United States Patent
Noma et al.

(10) Patent No.: US 7,416,462 B2
(45) Date of Patent: Aug. 26, 2008

(54) GLASS SUBSTRATE PROCESSING METHOD AND MATERIAL REMOVAL PROCESS USING X-RAY FLUORESCENCE

(75) Inventors: Takashi Noma, Hadano (JP); Toyoko Kobayashi, Yokohama (JP); Taiko Motoi, Atsugi (JP); Hiromitsu Takase, Sagamihara (JP); Naoko Miura, Kawasaki (JP); Shin Kobayashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 696 days.

(21) Appl. No.: 11/025,991

(22) Filed: Jan. 3, 2005

(65) Prior Publication Data

US 2005/0159068 A1    Jul. 21, 2005

Related U.S. Application Data

(62) Division of application No. 10/462,740, filed on Jun. 17, 2003, now Pat. No. 6,951,494, which is a division of application No. 09/722,543, filed on Nov. 28, 2000, now Pat. No. 6,632,113.

(51) Int. Cl.
    *G01N 23/223* (2006.01)
(52) U.S. Cl. ................ 445/2; 378/44; 378/45; 65/29.18; 250/306; 250/307
(58) Field of Classification Search ................ 445/2, 445/3, 59; 378/44–50; 65/29.18
    See application file for complete search history.

(56) References Cited

U.S. PATENT DOCUMENTS 4,860,329 A * 8/1989 Weiser et al. ................ 378/50
4,904,895 A   2/1990 Tsukamoto et al. ......... 313/336
4,952,185 A   8/1990 Lee ................................ 445/2
5,066,883 A   11/1991 Yoshioka et al. ............ 313/309
5,352,142 A   10/1994 Wolf .............................. 445/2
5,418,005 A   5/1995 Endo et al. .................. 427/140
5,540,809 A   7/1996 Ida et al. ..................... 156/584

(Continued)

FOREIGN PATENT DOCUMENTS

DE    43 30 184    3/1995

(Continued)

OTHER PUBLICATIONS

T. Fujii, et al., "Very Low Threshold Current GaAs-AlGaAs GRIN-SCH Lasers Grown by MBE or OEIC Applications", Journal of Vacuum Science & Technology B, $2^{nd}$ Series, vol. 2, No. 2, pp. 259-261 (Apr.-Jun. 1984).

(Continued)

*Primary Examiner*—Mariceli Santiago
(74) *Attorney, Agent, or Firm*—Fitzpatrick, Cella, Harper & Scinto

(57) ABSTRACT

To reuse glass used in a flat panel display, processing suitable for global environment such as processing of separating a lead component must be realized. A disassembly processing method for a flat panel display having a structure in which a face plate and rear plate mainly containing glass are airtightly joined via a frame with frit glass is characterized by including the step of separating the face plate and rear plate joined with the frit glass. The separation step is characterized by separating the face plate and rear plate by cutting, dissolution, or melting.

10 Claims, 58 Drawing Sheets

U.S. PATENT DOCUMENTS

| | | | |
|---|---|---|---|
| 5,556,018 A | 9/1996 | Kanehira | 225/2 |
| 5,569,974 A | 10/1996 | Morikawa et al. | 313/310 |
| 5,682,085 A | 10/1997 | Suzuki et al. | 315/169.1 |
| 5,697,825 A | 12/1997 | Dynka et al. | 445/25 |
| 5,734,224 A | 3/1998 | Tagawa et al. | 313/493 |
| 6,023,130 A | 2/2000 | Sakasegawa et al. | 313/592 |
| 6,409,562 B1 | 6/2002 | Asano et al. | 445/2 |
| 6,411,377 B1 * | 6/2002 | Noguchi et al. | 356/237.4 |
| 2002/0154734 A1 * | 10/2002 | Reim | 378/58 |

FOREIGN PATENT DOCUMENTS

| | | |
|---|---|---|
| EP | 0 587 039 | 9/1993 |
| EP | 655622 A1 * | 5/1995 |
| EP | 0 660 357 | 6/1995 |
| FR | 2 738 393 | 3/1997 |
| JP | 52-1633 | 1/1977 |
| JP | 53-12165 | 2/1978 |
| JP | 61-50687 | 3/1986 |
| JP | 61-50688 | 3/1986 |
| JP | 62-208525 | 9/1987 |
| JP | 64-31332 | 2/1989 |
| JP | 2-139833 | 5/1990 |
| JP | 2-257551 | 10/1990 |
| JP | 3-55738 | 3/1991 |
| JP | 4-28137 | 1/1992 |
| JP | 5-151898 | 6/1993 |
| JP | 5-185064 | 7/1993 |
| JP | 6-108047 | 4/1994 |
| JP | 6-130006 | 5/1994 |
| JP | 7-29496 | 1/1995 |
| JP | 7-37509 | 2/1995 |
| JP | 7-45198 | 2/1995 |
| JP | 7-235255 | 9/1995 |
| JP | 7-235521 | 9/1995 |
| JP | 7-302540 | 11/1995 |
| JP | 8-171850 | 7/1996 |
| JP | 8-273529 | 10/1996 |
| JP | 8-311444 | 11/1996 |
| JP | 8-333641 | 12/1996 |
| JP | 9-50765 | 2/1997 |
| JP | 2616320 | 3/1997 |
| JP | 9-92155 | 4/1997 |
| JP | 9-115445 | 5/1997 |
| JP | 9-115449 | 5/1997 |
| JP | 9-200654 | 7/1997 |
| JP | 9-200657 | 7/1997 |
| JP | 10-144224 | 5/1998 |
| JP | 63-177047 | 7/1998 |
| JP | 2804428 | 7/1998 |
| JP | 10206352 A * | 8/1998 |
| JP | 2004111801 A * | 4/2004 |

OTHER PUBLICATIONS

R. Meyer, "Recent Development on "Microtips" Display at LETI", Technical Digest of IVMC 91, pp. 7-9 (1991).

* cited by examiner

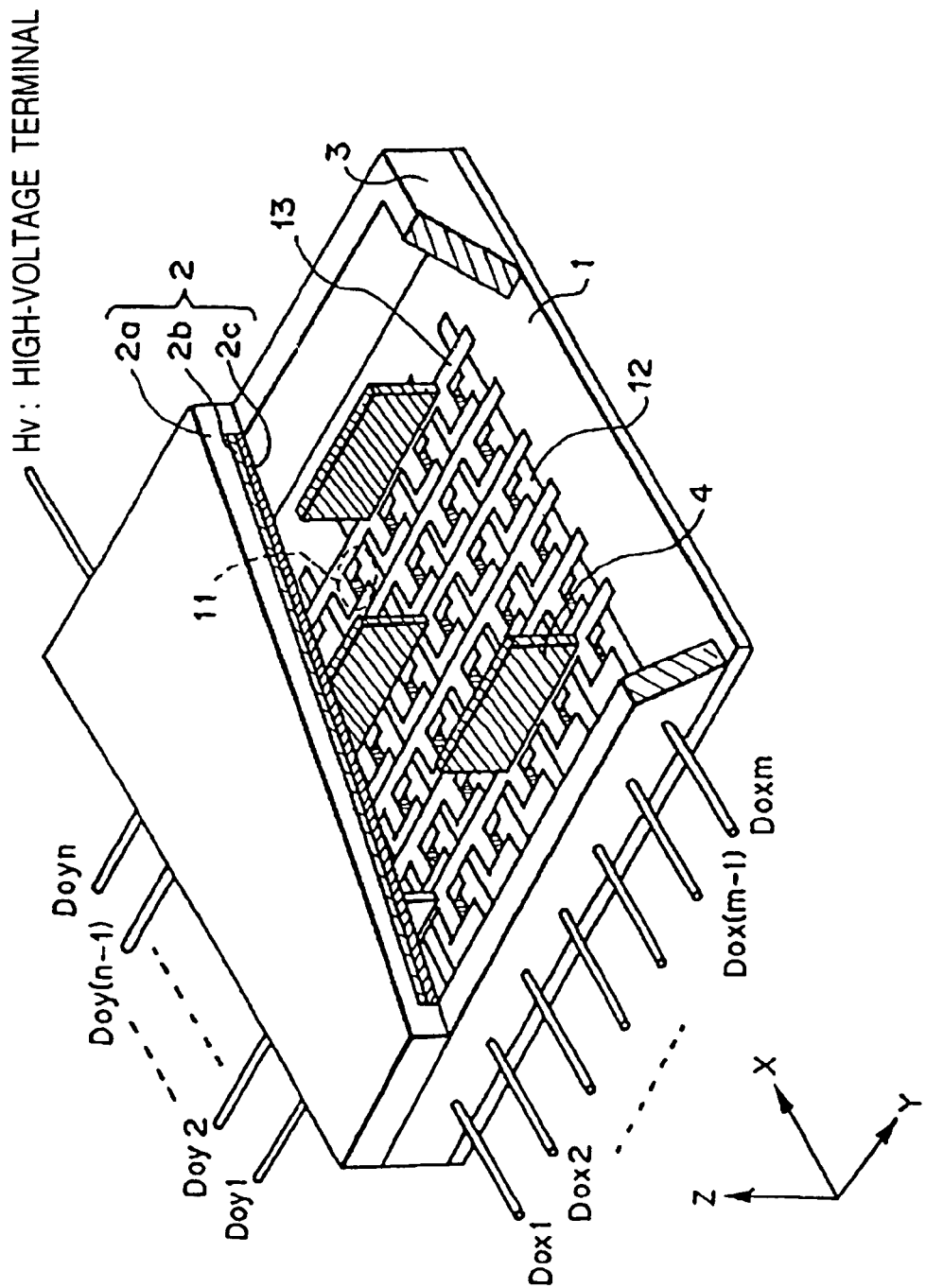

NITRIC ACID SOLUTION

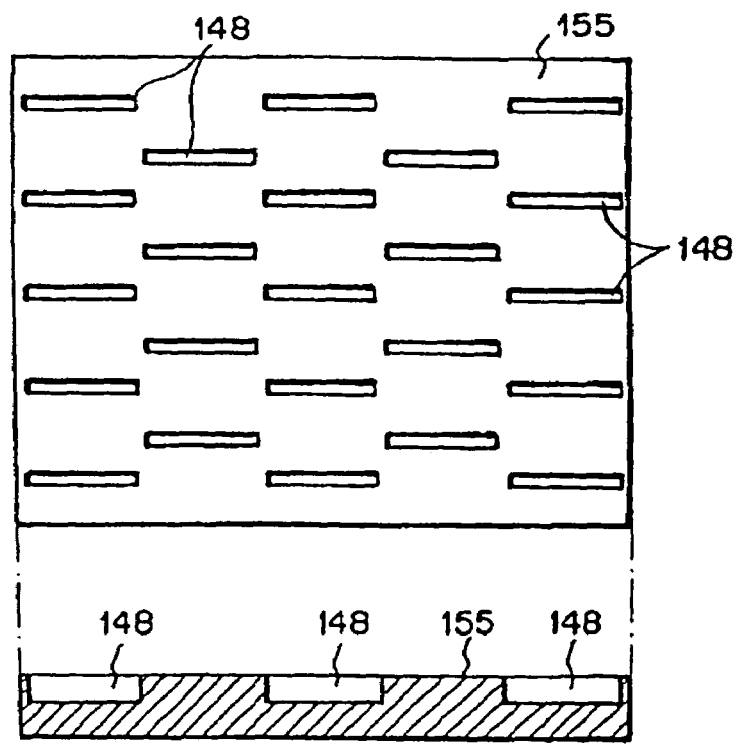
FIG. 16A
FIG. 16B
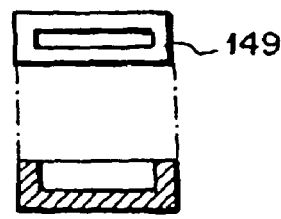
FIG. 17A
FIG. 17B

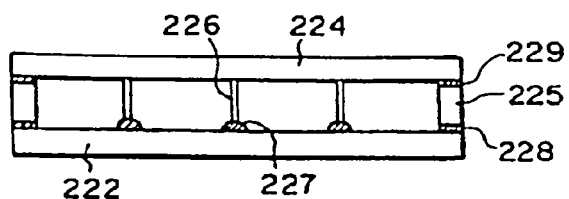
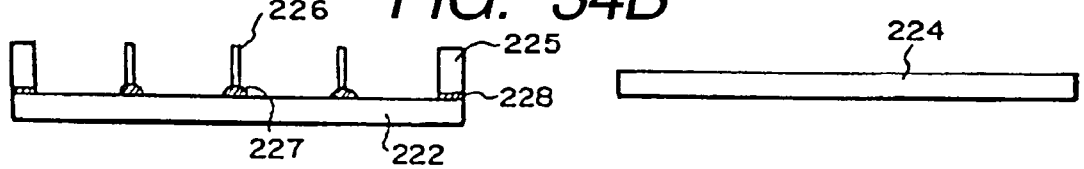
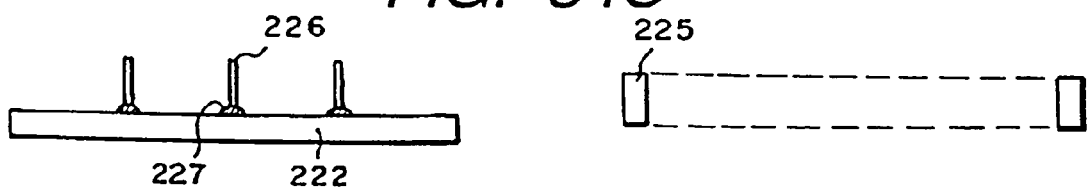
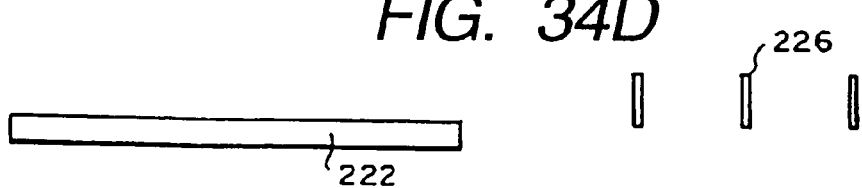

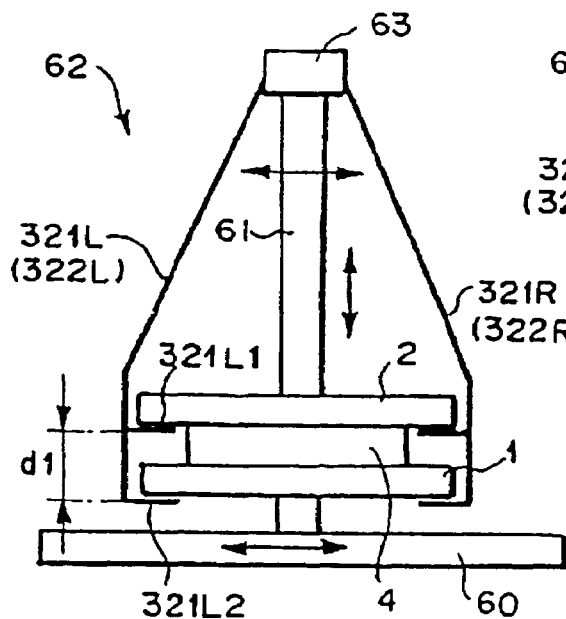
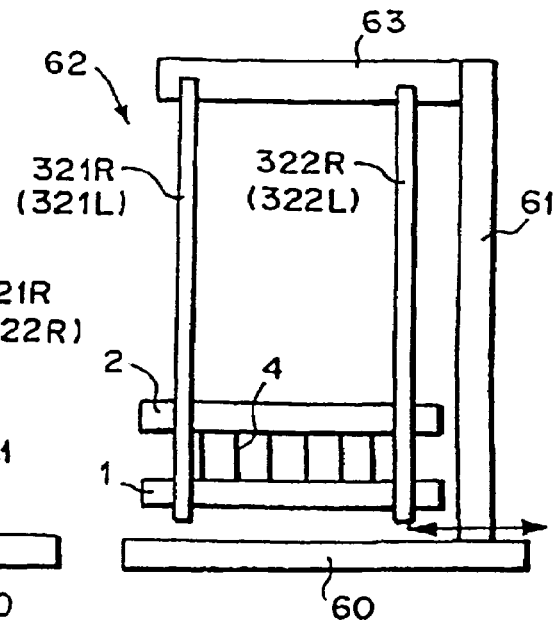
FIG. 47A    FIG. 47B
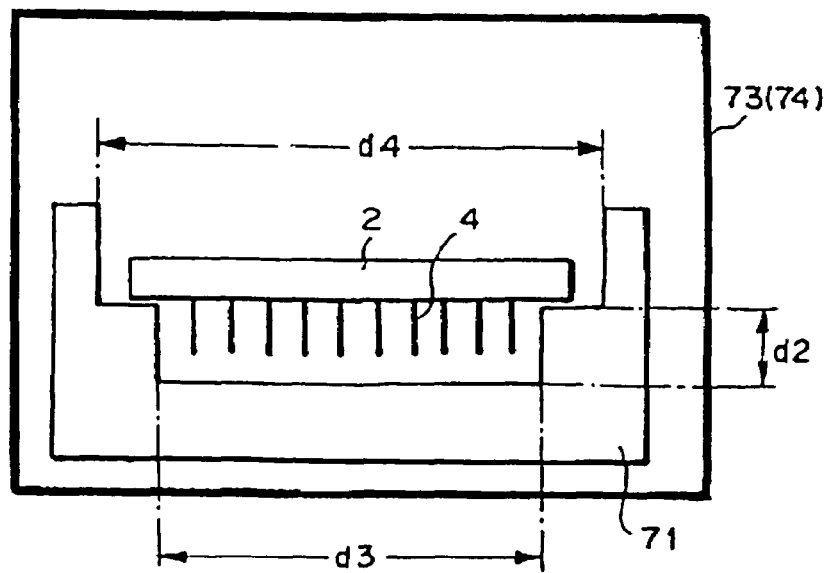
FIG. 48

GLASS SUBSTRATE PROCESSING METHOD AND MATERIAL REMOVAL PROCESS USING X-RAY FLUORESCENCE

This application is a continuation of International Application No. PCT/JP99/04866, filed Sep. 8, 1999, which claims the benefit of Japanese Patent Application as follows.

1) 10-255171 filed on Sep. 9, 1998
2) 10-263033 filed on Sep. 17, 1998
3) 10-263034 filed on Sep. 17, 1998
4) 10-268151 filed on Sep. 22, 1998
5) 11-004575 filed on Jan. 11, 1999
6) 11-032142 filed on Feb. 10, 1999
7) 11-032143 filed on Feb. 10, 1999
8) 11-033855 filed on Feb. 12, 1999
9) 11-045372 filed on Feb. 23, 1999
10) 11-047086 filed on Feb. 24, 1999
11) 11-047087 filed on Feb. 24, 1999
12) 11-047088 filed on Feb. 24, 1999
13) 11-047166 filed on Feb. 24, 1999
14) 11-248061 filed on Sep. 1, 1999

This is a divisional of application Ser. No. 10/462,740, filed on Jun. 17, 2003, now U.S. Pat. No. 6,951,494, issued on Oct. 4, 2005 which is a divisional of application Ser. No. 09/722,543, filed on Nov. 28, 2000, now U.S. Pat. No. 6,632,113, issued on Oct. 14, 2003.

TECHNICAL FIELD

The present invention relates to, in order to protect the global environment, a method of disassembling for scraping a flat panel display constituted by airtightly joining via a frame with frit glass or the like two substrates, i.e., a face plate (front glass substrate) and rear plate (rear glass substrate) mainly containing glass, a method of reusing a flat panel display, separating and recovering lead as a hazardous metal element among metal elements used for the flat panel display, and effectively reusing other noble metal elements and rare-earth elements, a method of dismantling an image forming apparatus welded with frit glass and recycling its face plate and rear plate, a method of recovering and reusing a spacer, a method of recovering fluorescent substances from a flat display apparatus or CRT (Cathode Ray Tube) for emitting light by irradiating a fluorescent substance-coated portion with an electron beam or ultraviolet ray, a display apparatus manufacturing method, an image display apparatus suitable for dismantling, disassembly, and reuse, a residual hazardous metal amount inspection apparatus for inspecting a hazardous metal amount contained in a waste or the like, and a fluorescent substance recovery method and apparatus in a flat display panel.

BACKGROUND ART

Conventionally, most of scrapped home appliances are shredded, valuables such as metals are recovered, and the remainders are disposed of as industrial wastes to a "least controlled landfill site" where the wastes are merely buried in a dug hole.

In recent years, a shortage of the capacity of disposal sites poses a serious problem, and environmental pollution by hazardous substances also poses a serious problem. For example, the cathode ray tube of a television uses a large amount of lead-containing glass. According to trial calculation by the Environment Agency, lead contained in scrapped cathode ray tubes amounts to 20,000 t every year, and most of lead is buried in least controlled landfill sites. However, rainwater naturally permeates in least controlled landfill sites, and these sites are not equipped with any drainage facility. It is being recognized that lead as a hazardous substance may diffuse.

Under these circumstances, conventional processing methods must be reconsidered. As for the cathode ray tube of a television, studies of shredding cathode ray tube glass into cullets (small glass pieces) and reusing them for cathode ray tubes have been made by Association for Electric Home Appliances. Of these studies, a system of extracting a cathode ray tube from a television main body and shredding the cathode ray tube into glass cullets has been developed (see, e.g., "Electrotechnology", January, 1997).

A method of recovering glass as cullets is disclosed in, e.g., Japanese Laid-Open Patent Application No. 61-50688. There is also known a method of shredding cathode ray tube glass into cullets (small glass pieces) and reusing them for cathode ray tubes (e.g., Japanese Laid-Open Patent Application No. 9-193762). A method of separating a cathode ray tube into a face plate and funnel in accordance with materials, and shredding them into cullets is disclosed in, e.g., Japanese Laid-Open Patent Application No. 05-185064. Further, a method of separating a cathode ray tube into a face plate and funnel, peeling fluorescent substances and a black mask from the face plate, and recycling the face place is disclosed in Japanese Laid-Open Patent Application No. 7-037509.

To reuse cathode ray tube glass, the glass must be separated into panel glass and lead-containing funnel glass. This is because, if lead is mixed in panel glass by a predetermined amount or more, a browning phenomenon occurs, and the lead-containing glass cannot be reused as a raw material of the panel glass. For this reason, a cathode ray tube is separated into a panel and funnel. For this purpose, there are proposed a method of defining a position to cut a cathode ray tube (Japanese Laid-Open Patent Application No. 9-115449), and a method of melting frit glass which joins a panel and funnel, thereby separating the panel and funnel (Japanese Laid-Open Patent Application No. 7-45198).

As a technique of separating a funnel and panel welded with frit glass, a technique of separating a funnel and panel using thermal distortion in heat treatment is known as disclosed in, e.g., Japanese Laid-Open Patent Application Nos. 5-151898, 7-029496, 9-200654, and 9-200657.

In recent years, studies for applying cold cathode elements have enthusiastically been done. Known examples of the cold cathode elements are surface-conduction type electron-emitting elements, field emission type electron-emitting elements, metal/insulator/metal type electron-emitting elements. Compared to a thermionic cathode element, the cold cathode element can emit electrons at a low temperature. The cold cathode element does not require any heater, is simpler in structure than the thermionic cathode element, and can form a small element. Even if many elements are arranged on a substrate at a high density, problems such as thermal melting of the substrate hardly arise. In addition, the response speed of the thermionic cathode element is low because it operates upon heating by a heater, whereas the response speed of the cold cathode element is high.

Of cold cathode elements, surface-conduction type electron-emitting elements have a simple structure, can be easily manufactured, and allow forming many elements in a wide area. As disclosed in Japanese Laid-Open Patent Application No. 64-31332 filed by the present applicant, a method of arranging and driving many elements has been studied.

As applications of surface-conduction type electron-emitting elements, e.g., image forming apparatuses such as an image display apparatus and image recording apparatus, charge beam sources, and the like have been studied.

Particularly as applications to image display apparatuses, as disclosed in U.S. Pat. No. 5,066,883 and Japanese Laid-Open Patent Application Nos. 2-257551 and 4-28137, an image display apparatus using a combination of a surface-conduction type electron-emitting element and a fluorescent substance which is irradiated with an electron beam to emit light has been studied. The image display apparatus using a combination of a surface-conduction type electron-emitting element and fluorescent substance is expected to exhibit more excellent characteristics than other conventional types of image display apparatuses. For example, this image display apparatus is superior to a recent popular liquid crystal display apparatus in that the image display apparatus does not require any backlight because of self-emission type and that the view angle is wide.

A method of driving many field emission type electron-emitting elements arranged side by side is disclosed in, e.g., U.S. Pat. No. 4,904,895. A known application of FE type electron-emitting elements to an image display apparatus is a flat display reported by R. Meyer et al. [R. Meyer: Recent Development on Micro-tips Display at LETI", Tech. Digest of 4th Int. Vacuum Micro-electronics Conf., Nagahama, pp. 6-9 (1991)].

An application of many metal/insulator/metal type electron-emitting elements arranged side by side to an image display apparatus is disclosed in Japanese Laid-Open Patent Application No. 3-55738.

Of these image forming apparatuses using electron-emitting elements, a thin flat display is space-saving and lightweight, and receives a great deal of attention as a substitute for a cathode ray tube type image display apparatus.

The interior of the airtight container in the image forming apparatus is kept at a vacuum of about $10^{-6}$ Torr. As the display area of the image display apparatus increases, the airtight container requires a means for preventing a rear plate and face plate from being deformed or destructed by the difference between internal and external pressures of the airtight container. If the rear plate and face plate are made thick, this increases the weight of the image display apparatus, and generates distortion and disparity of an image when viewed diagonally. Thus, the airtight container generally employs spacers each of which is made of a relatively thin glass plate whose surface is covered with an antistatic conductive film.

Flat displays including a vacuum fluorescent display (VFD), plasma display (PDP), and surface-conduction type electron source display (SED) in addition to the field-emission type electron source display (FED) and MIM type display described above are space-saving and lightweight, and receive a great deal of attention as substitutes for cathode ray tube type display apparatuses. Many flat displays have been studied and developed.

For example, the present applicant offers several proposals for an electron source constituted by arraying on a substrate many surface-conduction type electron-emitting elements as one type of cold cathode type electron-emitting elements, and an image display apparatus using this electron source.

The structure of the surface-conduction type electron-emitting element, the structure of the image display apparatus using this, and the like are disclosed in detail in, e.g., Japanese Laid-Open Patent Application No. 7-235255, and will be described briefly.

FIGS. 68A and 68B show a structure of a surface-conduction type electron-emitting element. Reference numeral 411 denotes a substrate; 412 and 413, a pair of element electrodes; and 414, a conductive film which partially has an electron-emitting portion 415. The substrate 411, element electrodes 412 and 413, conductive film 414, and electron-emitting portion 415 constitute an electron-emitting element 416.

As a method of forming the electron-emitting portion 415, a voltage is applied between the pair of element electrodes 412 and 413 to deform, change of properties, or destruct part of the conductive film, thereby increasing the resistance. This is called "electrification forming processing". To form an electron-emitting portion having good electron emission characteristics by this method, the conductive film is preferably made of fine conductive particles. An example of the material is fine PdO particles. The voltage applied in electrification forming processing is preferably a pulse voltage. This processing can adopt either one of a method of applying pulses having a predetermined peak value, as shown in FIG. 69A, and a method of applying pulses whose peak value gradually increases, as shown in FIG. 69B.

To form a fine conductive particle film, fine conductive particles may be directly deposited by gas deposition. Instead, a method of applying the solution of a compound (e.g., organic metal compound) containing the constituent element of the conductive film and annealing the coating into a desired conductive film is desirable because no vacuum device is required, the manufacturing cost is low, and a large electron source can be formed. As a method of applying the organic metal compound solution, a method of applying the solution to only a necessary portion using an ink-jet apparatus is desirable because the method does not require any extra step for patterning of the conductive film.

After the electron-emitting portion is formed, a pulse voltage is applied between the element electrodes in a proper atmosphere containing an organic substance (this will be called "activation processing"). Then, a deposition film mainly containing carbon is formed at the electron-emitting portion and its vicinity to increase a current flowing through the element and improve electron emission characteristics.

After that, a step called "stabilization processing" is preferably performed. In this processing, while a vacuum container and electron-emitting element are heated, the vacuum container is kept evacuated to sufficiently remove an organic substance and the like, thereby stabilizing the characteristics of the electron-emitting element.

A method of forming the conductive film of an electron source using a surface-conduction type electron-emitting element by an ink-jet apparatus is disclosed in, e.g., Japanese Laid-Open Patent Application No. 8-273529.

The ink-jet apparatus will be explained briefly. Methods of discharging ink from the ink-jet apparatus are roughly classified into two types. According to the first method, a liquid is discharged as droplets using the contraction pressure of a piezoelectric element disposed at a nozzle. This method is called a piezo-jet method. In this method, a conductive thin film material is stored in an ink reservoir, and a predetermined voltage is applied to an electrical signal input terminal to contract the cylindrical piezoelectric element, thereby discharging a liquid as droplets.

According to the second method, a liquid is heated and bubbled by a heating resistor to discharge droplets. This method is called a bubble-jet method. In a bubble-jet type ink-jet apparatus, the heating resistor generates heat to bubble a liquid, thereby discharging droplets from a nozzle.

By using this ink-jet apparatus, an organic metal compound solution is applied as droplets to only a predetermined position. After the solution is dried, the organic metal compound is thermally decomposed by heating processing to form a conductive film from small particles of a metal or metal oxide.

FIG. 1 shows a structure of an image display apparatus. In FIG. 1, reference numeral 1 denotes a rear plate; 2, a face plate having a fluorescent film 2b, metal back 2c, and the like formed on the inner surface of a substrate 2a; and 3, a support frame. The rear plate 1, support frame 3, and face plate 2 are joined and tightly sealed with frit glass to constitute an image display apparatus 15.

Flat panel displays having this structure are expected to abruptly increase in size and production. In these flat panel displays, frit glass used for sealing contains lead. The fluorescent substance 2b serving as an image forming member, a spacer 4, and the like are high-cost members. Similar to cathode ray tube glass, establishment of a recovery system becomes an important subject in terms of "non-hazardous processing", "volume reduction", and "recycling".

DISCLOSURE OF INVENTION

Problems to be solved by the present invention will be described in the following order, and examples for respective solving means and embodiments will be explained in this order.

[Problem 1] The FPD has a different structure from that of a cathode ray tube, and requires another processing method. That is, the FPD is constituted by airtightly joining two substrates, i.e., a face plate and rear plate mainly containing glass via a frame with frit glass. In general, frit glass containing a large amount of lead component so as to enable low-temperature baking is used.

For the same reason as a cathode ray tube, the FPD must be separated into glass not containing any lead and glass containing lead in order to reuse glass. In reusing members other than glass, lead must be removed.

The present invention has been made to solve the above problem, and has as its object to provide a processing method of easily reusing a scrapped FPD.

[Problem 2] It is another object of the present invention to provide a disassembly processing method including a separation/recovery method for lead as a hazardous metal, and a recovery/reuse method for rare elements such as noble metal elements and rare-earth elements.

[Problem 3] When a flat display is scrapped owing to generation of defects during the manufacture or upon the lapse of a service life, the entire display is shredded and scrapped, which increases the scrap amount. Recently, social demands arise for minimizing generation of wastes along with industrial activities, and reuse of members is becoming an imminent subject.

When a constituent material contains a hazardous element or the like, the hazardous element must be separated. A rear plate having electron-emitting elements that determines the performance of an image display apparatus often uses a high-cost substrate in order to obtain uniform element characteristics. Particularly, an element electrode which is first formed on a rear plate substrate is often made of a strong material which can resist subsequent steps.

The present invention has been made to solve this problem, and has as its object to provide a disassembly method of easily reusing a rear plate as an important constituent component of a scrapped image display apparatus, to provide a separation/recovery method for an element such as lead contained in a constituent material, and to efficiently form conductive films including the electron-emitting portions of a plurality of electron-emitting elements to be formed.

[Problem 4] When a flat display is scrapped owing to generation of defects during the manufacture or upon the lapse of a service life, the entire display is shredded and scrapped, which is economically undesirable because the constituent material contains a relatively high-cost material. Especially, the panel uses many spacers, and the manufacture of spacers requires a high manufacturing cost and long time because glass must be formed into thin pieces and conductive films must be formed. Even when a display is scrapped due to any reason, the cause is rarely a defective spacer, and spacers can often be reused without any problem.

For this reason, in scraping a flat display, spacers are desirably separated from other members, recovered, and reused.

As described above, the spacer is a thin plate and formed from a glass substrate, and may be damaged while a display is dismantled. Thus, development of a method capable of recovering spacers without any damage is desired.

[Problem 5] Conventionally, rare-earth elements have hardly been recovered from a display apparatus scrapped after use.

This is because (1) the amount of rare-earth elements used per display apparatus is very small, and the recovery is difficult, (2) rare-earth elements are used not as single substances but as compounds or alloys, and the separation cost is high, and (3) relatively low-cost imported rare-earth elements can be acquired at lower cost under the influence of the strong yen.

However, the recycling of these materials is desirably promoted in terms of environmental conservation and stably supply of rare-earth element resources. A method of recovering rare-earth elements from industrial products is an important subject. Note that rare-earth elements are mainly contained in fluorescent substances.

Fluorescent substances also contain chromium and sulfur elements, and these elements are also desirably recovered in terms of environmental conservation.

On the other hand, a face plate from which fluorescent substances are recovered loses almost all the smoothness of the inner surface. For this reason, such a face plate is conventionally shredded into cullets, buried in a least controlled landfill site, or reused as a glass material. In recent years, there are proposed a method of renewing the smoothness of the inner surface again by acid treatment and reusing the face plate, instead of shredding the face plate into cullets. However, this method is no longer effective because least controlled landfill sites are being saturated. Moreover, acid treatment is wet treatment, and is not preferable in terms of the cost and work environment.

The present invention has been made in consideration of the above situation, and has as its object to provide a method of efficiently recovering fluorescent substances contained in a display apparatus, and recovering and reusing a face plate while maintaining or renewing the smoothness of the inner surface.

[Problem 6] To dismantle, disassemble, and reuse an image display apparatus having an airtight container kept at a pressure lower than the atmospheric pressure, the interior of the airtight container must be returned to the atmospheric pressure. In returning to the atmospheric pressure, as the pressure difference from the internal pressure of the airtight container is larger, a larger amount of gas such as air often abruptly flows into the airtight container to damage the interior of the airtight container or destruct the airtight container. This may unexpectedly destruct the airtight container to scatter fragments, which is not preferable in terms of safety. This does not pose a serious problem when a CRT is shredded into cullets and reused as a glass material. However, to maximally reuse each member of an image display apparatus, the destruction not only increases wastes such as garbage in terms of resource conservation, but also wastes energy and labor.

Particularly in an FPD, the container incorporates many atmospheric pressure-resistant constituent members such as spacers. The destruction greatly damages the atmospheric pressure-resistant constituent members, and the destructed members damage and destruct the interior of the airtight container of the image display apparatus to inhibit reuse of these members. A spacer requires a higher cost than other members because the shape of the side surface is made uniform or the spacer is uniformly coated with a film having a conductivity corresponding to the specifications of an image display apparatus in order to prevent distortion of an image.

The present invention has been made to solve the above problem, and has as its object to reuse a member in dismantling and disassembly by smoothly returning the interior of an evacuated airtight container of an image display apparatus to an external pressure.

[Problem 7] When a flat display is scrapped owing to generation of defects during the manufacture or upon the lapse of a service life, the entire display is shredded and scrapped, which poses an environmental problem, and is not economically preferable because the constituent material of an element includes a relatively high-cost material. For example, a panel uses many spacers. The spacers require a high manufacturing cost and long time because glass must be shredded into thin pieces and conductive films must be formed. Further, a rear plate, face plate, and support frame can be reused after portions which need to be repaired in accordance with the situation are appropriately processed.

For this reason, demands arise for recovering and reusing members without any damage and efficiently recovering resources in disassembling a flat display due to generation of defects during the manufacture or upon the lapse of a service life.

It is still another object of the present invention to provide a method of safely, easily dismantling a flat display into constituent members, and a flat display panel suitable for this disassembly.

[Problem 8] In disassembling and fractionating a cathode ray tube, flat panel display, and the like, the hazardous metal amount must be quantitatively detected for wastes left after fractionated members for reuse are recovered, and whether the residual amount is an allowance or less must be checked and confirmed to prevent environmental pollution/destruction. As for fractionated members for reuse, the residual amount of lead (hazardous metal) is wanted to be quantitatively detected for fractionation depending on the presence/absence of lead.

To detect lead in a member, an inspection method using a fluorescent X-ray or the like is known. This method, however, must scan the entire surface of a member to be inspected, and becomes cumbersome for many targets to be inspected such as glass cullets. Inspection target objects are limited, quantitative detection is impossible, and the method is difficult to apply.

The present invention has been made to solve the conventional problem, and has as its object to provide a residual hazardous metal amount inspection apparatus capable of quantitatively detecting the amount of hazardous metal such as lead left in an inspection target object such as a fractionated glass member or waste, inspecting various members without particularly limiting inspection target objects, and easily quantitatively detecting the hazardous metal amount without any cumbersome operation in disassembling and fractionating a flat display panel or the like.

[Problem 9] A technique of disassembly processing for recycling a flat display panel is being developed, and conventional related arts cannot be directly adopted. For example, if the technique of cathode ray tube glass disassembly processing disclosed in Japanese Laid-Open Patent Application No. 9-193762 or the like is employed, the weight of a rear plate or face plate is applied to a spacer 4 to destruct it in separating the spacer 4. This technique cannot be applied to disassembly of a flat display panel.

The present invention has been made to solve the conventional problem, and has as its object to provide a flat panel display disassembly apparatus capable of performing disassembly processing by proper steps, recovering a directly reusable constituent member such as a spacer without any damage, and preferably recycling the recovered member.

[Problem 10] An FPD has a different structure from that of a cathode ray tube, and requires another processing method. The FPD is constituted by airtightly joining two substrates, i.e., a face plate and rear plate mainly containing glass via a frame with frit glass. In general, frit glass containing a large amount of lead component so as to enable low-temperature baking is used. In some cases, the material of a wiring line and the constituent material of a face plate contain lead in addition to frit glass. For the same reason as a cathode ray tube, the FPD must be separated into glass not containing any lead and glass containing lead in order to reuse glass. Also in reusing members other than glass, lead must be removed.

To remove lead, a method of selectively dissolving and separating a lead component using an aqueous acid or alkaline solution is effective. However, practicing this method on a large scale requires a large amount of aqueous solution for dissolving lead and a large amount of water for the subsequent cleaning step. To heat and flow a solution., large energy must be applied. This increases the processing cost.

The present invention has been made to solve the above problem, and has as its object to provide a method of processing a scrapped FPD at low cost.

[Problem 11] Rare-earth elements have hardly been recovered from a display scrapped after use. This is because (1) the amount of rare-earth elements used per display is very small, and the recovery is difficult and has not been automated, (2) rare-earth elements are used not as single substances but as compounds or alloys, and the separation cost is high, and (3) relatively low-cost imported rare-earth elements can be acquired at lower cost under the influence of the strong yen.

However, the recycling of these materials must be promoted in terms of environmental conservation and stable supply of rare-earth element resources. A method of recovering rare-earth elements from industrial products is becoming an important subject. Some home appliance manufacturers start recovery business for CRTs, whereas demands arise for immediately promoting the recycling of flat panel displays.

The present invention has been made in consideration of the above situation, and has as its object to provide a fluorescent substance recovery method and apparatus capable of efficiently, easily dismantling a flat display panel, and effectively recovering particularly fluorescent substances.

[Problem 12] An FPD (Flat Panel Display) has a different structure from that of a cathode ray tube, and requires another processing method. The FPD is constituted by airtightly joining two substrates, i.e., a face plate 2 and rear plate 1 mainly containing glass via a frame with frit glass. In general, frit glass containing a large amount of lead component so as to enable low-temperature baking is used. In some cases, the material of a wiring line and the constituent material of a face plate contain lead in addition to frit glass. For the same reason as a cathode ray tube, the FPD must be separated into glass not containing any lead and glass containing lead in order to reuse glass. In reusing members other than glass, lead must be removed.

To remove lead, a method (submergence processing) of selectively dissolving and separating a lead component using an aqueous acid or alkaline solution is effective. However, practicing this method on a large scale requires a large amount of aqueous solution for dissolving lead and a large amount of water for the subsequent cleaning step must be prepared. Further, to heat and flow a solution, large energy must be applied. To suppress the cost and complete processing within a short time, many glass plates obtained by disassembling a scrapped FPD must be processed by putting them into a submergence processing bath at once. In addition, quickly conveying glass plates between processing baths requires a convey mechanism for conveying many glass plates at once.

The present invention has been made in consideration of the above situation, and has as its object to provide a substrate processing method and apparatus of realizing efficient and appropriate submergence processing.

[Problem 13] In reusing substrate glass, a rear plate 1 and face plate 2 are separated from other members. Wiring lines, elements, and the like formed on the substrate are removed to obtain a single glass member. The glass member can be reused as a substrate, or can be shredded into cullets and newly reused as a glass substrate or the material of another product.

When, however, wiring lines, electron-emitting elements, frit glass, and the like are formed on a glass substrate, and soda-lime glass is used as the substrate, a thin film may be formed on the surface in advance. Some of the materials may be in tight contact with the glass substrate, or some of the elements may gradually diffuse into the glass substrate. Thus, the thin film may be difficult to completely separate from substrate glass.

In shredding used glass into cullets and reusing them, if an element other than a constituent element is mixed in glass cullets, the mixed element influences the physical properties and color of glass. Impurity element-containing glass may not be reused. Even when glass is reused as a substrate, the glass is desirably restored to an initial glass substrate state as much as possible.

The present invention has been made in consideration of the above situation, and has as its object to provide a glass substrate processing method of realizing effective and efficient reuse of substrate glass.

Means for solving the problems of the present invention will be explained in an order corresponding to the problems to be solved by the above-described inventions.

[Solving Means 1] To achieve the above object, according to the present invention, a disassembly processing method for an FPD having a structure in which two substrates, i.e., face plate and rear plate mainly containing glass are airtightly joined via a frame with frit glass is characterized by separating a portion of the frame joined with frit glass from remaining portions.

According to the present invention, a disassembly processing method for an FPD which incorporates a spacer and has a fluorescent screen on the inner surface of a face plate is characterized by comprising leaving the spacer and the fluorescent screen at remaining portions in separating a portion of the frame joined with frit glass.

The present invention is characterized by cutting part of the face plate and the rear plate to separate a portion of the frame joined with frit glass from remaining portions.

In the present invention, means for determining a cutting position includes means (video camera) for detecting a position of the frame joined with frit glass.

[Solving Means 2] To achieve the above object, according to the present invention, an FPD having a structure in which two substrates, i.e., face plate and rear plate mainly containing glass are airtightly joined via a frame with frit glass is characterized by comprising dissolving a joint portion with nitric acid to peel the face plate and the rear plate. In the present invention, the FPD may incorporate a spacer joined with frit glass.

As a method of dissolving frit glass with nitric acid, a method of dipping a joint portion in nitric acid is safe and easy because nitric acid must penetrate deep into the frit joint portion. The present invention adopts this method, but a method of, e.g., spraying nitric acid from a nozzle to joint portions is also available.

The frit joint portion to be dissolved with nitric acid can employ (1) a method of dipping all joint portions in nitric acid to dissolve and peel them, and separating, scraping, and reusing respective portions, and (2) a method of leaving a portion to be reused without eroding it with an acid, dipping remaining portions in nitric acid to dissolve, peel, and scrap them. Either method can separate only a hazardous lead component among metal components dissolved with nitric acid, and can reuse and recycle the remaining elements.

[Solving Means 3] To achieve the above object, according to the present invention, a rear plate recycling method comprises the step of dipping a welded portion in a nitric acid solution to dissolve frit glass, and the step of forming a conductive film by an ink-jet method, in scraping an image display apparatus constituted by at least a rear plate having a plurality of electron-emitting elements each formed from a pair of element electrodes and a conductive film, a face plate having an image forming member on which an image is formed upon collision of electrons emitted by the electron-emitting elements, and a support frame which connects the rear plate and face plate and maintains the internal pressure, the rear plate, face plate, and support frame being welded with frit glass.

According to the present invention, the rear plate is dismantled by chemically dissolving frit glass without mechanical cutting or the like. Thus, the rear plate can be recovered and reused without damaging the rear plate substrate and element electrode. Wastes can be decreased, resources can be effectively used, and the cost can be reduced. Elements such as Pb are eluted in a dipping nitric acid solution, so that they can be easily recovered. In recycling the rear plate, a conductive film is formed by an ink-jet method. Since the conductive film formation material is used for only a necessary portion, the amount of conductive film material can be minimized. Even when a defect is found after the conductive film is formed, only the defective portion can be formed again.

[Solving Means 4] The present invention has been made in consideration of the above situation. According to the present invention, there is provided a spacer recovery method in a flat display which has at least a rear plate with a plurality of electron-emitting elements, a face plate that is arranged to face the rear plate and has an image display portion, a frame, and spacers for holding an interval between the rear plate and the face plate against an atmospheric pressure, the rear plate, the face plate, the frame, and the spacers being welded with frit glass, characterized in that a spacer recovery jig for avoiding contact between the spacers or between the spacers and a peripheral member is used in dipping welded portions between the spacers and the rear plate or the face plate in a nitric acid solution to dissolve frit glass.

The spacer recovery jig used in an aspect of the present invention includes a flat plate having one or a plurality of recesses capable of storing the spacers. The spacer recovery jig in another aspect includes a jig having distal ends capable of pinching and holding the respective spacers, and an arm capable of moving the distal ends in an arbitrary direction.

According to the present invention, since spacers can be recovered with almost no damage in dismantling a flat display, they can be easily reused, resources can be effectively used, and the cost can be reduced. In addition, since the recovery step does not require any fine manual work, spacers can be safely recovered.

[Solving Means 5] According to the present invention, a method of recovering fluorescent substances from a display apparatus in which fluorescent substances are applied to a substrate, and caused to emit light, thereby obtaining display, characterized in that the fluorescent substances applied to the substrate are recovered by both a brush and a suction unit.

A display apparatus manufacturing method according to the present invention is characterized by reusing for a display apparatus a substrate from which fluorescent substances are removed by the method of recovering fluorescent substances from a display apparatus according to the present invention.

The present invention is effective for recovery of fluorescent substances and a substrate such as a face plate from a display apparatus such as a CRT or flat display apparatus in which fluorescent substances are applied to a substrate such as a face plate, and caused to emit light by irradiation of an electron beam or an ultraviolet ray. A substrate surface coated with fluorescent substances is swept with a brush to brush off fluorescent substances, or fluorescent substances and a black matrix component. When the smoothness of the substrate surface is held or impaired, the substrate is reformed, and the fluorescent substances and black matrix component are swept and sucked by a suction device. The fluorescent substances and black matrix are further transferred to the fluorescent substances separation process. The substrate such as a face plate is unloaded from the step while the smoothness of the surface is held or kept unimpaired, and then the substrate is directly reused as a substrate such as a face plate.

As a flat display apparatus for performing display by causing fluorescent substances to emit light, a type of apparatus for irradiating fluorescent substances with an electron beam includes a display apparatus using an electron-emitting element (to be described later) and a vacuum fluorescent display tube for emitting light by a low-speed electron beam. A type of apparatus using an ultraviolet ray includes a plasma display apparatus. When fluorescent substances are irradiated from a back surface with an electron beam or ultraviolet ray, and emit visible light from a front surface, the fluorescent substances are applied to the face plate of the flat display apparatus. When visible light is emitted from a surface on which fluorescent substances are irradiated with a low-speed electron beam, like a vacuum fluorescent tube, the fluorescent substances are applied to the rear plate.

[Solving Means 6] According to the present invention, in order to achieve the above object, an image display apparatus is characterized by comprising display means for displaying an image, an airtight container, and means for gradually changing an interior of the airtight container close to a pressure outside the airtight container as needed.

The present invention is characterized in that the image display apparatus further comprises an exhaust device, and the means for changing the interior of the airtight container close to the pressure outside the airtight container is arranged at a different position on the airtight container from means connected to the exhaust device. The means for changing the interior of the airtight container close to the pressure outside the airtight container is characterized by comprising a necessary filter.

The present invention is characterized by comprising display means for displaying an image, an airtight container for maintaining an external pressure, an atmospheric pressure-resistant structure member in the airtight container, means connected to an exhaust device for evacuating an interior of the airtight container, and means for gradually changing the interior of the airtight container close to a pressure outside the airtight container as needed.

Since the image display apparatus having this arrangement has the means for gradually changing the interior of the airtight container close to the atmospheric pressure, the internal member of the airtight container is almost free from any stress caused by a change in pressure in dismantling and disassembly.

Thus, the member is hardly destructed, and secondary damage by pieces of the destructed member can be prevented.

[Solving Means 7] According to the present invention, a flat display having at least a rear plate with a plurality of electron-emitting elements, a face plate which is arranged to face the rear plate and has an image display portion, a support frame, and a spacer for holding an interval between the rear plate and the face plate against an atmospheric pressure, the rear plate, the face plate, the support frame, and the spacer being welded with frit glass is characterized in that joining of the rear plate and the support frame, and joining of the face plate and the support frame use frit glasses having different softening temperatures, and joining of the spacer and the substrate uses a frit glass having a softening temperature not less than a higher softening temperature of the frit glass among the two types of frit glasses.

Each of the plurality of frit glasses is characterized to have a softening temperature different by at least 20° C. from the softening temperatures of the remaining frit glasses.

The spacer in the present invention is characterized to be joined to either one of the rear plate and the face plate.

A flat display disassembly method according to the present invention is characterized by comprising heating the flat display panel to not less than a softening temperature of a frit glass having the lowest softening temperature, and to not more than the softening temperatures of the remaining frit glasses, melting only the frit glass having the lowest softening temperature to selectively separate only a joint portion joined with the frit glass, and repeating the same procedures to sequentially separate the flat display panel from a joint portion using a frit glass having a lower softening temperature.

A method of separating a joint portion joined with the frit glass having the highest softening temperature may include a method of heating the frit glass to not less than the softening temperature to melt the frit glass, thereby separating the joint portion, or may include a method of dissolving the frit glass with a proper solvent to separate the joint portion.

A flat display having an airtight container storing at least a substrate with a plurality of electron-emitting elements, and a substrate which is arranged to face the substrate and has an image display portion may be characterized in that joint portions between the substrates and the airtight container are joined with frit glasses having different softening temperatures corresponding to a disassembly order.

A flat display having as constituent members at least a rear plate with a plurality of electron-emitting elements, a face plate which is arranged to face the rear plate and has an image display portion, and a support frame for supporting the substrates, the constituent members being welded with frit glass, may be characterized in that joining of the rear plate and the support frame, and joining of the face plate and the support frame use frit glasses having different softening temperatures.

A flat display having an envelope storing an electron-emitting element may be characterized in that a joint portion between a rear plate and a support frame constituting the envelope, and a joint portion between a face plate and the support frame use two types of frit glasses having different softening temperatures, and a joint portion between a spacer for supporting an interval between the substrates and at least one of the substrates is joined using a frit glass having a softening temperature higher than the softening temperatures of the two types of frit glasses or equal to the softening temperature of either type of frit glass.

A flat display disassembly method is characterized by comprising, in disassembling the flat display, heating the flat display stepwise, and sequentially melting and separating the flat display from a joint portion using frit gas having a lower frit gas, thereby disassembling the flat display.

In the flat display according to the present invention, members forming an envelope can be sequentially separated, so that the members can be recovered by a safe and simple method without damaging the envelope and the internal members during the disassembly process. The members can, therefore, be recovered as reusable ones, resources can be effectively used, and the cost can be reduced.

[Solving Means 8] To achieve the above object, a residual hazardous metal amount inspection apparatus for inspecting an amount of hazardous metal such as lead contained in an inspection target object such as a member or a waste disassembled and fractionated for recycling comprises first elution means having, in a bath for dipping the inspection target object, an acid solution for eluting a hazardous metal contained in the inspection target object; cleaning means for cleaning the inspection target object after elution by the first elution means; second elution means having an acid solution for eluting a hazardous metal left on the inspection target object, in a bath for dipping the inspection target object cleaned by the cleaning means; and quantitative detection means for quantitatively detecting a hazardous metal amount eluted in the acid solution of the second elution means.

In the residual hazardous metal amount inspection apparatus of the present invention, an inspection target object is dipped in the bath of the first elution means to elute a hazardous metal contained in the inspection target object with an acid solution in the bath. The inspection target object is transferred to the cleaning means where the object is cleaned. Then, the inspection target object is dipped in the bath of the second elusion means to elute a hazardous metal left on the inspection target object with an acid solution in the bath. This elution solution is supplied to the quantitative detection means, which quantitatively detects a hazardous metal amount contained in the elusion solution.

Hence, in disassembling and fractionating a flat panel display or the like, the amount of hazardous metal such as lead left on an inspection target object such as a fractionated glass member or waste can be quantitatively detected.

[Solving Means 9] According to the present invention, a flat panel display disassembly apparatus for disassembling and recycling a flat panel display in which a frame member is interposed between a rear plate and a face plate to constitute a flat vacuum container, and a spacer for holding a gap between the plates against an atmospheric pressure is fixed to both or either one of the plates comprises first support means for applying a pull-up force to a plate fixed to the spacer to support the plate in order to perform the step of separating the frame member from the vacuum container, second support means for receiving and supporting an edge of the plate fixed to the spacer after the frame member is separated, and spacer recovery means for performing the step of separating the spacer from the plate received and supported by the second support member.

The flat panel display disassembly apparatus according to the present invention further comprises convey means for, after the step of separating the frame member from the vacuum vessel, receiving the supported plate from the first support means, receiving and supporting an edge of the plate, and conveying the plate to the second support means.

In the flat panel display disassembly apparatus according to the present invention, the convey means has a structure which prevents a load of the plate fixed to the spacer from being applied to the spacer.

In the flat panel display disassembly apparatus of the present invention having this arrangement, the first support means supports a plate fixed to spacers by applying a pull-up force in the step of separating a frame member from a vacuum container. The spacers are suspended and are free from the weight of the fixed plate, and the frame member can be separated without applying any load to the spacers.

After the frame is separated, the second support means receives and supports the edge of the plate fixed to the spacers. At this time, the spacers are suspended and are free from the weight of the fixed plate. The step of separating the spacers from the plate received and supported by the second support means is executed by the spacer recovery means while the plate is kept received and supported. Also in the spacer separation/recovery step, the spacers are free from any extra weight, and can be prevented from being damaged.

[Solving Means 10] According to the present invention, a flat panel display disassembly processing method for a flat panel display having a structure in which two substrates, i.e., face plate and rear plate mainly containing glass are airtightly joined via a frame with lead-containing frit glass is characterized by comprising the step of separating and extracting a portion including the face plate and a portion including the rear plate from the flat panel display to be scrapped, and the step of separately collecting pluralities of extracted portions including face plates and extracted portions including rear plates, separately charging the portions in processing baths at once, and executing submergence processing.

The present invention further includes, as characteristic features, that

"the submergence processing includes processing using an aqueous acid or alkaline solution;"

"the submergence processing includes processing using an aqueous acid or alkaline solution, and subsequent cleaning processing using water or an organic solvent;"

"the submergence processing is performed by flowing a processing solution in the processing bath;"

"the submergence processing is performed by circulating a processing solution between the processing bath and an outside;"

"the submergence processing is performed by heating a processing solution;" and

"the submergence processing is performed by propagating a vibration or an acoustic wave to an object to be processed."

[Solving Means 11] According to the present invention, a flat panel body fixing apparatus for fixing a flat panel body constituted by joining a pair of panels facing each other via a frame comprises a fixing jig disposed to be retractable with respect to the flat panel body so as to surround the flat panel body placed on a base, wherein the fixing jig swings and comes into contact with the flat panel body from around the flat panel body, thereby fixing the flat panel body.

The flat panel body fixing apparatus according to the present invention is characterized in that the apparatus further comprises a driving mechanism for moving back and forth the fixing jig with respect to the flat panel body, position detection means for detecting a position of the fixing jig on the basis of a moving amount of the fixing jig, and a controller capable of controlling the driving mechanism, and a size of the flat panel body is detected from positional information of the fixing jig obtained by the position detection means.

The flat panel body fixing apparatus according to the present invention is characterized by further comprising chuck means for chucking and fixing the flat panel body via a chucking hole formed in the base.

According to the present invention, a flat panel display fluorescent substance recovery apparatus for recovering fluorescent substances in a flat panel display which includes a face plate, a rear plate, and a frame, and emits light by irradiating the fluorescent substances applied to the face plate with electrons is characterized by comprising the above-described fixing apparatus, the face plate being fixed by the fixing jig from four directions.

The flat panel display fluorescent substance recovery apparatus according to the present invention is characterized in that the apparatus comprises a plurality of processing means for recovering the fluorescent substances from the face plate fixed by the fixing apparatus, and the processing means are driven by the controller on the basis of the positional information obtained by the position detection means.

The flat panel display fluorescent substance recovery apparatus according to the present invention is characterized in that the processing means include cutting means for separating the face plate and the rear plate, and recovery means for sweeping and sucking the fluorescent substances of the face plate.

The flat panel display fluorescent substance recovery apparatus according to the present invention is characterized in that processing work operations by a cutter of the cutting means and a recovery brush of the recovery means are controlled by the controller so as to be performed within predetermined work ranges.

The flat panel display fluorescent substance recovery apparatus according to the present invention is characterized in that the apparatus further comprises fluorescent substance detection means for detecting an amount of fluorescent substances left on the face plate, and actuation of the recovery means is controlled based on fluorescent substance amount information obtained by the fluorescent substance detection means.

The flat panel display fluorescent substance recovery apparatus according to the present invention is characterized in that the fluorescent substance amount information is defined by a transmittance or an absorbance of visible light transmitting through the face plate.

The flat panel display fluorescent substance recovery apparatus according to the present invention is characterized in that the fluorescent substance amount information is defined by a fluorescent intensity generated by irradiating an inner surface of the face plate with an ultraviolet ray or visible light.

The flat panel display fluorescent substance recovery apparatus according to the present invention is characterized in that the fluorescent substance detection means moves following the work range of the recovery brush of the recovery means.

According to the present invention, a flat panel display fluorescent substance recovery method of recovering fluorescent substances in a flat panel display which includes a face plate, a rear plate, and a frame, and emits light by irradiating the fluorescent substances applied to the face plate with electrons is characterized by comprising the step of swinging a fixing jig and fixing the flat panel display from four directions of the flat panel display placed on a base, the step of separating the face plate and the rear plate of the fixed flat panel display, and the recovery step of sweeping and sucking the fluorescent substances of the face plate.

The flat panel display fluorescent substance recovery method according to the present invention is characterized by further comprising the step of detecting a position of the fixing jig on the basis of a moving amount of the fixing jig for fixing the flat panel display.

The flat panel display fluorescent substance recovery method according to the present invention is characterized by further comprising the step of chucking and fixing the flat panel display via a chucking hole formed in a base.

The flat panel display fluorescent substance recovery method according to the present invention is characterized in that cutting work by a cutter is controlled to match a size of the face plate on the basis of positional information of the fixing jig in separating the face plate and the rear plate.

The flat panel display fluorescent substance recovery method according to the present invention is characterized in that recovery work by a recovery brush is controlled to match a size of the face plate on the basis of positional information of the fixing jig in recovering the fluorescent substances of the face plate.

The flat panel display fluorescent substance recovery method according to the present invention is characterized in that the method further comprises the step of detecting an amount of fluorescent substances left on the face plate, and the work of the recovery brush is controlled based on detected fluorescent substance amount information.

The flat panel display fluorescent substance recovery method according to the present invention is characterized by further comprising the step of controlling the recovery brush so as to move following a work range of the recovery brush.

According to the present invention, a flat panel display placed on the base is fixed by the fixing jig by swinging the fixing jig from the four directions of the flat panel display. At this time, the position of the fixing jig is detected based on the moving amount of the fixing jig, and this positional information is effectively used for the subsequent processing step. That is, in driving a cutter for separating a face plate and rear plate, and a recovery brush for sweeping and sucking the fluorescent substances of the face plate, the work ranges of the cutter and recovery brush are controlled using positional information of the fixing jig.

As a result, the fluorescent substances of the face plate can be efficiently, reliably recovered. The fixing jig can effectively cope with a change in the panel size of the flat panel display, and is very practical.

[Solving Means 12] According to the present invention, a substrate processing method of disassembling a substrate mainly constituted by a pair of glass substrates airtightly joined via a frame is characterized by comprising the step of separating the pair of joined substrates, the step of holding a plurality of separated substrates in parallel with each other at a predetermined gap, and the step of conveying the plurality of held substrates at once, and performing predetermined processing.

The substrate processing method according to the present invention is characterized in that the substrates are held to cause surfaces of the substrates to stand substantially vertically.

The substrate processing method according to the present invention is characterized in that the substrates are supported by linearly contacting predetermined portions of the substrates.

According to the present invention, a substrate processing apparatus for disassembling a substrate mainly constituted by a pair of glass substrates airtightly joined via a frame is characterized by comprising a plurality of support members disposed in parallel with each other at a predetermined gap, separated substrates being held between the support members so as to stand substantially vertically.

The substrate processing apparatus according to the present invention is characterized in that at least portions of the support members in contact with the substrates are round or arcuated.

According to the present invention, a flat panel display disassembly processing method for a flat panel display having a structure in which a face plate and a rear plate formed from a pair of substrates mainly containing glass are airtightly joined via a frame with lead-containing frit glass is characterized by comprising, in conveying the glass substrates extracted from the flat panel display to be disassembled and performing submergence processing, processing the face plate or the rear plate by any one of the substrate processing methods described above.

The flat panel display disassembly processing method according to the present invention is characterized by comprising using the above substrate processing apparatus.

The present invention comprises the means for holding glass plates in order to convey at once many glass plates obtained by disassembling scrapped FPDs and perform submergence processing. Since many substrates are preferably held at once, the present invention can realize a method of processing scrapped FPDs at low cost.

[Solving Means 13] According to the present invention, a glass substrate processing method of detecting a surface state of a glass substrate and processing a substrate surface in accordance with a detection result is characterized by comprising the detection step of irradiating the glass substrate surface with a primary X-ray, and detecting a generated fluorescent X-ray to detect an element present on the glass substrate surface, and the removal step of removing an element other than a glass constituent element from the glass substrate surface in accordance with a detection result of the detection step.

The glass substrate processing method according to the present invention is characterized in that the detection step of detecting an element present on the glass substrate surface comprises changing relative positions of the glass substrate and a fluorescent X-ray detector in accordance with a size of the glass substrate.

The glass substrate processing method according to the present invention is characterized in that a fluorescent X-ray detector irradiates with the primary X-ray a region wider than a region in which a fluorescent X-ray can be detected.

The glass substrate processing method according to the present invention is characterized in that an incident angle when the primary X-ray is incident on the glass substrate is not more than a critical angle of the primary X-ray. In addition, the glass substrate processing method according to the present invention is characterized in that the removal step for the glass substrate surface is performed by polishing the glass substrate surface.

The glass substrate processing method according to the present invention is characterized in that the detection step and the removal step for the glass substrate surface are repetitively performed.

According to the present invention, a glass substrate recycling processing method in a flat display including a rear plate having a plurality of electron-emitting elements formed on a glass substrate, a face plate having an image display portion formed on a glass substrate, and a support frame which joins the plates so as to face each other is characterized by comprising applying the above processing method to a substrate surface of the rear plate or the face plate after the rear plate and the face plate are separated and extracted.

The glass substrate recycling processing method in a flat display according to the present invention is characterized in that a wiring line mainly containing Ag is formed on the glass substrate of the rear plate.

The glass substrate recycling processing method in a flat display according to the present invention is characterized in that a thin film containing an element other than a glass constituent element is formed on the glass substrate surface constituting the rear plate.

The glass substrate recycling processing method according to the present invention is characterized in that frit glass for joining the rear plate, the face plate, and the frame is melted to separate the rear plate, the face plate, and the frame.

According to the present invention, a glass substrate recycling processing apparatus in a flat display including a rear plate having a plurality of electron-emitting elements formed on a glass substrate, a face plate having an image display portion formed on a glass substrate, and a support frame which joins the plates so as to face each other is characterized by comprising a mechanism of irradiating with an X-ray a surface of the glass substrate constituting the separated/extracted rear plate or face plate, and detecting a generated fluorescent X-ray to detect an element present on the glass substrate surface, and a mechanism of removing an element other than a glass constituent element from the glass substrate surface.

According to the present invention, residues on a glass substrate surface can be detected by a simple method, and all the elements other than a glass constituent element can be removed in the step of processing used substrate glass. Consequently, glass can be efficiently reused without any wastes.

BRIEF DESCRIPTION OF DRAWINGS

FIG. 9 is a perspective view schematically showing a surface-conduction type electron source display (SED) as an FPD to be disassembled by the method of the present invention;

FIG. 16A is a plan view showing a spacer recovery container used in the method of the present invention;

FIG. 16B is a sectional view showing the spacer recovery container in FIG. 16A;

FIG. 17A is a plan view showing another spacer recovery container used in the present invention;

FIG. 17B is a sectional view showing the spacer recovery container in FIG. 17A;

FIGS. 34A, 34B, 34C, and 34D are views showing an embodiment of a flat display disassembly method according to the present invention;

FIG. 47A is a front view showing another example of the convey means in FIGS. 44A and 44B;

FIG. 47B is a side view showing the convey means in FIGS. 44A and 44B;

FIG. 48 is a side view showing a spacer recovery jig in FIGS. 44A and 44B;

DISCLOSURE OF INVENTION

Embodiments of the present invention will be described in detail below with reference to the accompanying drawings. The numbers of respective embodiments and examples correspond to those of the above-described problems and solving means.

Embodiment 1

Embodiment 1 of the present invention will be described in detail below with reference to the accompanying drawings. This embodiment will exemplify disassembly processing for an FPD which incorporates spacers and has a fluorescent screen on the inner surface of a face plate, as shown in FIGS. 1A, 1B, and 2.

Figure 1A:
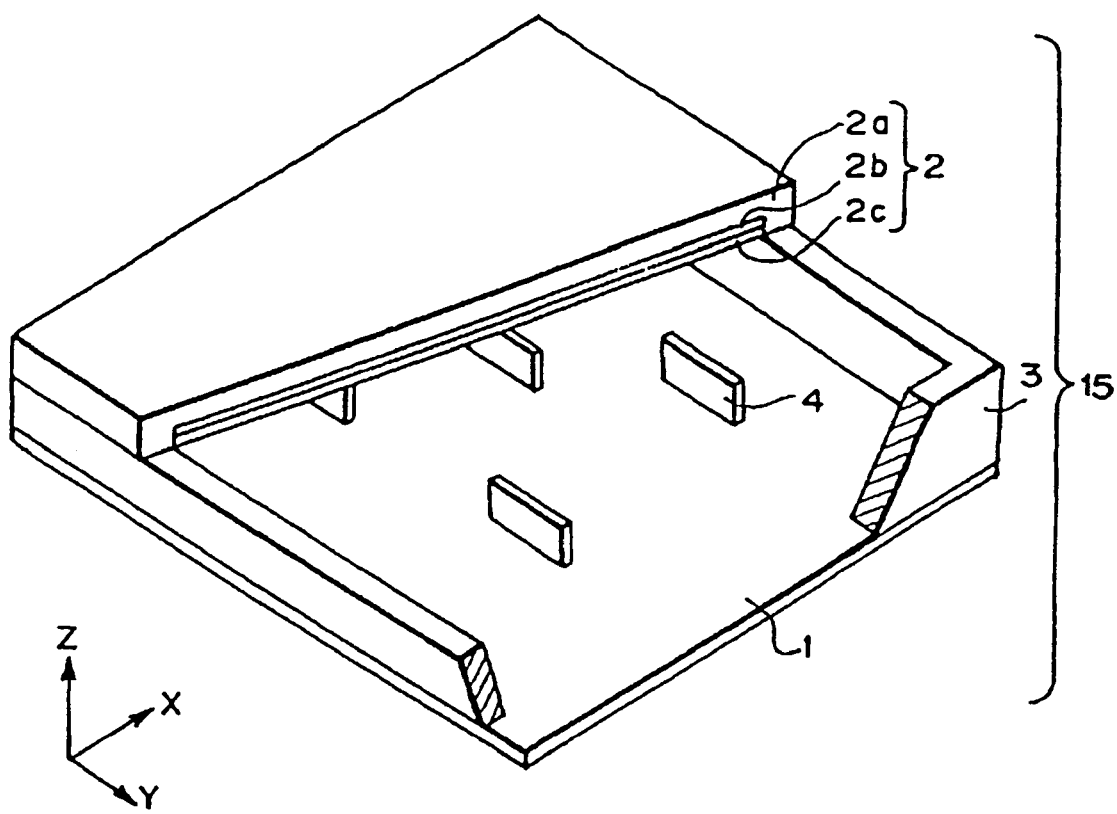
FIG. 1A is a partially cutaway perspective view showing an example of a flat panel display processed by a disassembly processing method according to the present invention.
Figure 1B:
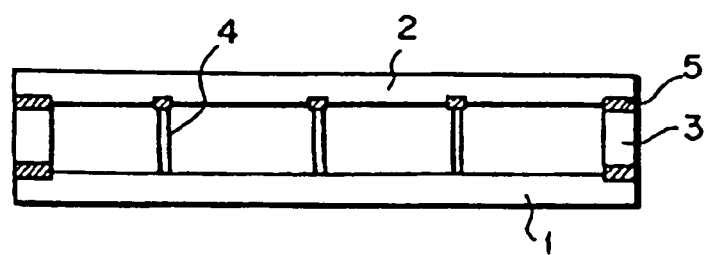
FIG. 1B is a sectional view of the flat panel display shown in FIG. 1A.
Figure 2:
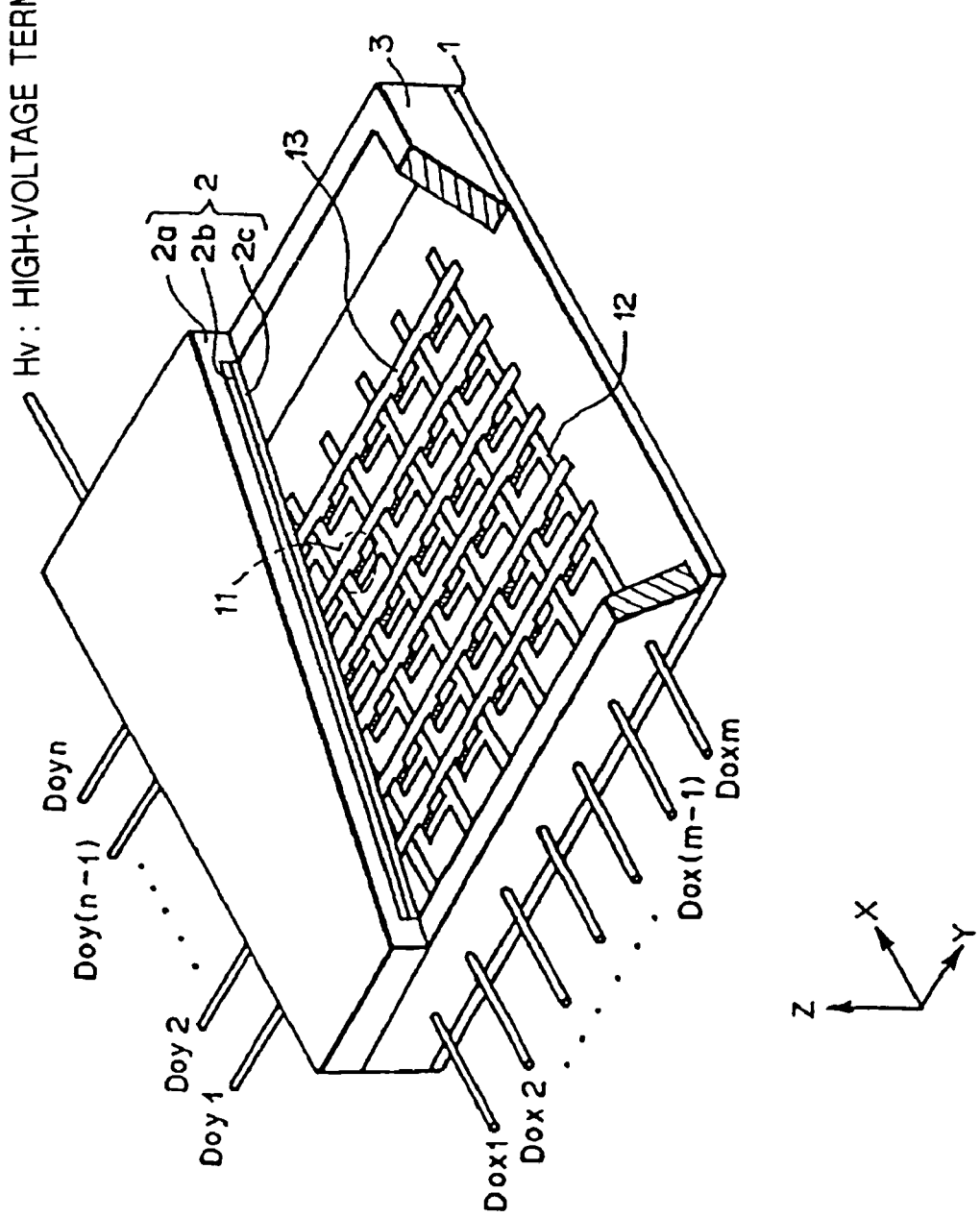
FIG. 2 is a schematic view showing a surface-conduction type electron source display among flat panel displays according to the present invention.

In FIGS. 1A and 1B, reference numeral 1 denotes a rear plate; 2, a face plate; 3, a frame; and 4, spacers. Lead-containing frit glass 5 is used at each joint portion between the rear plate 1, the face plate, and the frame 3 that is shown in black in FIGS. 1A and 1B.

The spacers 4 are bonded to either one of the face plate side and rear plate side, or the two sides with frit glass or the like. In this embodiment, the spacers 4 are bonded to only the face plate side. Examples of the materials of the rear plate, face plate, and frame are silica glass, glass containing a small amount of impurity such as Na, soda-lime glass, and glass prepared by stacking a silica layer on soda-lime glass. On the face plate, a fluorescent film $2b$ is formed on the inner surface of a glass substrate $2a$, and a metal back $2c$ containing Al is formed on the inner surface of the fluorescent film. The spacer is basically made of glass. The surface of the spacer may be coated with an antistatic conductive film.

In addition, an exhaust pipe (not shown) for evacuating the FPD is generally attached to the FPD. In general, the exhaust pipe is formed from low-melting glass containing lead.

FIG. 2 shows a surface-conduction type electron source display (SED) of matrix driving scheme as an example of the FPD. In FIG. 2, surface-conduction type electron sources 11, and wiring lines 12 and 13 for driving the electron sources are formed on the rear plate 1. The wiring lines 12 and 13 are X-direction (Dox1, Dox2, . . . , Doxm) and Y-direction (Doy1, Doy2, . . . , Doyn) element wiring lines, and are made of Ag, Pd, or the like. The X-direction wiring lines and Y-direction wiring lines are insulated by an insulating layer at least at their intersections. The insulating layer is made of glass containing a large amount of lead.

Figure 3A:
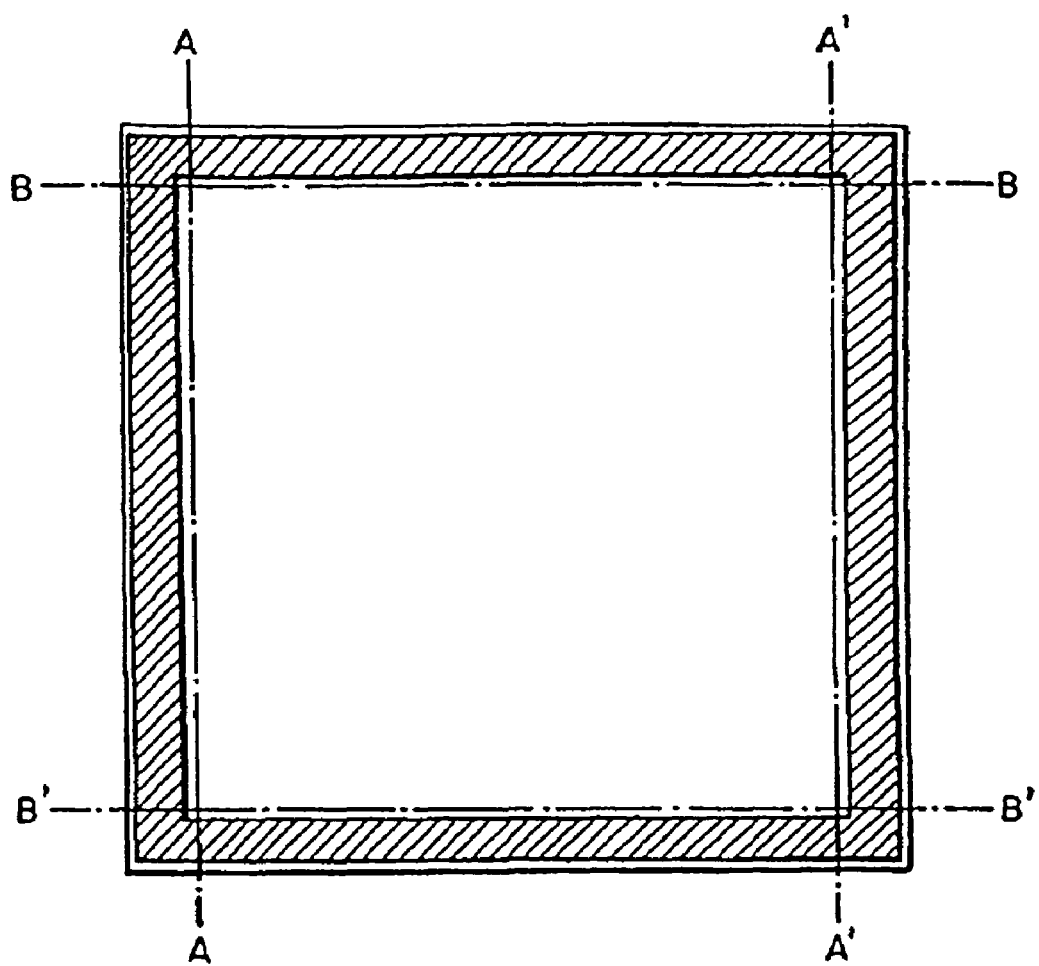
FIG. 3A is a plan view showing a flat panel cutting position in a flat panel display disassembly processing method according to the present invention.
Figure 3B:
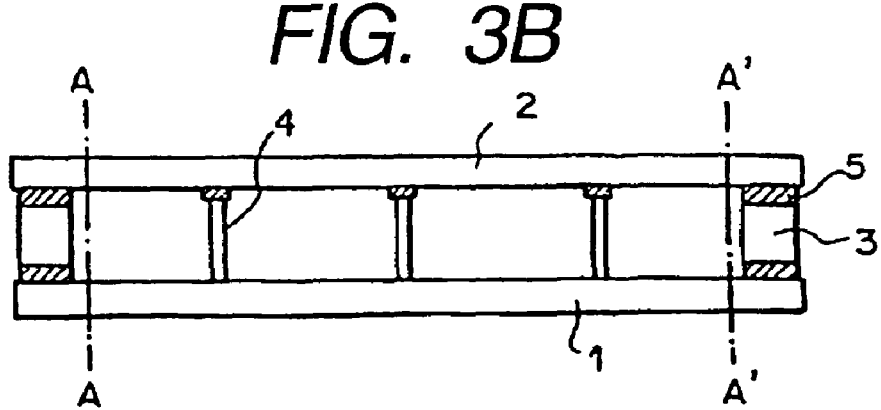
FIG. 3B is a sectional view of the flat panel shown in FIG. 3A.

As described above, various portions of the FPD use lead-containing materials. Of these portions, frit glass at the frame contains a large amount of lead. The characteristic feature of the present invention is to process the frame separately from the remaining portions. That is, as shown in FIGS. 3A and 3B, according to the FPD disassembly processing method of the present invention, the FPD is cut at cutting lines A-A, A'-A', B-B, and B'-B'.

Figure 4:
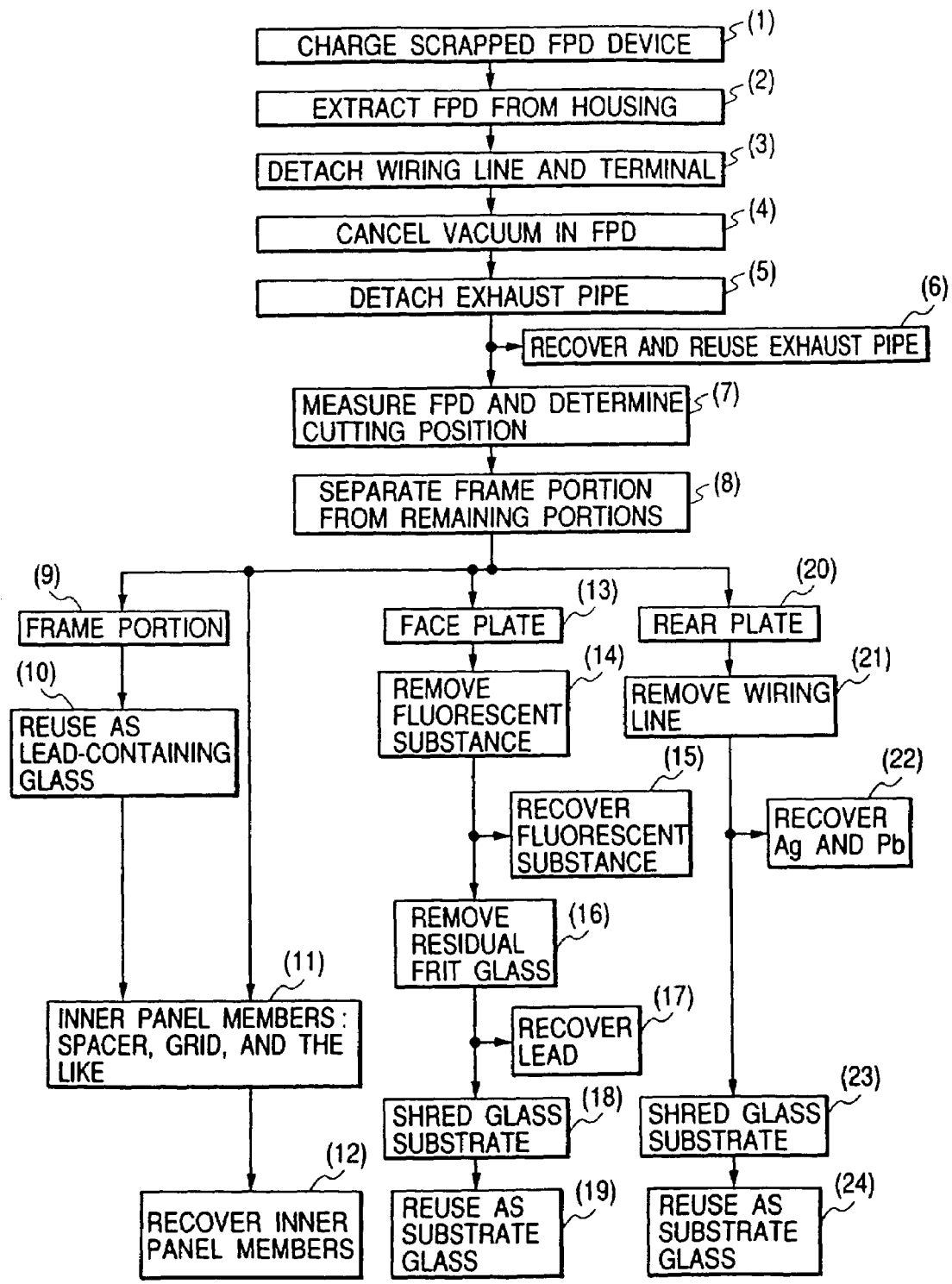
FIG. 4 is a flow chart showing an FPD disassembly processing method according to the present invention.

FIG. 4 is a flow chart showing the steps of an FPD device disassembly processing method for explaining the embodiment of the present invention. Steps (1) to (3) as the former half of this method are pre-processing steps, and include the step of extracting an FPD from the housing of an FPD device, and removing accessory wiring lines and terminals. In steps (4) to (6), the vacuum in the FPD is canceled by a proper method, and then the exhaust pipe is detached. Since the exhaust pipe contains lead, it is processed and reused as lead-containing glass.

In step (7), the FPD is measured to acquire information about area of a region where the frame is sealed with frit glass, and cutting positions are determined. In general, frit glass is black, and its presence can be optically detected via a glass substrate. More specifically, the area of the region where the frame is sealed with frit glass can be measured by image-sensing the FPD with a video camera and executing image analysis for the obtained video image. In this case, cutting lines are set inside the region where the frame is sealed with frit glass. When the position and width of the frame are known to fall within a predetermined range, the edges of the FPD are simply detected, and lines apart from the edges by a predetermined distance are set as cutting lines.

Step (8) is the separation step for the frame and remaining portions. The frame is cut along the cutting lines set in step (7). The cutting method can be a general method of cutting glass. This method includes (1) a method of scratching glass with a hard metal roller and applying thermal stress to the scratched portion, (2) a diamond cutting saw, (3) a diamond wheel, (4) laser processing, and (5) ultrasonic processing. By this step, the scrapped FPD is separated into four parts, i.e., a frame (9), an inner panel member (11), a face plate (13), and a rear plate (20). Processing methods for the respective members will be described.

The frame (9) is shredded and reused as lead-containing glass (10).

If a spacer (made of glass), grid (made of a metal), and the like exist as inner panel members in step (11), they are recovered and reused (step (12)).

As for the face plate in step (13), fluorescent substances are removed in step (14), and recovered in step (15). Step (16) is the step of removing residual frit glass. After lead in the residual frit glass is recovered in this step, the glass substrate is shredded into glass cullets in step (18). Step (19) makes it possible to reuse these glass cullets as face plate and rear plate substrates.

As for the rear plate in step (20), wiring lines are removed in step (21), a metal (Ag, Pb, or the like) contained in the wiring lines is recovered, and the glass substrate is shredded into glass cullets in step (23). Step (24) makes it possible to reuse these glass cullets as face plate and rear plate substrates.

EXAMPLE 1

The present invention will be described in detail by way of Example 1 with reference to FIGS. 1A and 1B to 4.

EXAMPLE 1-1

A surface-conduction type electron source display (SED) of matrix driving scheme as shown in FIG. 2 was disassembled. This SED has a panel structure containing spacers as shown in FIG. 1.

In accordance with the flow chart of disassembly processing for an FPD device in FIG. 4, the SED was extracted from the housing of the SED device, and accessory wiring lines and terminals were removed. Then, the vacuum in the SED was canceled, and the exhaust pipe was detached. The exhaust pipe was processed and reused as lead-containing glass.

The SED was image-sensed with a video camera, and its image was captured by an image processing apparatus. A region of the image where frit glass was applied can be recognized as a darker region than the remaining portions. The image was binarized to measure the area of the region where frit glass was applied.

Disassembly pre-processing steps (1) to (5) were executed. The flat panel display was removed from the housing of the flat panel display apparatus, and the resultant flat panel display apparatus was charged [steps (1) and (2)]. Accessory wiring lines and terminals were removed [step (3)]. The vacuum in the vacuum container was canceled by proper processing of, e.g., unsealing the attaching portion of the exhaust pipe. The interior of the vacuum container was returned to the atmospheric pressure [step (4)]. Then, the exhaust pipe was detached [step (5)]. The exhaust pipe was recovered and reused [step (6)]. The size of the flat panel display was measured, and its cutting positions were determined [step (7)].

After that, a frame member 3 was separated from a flat panel display 20 [step (8)]. This separation adopts an appropriate method of press-inserting a wedged-edge tool into the joint portion between the frame member 3 and two plates 1 and 2 to separate them, or spraying a nitric acid solution.

The frame member 3 separated in step (7) [step (9)] was shredded and reused as a recycled new glass material [step (10)].

Spacers 4 were recovered [step (11)]. At this time, the spacers 4 were separated and recovered [step (12)].

After the spacers 4 were recovered, if the plate member was the face plate 2 [step (13)], fluorescent substances 2b were recovered from the face plate 2 [step (14)], and the face plate 2 was shredded. At the same time, a lead component was removed, and the face plate 2 was reused as a recycled new glass material [step (15)]. After that, the residual frit glass was removed [step (16)]. The glass substrate was shredded [step (18)] and reused as substrate glass [step (19)].

If the plate member is the rear plate 1 [step (20)], wiring lines are removed from the rear plate 1 [step (21)]. The rear plate 1 was shredded [step (23)] and reused as a recycled new glass material [step (24)].

From the measurement results, cutting lines A-A, A'-A', B-B, and B'-B' were set inside a region where the frame was sealed with frit glass. The SED was cut along the cutting lines with a diamond cutting saw while a grinding solution was applied.

By cutting, the SED was divided into the frame portion 3, face plate 2, and rear plate 1. Some of the spacers 4 came off in cutting, and some of the spacers 4 were kept bonded to the face plate 2. All the spacers 4 were manually recovered, and recyclable spacers 4 were screened and reused.

The frame portion 3 was shredded and reused as a lead-containing glass material. After fluorescent substances were removed from the face plate 2, and the residual frit glass was removed with nitric acid, the glass substrate was shredded and reused. After wiring lines were removed from the rear plate 1, the glass substrate was shredded and reused.

EXAMPLE 1-2

A surface-conduction type electron source display (SED) of matrix driving scheme as shown in FIG. 2 was disassembled. Steps up to the step of setting the cutting lines A-A, A'-A', B-B, and B'-B' are the same as in Example 1-1. The SED was scratched with a hard metal roller along the SED cutting lines. Subsequently, the scratched portions were sequentially heated with a gas burner in which oxygen was added to city gas. As a result, the glass was cut along the cutting lines, and the SED was divided into a frame portion 3, face plate 2, and rear plate 1. The subsequent steps were the same as in Example 1-1.

Since Example 1-2 does not use any grinding solution, members can be easily recovered and reused.

Embodiment 2

Embodiment 2 of the present invention will be explained in detail below with reference to the accompanying drawings.

Figure 5:
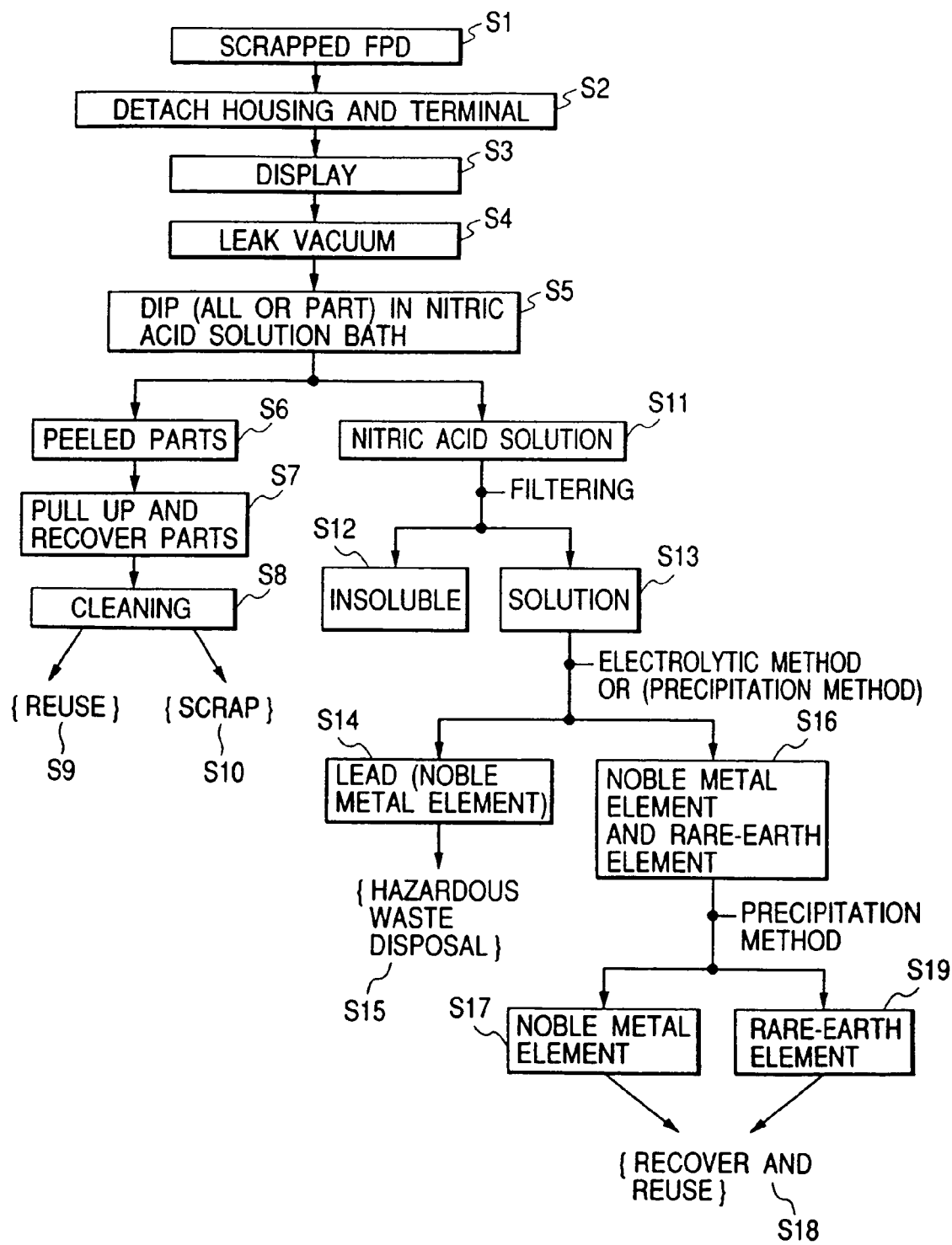
FIG. 5 is a flow chart showing the steps of a scrapped flat panel display disassembly method according to the present invention.

FIG. 5 is a flow chart showing an FPD disassembly processing method according to this embodiment of the present invention. This embodiment will exemplify disassembly processing for an FPD having spacers, as shown in FIG. 1.

In FIG. 1, reference numeral 1 denotes a rear plate; 2, a face plate; 3, a frame; and 4, spacers. Lead-containing frit glass 5 is used at each joint portion shown in black in FIGS. 1A, 1B, and 2. The spacers 4 are bonded to either one of the face plate 2 and rear plate 1 or both of them. In this embodiment, the spacers 4 are bonded to only the face plate 1.

Examples of the materials of the rear plate 1, face plate 2, and frame 3 are silica glass, glass containing a small amount of impurity such as Na, soda-lime glass, and glass prepared by depositing $SiO_2$ on soda-lime glass by, e.g., sputtering. On the face plate 2, a fluorescent film 2b containing fluorescent substances including a rare-earth element such as Y is formed on the inner surface of a glass substrate 2a, and a metal back 2c is formed on the inner surface of the fluorescent film.

The spacer 4 is basically made of glass. The surface of the spacer is coated with an antistatic conductive film. Examples of the material of the conductive film are oxides of metals such as Cr, Ni, and Cu, a nitride of Al and a transition metal alloy, and carbon.

As the material of the frit glass 5, frit glass containing a large amount of lead component so as to enable low-temperature baking is used, and mainly contains PbO.

According to the present invention, lead (Pb) in the frit glass 5 used at joint portions is dissolved in nitric acid, and respective members are peeled at the joint portions to disassemble the display. The nitric acid concentration applied to the present invention falls within the range of 0.1 N (Normal) to several N, and preferably the range of 0.1 N to 2 N. The dipping time falls within the range of several h to several ten h, and preferably the range of 10 h to 24 h.

The disassembly method will be explained in detail with reference to FIG. 6 in accordance with the flow chart of FIG. 5.

(1) A housing is dismounted, the external terminals of the container are detached, and only the display is extracted (S1 to S3).

(2) For the vacuum system, the vacuum is leaked (S4).

Figure 6A:
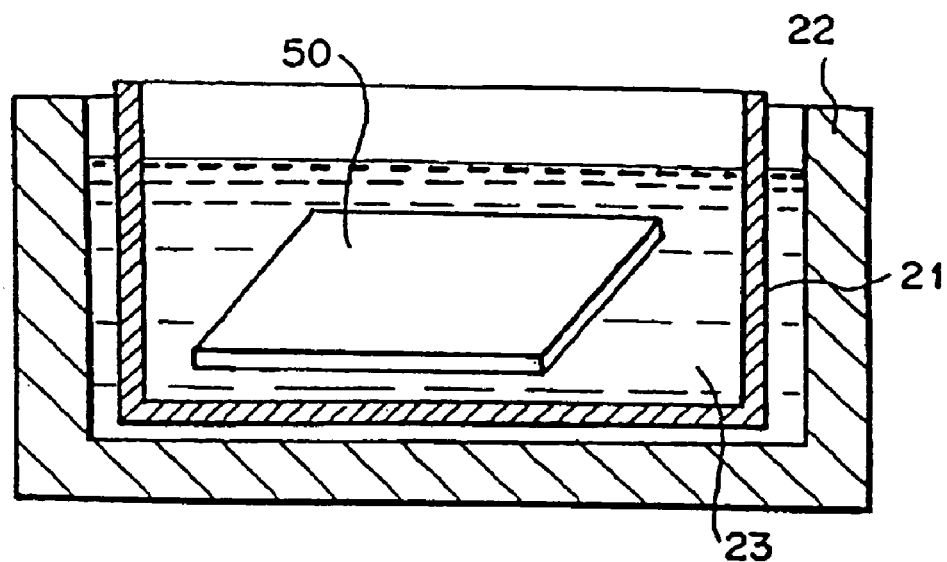
FIG. 6A is an explanatory view showing a state in which the whole panel is simultaneously disassembled by the method of the present invention.

(3) The entire display is dipped in a bath filled with nitric acid (S5). At this time, to prevent glass from being scratched, a meshed cage 21 made of a Teflon resin is sunk in a bath 22, and a display 50 is sunk in the meshed cage 21 (FIG. 6A).

(4) The meshed cage 21 is pulled up to recover members peeled from the frit joint portions (S6 and S7). The members are transferred to a cleaning bath of pure water 25 (S8), and then classified into reusable members and scrapped members (FIG. 6B) (S9 and S10).

(5) The nitric acid solution is filtered (S11) to separate it into a filtrate and insolubles (S12 and S13).

At this time, the insolubles are ones which do not dissolve in nitric acid among nitric acid insolubles of a frit component and a spacer coat component. In the filtrate (S13), lead, a noble metal element, and a rare-earth element are dissolved (S14 and S16).

(6) Metals in the filtrate are separated into lead and other metals by the electrolytic method.

At this time, lead is deposited as $PbO_2$ on the cathode, whereas other metals containing a noble metal are deposited on the anode.

(7) $PbO_2$ deposited on the cathode is recovered and undergoes hazardous waste disposal (S15).

(8) The noble metal and the like are deposited on the anode, recovered, and reused (S16).

(9) If a rare-earth metal is mixed (S19), the solution is adjusted to pH=0, and oxalic acid is added to precipitate it as oxalate. The solution is filtered to recover oxalate.

According to this method, a noble metal element is also recovered. As another method, sulfuric acid ions are added to the filtrate (6) to produce the precipitate ($PbSO_4$) of a lead component, thereby fractionated lead. In this case, a noble metal element also precipitates, and is difficult to recover. This method is simple and convenient when a noble metal element is small in amount and need not be recovered, or is not contained.

According to the above method, the entire panel is dipped in nitric acid. A method of leaving a member to be reused and dipping only the remaining members in nitric acid is also basically based on this method.

The steps of partially dipping the panel in nitric acid and processing it will be described with reference to FIGS. 7A, 7B, 8A, and 8B.

Figure 7A:
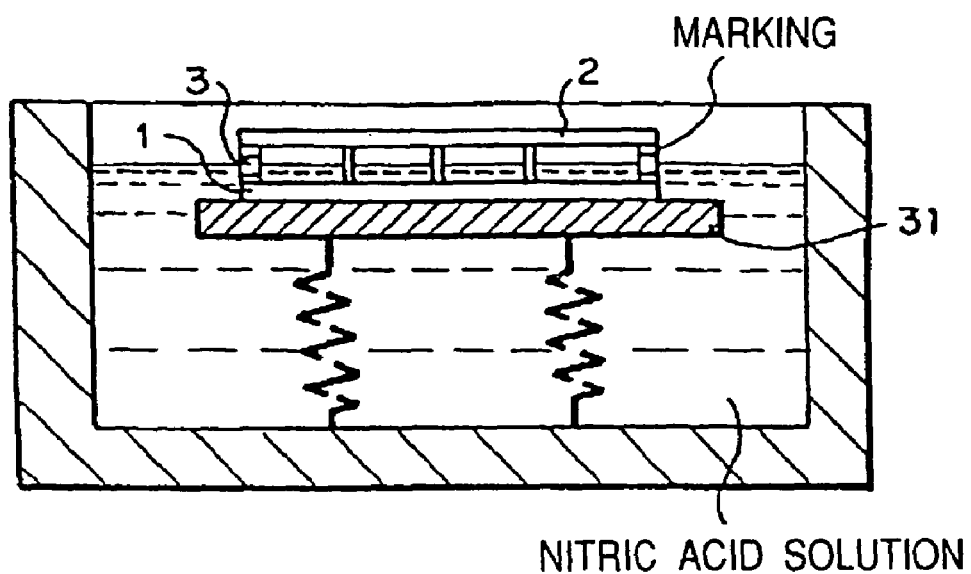
FIG. 7A is a view showing a method of disassembling a panel while leaving part of it in the method of the present invention.
Figure 7B:
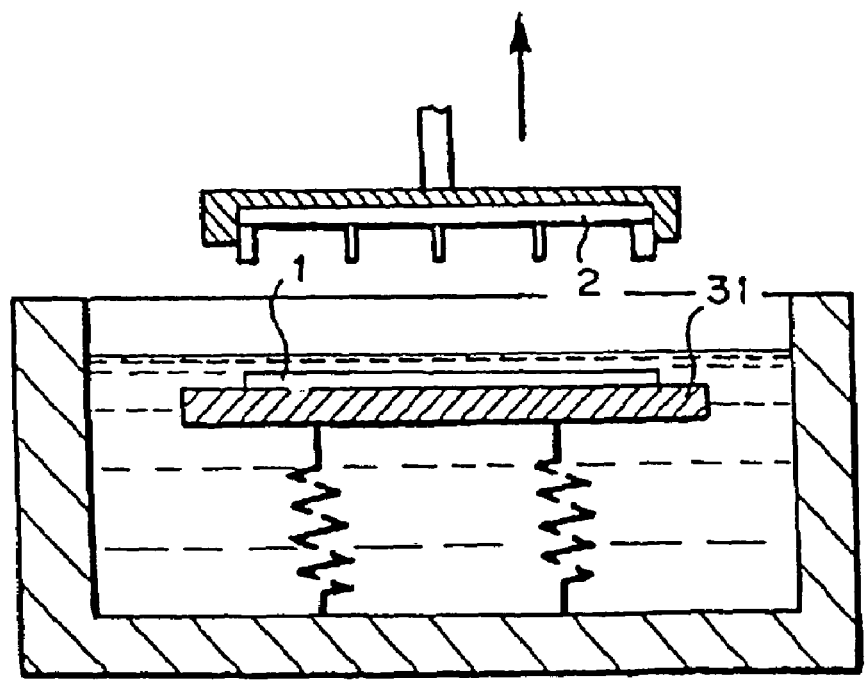
FIG. 7B is a view showing a state in which a face plate equipped with a spacer in FIG. 7A is pulled up.
Figure 8A:
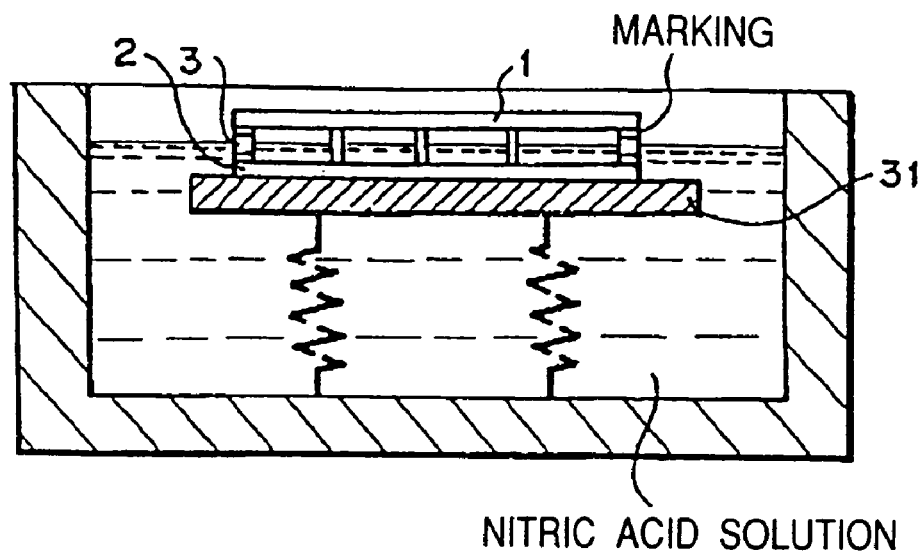
FIG. 8A is a view showing a method of disassembling a panel while leaving part of it in the method of the present invention.
Figure 8B:
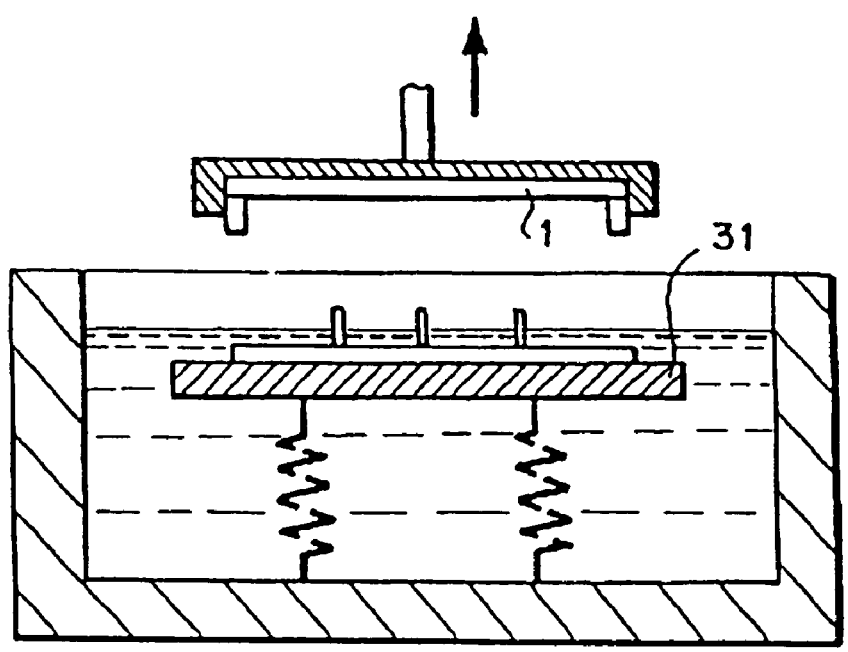
FIG. 8B is a view showing a state in which a rear plate in FIG. 8A is pulled up.

FIGS. 7A, 7B, 8A, and 8B show a method of dipping only the rear plate 1 and face plate 2 in nitric acid (FIGS. 7A and 8A), and pulling up and reusing the face plate 2 with the frame and the rear plate 1 with the frame 3 (FIGS. 7B and 8B). The nitric acid solution is processed similarly to the method of dipping the entire display.

In this case, a position at which a member is dipped in nitric acid must be precisely controlled. This method can be experimentally confirmed. At this time, it is convenient to place a Teflon table 31. In a display having spacers, when the spacers are to be reused, the method of dipping the entire display, and the method of dipping only frit joint portions can be used, and are basically the same as the above methods.

EXAMPLE 2

The present invention will be described in detail by exemplifying Example 2.

EXAMPLE 2-1

Method of Dipping Entire Display in Nitric Acid

Example 2-1 will be described with reference to FIGS. 5, 6A, 6B, and 9.

FIG. 9 is a schematic view showing an FPD used in Example 2-1. The same reference numerals as in FIG. 1 denote the same parts. This display is a surface-conduction type electron source display (SED) having electrodes, wiring lines, insulating layer, electron-emitting elements, and the like on a glass rear plate. A rear plate 1 is coated with $SiO_2$ on soda-lime glass. Element electrodes formed to face each other on the $SiO_2$ coat are made of Pt, and electron-emitting elements 11 each formed between two electrodes are made of Pd. Further, upper wiring lines 13 and lower wiring lines 12 made of Ag, Pb, B, or the like, and a PbO insulating layer for insulating these wiring lines are formed. A frame 3 is also made of soda-lime glass. Reference symbols Dx01 to Dx0m, and Dy01 to Dy0n denote external terminals of the container.

On a face plate 2, a fluorescent film 2b formed from black stripes and fluorescent substances is formed on the inner surface of a soda-lime glass substrate 2a, and an Al metal back 2c is formed on the inner surface of the fluorescent film. The black stripes are made of PbO and C (Carbon), whereas the fluorescent substances are made of ZnS and YS. Spacers 4 are bonded to the inner surface of the display with glass frit.

The spacers 4 are made from a glass substrate whose surface is coated with conductive ceramics.

This panel was disassembled as follows.

(1) The display was extracted from the housing, and the external terminals of the container were detached.

(2) The vacuum in the display was leaked and returned to the atmospheric pressure.

(3) The entire display was dipped in a 1.2 N nitric acid bath for 24 h. At this time, to prevent glass from being scratched, a meshed cage 21 made of a Teflon resin was sunk in the nitric acid bath, and the display was in the meshed cage 21 (FIG. 6A).

Figure 6B:
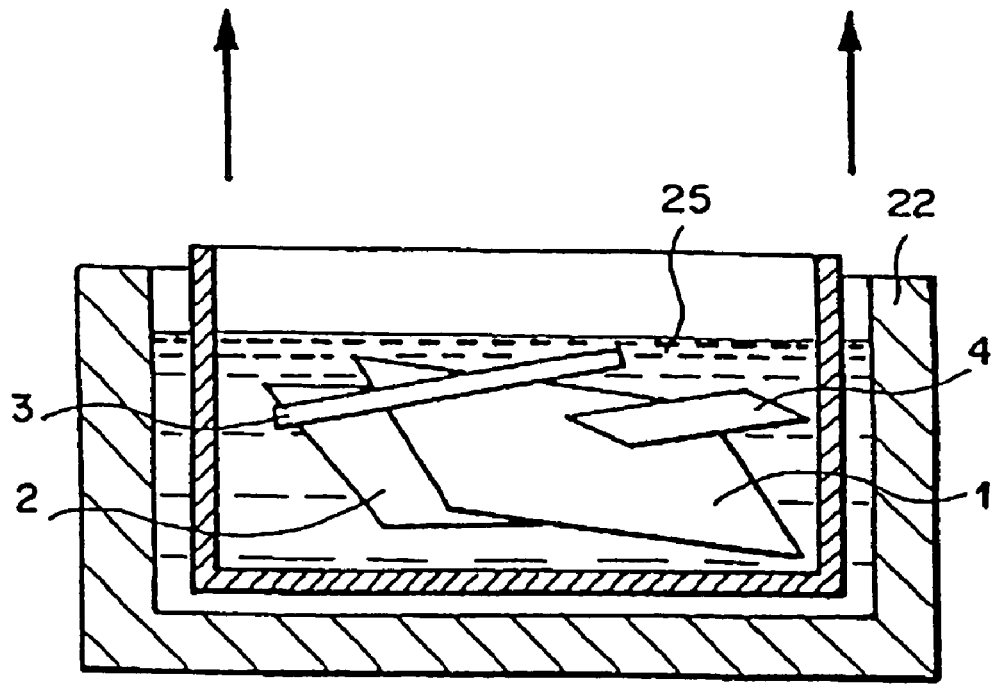
FIG. 6B is a view showing a state in which respective portions of the panel in FIG. 6A are separated.

(4) The rear plate, face plate, frame, and spacers peeled from frit joint portions were pulled up from the nitric acid solution, transferred to a cleaning bath of pure water, and then classified into recyclable members and scrapped members (FIG. 6B).

(5) The nitric acid solution after the members were pulled up was filtered to separate it into a filtrate and insolubles.

(6) Part of Pd of the electron-emitting element film, part of Ag of the wiring lines, and the like were dissolved in this filtrate in addition to a lead component of frit glass. To separate and recover these metals, electrolytic processing was performed as follows.

The filtrate was set to a potential of +1.4 to 1.7 V with reference to a silver/silver chloride standard electrode. Pd and Ag deposited on the cathode were recovered and reused. An oxide deposited as $PbO_2$ on the anode was recovered and undergone hazardous waste disposal.

(7) Since Y (Yttrium) used for fluorescent substances was dissolved in the filtrate, the filtrate was adjusted to pH=0 in order to recover Y. Then, oxalic acid was added to precipitate and recover Y as $Y_2(C_2O_4)_3$.

EXAMPLE 2-2

Method of Dipping Display in Nitric Acid Except for Face Plate (with Frame and Spacer)

Example 2-2 will be explained with reference to FIGS. 5, 7A, and 7B.

An FPD identical to that in Example 2-1 was disassembled as follows.

(1) The same processes as (1) and (2) in Example 2-1 were executed.

(2) The frame of the display was marked at two portions in parallel with the liquid level of nitric acid. The display was placed on a Teflon table 31, and adjusted to set the liquid level below the marks of the face plate side so as to dip only the joint portions between the frame and the rear plate in nitric acid. In this state, the display was dipped in a 1.2 N nitric acid bath for 24 h (FIG. 7A).

(3) The face plate with the frame and spacers was pulled up, transferred to a cleaning bath of pure water to clean the portions dipped in nitric acid, and reused (FIG. 7B).

(4) The nitric acid solution was processed similarly to (5) and (6) in Example 2-1.

EXAMPLE 2-3

Method of Dipping Display in Nitric Acid Except for Rear Plate (with Frame)

Example 2-3 will be explained with reference to FIGS. 5, 8A, and 8B.

An FPD identical to that in Example 2-1 was disassembled as follows.

(1) The same processes as (1) and (2) in Example 2-1 were executed.

(2) The frame was marked similarly to Example 2-2. Similar to Example 2-2, the display was dipped in a 1.2 N nitric acid bath 22 for 24 h so as to dip only the joint portions between the frame and the rear plate in nitric acid (FIG. 8A).

(3) Similar to Example 2-2, the rear plate with the frame was pulled up, cleaned, and reused (FIG. 8B).

(4) The nitric acid solution was filtered, and sulfuric acid was added in the filtrate to produce the precipitate of $PbSO_4$. This precipitate was separated by filtering, and undergone hazardous waste disposal.

(5) Since the nitric acid solution contained Y of fluorescent substances, the solution was adjusted to pH=0. Oxalic acid was added to precipitate and recover Y as $Y_2(C_2O_4)_3$.

COMPARATIVE EXAMPLE 2

To scrap or reuse an FPD identical to that in Example 2-1, a frit glass portion was melted and peeled by heating as a method of peeling a member from a joint portion.

However, to melt PbO as a frit glass component, the melting point must be set as high as about 900° C. or more. When the frit joint portion was partially set to such a high temperature, the glass substrate distorted or cracked under some conditions. It was difficult to set conditions for reusing a substrate.

Embodiment 3

The present invention will be described in detail by exemplifying more preferable another embodiment.

More specifically, a method of recycling the rear plate of an image display apparatus in order to recover and reuse a rear plate 1 in disposal of the image display apparatus constituted by the rear plate 1 having a plurality of electron-emitting elements each made up of a pair of element electrodes of the electron-emitting element and a conductive film that is connected to the pair of element electrodes and has an electron-emitting portion at part of the conductive film, a face plate 2 having an image forming member which forms an image upon collision with electrons emitted by the electron-emitting elements, and a support frame 3 which connects the rear plate and face plate and maintains the internal pressure, the rear plate 1, face plate 2, and frame 3 being welded with frit glass 5 comprises the step of dipping welded portions in a nitric acid solution to dissolve the frit glass 5, and the step of forming the conductive film by an ink-jet method.

Figure 10:
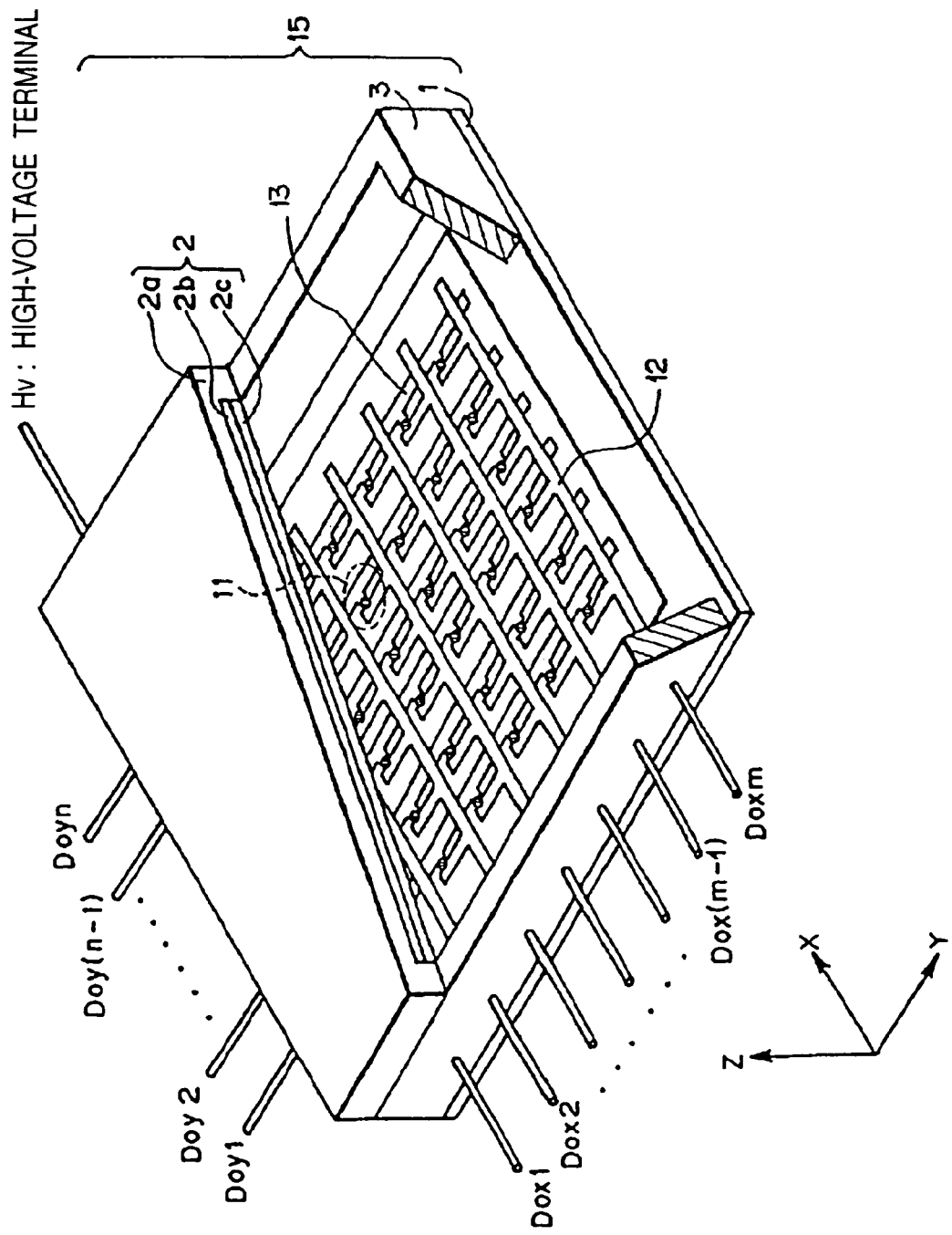
FIG. 10 is a partially cutaway perspective view showing an example of an image display apparatus having a rear plate to be recycled by the present invention.

FIG. 10 is a view showing the structure of an image display apparatus. In FIG. 10, the rear plate 1 comprises a plurality of electron-emitting elements 11. The face plate 2 comprises an image forming member which forms an image upon collision with electrons emitted by the electron-emitting elements 11. The support frame 3 connects the rear plate 1 and face plate 2, and maintains the internal pressure. Reference numeral 4 denotes frit for sealing the rear plate 1, face plate 2, and support frame 3. These constituent elements constitute an image display apparatus 15.

Figure 11A:
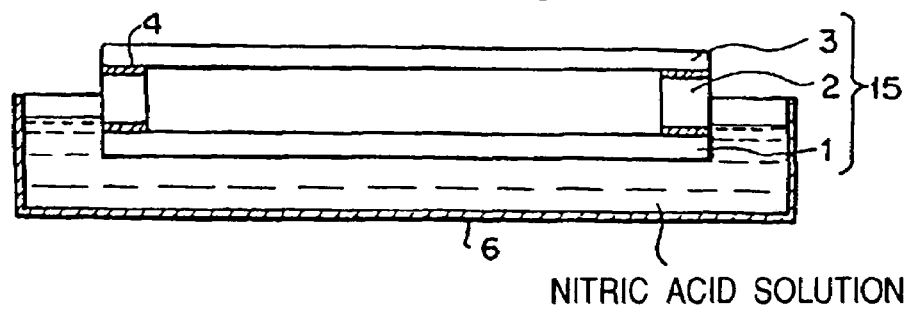
FIG. 11A is an explanatory view showing the steps of a rear plate recovery/recycling method according to the present invention.
Figure 11B:
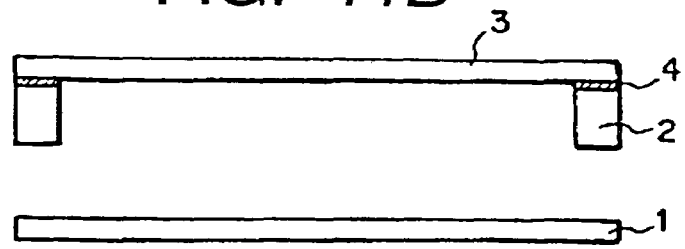
FIG. 11B is a view showing a state in which the rear plate in FIG. 11A is peeled.

As shown in FIG. 11, the image display apparatus 15 from which the external terminals of the container and the like are detached is leaked when the internal pressure is low. Then, the image display apparatus 15 is dipped in a nitric acid solution bath 6 filled with nitric acid (FIG. 11A). In some cases, the image display apparatus 15 incorporates spacers as atmospheric pressure-resistant support members. In dipping in nitric acid, the amount of nitric acid solution is adjusted as needed, so as to easily peel the rear plate 1, and a table (not shown) is set in the nitric acid solution bath 6 to extract the rear plate 1 from the image display apparatus 15 (FIG. 11B). In this case, the frit 4 applied to the vicinity of the rear plate is dissolved. Alternatively, the entire image display apparatus 15 can be dipped in the nitric acid solution bath 6 filled with nitric acid to separate the apparatus 15 into respective constituent components, thereby extracting the rear plate 1. The nitric acid concentration at this time falls within the range of 0.1 N (Normal) to several N, and preferably the range of 0.1 to 2 N.

Figure 12:
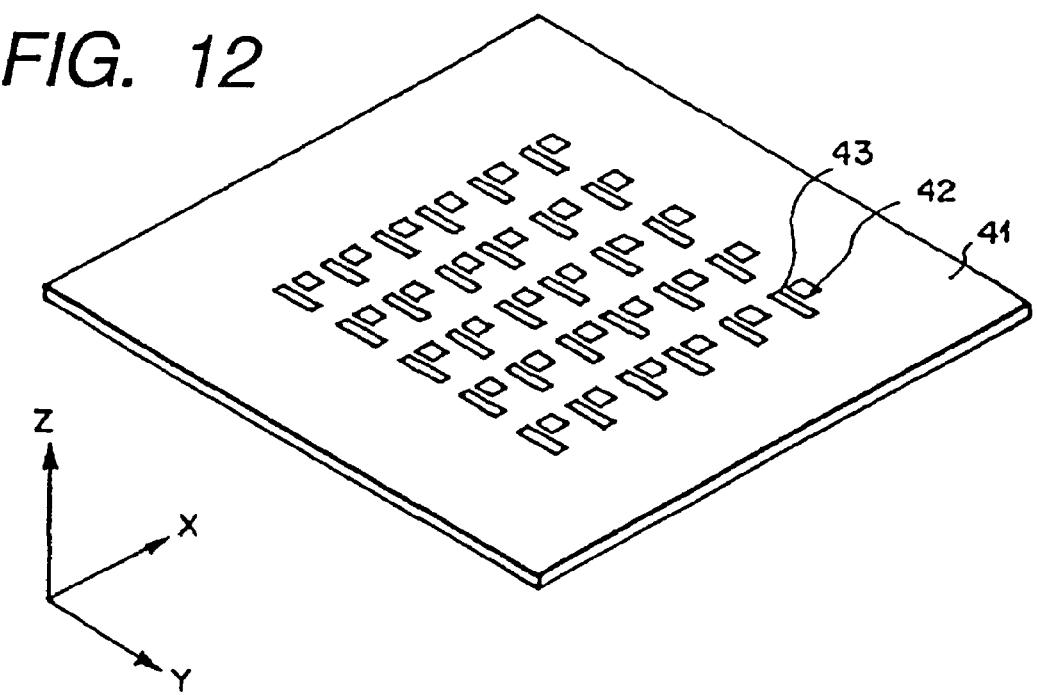
FIG. 12 is a perspective view showing an example of a rear plate substrate cleaned by the recycling method of the present invention.

The dipping time falls preferably within the range of several h to several ten h, and more preferably within the range of 10 h to 24 h. The extracted rear plate 1 is transferred to a cleaning bath of pure water, cleaned, and dried. To prevent nonuniformity in drying, the rear plate 1 may be cleaned with a solvent such as ketones or alcoholes, as needed. The rear plate 1 may be cleaned with a solvent of conductive film formation droplets (to be described later) to facilitate formation of a conductive film in recycling. The rear plate 1 extracted and cleaned in this manner is shown in FIG. 12. Reference numeral 41 denotes a rear plate substrate; and 42 and 43, element electrodes. After cleaning, conductive films and printed wiring lines are removed, and the element electrodes 42 and 43 remain on the rear plate substrate 41.

Examples of the material of the substrate 41 for the rear plate 1 are silica glass, glass containing a small amount of impurity such as Na, soda-lime glass, a glass substrate prepared by depositing $SiO_2$ on soda-lime glass by sputtering, CVD, or liquid phase epitaxy, and a glass substrate on which P-doped $SiO_2$ is deposited. The electrode material of the element electrode is not particularly limited as far as the material is conductive. When the element electrode is formed from a noble metal such as Pt or Au whose properties do not change in the nitric acid solution, the element electrode remains on the cleaned rear plate substrate, and can be reused. When the element electrode is formed from a material whose properties change in the nitric acid solution, the element electrode dissolves in the nitric acid solution, and thus only the rear plate substrate is reused.

In FIG. 12, upper wiring lines and lower wiring lines electrically connected to the element electrodes 42 and 43 to drive them are dissolved in the nitric acid solution. However, since one of the element electrodes and the lower wiring line can be simultaneously formed from the same material, the lower wiring including the element electrode may remain on the rear plate substrate. As the frit glass used at joint portions, frit glass containing a large amount of lead component so as to enable low-temperature baking is used, and mainly contains PbO. The lead component in frit glass dissolves in the nitric acid solution, and can be recovered by deposition by the electrolytic method or as a precipitate upon acid/alkaline reaction.

The rear plate 1 is manufactured using the rear plate substrate 41 having the element electrodes 42 and 43. For example, a Y-direction wiring line 13 is formed on the element electrode 42, a notch 46 is formed, and an X-direction wiring line 12 is formed. The wiring lines and interlevel insulating layer can be formed by printing or the like. Then, a film serving as the precursor of a conductive film is formed by an ink-jet apparatus for discharging a conductive solution by an ink-jet method. After the solvent is dried, the resultant structure is heat-treated to form a conductive film 49. In this fashion, the rear plate 1 of the image display apparatus 15 can be recycled.

EXAMPLE 3

The present invention will be described in more detail by way of Example 3.

EXAMPLE 3-1

Example 3-1 will be explained with reference to FIGS. 10 to 13E.

FIG. 10 shows the structure of an image display apparatus according to Example 3-1. In FIG. 10, reference numeral 1 denotes a rear plate; 2, a face plate having a fluorescent film 2b, metal back 2c, and the like on the inner surface of a substrate 2a; and 3, a support frame. The rear plate 1, support frame 3, and face plate 2 are sealed with frit glass to constitute an image display apparatus 15. Reference symbols Dox1, Dox2, . . . , Dox(-1), Doxm, Doy1, Doy2, . . . , Doy(-1), and Doyn denote external terminals of the container.

In FIG. 10, reference numeral 11 denotes a surface-conduction type electron-emitting element. In FIG. 12, reference numerals 42 and 43 denote a Y-direction wiring line 13 and X-direction wiring line 12 connected to a pair of element electrodes of a surface-conduction type electron-emitting element in FIGS. 13A to 13E.

A rear plate substrate 41 is coated with $SiO_2$ on soda-lime glass. The element electrodes 42 and 43 are made of Pt. The Y-direction wiring line 13 and X-direction wiring line 12 are made of Ag paste; an interlevel insulating layer 45, PbO glass paste; and a conductive film 49, Pd.

FIGS. 11A and 11B are explanatory views showing a rear plate recovery/recycling method according to the present invention. In FIGS. 11A and 11B, reference numeral 1 denotes the rear plate having a plurality of electron-emitting elements 11; 2, the face plate having an image forming member which forms an image upon collision with electrons emitted by the electron-emitting elements 11; 3, the support frame which connects the rear plate 1 and face plate 2, and maintains the internal pressure; 4, frit glass for sealing the rear plate 1, face plate 2, and support frame 3. These constituent elements constitute the image display apparatus 15.

The image display apparatus 15 from which the external terminals of the container and the like were detached was leaked because of a low internal pressure, and dipped in a nitric acid solution bath 6 filled with 1.2 N nitric acid. This state is shown in FIG. 11A. In dipping in nitric acid, the amount of nitric acid solution was adjusted to easily peel the rear plate 1, and the rear plate 1 was extracted from the image display apparatus 15 (FIG. 11B). The extracted rear plate 1 was transferred to a cleaning bath of pure water to clean the rear plate 1, and cleaned and dried with acetone or isopropanol.

The rear plate extracted and cleaned in this way is shown in FIG. 12. Reference numeral 41 denotes the rear plate substrate; and 42 and 43, the element electrodes. After cleaning, conductive films and printed wiring lines were removed, and the element electrodes 42 and 43 remain on the rear plate substrate 41.

The nitric acid solution was filtered, and the filtrate was electrolyzed as follows.

The filtrate was set to a potential of +1.4 to 1.7 V with reference to a silver/silver chloride standard electrode. Then, Pd and Ag were deposited on the cathode, and $PbO_2$ was deposited on the anode. These metals were recovered. Pd and Ag were reused, and $PbO_2$ underwent waste disposal.

The rear plate 1 was manufactured using the rear plate substrate 41 having the element electrodes 42 and 43. FIGS. 13A to 13E are views showing the steps in manufacturing the rear plate 1.

Figure 13A:
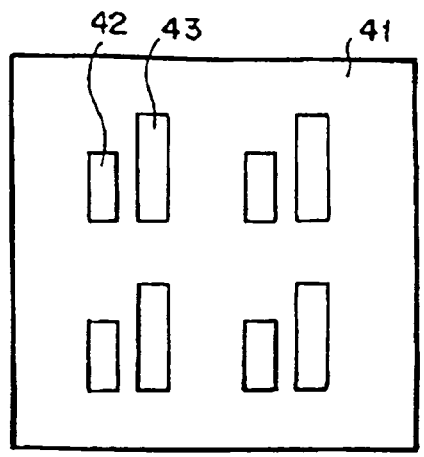
FIGS. 13A, 13B, 13C, 13D, and 13E are schematic views for explaining the steps in forming an electron-emitting element on a rear plate.
Figure 13B:
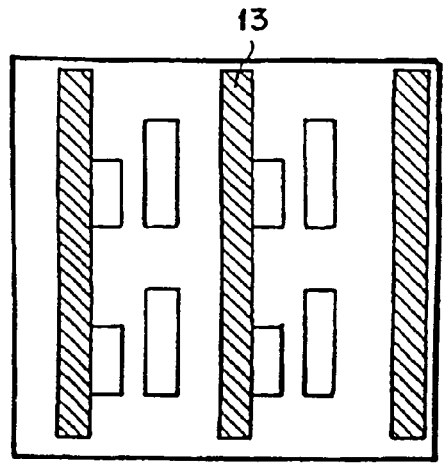

Ag paste was screen-printed into a predetermined shape on the rear plate substrate 41 (FIG. 13A) having the element electrodes 42 and 43, and heated and baked to form a Y-direction wiring line 13. Note that the Y-direction wiring line had a thickness of about 20 μm and a width of 100 μm (FIG. 13B).

Figure 13C:
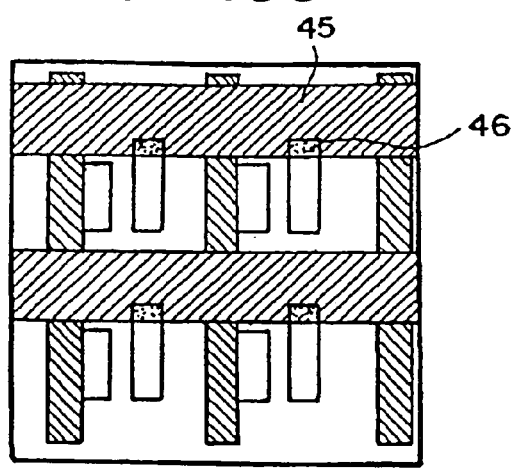

Glass paste was printed into a predetermined shape, and heated and baked to form an interlevel insulating layer 45. At this time, a notch 46 was formed not to cover the element electrode 43. The interlevel insulating layer had a width of about 250 µm, and a thickness of about 20 µm at a portion at which the interlevel insulating layer overlapped the Y-direction wiring line, and about 35 µm at the remaining portions (FIG. 13C).

Figure 13D:
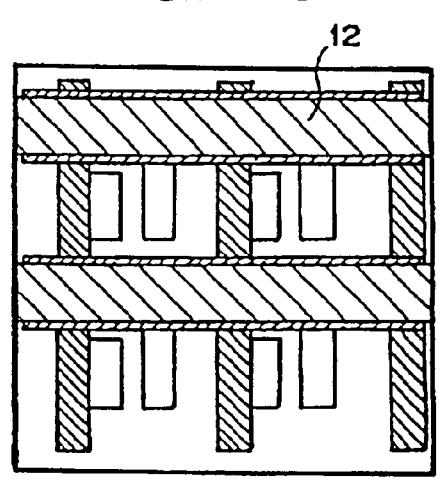

Subsequently, Ag paste was printed on the interlevel insulating layer 45, and heated and baked to form an X-direction wiring line 12. Note that the X-direction wiring line had a width of 200 µm and a thickness of about 15 µm (FIG. 13D).

Figure 13E:
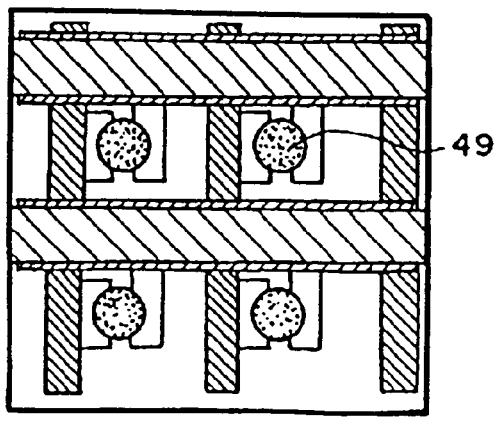

A piezo-jet type ink-jet apparatus applied droplets of a solution of an organic palladium-ethanolamine complex, thereby forming a film serving as the precursor of a conductive film. After the solvent was dried, heat treatment was performed at 300° C. for 10 min to change the precursor film into a conductive film 49 made of fine PdO particles. The conductive film had an almost cylindrical shape with a diameter of 40 µm and a film thickness of 15 nm (FIG. 13E).

In this way, the rear plate 1 was recycled. The rear plate 1 was welded to a face plate and support frame with frit glass. The container was satisfactorily evacuated, and subjected to forming processing and activation processing to constitute an image display apparatus 15 shown in FIG. 10.

The manufactured image display apparatus was free from any conspicuous defects or luminance variations on an image.

EXAMPLE 3-2

Example 3-2 relates to the same recycling method as in Example 3-1 except for the following point.

Figure 14:
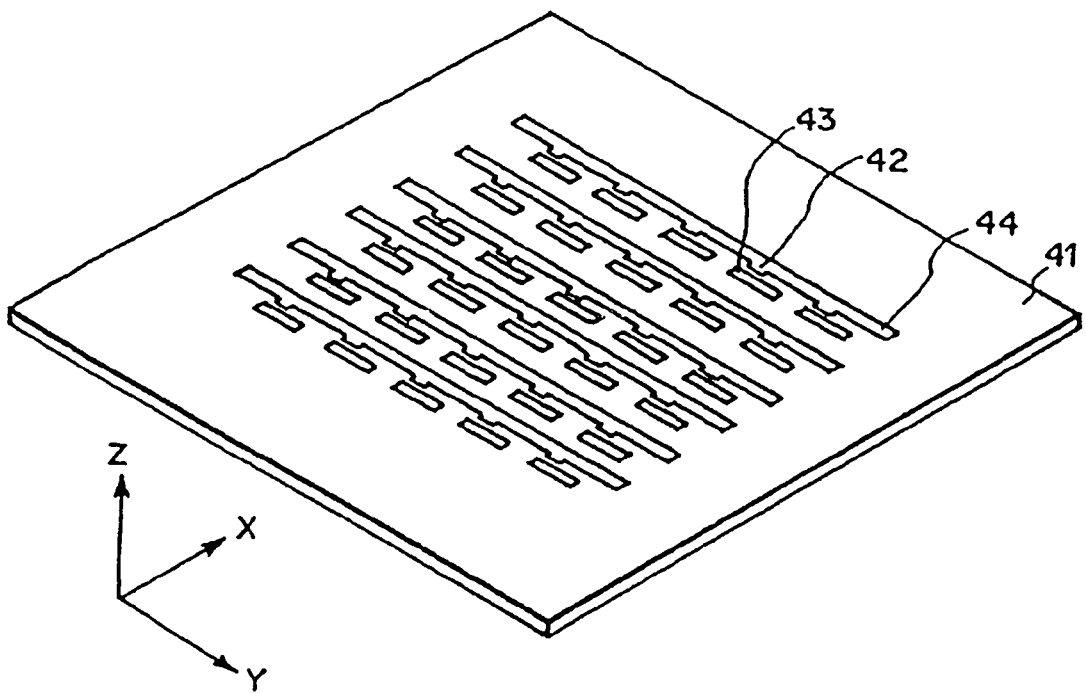
FIG. 14 is a perspective view showing another example of the rear plate substrate cleaned by the recycling method of the present invention.

In Example 3-1, the Y-direction wiring line 13 is a printed electrode. To the contrary, in Example 3-2, a Y-direction wiring line 13 is made of Pt connected to an element electrode 42 formed at the same time as element electrodes 42 and 43. As shown in FIG. 14, the element electrodes and the Y-direction wiring line 13 connected to one of the element electrodes remain on a rear plate after dipping in a nitric acid solution and cleaning.

The ink-jet apparatus used to apply droplets in Example 3-1 is of piezo-jet type. Instead of this, Example 3-2 used a bubble-jet type apparatus. With this apparatus, a rear plate 1 for an image display apparatus 15 can be recycled.

Embodiment 4

The present invention will be described in more detail.

The characteristic feature of the present invention is to reuse spacers by recovering them by a simple method without any damage in dismantling a flat display.

According to a spacer recovery method in the present invention, portions at which spacers and a flat panel or substrate are welded with frit glass are dipped in a nitric acid solution to dissolve the welded portions, thereby separating only the spacers. At this time, a jig for storing or holding the spacers is used to avoid any damage caused by contact with other spacers or peripheral members.

Figure 15:
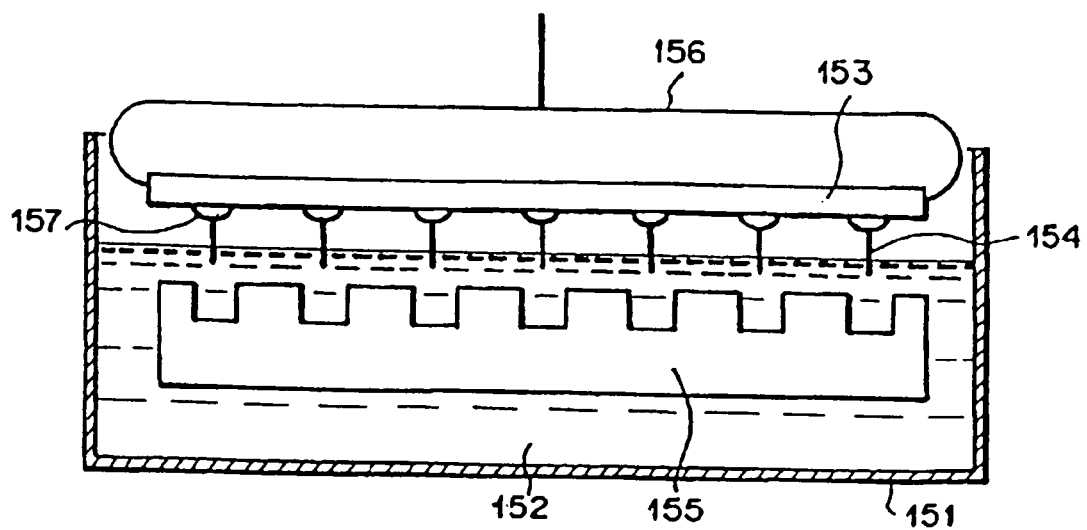
FIG. 15 is a view showing an embodiment of a spacer recovery method according to the present invention.

FIG. 15 is a schematic view showing an embodiment of a spacer recovery method and recovery apparatus according to the present invention. In FIG. 15, reference numeral 151 denotes a nitric acid solution bath; 152, a nitric acid solution; 153, a rear plate or face plate; 154, spacers; 155, a spacer container; 156, a support for the rear plate or face plate; and 157, frit.

The spacers 154 may be welded to the face plate, rear plate, or two plates. In this case, the spacers 154 are welded to the face plate.

The rear plate, face plate, and frame are separated while the face plate and spacers are kept welded with frit. A method of separating the rear plate, face plate, and frame includes a cutting method, a method of dissolving frit by spraying a nitric acid solution to frit portions at which respective members are welded, or dipping the frit portions in the nitric acid solution, and a method of dissolving frit by heating. A desirable method is dissolution with nitric acid because it does not damage spacers.

Then, the spacers and face plate are dipped in a nitric acid solution. The spacers and face plate are dipped while the face plate 153 is supported by the support 156 and the spacers 154 face down, as shown in FIG. 15.

The frit 157 between the spacers 154 and the face plate 153 are dissolved to separate them. At this time, the container 155 as shown in FIGS. 16A and 16B is used to prevent the spacers 157 from falling into the nitric acid solution container 151, coming into contact with other spacers or peripheral members, and being damaged.

The container 155 is almost equal in size to the face plate 153, and has recesses 148 in accordance with the layout of the spacers 154. The container 155 is made of a material, e.g., fluoroplastic which is stable with respect to nitric acid, and does not damage the spacers. To prevent the solution from staying in the recesses, the entire container or the bottoms of the recesses may be meshed. The container 155 is set below the spacers 154 to store the spacers 154 separated from the face plate 153 in the recesses 148, thereby preventing contact between the spacers 154.

After the face plate 153 is removed, the container 155 is pulled up from the nitric acid solution container 151. The spacers can undergo the subsequent cleaning step and drying step while being stored in the container.

Note that the shape of the spacer container 155 is not limited to the above one. The shape shown in FIGS. 16A and 16B is merely an example of the container shape. As shown in FIG. 17, many recessed containers 149 each slightly larger than the spacer 154 can be employed and arranged below the spacers to store the spacer 154 separated from the face plate 153. When this method is adopted, the containers 149 pulled up from the nitric acid solution container 151 can be gathered within a narrow range. Thus, a subsequent cleaning bath and drying bath can be downsized.

Figure 18:
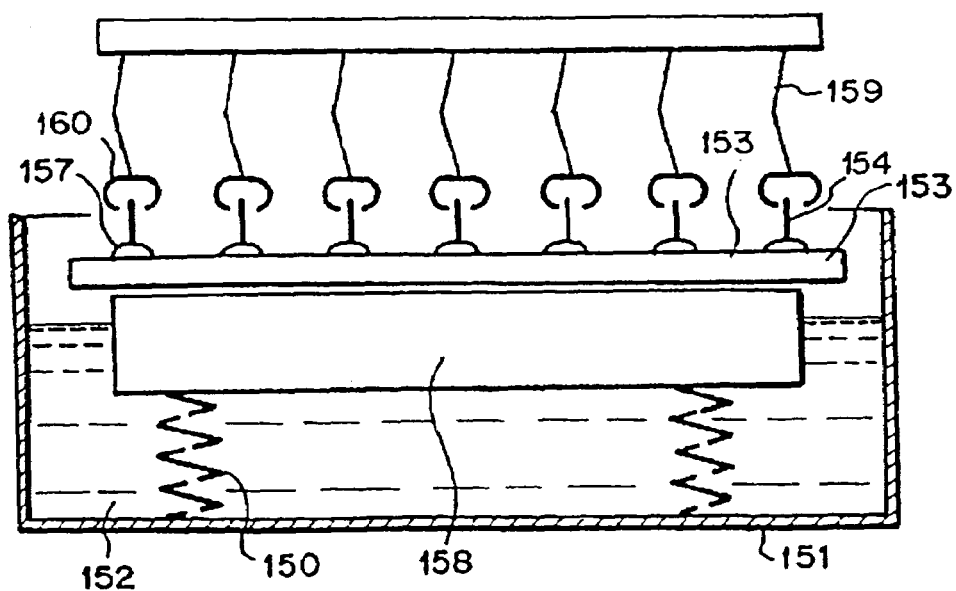
FIG. 18 is a view showing another embodiment of the spacer recovery method according to the present invention.

FIG. 18 is a schematic view showing another embodiment of a spacer recovery method and recovery apparatus according to the present invention. In FIG. 18, reference numeral 151 denotes a nitric acid solution bath; 152, a nitric acid solution; 153, a rear plate or face plate; 154, spacers; 157, frit; 158, a table for the rear plate or face plate; 159, spacer support arms; and 160, distal ends of the arms.

The rear plate, face plate, and frame are separated, and disassembled to a state in which the spacers 154 are kept welded to the rear plate or face plate with frit. Then, the spacers 154 are dipped in the nitric acid solution bath 151.

The spacers 154 may be welded to the face plate, substrate, or two plates. Although the present invention can be applied to any case, the spacers 154 are assumed to be welded to the face plate.

According to a dipping method, the face plate 153 is placed on the table 158 with the spacers 154 facing up. Then, the distal ends of the respective spacers 154 are clamped with the distal ends 160 of the corresponding arms 159. The table 158 is moved down to dip the face plate 153 and welded portions 157 in the nitric acid solution 152. Since the spacers 154 are fixed in advance so as to prevent the spacers 154 separated from the face plate 153 from falling. This can prevent the spacers 154 from being damaged. Note that the arm 159 and its distal end 160 must be formed from a material, e.g., a fluorine-based compound which is stable with respect to nitric acid.

The spacers 154 can undergo the subsequent cleaning step and drying step while being fixed by the distal ends 160. In the cleaning step, the frit glass 157 left on the spacers 154 is dissolved, and reattached substances dissolved from the face plate 153 and substrate are removed. The cleaning step is generally performed in a new nitric acid solution bath. Thereafter, the spacers 154 are transferred to a pure water bath where the spacers 154 are finally cleaned.

The drying step may adopt any method as far as pure water evaporates. For example, the spacers 154 can be dried with warm air.

In reusing the dried spacers, whether they are not damaged must be inspected. An appropriate inspection method may be employed. For example, a method of visually confirming the presence/absence of defects, or a method of checking the presence/absence of cracks by heating can be used.

Figure 19A:
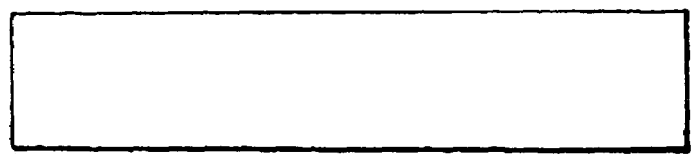
FIGS. 19A and 19B are views showing a spacer in the present invention.
Figure 19B:
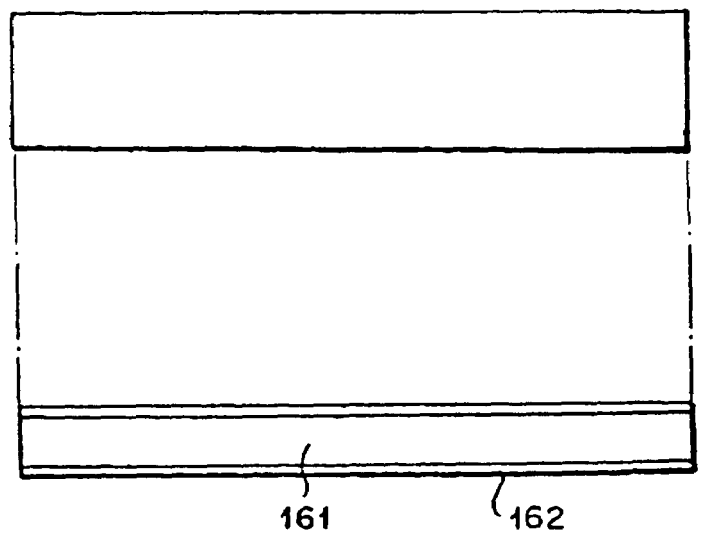

FIGS. 19A and 19B are schematic views showing the spacer 154. In general, the spacer 154 has a thin plate-like shape with a length and width of about several ten mm and a thickness of 300 µm or less, and is constituted by forming an antistatic conductive film 162 on the surface of an insulating substrate 161. A number of spacers 154 necessary for the purpose are arranged at a necessary interval, and fixed to the inner surface of the face plate 153 or the surface of the substrate with glass frit. When the spacers 154 are fixed to the rear plate, they are processed in the same manner as in the case wherein the spacers 154 are fixed to the face plate.

Examples of the material of the conductive film are oxides of metals such as chromium, nickel, and copper, a nitride of aluminum and a transition metal alloy, and carbon.

Examples of the material of the insulating substrate 161 of the spacer 154 are silica glass, glass containing a small amount of impurity such as Na, soda-lime glass, and a substrate prepared by stacking an $SiO_2$ insulating layer on each of various substrates described above.

As described above, the conductive film 162 is formed on the surface of the spacer. Depending on the material, the conductive film 162 may be stable with respect to nitric acid or may dissolve. When the conductive film 162 is formed from a material which is stable with respect to nitric acid, the spacer can be reused after the cleaning, drying, and inspection steps. When the conductive film 162 is formed from a material which dissolves in the nitric acid solution, the spacer can be reused after the film is sufficiently dissolved in the nitric acid solution, the cleaning, drying, and inspection steps are done, and a conductive film is newly formed.

EXAMPLE 4

The present invention will be described in detail by way of Example 4.

EXAMPLE 4-1

Spacers were recovered using the spacer recovery apparatus according to the present invention shown in FIG. 15. The apparatus in FIG. 15 dissolves frit glass 157 which joint portions a face plate 153 and spacers 154, and separates the face plate 153 and spacers 154. In FIG. 15, reference numeral 151 denotes a nitric acid solution bath; 152, a nitric acid solution; 153, the face plate; 154, the spacers; 155, a spacer container; 156, a face plate support; and 157, the frit glass.

FIG. 20 schematically shows states in the respective steps of the spacer recovery method according to the present invention. FIG. 20A shows the step of separating a substrate, face plate, and frame, FIG. 20B shows the step of separating the face plate and spacers, FIGS. 20C and 20D show the spacer cleaning step, and FIG. 20E shows the spacer drying step.

Example 4-1 used a display in which 25 spacers 154 were welded to a face plate 153 made of soda-lime glass with a size of 300 mm×250 mm×2.8 mm. Each spacer 154 was formed by forming aluminum nitride as a conductive film on a soda-lime glass substrate having a height of 2.8 mm, a thickness of 200 µm, and a length of 40 mm.

Example 4-1 will be described in detail with reference to FIG. 15, 16A, 16B, and 20A to 20E.

(1) The housing was dismantled to extract a unit made up of a rear plate 163, face plate 153, and frame 164 welded with the frit glass 157.

Figure 20A:
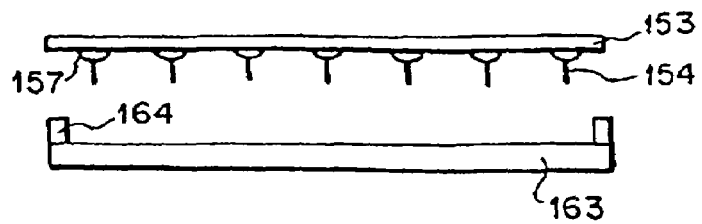
FIGS. 20A, 20B, 20C, 20D, and 20E are views showing an example of the steps in recovering a spacer according to the present invention.

(2) A 0.2-N nitric acid solution was sprayed to the welded portions to gradually dissolve them. When almost all the frit 157 was dissolved, the face plate 153 was pulled up by the support 156 and separated from the frame (FIG. 20A).

(3) A container 155 for storing spacers was sunk in the nitric acid solution bath 151 with a length of 400 mm and a width of 350 mm which contained a 0.2-N nitric acid solution. As shown in FIG. 16, this container was 300 mm in length× 250 mm in width×10 mm in height, and had 25 recesses (length: 50 mm, width: 5 mm, and depth: 4 mm) in accordance with the layout of the spacers. The container was formed from a fluoroplastic which was stable with respect to nitric acid and did not damage the spacers. The recesses were meshed not to store any solution.

The face plate 153 to which the spacers 154 were welded was dipped in the nitric acid solution bath 151 with the spacers 154 facing down. The frit between the spacers 154 and the face plate 153 was dissolved to separate them. Each spacer 154 fell into a corresponding recess of the container 155.

Figure 20B:
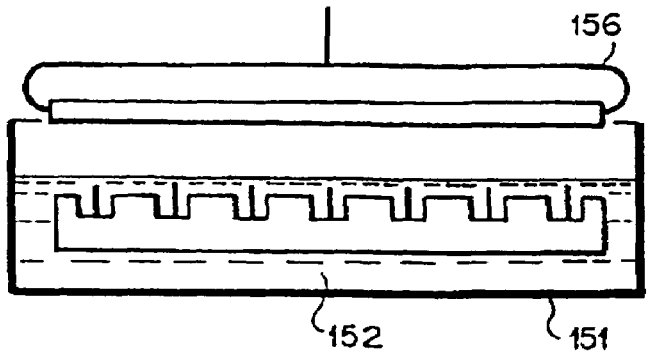

After the face plate 153 separated from the spacers 154 was removed, the container 155 was pulled up from the nitric acid solution bath (FIG. 20B).

Figure 20C:
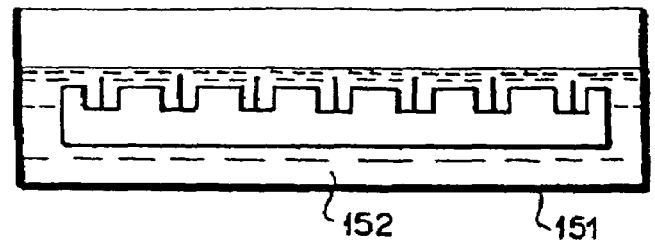

(4) The spacers 154 were sunk together with the container 155 in a cleaning nitric acid solution bath filled with a 0.2-N nitric acid solution. In this step, the frit glass 157 left on the spacers 154 was dissolved, and reattached substances dissolved from the face plate 153 and substrate were removed (FIG. 20C).

Figure 20D:
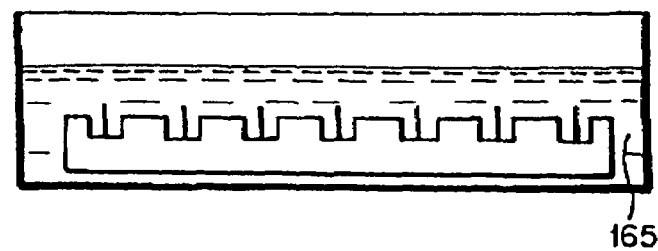

(5) The spacers 154 were transferred together with the container 155 to a pure water bath where the spacers 154 were finally cleaned with pure water 165. Note that the nitric acid cleaning bath and pure water cleaning bath were equal in size to the nitric acid solution bath in FIG. 20B (FIG. 20D).

Figure 20E:
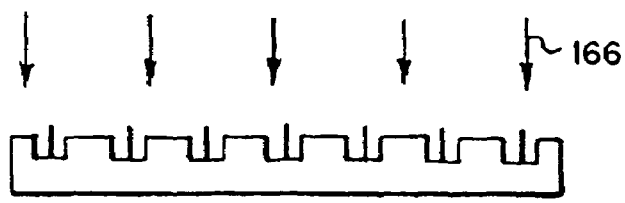

(6) Warm air 166 was blown to the spacers 154 in the container 155 to dry them (FIG. 20E).

(7) In reusing the spacers recovered in this way, the spacers 154 were inspected. As the inspection method, peeling of conductive films, and the presence/absence of scratches, deposits, and another dirt were checked with an optical microscope. Then, the presence/absence of cracks by heating was checked to exclude spacers having defective glass substrates. These inspections were done for the spacers while they were contained in the container or after the they were picked up one by one. As a result of inspection, about 10% of spacers was excluded as defectives, and most of spacers could be reused. Non-defective spacers were directly used to assemble a new display.

EXAMPLE 4-2

Example 4-2 used a display having the same structure as in Example 4-1. Spacers were recovered by the same method as in Example 4-1 except that a frame, rear plate, and face plate separated from a housing were separated by cutting.

Figure 21:
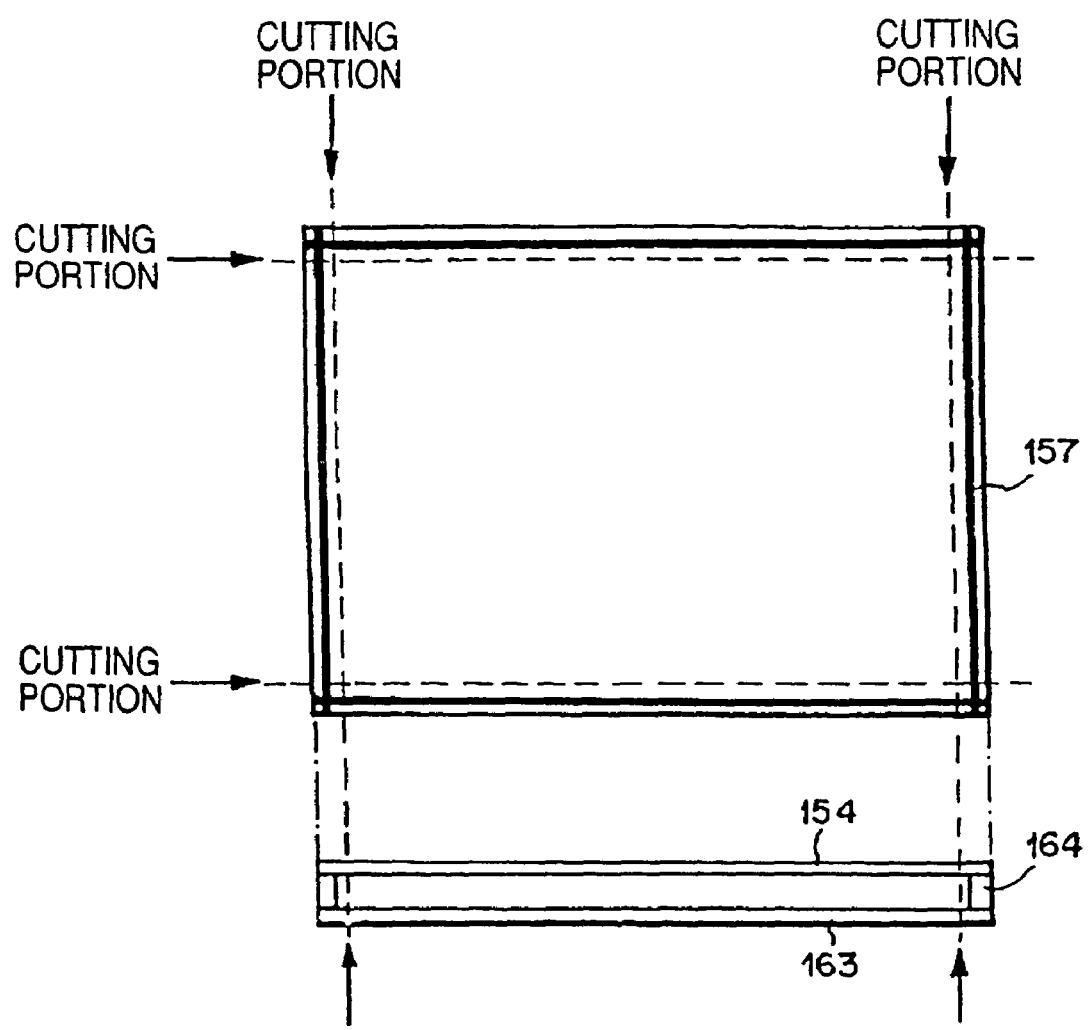
FIG. 21 is a view showing a flat display panel cutting method according to the present invention.

As shown in FIG. 21, the frame, substrate, and face plate were cut to separate four welded portions and the surrounded region where spacers existed. The spacer recovery method after cutting was the same as steps (3) to (6) in Example 4-1.

As a result of inspection, about 15% of spacers were excluded as defectives, and most of spacers could be reused.

EXAMPLE 4-3

Example 4-3 used a display having the same structure as in Example 4-1. Spacers were recovered by the same method as in Example 4-1 except that a container shown in FIGS. 17A and 17B was used in separating a face plate and spacers.

Example 4-3 will be explained with reference to FIGS. 15, 16A, 16B, 17A, 17B, and 22A to 22D.

A face plate and frame were separated by the same method as steps (1) and (2) in Example 4-1.

(3) 25 containers 167 for storing spacers 154, which were equal in number to the spacers, were fixed to a base 168, and sunk in a nitric acid solution bath filled with a 0.2-N nitric acid solution.

Each container had a rectangular shape with a length of 60 mm, a width of 10 mm, and a height of 10 mm, as shown in FIGS. 17A and 17B. A recess with a length of 50 mm, a width of 5 mm, and a depth of 8 mm was formed in the top of the container. The recess was meshed not to store any solution, and formed from a fluoroplastic which was stable with respect to nitric acid and did not damage the spacers. These containers were fixed to the base so as to be set immediately below the respective spacers, and sunk in a nitric acid solution bath 151.

A face plate 153 to which the spacers 154 were welded was dipped in the nitric acid solution bath 151 with the spacers 154 facing down. Frit glass 157 was dissolved to separate the face plate 153 and spacers 154. Each spacer 154 fell into the recess of a corresponding container.

Figure 22A:
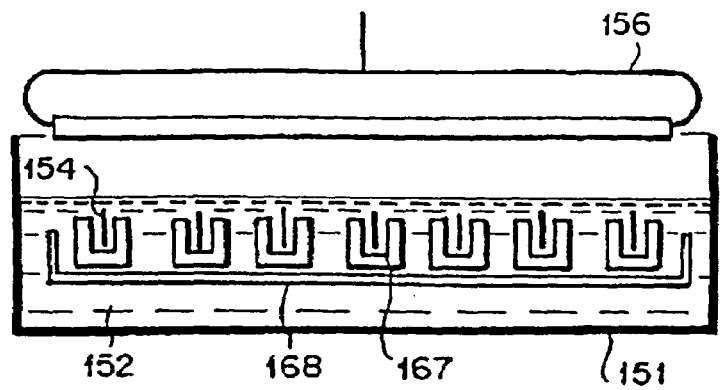
FIGS. 22A, 22B, 22C, and 22D are views showing another example of the steps in recovering a spacer according to the present invention.

After the face plate 153 separated from the spacers 154 was moved, the containers 167 were pulled up from the nitric acid solution bath together with the base 168 (FIG. 22A).

Figure 22B:
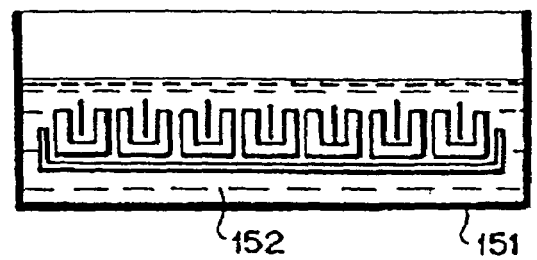

(4) After the containers were rearranged close to each other, the spacers were sunk together with the containers in a cleaning nitric acid solution bath filled with a 0.2-N nitric acid solution. In this step, the frit glass left on the spacers was dissolved, and reattached substances dissolved from the face plate and substrate were removed (FIG. 22B).

Figure 22C:
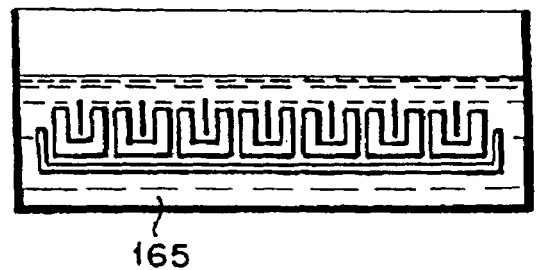
Figure 22D:
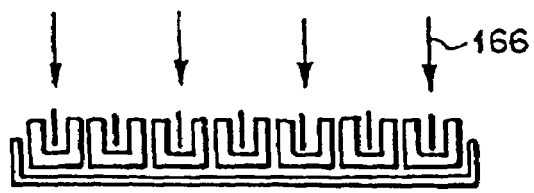

(5) By the same method as in Example 4-1, the spacers were cleaned with pure water, dried, and inspected. Note that the cleaning bath used in Example 4-3 was smaller than that used in Example 4-1, and had a length of 200 mm and a width of 150 mm (FIGS. 22C and 22D).

As a result of inspection, about 10% of spacers was excluded as defectives, and most of spacers could be reused.

EXAMPLE 4-4

In Example 4-4, spacers were recovered using the same apparatus as in Example 4-1. Example 4-4 adopted a face plate identical to that in Example 4-1 to which 25 spacers were welded. Each spacer was prepared by forming a nickel oxide ($NiO_2$) film as a conductive film on a silica glass substrate.

The spacers were separated, cleaned, and dried by the same method as steps (1) to (6) in Example 4-1.

The spacers recovered in this manner were inspected. As the inspection method, deposits, another dirt, scratches of conductive films, and film peeling were confirmed with an optical microscope. Then, the presence/absence of cracks by heating was checked to exclude defective spacers. As a result of inspection, about 10% of spacers was excluded as defectives, and most of spacers could be reused. Non-defective spacers were directly used to assemble a new display.

EXAMPLE 4-5

Example 4-5 used a flat display having the same structure as in Example 4-1.

As a spacer recovery apparatus, Example 4-5 employed an apparatus as shown in FIG. 18. In FIG. 18, reference numeral 151 denotes a nitric acid solution bath; 152, a nitric acid solution; 153, a face plate; 154, spacers; 157, frit; 158, a table for the face plate, 159, spacer support arms; 160, distal ends of the arms; and 150, elastic members made of a fluoroplastic for supporting the table. The table 158 and arms 159 were made of a fluoroplastic stable with respect to nitric acid, and the distal ends 160 were made of fluororubber which did not damage spacers.

Example 4-5 will be explained with respect to FIGS. 18 and 23A to 23E.

A face plate and frame were separated by the same method as in (1) and (2) of Example 4-1.

Figure 23A:
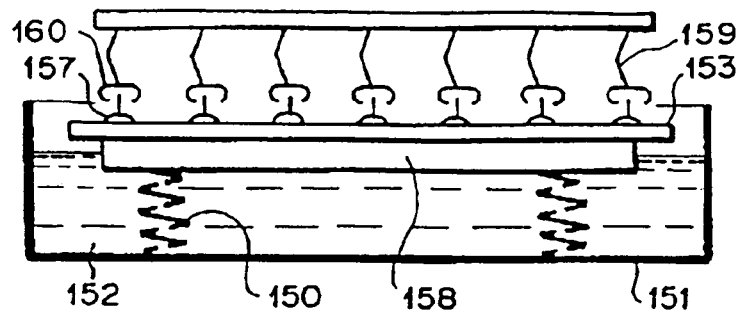
FIGS. 23A, 23B, 23C, 23D, and 23E are views showing still another example of the steps in recovering a spacer according to the present invention.
Figure 23B:
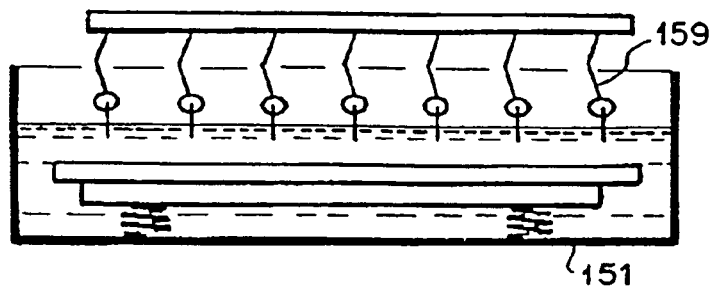

(3) The face plate 153 was placed on the table 158 with the spacers facing up, and then the distal ends of the respective spacers 154 were clamped with the distal ends 160 of the support arms 159 (FIG. 23A). The table 158 was moved down to dip the face plate 153 and welded portions 157 in the nitric acid solution bath 151 containing a 0.2-N nitric acid solution. After it was confirmed that the frit glass 157 was dissolved to separate the spacers 154, the spacers 154 were pulled up from the nitric acid solution bath (FIG. 23B).

Figure 23C:
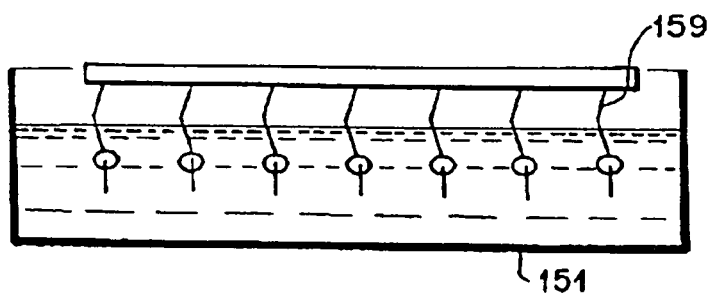

(4) While the spacers were kept clamped with the support members, they were sunk in a cleaning nitric acid solution bath filled with a 0.2-N nitric acid solution. In this step, the frit glass left on the spacers was dissolved, and reattached substances dissolved from the face plate and substrate were removed (FIG. 23C).

Figure 23D:
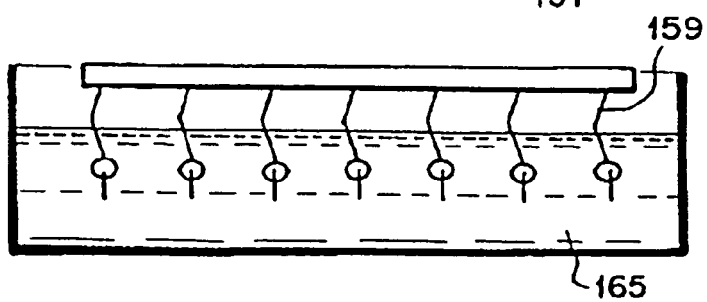

(5) The spacers were transferred to a pure water bath where they were finally cleaned (FIG. 23D).

Figure 23E:
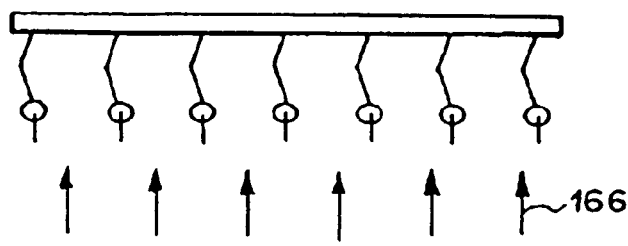

(6) The spacers were dried with warm air (FIG. 23E).

(7) The recovered spacers were inspected by the same method as in Example 4-1 to find that about 10% of spacers was excluded as defectives, and most of spacers could be reused.

EXAMPLE 4-6

Example 4-6 used a display having the same structure as in Example 4-1 except that spacers were welded to both a substrate and face plate.

Example 4-6 will be explained with reference to FIGS. 15 and 24A to 24C.

(1) A unit made up of a substrate 163, face plate 153, and frame 164 welded with frit glass 157 was extracted from a housing.

Figure 24A:
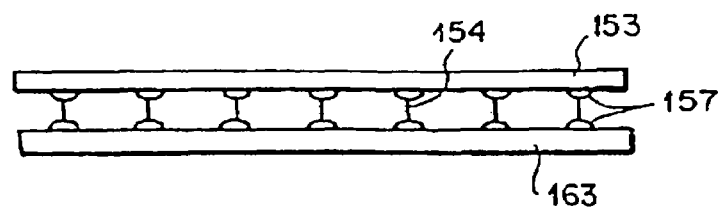
FIGS. 24A, 24B, and 24C are views showing still another example of the steps in recovering a spacer according to the present invention.

(2) The welded portions between the frame, the substrate, and the face plate were cut by the same method as in Example 4-2 (FIG. 24A).

Figure 24B:
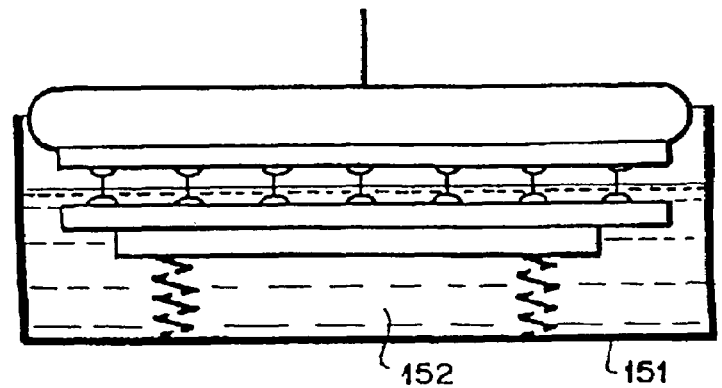

(3) The unit was gradually dipped in a nitric acid solution bath 151 containing a 0.2-N nitric acid solution with the substrate facing down. When the welded portions between the substrate and the spacers were sunk in the solution, dipping the unit was stopped (FIG. 24B).

Figure 24C:
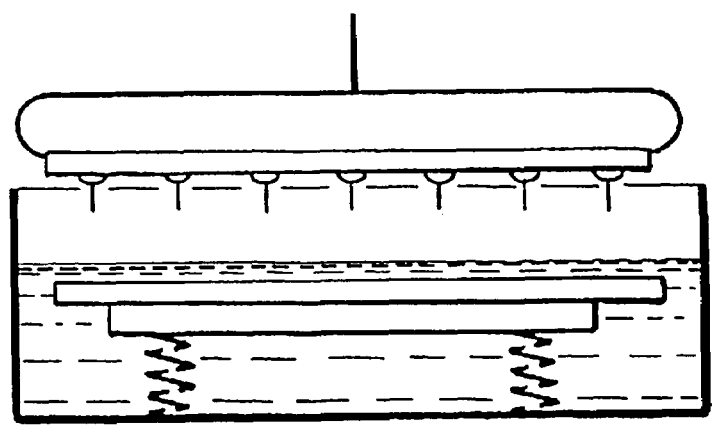

In this manner, only frit between the substrate and the spacers was dissolved to separate them (FIG. 24C).

(4) After the substrate was pulled up from the nitric acid solution bath, the spacers were separated and recovered from the face plate by the same method as in steps (3) to (7) in Example 4-1.

After recovery by this method, about 15% of spacers was excluded as defectives, and most of spacers could be reused.

Embodiment 5

Figure 25:
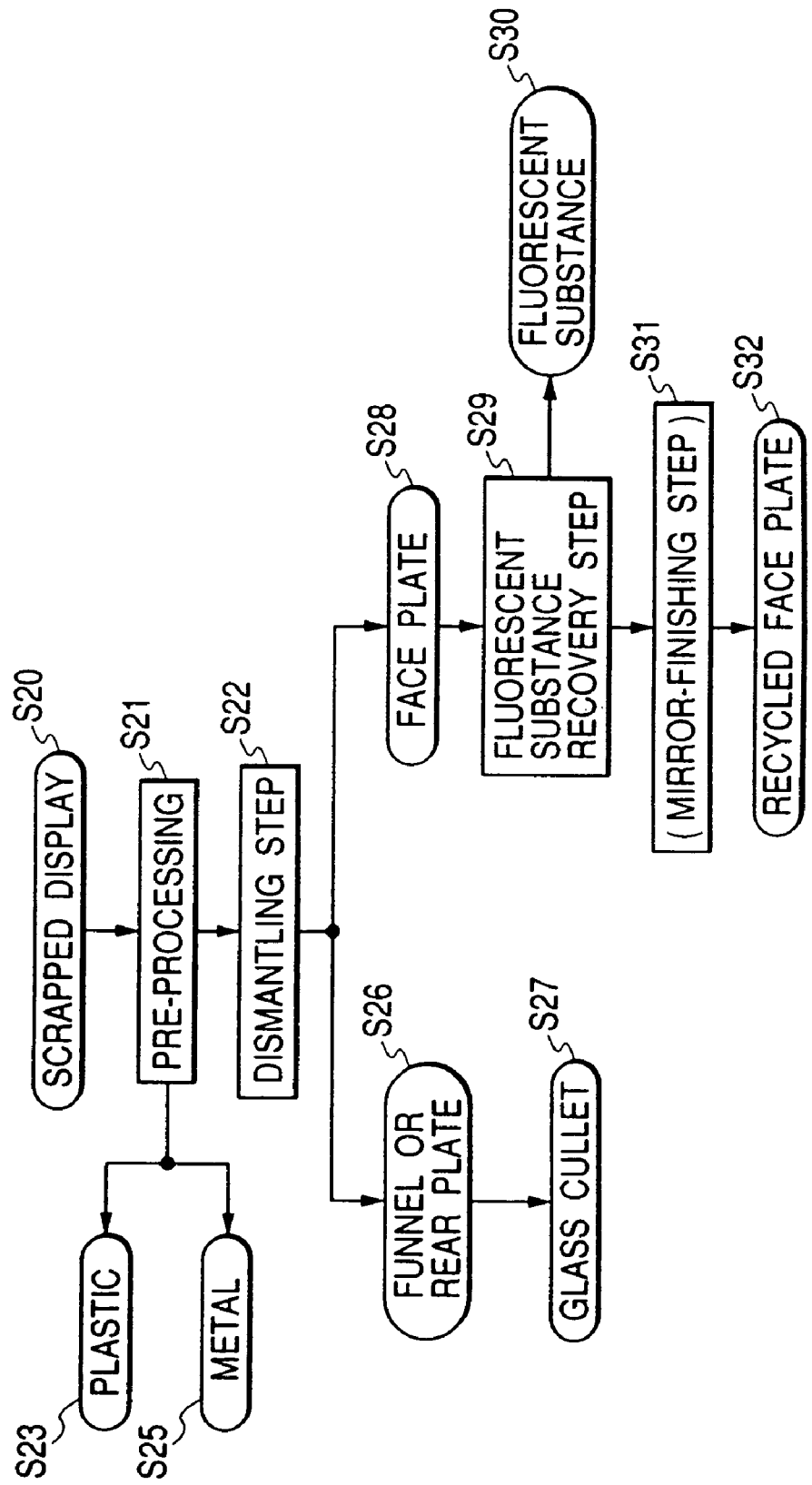
FIG. 25 is a flow chart showing the steps in recovering fluorescent substances from a display apparatus according to the present invention.

FIG. 25 is a flow chart showing the steps of a method of recovering fluorescent substances from a display apparatus according to the present invention. The recovery steps will be explained with reference to FIG. 25.

A processed/scrapped display apparatus (S20) is a type of display in which a face plate is coated with fluorescent substances and the fluorescent substances emit light by irradiation of an electron beam or ultraviolet ray. Examples of this display are some of general CRTs and flat displays in which face plates are coated with fluorescent substances.

The model of the display apparatus is identified by a sensor before a CRT or flat display is separated from a cabinet. Data (e.g., size, display dismounting method, brush size suitable for the shape of the face plate, shape, and shape of the suction unit) used in the subsequent steps are read out from the database.

In accordance with the data obtained in the identification step, the display is extracted from the cabinet, and the display is fixed onto a jig in order to easily dismount the face plate from the display. As the jig used at this time, a jig with an optimal shape is selected and used in accordance with the data obtained in the identification step. When plastic and metal members are attached to the display, they are detached as needed (S21).

After a reduced-pressure state in the display fixed to the jig is canceled, the display is sent to the next step.

In the face plate separation (dismantling) step (S22), the face plate is dismounted from the display along frit glass portions between the face plate and the funnel for a CRT or between the face plate and the frame for a flat display. As the dismounting method, a method of cutting the display between the face plate and the funnel, and a method of peeling, with a peeling solution, frit glass portions at which the face plate and funnel are sealed are available. As the CRT dismantling method, a method of cutting the CRT with a heating wire (Japanese Laid-Open Patent Application No. 07-029496), a method of causing thermal distortion to dismantle the CRT (Japanese Laid-Open Patent Application No. 05-151898), a method of applying ultrasonic vibrations at the same time as heating to dismantle the CRT, and a method using nitric acid as a peeling solution (Japanese Laid-Open Patent Application No. 07-045198) are available. Since a wet process of preventing generation of thermal distortion requires a long time and high cost, cutting with a wire saw or energy cutter is preferable. Glass dust generated at this time is sucked and removed by a suction unit. The funnel and rear plate are shredded into glass cullets.

The dismounted face plate is fixed to a jig with the inner surface facing up, and sent to the brush sweep & suction step (S28).

The brush sweep step may be completed by only one sweep operation if fluorescent substances are only recovered. To reuse the face plate, the brush sweep step can be repetitively performed until the inner surface satisfies the specifications. In this case, a brush for removing fluorescent substances can be replaced with a buff for mirror-polishing the inner surface.

As the brush used in the brush sweep step of the present invention, a brush having a shape corresponding to R (radius of curvature) of the inner surface of the face plate is selected for a general CRT. For a flat CRT or flat display, a brush corresponding to a flat surface is selected. When pestling motion processing (to be described later) is adopted, a brush curved with R is used even in the processing step for a flat face plate in consideration of pestling motion (S32).

Figure 26:
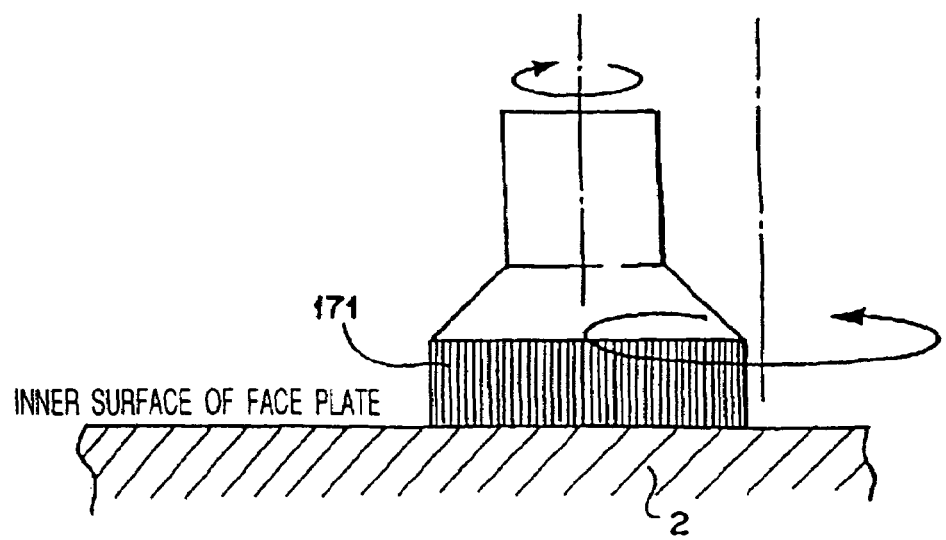
FIG. 26 is a view showing the operation of a revolutionary motion type brush.
Figure 27:
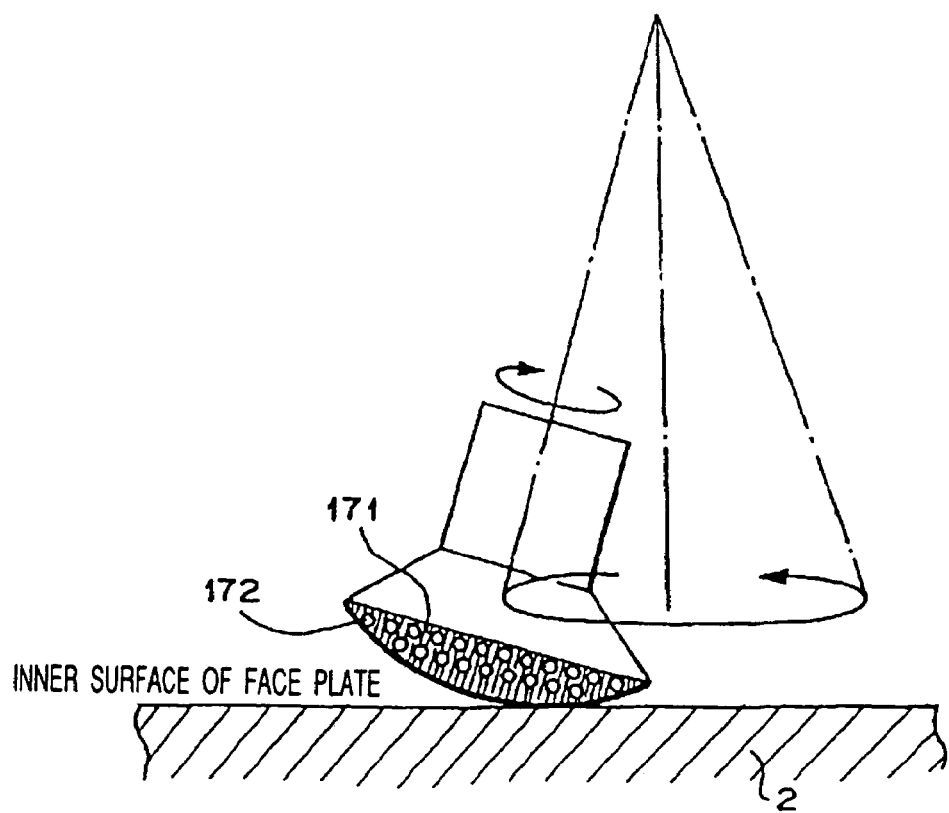
FIG. 27 is a view showing the operation of a pestling motion type brush.

The motion of the brush used in the present invention is not particularly limited, and includes simple rotating motion and reciprocal rotating motion on the surface of a face plate 2. If the motion of the brush employs a method of causing a brush 171 to simultaneously perform rotational motion and revolutionary motion (FIG. 26), or a motion (pestling motion) method of rotating the brush about a center line as its axis while rotating the axis about one point (FIG. 27), fluorescent substances are easily, quickly swept to planarize the inner surface.

The nozzle shape and suction force of the suction unit used in the present invention are not limited as far as the suction unit can suck and recover fluorescent substances 2b and black stripes swept by the brush. The suction unit can be installed in the brush or can be set to surround the brush in order to prevent the fluorescent substances 2b from scattering. To satisfactorily suck fluorescent substances around the face plate, the suction unit is preferably installed in the brush.

The fluorescent substances 2b and black stripes recovered by the present invention are separated and purified by a known method with an arbitrary means. For example, the recovered fluorescent substances may be processed with an aqueous solution containing NaOH, NaClO, and $H_2O_2$, and processed with weak acid (Japanese Laid-Open Patent Application No. 06-108047). Alternatively, the recovered fluorescent substances may be processed with weak acid to leach rare-earth elements, oxalic acid may be added to convert the rare-earth elements into oxalate, and oxalate may be baked to obtain rear-earth oxides (Japanese Laid-Open Patent Application No. 08-333641).

Figure 29:
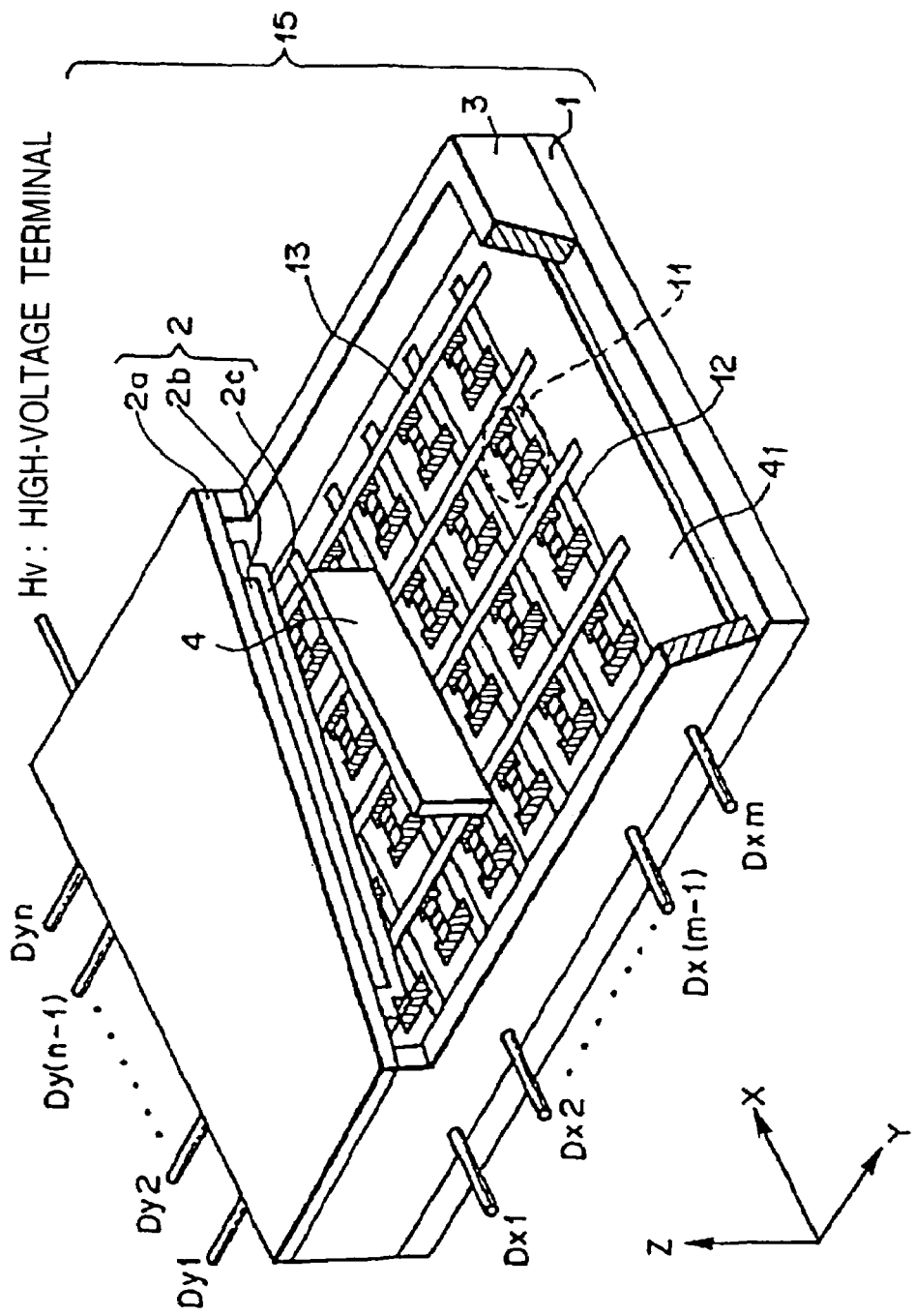
FIG. 29 is a perspective view showing a display apparatus using a spacer.

As an example of the flat display, a structure of a flat display apparatus using surface-conduction type electron-emitting elements will be described. FIG. 29 is a perspective view showing a display apparatus using spacers, in which a panel is partially cut away in order to show the internal structure.

In FIG. 29, reference numerals 11 denote electron-emitting elements; 1, a rear plate; 3, a side wall (frame); and 2, a face plate. The rear plate 1, side wall 3, and face plate 2 form an airtight container (envelope 15) for keeping the interior of the display panel in vacuum. Spacers 4 are arranged as needed, in order to prevent the envelope from being damaged and deformed by the atmospheric pressure. In assembling the airtight container, the respective members must be sealed to obtain a sufficient strength and maintain the airtight condition. For example, frit glass is applied to joint portions, and sintered at 400 to 500° C. for 10 min or more in air or a nitrogen atmosphere to seal the members.

A substrate 41 is fixed to the rear plate 1, and N×M cold cathode type electron-emitting elements 11 are formed on the substrate 41 (N and M=positive integers equal to 2 or more, and properly set in accordance with the number of target display pixels. For example, in an image forming apparatus for high-resolution television display, N=3,000 or more and M=1,000 or more are desirably set.) The N×M cold cathode type electron-emitting elements 11 are arrayed in a simple matrix with M X-direction wiring lines 12 and N Y-direction wiring lines 13.

In this embodiment, the substrate 41 of the multi-electron beam source is fixed to the rear plate 1 of the airtight container. If, however, the substrate 41 of the multi-electron beam source has a sufficient strength, the substrate 41 of the multi-electron beam source may be used as the rear plate 1 of the airtight container.

A fluorescent film 2b is formed on the lower surface of the face plate 2. For a color display apparatus, the fluorescent film 2b is coated with fluorescent substances of red, green, and blue, i.e., three primary colors used in the CRT field. Black stripes are formed between the respective fluorescent substances. The purposes of forming the black stripes are to prevent misregistration of the display color even if the electron-beam irradiation position slightly shifts, and to prevent degradation of the display contrast by preventing reflection of external light.

Note that when a monochrome display panel is formed, a single-color fluorescent material may be applied to the fluorescent film 2b, and black stripes may not always be used.

A metal back 2c, which is well-known in the CRT field, is formed on a surface of the fluorescent film 2b on the rear plate side. The purposes of forming the metal back 2c are to improve the light utilization ratio by mirror-reflecting part of light emitted by the fluorescent film 2b, to protect the fluorescent film 2b from collision with negative ions, to use the metal back 2c as an electrode for applying an electron beam accelerating voltage, and to use the metal back 2c as a conductive path for electrons which excite the fluorescent film 2b. The metal back 2c is formed by forming the fluorescent film 2b on a face plate substrate 2a, smoothing the surface of the fluorescent film, and depositing Al on the smoothed surface by vacuum deposition. Note that when a fluorescent material for a low accelerating voltage is used for the fluorescent film 2b, the metal back 2c may not be used.

To apply an accelerating voltage or improve the conductivity of the fluorescent film, a transparent electrode made of, e.g., ITO may be arranged between the face plate substrate 2a and the fluorescent film 2b.

Reference symbols Dx1 to Dxm, Dy1 to Dyn, and Hv denote electric connection terminals for an airtight structure provided to electrically connect the display panel to an electric circuit (not shown). Dx1 to Dxm are electrically connected to the X-direction wiring lines of the multi-electron beam source; Dy1 to Dyn, to the Y-direction wiring lines of the multi-electron beam source; and Hv, to the metal back 2c of the face plate.

EXAMPLE 5

This example of the present invention will be described in detail with reference to the accompanying drawings.

EXAMPLE 5-1

A flat display apparatus which was constituted by a face plate, frame, and rear plate and used surface-conduction type electron-emitting elements was fixed to a jig with the face plate facing down, and a press tool having a rubber sucker was brought into tight contact with the rear plate to fix the display. The distal end of an exhaust pipe was broken to cancel the vacuum state in the display, and frit portions between the face plate and the frame were cut with an energy cutter to dismantle the display.

The rear plate and frame were removed. While the inner surface of a face plate 2 was swept to sweep fluorescent substances 2b (about 20 min) with a rotating brush (see FIG. 27) which had a suction unit and performed pestling motion, the fluorescent substances 2b and black stripes were sucked and recovered from suction holes 172.

After the fluorescent substances 2b were completely removed, the inner surface was polished for 30 min to mirror-finish it.

Corrugations at black matrix portions and portions coated with the fluorescent substances 2b on the inner surface of the face plate were suppressed to 15 μm or less, and the face plate was confirmed to be directly used as a recycled face plate.

COMPARATIVE EXAMPLE 5-1

Similar to Example 5-1, a dismantled face plate was dipped in an aqueous oxalic acid solution to remove fluorescent substances, and then black matrix was removed with high-pressure water. Corrugations of about 85 μm were observed at fluorescent substance-coated portions and black matrix-coated portions.

EXAMPLE 5-2

An electron gun and deflection yoke were cut from a CRT separated from a cabinet. The CRT was fixed to a jig with the face plate facing down. A press tool having a rubber sucker was brought into tight contact with the funnel to fix the CRT. An explosion-proof band wound around the frit glass portions of the CRT was peeled, and an adhesive agent was removed by grinding operation. The CRT was divided with an energy cutter into the face plate and funnel.

The funnel was removed, and the inner surface of the face plate was swept by a revolutionary motion brush (see FIGS. 26, 28A, and 28B) having a suction unit to sweep fluorescent substances (about 20 min), while the fluorescent substances and black matrix were sucked and recovered.

After the fluorescent substances were completely removed, the rotating brush was replaced with a buff. The inner surface was polished for 30 min to mirror-finish it.

Corrugations at black matrix portions and fluorescent substance-coated portions on the inner surface of the face plate were suppressed to 10 μm or less, and the face plate was confirmed to be directly used as a recycled face plate.

Figure 28A:
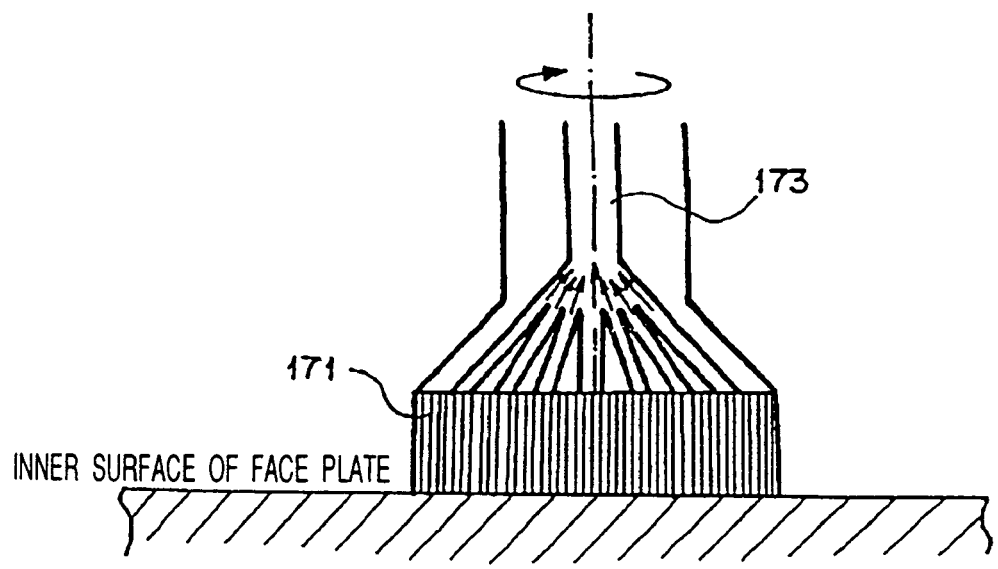
FIGS. 28A and 28B are views, respectively, showing different structures of a brush and suction unit.
Figure 28B:
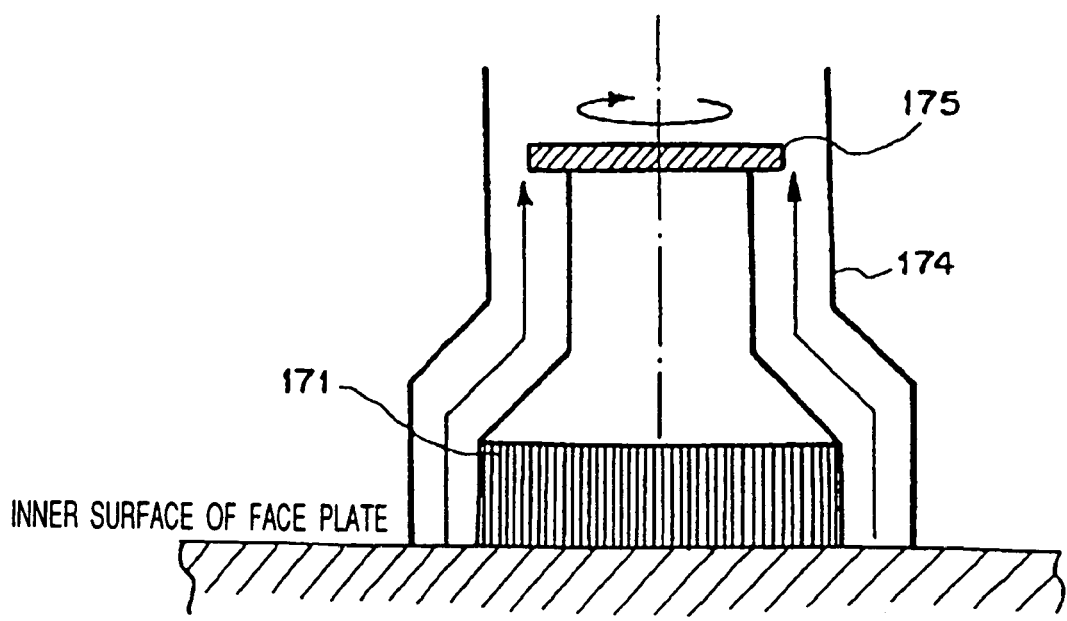

FIGS. 28A and 28B are sectional views each showing the structure of the brush and suction unit. In FIG. 28A, suction holes are formed in a brush 171, and dust is sucked by a suction mechanism 173. In FIG. 28B, the brush 171 is covered with a suction unit 174 to suck dust. In addition, the flow of air by suction is changed into rotating motion by a turbine 175, and used as the driving force of the brush 171.

Embodiment 6

Embodiment 6 of the present invention will be described in detail with reference to the accompanying drawings. In this embodiment, in recovering a face plate, rear plate, frame, spacer, and the like, an airtight container in the FPD must be returned to a normal air pressure because the airtight container is at an air pressure as low as vacuum of about $10^{-5}$ Pa. In this case, if the FPD is processed by direct cutting, melting, or the like without returning the interior of the airtight container to a normal air pressure, parts cannot be efficiently recovered. As one step of a recyclable recovery method, a process of returning the vacuum airtight container to a normal air pressure will be explained.

Figure 30:
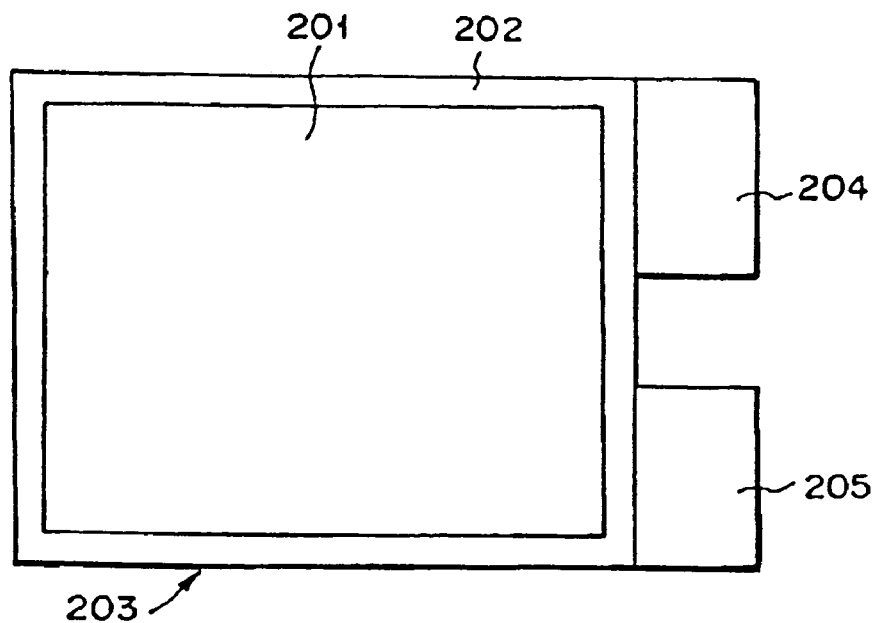
FIG. 30 is a schematic view showing the structure of an image display apparatus according to the present invention.

FIG. 30 is a schematic view showing an embodiment of an image display apparatus according to the present invention. In FIG. 30, reference numeral 201 denotes an image display; 202, an airtight container for maintaining the pressure of the image display apparatus; 203, an atmospheric pressure-resistant constituent member which is incorporated in the airtight container and keeps the airtight container stable; 204, a means connected to an exhaust device in order to obtain the pressure; and 205, a means for gradually returning the interior of the airtight container to the atmospheric pressure.

Figure 31:
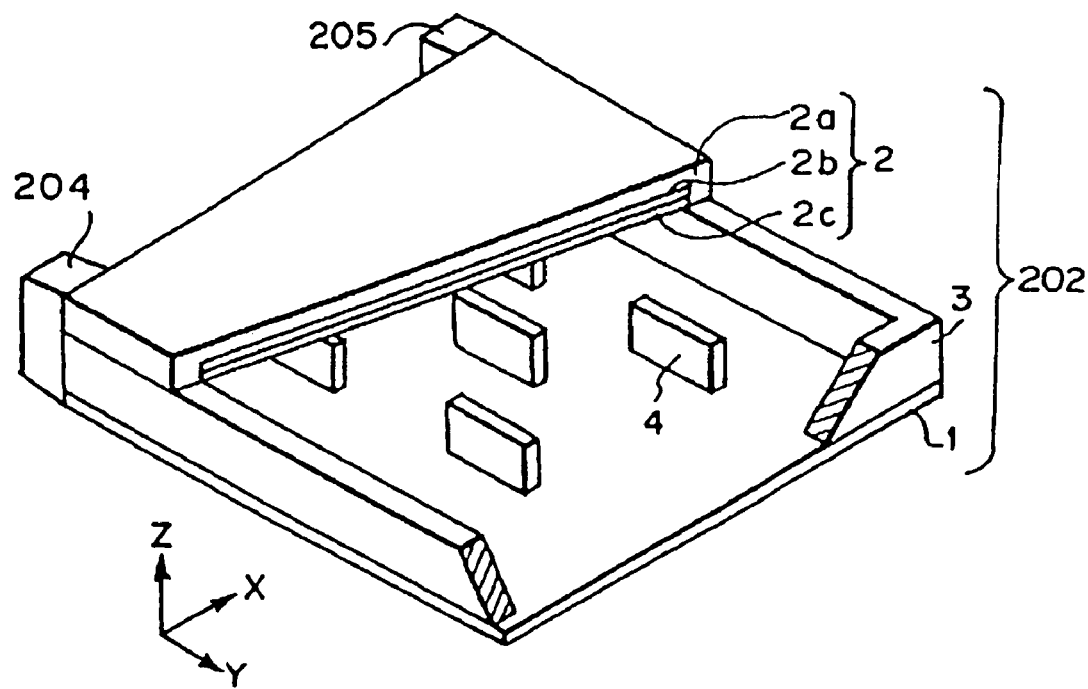
FIG. 31 is a perspective view showing an FPD as an example of the image display apparatus according to the present invention.

FIG. 31 is a schematic view showing an FPD as an example of the embodiment of the image display apparatus according to the present invention. In FIG. 31, reference numeral 2 denotes a face plate which serves as an image display, and is made up of a glass substrate 2a, fluorescent screen 2b, and metal back 2c; 1, a rear plate; and 3, a frame. The face plate 2, rear plate 1, and frame 3 constitute the airtight container 202. The airtight container 202 comprises the means 204 connected to the exhaust device and the means 205 for returning the interior of the airtight container to the atmospheric pressure that are shown in FIG. 30. The airtight container 202 comprises spacers 4 as an example of the atmospheric pressure-resistant constituent member.

An image display apparatus suitable for the present invention is a display apparatus for maintaining the interior at a pressure lower than the atmospheric pressure. Examples of this display apparatus are an image display apparatus such as a CRT, a plasma display panel (PDP), a flat image display apparatus including a surface-conduction type electron-emitting element, a flat image display apparatus including a field emission (FE) type electron-emitting element, a flat image display apparatus including a metal/insulator/metal (MIM) type electron-emitting element, a vacuum fluorescent display, a flat CRT, and a thin FPD.

An image display 15 of the image display apparatus such as a CRT is kept at a pressure much lower than a normal atmospheric pressure, compared to a liquid crystal display apparatus and electroluminescent panel. This is because electrons irradiate fine fluorescent substances or the like to emit light, and the light is controlled to display image information. In other words, the orbit of electrons cannot be controlled unless the pressure is reduced to set an atmosphere in which substances as obstacles which collide against electrons are satisfactorily eliminated. The pressure at which the orbit of electrons can be controlled is optimally selected in accordance with the structure of the image display apparatus, and is preferably 10 Pa or less, and more preferably 1 Pa or less.

As the material of the airtight container which maintains the internal pressure of the image display 15, the face plate 2 is made of materials, mainly various glass materials, which transmit visible light capable of externally displaying internal image information and is strong enough to maintain the internal pressure. The face plate 2, frame 3, and rear plate 1 preferably are made of materials which have almost the same thermal expansion coefficient in order to airtightly maintain the interior and can be sealed with frit glass or the like having almost the same thermal expansion coefficient.

When the internal pressure is greatly different from the external atmospheric pressure, an atmospheric pressure-resistant constituent member such as the spacer 4 is used to increase the strength of the airtight container 202 and prevent deformation of the airtight container 202. Particularly in a large-screen image display apparatus, if the airtight container 202 is made thick to increase the strength of the container, the weight of the image display apparatus increases, and the image display apparatus is difficult to use at home.

To reduce the weight of the image display apparatus, an atmospheric pressure-resistant constituent member is used in addition to the outer wall of the airtight container 202. In a thin FPD, the interval between the face plate 2 serving as the internal image display section in the panel, and the rear plate 1 constituting the airtight container 202 can be kept uniform to attain a uniform image across the entire surface of the image display apparatus. For this reason, many spacers 4 are arranged as atmospheric pressure-resistant constituent members to keep almost uniform the distance between the face plate 2 and the rear plate 1 in the panel serving as the airtight container 202.

As the panel becomes larger, the spacers 4 must be used in a larger number of locations in the panel in order to suppress distortion between the face plate 2 and the rear plate 1. The shape, the number of spacers 4, and the like are appropriately determined in accordance with the sizes, strengths, and distances of the face plate 2 and rear plate 1, the strength of the frame 3, and the like.

Since the airtight container 202 having the image display constituted in this manner has the means 204 connected to the exhaust device such as a vacuum pump, the internal pressure of the airtight container 202 can be decreased. After the airtight container 202 is evacuated to a sufficiently low pressure, the airtight container 202 can be sealed to maintain the interior of the airtight container 15 at a low pressure. Thereafter, the image display of the image display apparatus is driven.

The airtight container 202 is connected to the means for gradually returning the interior of the airtight container 202 to the atmospheric pressure. In general, a quantity Q of gas flowing in leakage is given by $$Q = C(P_1 - P_0) \text{ [Pa·m}^2\text{/s]} \tag{1}$$

where
 C: conductance [m$^2$/s]
 $P_1$: atmospheric pressure [Pa]
 $P_0$: internal pressure of airtight container [Pa]
 $P_1 - P_0$: difference between atmospheric pressure and internal pressure of airtight container [Pa]

To prevent damage to the airtight container and internal constituent members, abrupt inflow of gas into the airtight container must be prevented. For this purpose, the quantity Q of gas is desirably suppressed to about $10^1$ Pa·m$^2$/s or less. From equation (1), a mechanism having a leakage means having a conductance C of about $10^{-4}$ m$^2$/s or less is attached to the airtight container 202 as the means 205 for gradually returning the interior of the airtight container to the atmospheric pressure.

As the means 205 for gradually returning the interior of the airtight container to the atmospheric pressure, the airtight container is provided with a slow leak valve, a long thin pipe corresponding to the specifications, or a porous material. The means 205 for gradually returning the interior of the airtight container to the atmospheric pressure is attached at a position where the means 205 connects the airtight container 202 to the outer air side. The means 205 is further connected to the exhaust device from the outer air side to seal the airtight container. With this structure, the airtight container 202 is also tightly closed from the outer air side when the airtight container 202 is kept at a low pressure. In leaking the interior of the airtight container in order to reuse the image display apparatus, seal connection on the outer air side is canceled to gradually return the internal pressure of the airtight container to the atmospheric pressure.

In this embodiment, the means 205 for gradually returning the interior of the atmospheric pressure to the atmospheric pressure is attached to the side of the airtight container 202. However, the position of the means 205 is not limited to this, and the means 205 may be attached at a position, such as the corner, lower surface, or side surface of the airtight container 202, at which the means 205 does not preclude an operation of the image display section.

As needed, a filter or the like can be arranged and connected to a mechanism for gradually introducing gas.

When a used image display apparatus is to be reused, inert gas, nitrogen, air, air free from moisture, or the like is gradually introduced in accordance with subsequent processing.

When a defect generated during the manufacture is to be repaired, an introduction gas is properly selected not to influence the subsequent manufacturing step, the airtight container 202 kept at a low pressure is gradually returned to the atmospheric pressure, and the image display is dismantled and repaired.

EXAMPLE 6

The present invention will be described in detail by way of Example 6.

EXAMPLE 6-1

Example 6-1 will be explained with reference to FIGS. 30 and 31. FIG. 30 is a plan view showing the structure of an image display apparatus according to the present invention. FIG. 31 shows an example of an FPD as the image display apparatus of the present invention.

Spacers 214 serving as atmospheric pressure-resistant structures were arranged in an airtight container 202 serving as an image display made up of a face plate 2, rear plate 1, and frame 3. The airtight container 202 is connected to an exhaust connection means 204 connected to an exhaust device. After the interior is kept at a low pressure, the airtight container is sealed. In Example 6-1, the airtight container was sealed after being evacuated to about $5 \times 10^{-2}$ Pa. The airtight container 202 is connected to an air pressure returning means 205 for gradually returning the interior of the airtight container to the atmospheric pressure. Example 6-1 employed a slow leak valve having a conductance C of about $10^{-7}$ m$^2$/s. This slow leak valve is sealed after the air side is also evacuated to about $5 \times 10^2$ Pa. To dismantle the image display apparatus, the outer air side of the means 205 for gradually returning the interior of the airtight container to the atmospheric pressure was opened to leak the airtight container 202. The interior of the panel was confirmed after dismantling and disassembly to find that no spacers 4 were damaged and particularly no internal members of the airtight container 202 were scratched.

For comparison, an exhaust connection means 204 connected to the exhaust device of an identical image display apparatus was opened to leak the gas from an airtight container 202. The interior of the panel was quickly opened to the atmospheric pressure. However, internal spacers 4 were damaged, and fragments generated many scratches on a face plate 2, rear plate 1, and frame 3.

EXAMPLE 6-2

Figure 32:
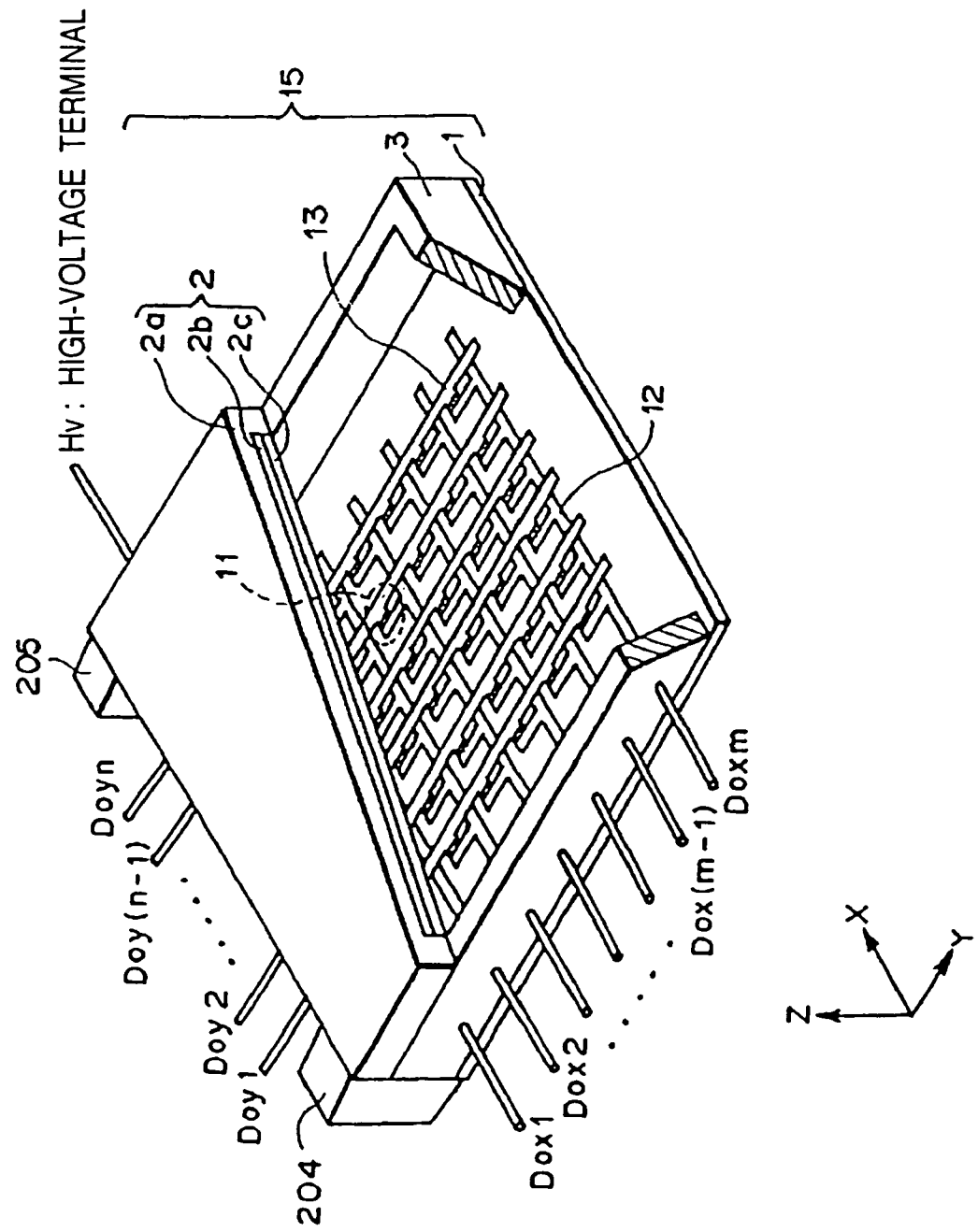
FIG. 32 is a perspective view showing an SED as another example of the image display apparatus according to the present invention.

Example 6-2 will exemplify a surface-conduction type electron source display (SED) of matrix driving scheme as shown in FIG. 32 as an image display apparatus. Wiring lines 12 and 13 for driving electron sources 11 of surface-conduction type electron sources were formed on a rear plate 1. The wiring lines 12 and wiring lines 13 are X-direction (Dox1, Dox2, . . . , Doxm) and Y-direction (Doy1, Doy2, . . . , Doyn) element wiring lines, respectively. This SED has a structure including spacers 4 as shown in FIG. 31. Similar to Example 6-1, Example 6-2 also adopted an air pressure returning means 205 for gradually returning the interior of the airtight container to the atmospheric pressure.

After the panel was substantially completed, it was driven to find that part of the panel was defective. Thus, the outer air side of the air pressure returning means 205 for gradually returning the interior of the airtight container to the atmospheric pressure was opened to leak the panel, and the defect was repaired. After that, the interior of the panel was evacuated and sealed again by the exhaust connection means 204 connected to the exhaust device. At the same time, the outer air side of the air pressure returning means 205 for gradually returning the interior of the airtight container to the atmospheric pressure was evacuated and sealed to complete the image display apparatus. When the image display apparatus was driven to display an image, it was found that the defect had been repaired and no defect was generated.

Embodiment 7

Embodiment 7 of the present invention will be described with reference to the accompanying drawings.

Figure 33A:
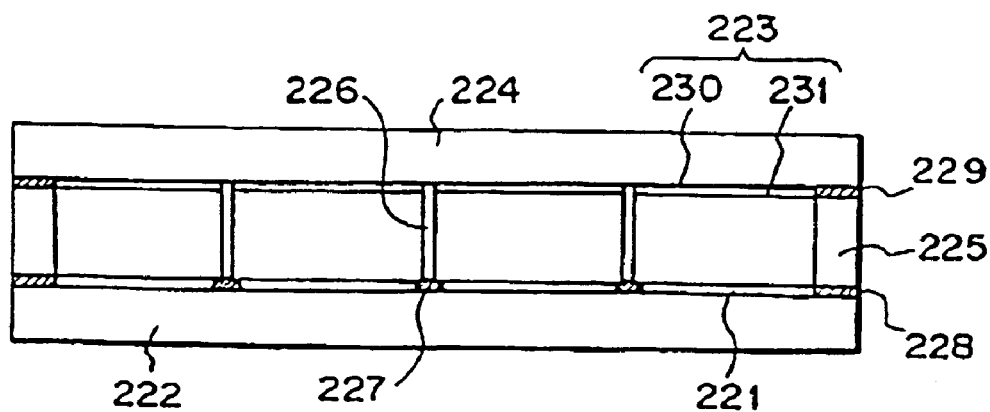
FIGS. 33A and 33B are a sectional view and plan view, respectively, showing an embodiment of a flat display according to the present invention.
Figure 33B:
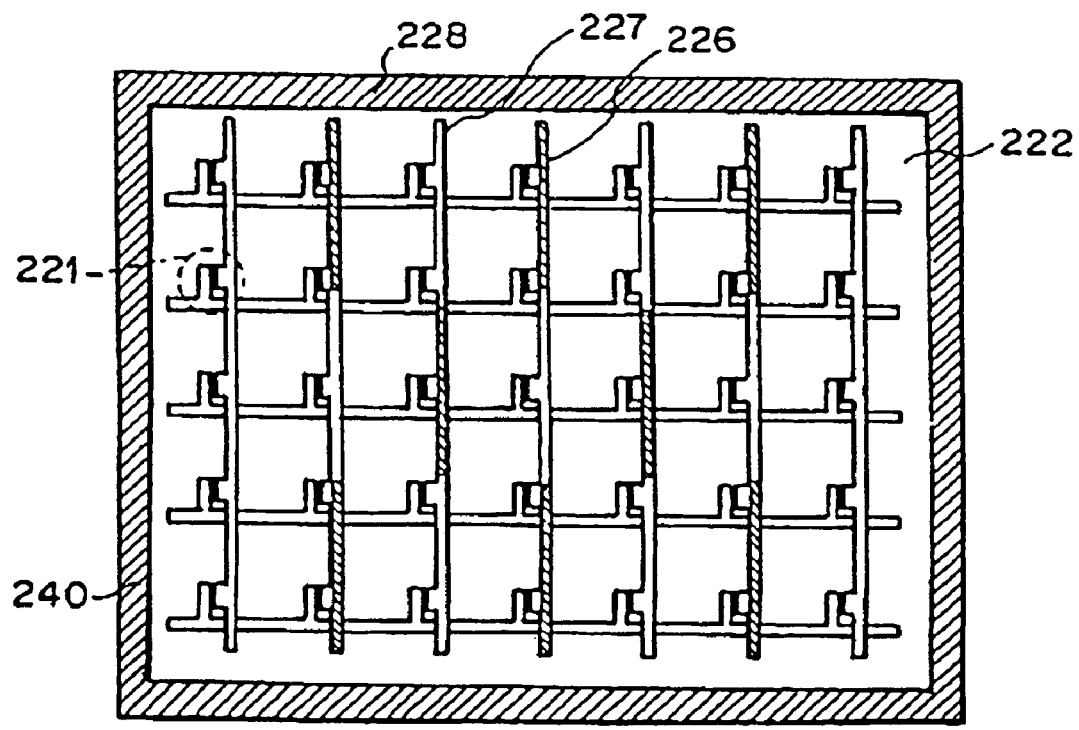

FIG. 33A is a sectional view schematically showing an embodiment of a flat display according to the present invention, and FIG. 33B is a partially cutaway plan view of the flat display shown in FIG. 33A.

The flat display of the present invention comprises at least a rear plate 222 having many electron-emitting elements 221 arrayed on a glass substrate, a face plate 224 which is arranged to face the rear plate 222 and has image display portions 223, a support frame 225, and spacers 226 for holding the interval between the rear plate 222 and the face plate 224 against the atmospheric pressure. The rear plate 222, face plate 224, support frame 225, and spacers 226 are airtightly joined with frit glass 229 to constitute the flat display. The frit glass 229 is generally low-melting glass mainly containing lead oxide and the like.

In joining the respective members, the spacers and substrate are joined with first frit glass 227, the rear plate and support frame are joined with second frit glass 228, and the face plate and support frame are joined with the third frit glass 229. Of the three types of frit glasses, the frit glasses 228 and 229 have different softening temperatures. The first frit glass 227 which joins the spacers 226 has a softening temperature equal to or higher than a higher softening temperature of either one of the second and third frit glasses 228 and 229. Any of the temperatures falls within the range of 350 to 470° C., and is preferably different by 20° C. or more from the temperatures of the remaining frit glasses.

Of the plurality of frit glasses, either one of the second and third frit glasses 228 and 229 has a higher softening temperature, which is determined in terms of the process. The spacers 226 are joined to either one of the rear plate 222 and face plate 224, and the joined plate can be arbitrarily determined.

In the manufacture process, the respective members are joined by coating joint portions with frit glass and heating the frit glass to its softening temperature or more. In actual operation, heating processing is done in air at about 300° C. to remove components called binders in the frit glass (this step is called calcination). Thereafter, heating processing is done in inert gas as Ar at 400° C. or more to weld joint portions. The procedures of joining the members are not particularly limited. The plurality of frit glasses may be simultaneously applied and heated to a temperature higher than the softening temperatures of all the frit glasses, thereby joining the members at once. A method of sequentially joining portions using frit having a higher softening temperature can be adopted. This method is preferable because the respective members can be sequentially joined at a temperature at which frit glass at previously joined portions does not melt.

The softening temperature in the present invention corresponds to a frit glass viscosity of $10^{7.65}$ dPa·s (Poise). The respective members can be joined by heating frit glass to a temperature (baking temperature) higher than the softening temperature.

The spacer generally has a thin plate-like shape with a length and width of about several ten mm and a thickness of 300 μm or less, and is constituted by forming an antistatic conductive film on the surface of an insulating substrate. A number of spacers necessary for the purpose are arranged at a necessary interval.

Examples of the insulating material of the spacer are silica glass, glass containing a small amount of impurity such as Na, soda-lime glass, and a substrate prepared by stacking an insulating layer of, e.g., $SiO_2$ on each of various substrates described above.

Examples of the material of the conductive film are oxides of metals such as chromium, nickel, and copper, a nitride of aluminum and a transition metal alloy, and carbon.

The structure of the face plate 224 will be explained. In FIGS. 33A and 33B, the face plate 224 is constituted by forming a fluorescent film 230 and metal back 231 on a glass substrate. This portion serves as an image display region. For a monochrome image display apparatus, the fluorescent film 230 is made of only fluorescent substances. To display a color image, image forming portions (to be also referred to as pixels hereinafter) are formed from fluorescent substances of three primary colors, i.e., red, green, and blue, and the fluorescent substances are isolated with black conductive members. The black conductive members are called black stripes or black matrix depending on the shape. The metal back 231 is formed from a conductive thin film of Al or the like. The metal back 231 increases the luminance by reflecting to the glass substrate, of light generated by fluorescent substances, light traveling toward the electron source made up of the electron-emitting elements 221. At the same time, the metal back 231 prevents fluorescent substances from being damaged by bombardment of ions generated by ionizing gas left in the panel by an electron beam.

The metal back 231 renders the image display region of the face plate 224 conductive to prevent accumulation of charges, and serves as an anode electrode with respect to the electron source. Note that the metal back 231 is electrically connected to a high-voltage terminal Hv, and can apply an external voltage via the high-voltage terminal Hv.

A flat display disassembly method according to the present invention will be explained.

FIGS. 34A to 34D are schematic views showing an embodiment of the disassembly method according to the present invention. In FIGS. 34A to 34D, reference numeral 222 denotes a rear plate; 224, a face plate; 225, a support frame; 226, spacers; 227, first frit glass; 228, second frit glass; and 229, third frit glass. In FIG. 34, the first, second, and third frit glasses used at respective joint portions are three types of frit glasses having different softening temperatures (FIG. 34A). For example, assume that the order of higher softening temperatures is the first frit glass 227>the second frit glass 228>the third frit glass 229.

The disassembly procedures are as follows. A panel is loaded to a proper heating furnace. The panel is heated to a temperature that is equal to or higher than the softening temperature of the third frit glass 229 and is equal to or lower than the softening temperatures of the remaining frit glasses, thereby melting only the third frit glass 229. While the temperature is maintained, the face plate 224 is separated from the support frame 225 (FIG. 34B). The heating temperature is increased to a temperature that is equal to or higher than the softening temperature of the second frit glass 228 and is equal to or lower than the softening temperature of the first frit glass 227. When the second frit glass 228 melts, the support frame 225 and rear plate 222 are separated (FIG. 34C). The heating temperature is further increased to melt the first frit glass 227, thereby separating the spacers 226 and rear plate 222.

The method of separating joint portions using the first frit glass 227 is not limited to the heating method. For example, as shown in FIG. 35, after the panel is separated to a state shown in FIG. 34C, the panel can be dipped in a frit dissolving solution 239 to dissolve the frit glass to separate the spacers 226 and rear plate 222. A preferable solution is a nitric acid solution.

After separation, residual frit glass is removed with nitric acid or the like, and the cleaning step is executed to recover the respective members. The recovered members are transferred to the reuse step or more precise recovery step.

FIG. 36 is a schematic view showing another embodiment of the disassembly method according to the present invention. Also in FIG. 36, three types of frit glasses having different softening temperatures are used at respective joint portions (FIG. 36A). For example, assume that the order of higher softening temperatures is the first frit glass 227>the third frit glass 229>the second frit glass 228.

Figure 36A:
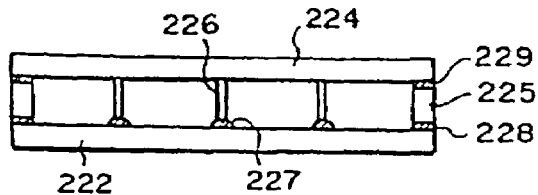
FIGS. 36A, 36B, 36C, 36D, and 36E are views showing still another embodiment of the flat display disassembly method according to the present invention.
Figure 36B:
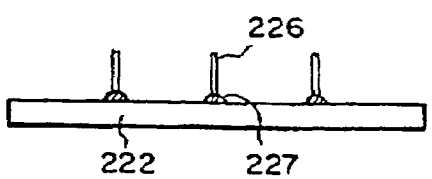
Figure 36C:
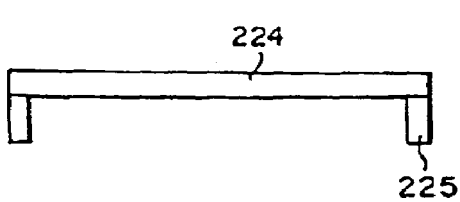

The disassembly procedures are as follows. A panel is loaded to a proper heating furnace. The panel is heated to a temperature that is equal to or higher than the softening temperature of the second frit glass 228 and is equal to or lower than the softening temperatures of the remaining frit glasses, thereby melting only the second frit glass 228. While the panel is heated, the panel is divided into the face plate 224, support frame 225, rear plate 222, and spacers 226 (FIG. 36B). For the former case, the heating temperature is increased to a temperature equal to or higher than the softening temperature of the second frit glass 228. Since the second frit glass 228 is melted, the support frame 225 and rear plate 222 are separated (FIG. 36C). Note that the rear plate 222 and spacers 226 can be separated by the same method as in the first embodiment.

EXAMPLE 7

The present invention will be described in detail by way of Example 7. In Example 7, frit glasses were properly selected from frit glasses listed in Table 1:

TABLE 1

| Type of Frit Glass | Main Component | Softening Temperature |
|---|---|---|
| I | PbO•$B_2O_3$ | 365° C. |
| II | PbO•$B_2O_3$ | 390° C. |
| III | PbO•$B_2O_3$ | 410° C. |

EXAMPLE 7-1

FIG. 33A is a sectional view schematically showing an arrangement of a flat display according to the present invention, and FIG. 33B is a partially cutaway plan view of the flat display shown in FIG. 33A. The flat display of the present invention comprises at least a rear plate 222 having many electron-emitting elements 221 arrayed on a glass substrate, a face plate 224 which is arranged to face the rear plate 222 and has image display portions 223, a support frame 225, and spacers 226 for holding the interval between the rear plate 222 and the face plate 224 against the atmospheric pressure. The rear plate 222, face plate 224, support frame 225, and spacers 226 are airtightly joined with frit glass 229 to constitute the flat display.

In Example 7-1, a display in which 25 spacers 226 were welded to a rear plate 222 formed from soda-lime glass 300 mm×250 mm×2.8 mm in size was manufactured. Each spacer was prepared by forming an aluminum nitride film as a conductive film having a thickness of about 100 nm on a soda-lime glass substrate having a height of 2.8 mm, a thickness of 200 μm, and a length of 40 mm.

III (softening temperature: 410° C.) in Table 1 was used as frit glass 227 between the spacer 226 and the rear plate 222. II (softening temperature: 390° C.) in Table 1 was used as frit glass 228 between the rear plate 222 and the support frame 225. Frit glass 229 of I (softening temperature: 365° C.) in Table 1 was used as frit glass 229 between the face plate 224 and the support frame 225.

Figure 37A:
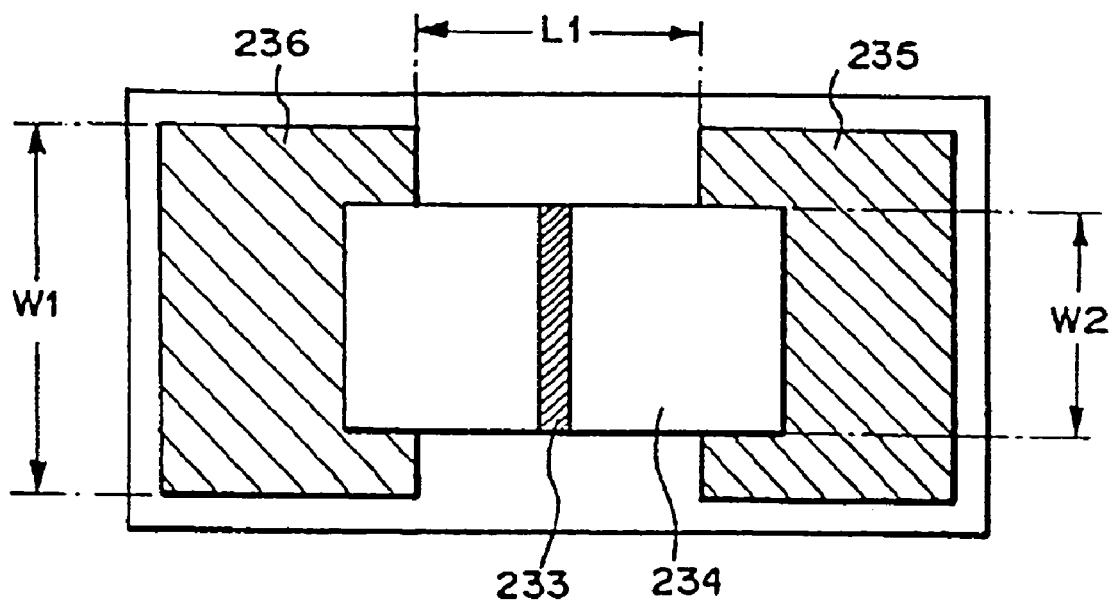
FIG. 37A is a view showing an example of an electron-emitting element according to the present invention.
Figure 37B:
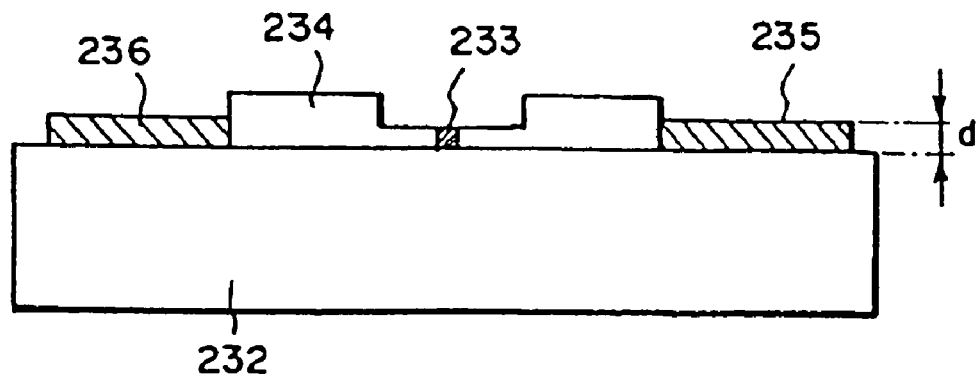
FIG. 37B is a sectional view showing the electron emitting element in FIG. 37A.

As the electron-emitting element 221, a surface-conduction type electron-emitting element shown in FIGS. 37A and 37B was formed.

A flat display manufacturing method according to Example 7-1 will be described with reference to FIGS. 33A, 33B, 37A, 37B, 38A, and 38B.

(1) Soda-lime glass was used as a rear plate, and element electrodes 235 and 236 were formed using Pt on the substrate. At this time, an element electrode interval L1 was set to 10 μm; an element electrode width W1, 500 μm; and an element electrode thickness d, 100 nm. After an organic palladium-containing solution was applied to a desired position including the element electrodes, heating processing was done at 300° C. for 10 min to form a fine particle film 234 from fine palladium oxide (PdO) particles (average diameter: 7 nm).

A plurality of electron-emitting elements 221 were formed on the substrate to obtain a rear plate 222. A face plate was prepared by applying fluorescent substances as image display members 223 on a glass substrate.

Figure 38A:
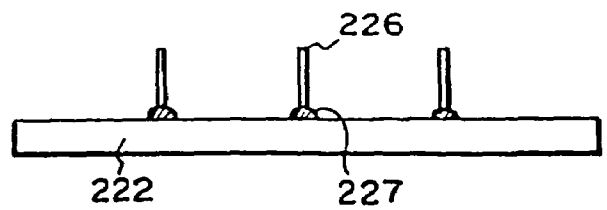
FIGS. 38A, 38B, and 38C are views showing an embodiment of a flat display manufacturing method according to the present invention.

(2) A seal method in Example 7-1 will be explained. Spacers 226 were welded to the rear plate 222 with frit glass III (softening temperature: 410° C.) (FIG. 38A).

Figure 38B:
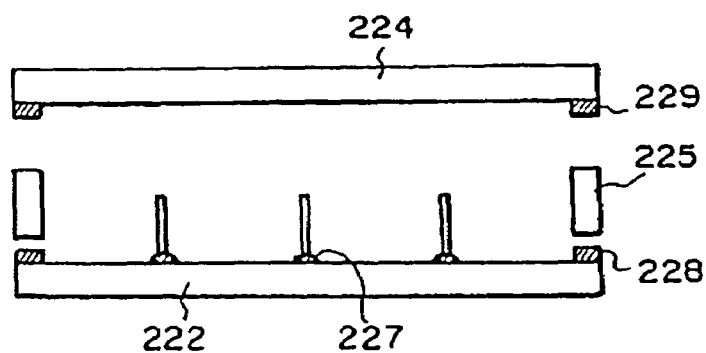

(3) Frit glass II (softening temperature: 390° C.) was applied to an outer edge (frit-coated portion 240 in FIG. 33B) on the rear plate 222. Further, frit glass I (softening temperature: 365° C.) was applied to a similar portion on the face plate 224. Then, the face plate 224, support frame 225, and rear plate 222 were overlapped while being precisely aligned (FIG. 38B). The face plate 224, support frame 225, and rear plate 222 were fixed with a jig so as not to move the face plate 224 and rear plate 222, and baked in a furnace at 400° C. for 10 min or more.

Figure 38C:
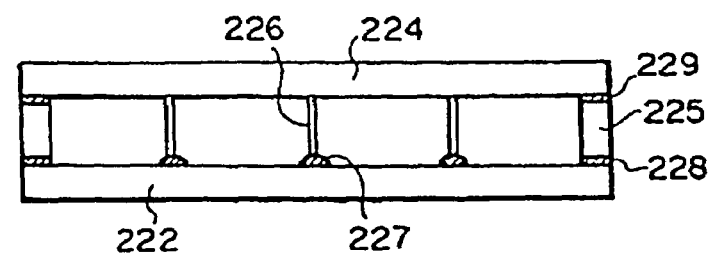

In this manner, the face plate, rear plate, and support frame were joined (FIG. 38C).

(4) To evacuate the interior of the container manufactured in the above step, the container was evacuated via an exhaust pipe (not shown) attached to the support frame 225 or the like after seal processing. After that, the exhaust pipe was sealed.

EXAMPLE 7-2

In Example 7-2, a display having the same structure as in Example 7-1 was manufactured. In Example 7-2, spacers were joined to a rear plate with frit glass III (softening temperature: 410° C.). A rear plate 222 and support frame 225 were joined with frit glass I (softening temperature: 365° C.), and a face plate 224 and the support frame 225 were joined with frit glass II (softening temperature: 390° C.).

The manufacture of the flat display in Example 7-2 adopted the same method as in Example 7-1.

EXAMPLE 7-3

In Example 7-3, a display having the same structure as in Example 7-1 was manufactured. In Example 7-3, spacers 226 were joined to a rear plate 222 with frit glass IV (softening temperature: 450° C.). The rear plate 222 and a support frame 225 were joined with frit glass III (softening temperature: 410° C.), and a face plate 224 and the support frame 225 were joined with frit glass II (softening temperature: 390° C.).

The manufacture of the rear plate 222 and face plate 224 of the flat display in Example 7-3 adopted the same method as (1) in Example 7-1.

(2) A seal method in Example 7-3 will be explained. The spacers 226 were welded to the rear plate 222 with frit glass IV (softening temperature: 450° C.) (FIG. 38A).

(3) Frit glass III (softening temperature: 410° C.) was applied to an outer edge (frit-coated portion 240 in FIG. 33B) on the rear plate 222. Further, frit glass II (softening temperature: 390° C.) was applied to a similar portion on the face plate 224. Then, the face plate 224 and support rear plate 222 were overlapped while being precisely aligned (FIG. 38B). The face plate 224 and rear plate 222 were fixed with a jig so as not to move them, and baked in a furnace at 420° C. for 10 min or more.

As a result, the face plate 224, rear plate 222, and support frame 225 were joined (FIG. 38C).

(4) To evacuate the interior of the container manufactured in the above step, the container was evacuated via an exhaust pipe (not shown) attached to the support frame 225 or the like after seal processing. Thereafter, the exhaust pipe was sealed.

EXAMPLE 7-4

In Example 7-4, a display having the same structure as in Example 7-1 was manufactured. In Example 7-4, spacers 226 were joined to a face plate 224 with frit glass III (softening temperature: 410° C.). A rear plate 222 and support frame 225 were joined with frit glass II (softening temperature: 390° C.), and the face plate 224 and support frame 225 were joined with frit glass I (softening temperature: 365° C.).

The manufacture of the rear plate 222 and face plate 224 of the flat display in Example 7-4 employed the same method as (1) in Example 7-1.

Figure 39A:
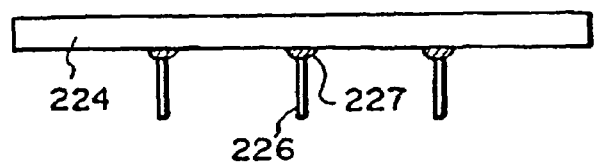
FIGS. 39A, 39B, and 39C are views showing another embodiment of a flat display manufacturing method according to the present invention.

(2) A seal method in Example 7-4 will be explained with reference to FIG. 39. The spacers 226 were welded to the face plate 224 with frit glass III (softening temperature: 410° C.) (FIG. 39A).

Figure 39B:
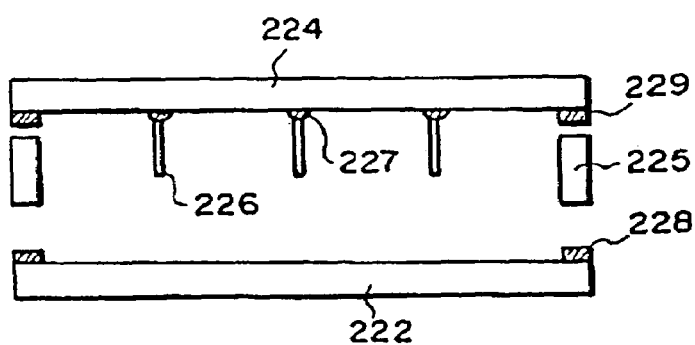

(3) Frit glass II (softening temperature: 390° C.) was applied to an outer edge on the rear plate 222. Further, frit glass I (softening temperature: 365° C.) was applied to a similar portion on the face plate. The face plate 224, support frame 225, and rear plate 222 were overlapped while being precisely aligned (FIG. 39B). The face plate 224, support frame 225, and rear plate 222 were fixed with a jig so as not to move the face plate 224 and rear plate 222, and baked in a furnace at 420° C. for 10 min or more.

Figure 39C:
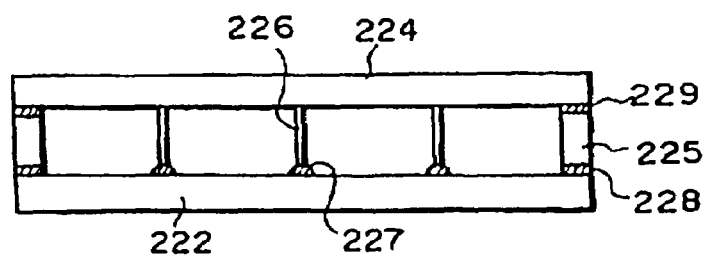

In this fashion, the face plate 224, rear plate 222, and support frame 225 were joined (FIG. 39C).

(4) To evacuate the interior of the container manufactured in the above step, the container was evacuated via an exhaust pipe (not shown) attached to the support frame 225 or the like after seal processing. Then, the exhaust pipe was sealed.

EXAMPLE 7-5

In Example 7-5, a display having the same structure as in Example 7-1 was manufactured. In Example 7-5, spacers 226 were joined to a rear plate 222 with frit glass II (softening temperature: 390° C.). The rear plate 222 and a support frame 225 were also joined with frit glass II (softening temperature: 390° C.), and a face plate 224 and the support frame 225 were joined with frit glass I (softening temperature: 365° C.).

The manufacture of the rear plate 222 and face plate 224 of the flat display in Example 7-5 used the same method as (1) in Example 7-1.

Figure 40A:
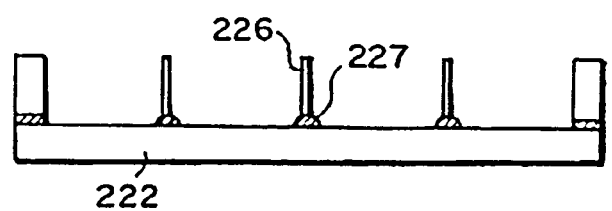
FIGS. 40A, 40B, and 40C are views showing still another embodiment of the flat display manufacturing method according to the present invention.
Figure 40B:
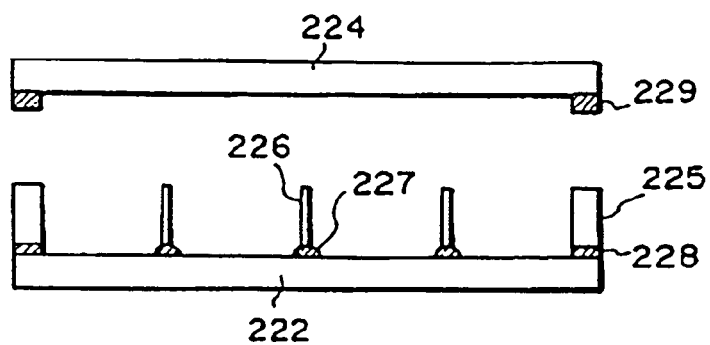

(2) A seal method in Example 7-5 will be explained with reference to FIGS. 40A to 40C. The spacers 226 and support frame 225 were welded to the rear plate 222 with frit glass II (softening temperature: 390° C.) (FIG. 40A).

(3) Frit glass I (softening temperature: 365° C.) was applied to an outer edge on the face plate 224. The face plate 224 and support frame 225 were overlapped while being precisely aligned (FIG. 40B). The face plate 224 and support frame were fixed with a jig so as not to move them, and baked in a furnace at 420° C. for 10 min or more.

Figure 40C:
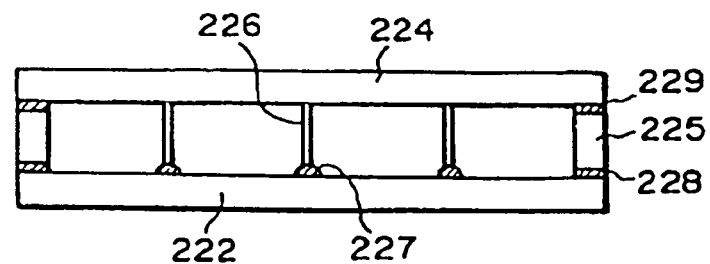

In this manner, the face plate 224 and support frame 225 were joined (FIG. 40C).

(4) To evacuate the interior of the container manufactured in the above step, the container was evacuated via an exhaust pipe (not shown) attached to the support frame 225 or the like after seal processing. Then, the exhaust pipe was sealed.

EXAMPLE 7-6

Example 7-6 relates to a method of disassembling the flat display described in Example 7-1. The disassembly method will be explained with reference to FIGS. 34A to 34D.

(1) The sealed portion of the exhaust pipe was unsealed to introduce air, thereby canceling the vacuum in the container (not shown).

(2) The display was loaded to a heating furnace, a rear plate 222 and face plate 224 were held with a proper jig, and then the display was heated to 380° C. When the heating temperature exceeded 365° C., frit glass I which joined the face plate 224 and a support frame 225 gradually melted. The jig holding the face plate 224 was pulled up to separate the face plate 224 and support frame 225 from each other (FIGS. 34A and 34B).

(3) After the support frame 225 was held with a proper jig, the heating temperature was increased to 400° C. When the heating temperature exceeded 390° C., frit glass II which joined the rear plate 222 and support frame 225 gradually melted. The jig holding the support frame 225 was pulled up to separate the support frame 225 and rear plate 222 (FIG. 34C).

(4) After spacers 226 were held with a proper jig, the heating temperature was increased to 450° C. When the heating temperature exceeded 410° C., frit glass III which joined the rear plate 222 and spacers 226 gradually melted. The jig holding the spacers 226 was pulled up to separate the rear plate 222 and spacers 226 from each other (FIG. 34D).

Each of the recovered members was cleaned with a 0.2-N nitric acid solution to remove residual frit glass, and then the member was cleaned and dried. The spacers and support frame were screened through the inspection step, and non-defectives were sent to the reuse step. The rear plate and face plate were sent to the recovery step for resources formed on these substrates, the reuse step for the substrates themselves, and the like. In the flat display disassembled in accordance with Example 7-6, the face plate 224, rear plate 222, support frame, and spacers 226 were hardly damaged during the process.

EXAMPLE 7-7

Example 7-7 relates to a method of disassembling the flat display described in Example 7-2. The disassembly method will be explained with reference to FIGS. 36A to 36E.

(1) The sealed portion of the exhaust pipe was unsealed to introduce air, thereby canceling the vacuum in the container (not shown).

(2) The display was loaded to a heating furnace, a rear plate 222 and face plate 224 were held with a proper jig, and then the display was heated to 380° C. When the heating temperature exceeded 365° C., frit glass I which joined the rear plate 222 and a support frame 225 gradually melted. The jig holding the face plate 224 was pulled up to separate the two parts, i.e., the face plate 224 and support frame 225 and the rear plate 222 and spacers 226 (FIGS. 36A, 36B, and 36C).

Figure 36D:
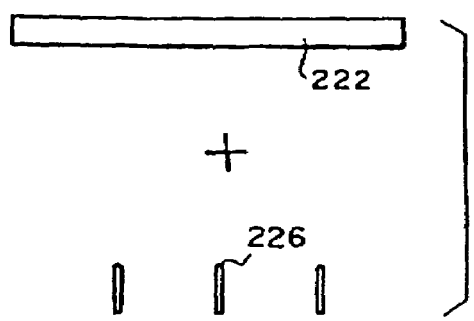
Figure 36E:
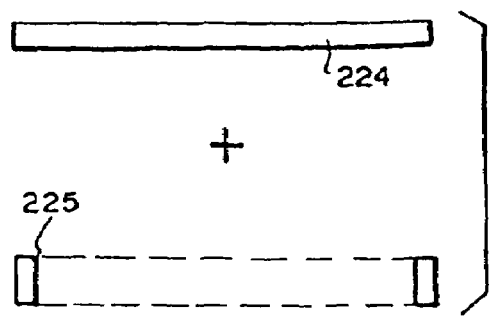

(3) Of the two separated parts, the face plate 224 and support frame 225 were heated to 410° C. in the furnace to gradually melt frit glass II, and the jig holding the support frame 225 was pulled up to separate the face plate 224 and support frame 225, similar to the method as in Example 7-6 (FIG. 36E).

(4) On the other hand, the rear plate 222 and spacers 226 were separated by the same method as (4) in Example 7-6 (FIG. 36D). Each of the recovered members was cleaned with a 0.2-N nitric acid solution to remove residual frit glass, and then the member was cleaned and dried. The spacers 226 and support frame were screened through the inspection step, and non-defectives were sent to the reuse step. The rear plate 222 and face plate 224 were sent to the recovery step for resources formed on these substrates, the reuse step for the substrates themselves, and the like. In the flat display disassembled in accordance with Example 7-7, the face plate, rear plate, support frame, and spacers were hardly damaged during the process.

EXAMPLE 7-8

Example 7-8 is directed to a method of disassembling the flat display described in Example 7-3. The disassembly method will be explained with reference to FIGS. 34A to 34D and 35A to 35C.

A face plate 224 and support frame 225 were separated from a display up to a state in FIG. 34C by steps (1) to (3) in Example 7-6.

Figure 35A:
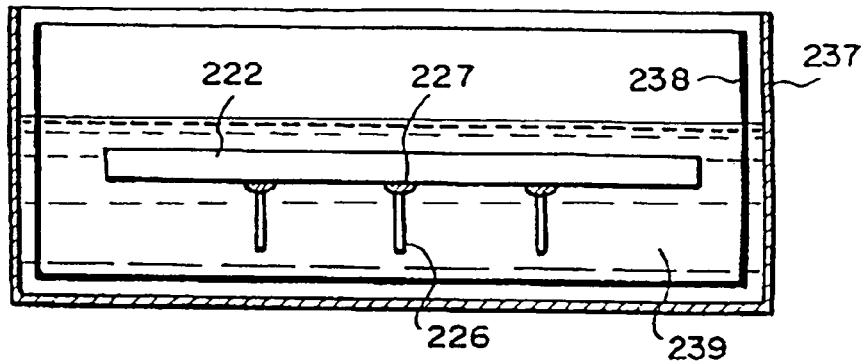
FIGS. 35A, 35B, and 35C are views showing another embodiment of the flat display disassembly method according to the present invention.
Figure 35B:
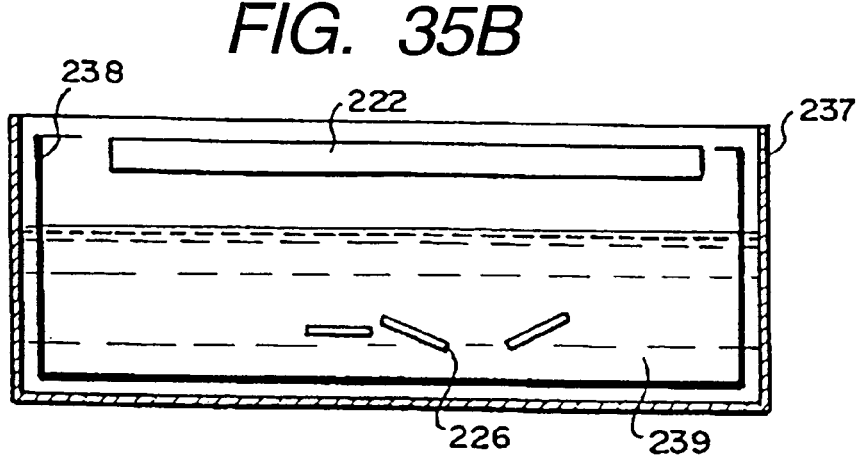
Figure 35C:
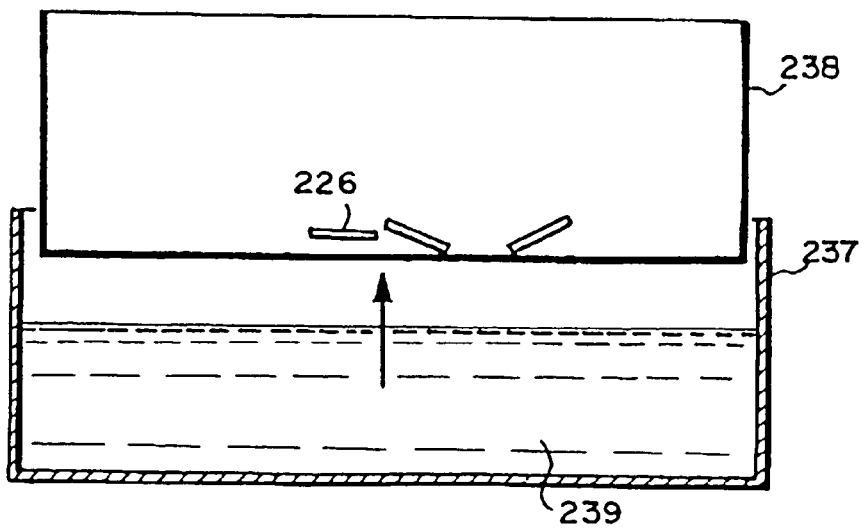

(4) The rear plate was held with a proper jig, and the joint portions between the rear plate 222 and spacers 226 were dipped in a solution bath 237 filled with a 0.2-N nitric acid solution 239 (FIG. 35A). The solution bath 237 incorporated a meshed Teflon container 238. When the joint portions were dipped in the nitric acid solution 239, frit glass IV dissolved, and the spacers 226 were recovered in the container 238. After all the spacers 226 were confirmed to be separated, the rear plate 222 was pulled up (FIG. 35B). The spacers 226 were also pulled up from the nitric acid solution 239 together with the container 238.

Residual frit glass was removed from each of the recovered members, and the member was cleaned and dried. Each member was screened through the inspection step, and sent to the reuse step or more precise recovery step. In the flat display disassembled in accordance with Example 7-8, the face plate, rear plate, support frame, and spacers were hardly damaged during the process.

EXAMPLE 7-9

Example 7-9 concerns a method of disassembling the flat display described in Example 7-4. By the same method as in (1) and (2) described in Example 7-7, the display was heated to 360° C. to separate two parts, i.e., a rear plate 222 and support frame 225, and a face plate 224 and spacers 226.

Of the two separated parts, the rear plate 225 and support came 225 were separated by the same method as (3) in Example 7-7.

The face plate 224 and spacers 226 were separated by the same method as (4) in Example 7-6.

In the flat display disassembled in accordance with Example 7-9, the face plate 224, rear plate 222, support frame 225, and spacers 226 were hardly damaged during the process.

EXAMPLE 7-10

Example 7-10 relates to a method of disassembling the flat display described in Example 7-5. A face plate 224 was separated from a display up to a state in FIG. 34B by the same method as (1) and (2) in Example 7-6.

(3) After a support frame 225 and spacers 226 were simultaneously held with a proper jig, the heating temperature was increased to 410° C. When the heating temperature exceeded 390° C., frit glass II which joined a rear plate 222 and the support frame 225, and the rear plate 222 and the spacer 226 gradually melted. The jig holding the support frame 225 and spacers 226 was pulled up to separate the respective members.

In the flat display disassembled in accordance with Example 7-10, the face plate 224, rear plate 222, support frame 225, and spacers 226 were hardly damaged during the process.

COMPARATIVE EXAMPLE 7-1

A flat display disassembled in Comparative Example 7-1 was manufactured by the same method as in Example 7-1 except that spacers 226 and a rear plate 222, the rear plate 222 and a support frame 225, and a face plate 224 and the support frame 225 were joined with frit glass II (softening temperature: 390° C.).

This flat display was disassembled as follows. After the container was evacuated, the display was loaded to a heating furnace. After the rear plate 222, face plate 224, and support frame 225 were held with a proper jig, the display was heated to 410° C. When the heating temperature exceeded 390° C., frit glass II started melting. Since the joint portions between the rear plate, frame, and face plate simultaneously melted, the holding state became unstable though the rear plate, frame, and face plate were held with the jig. In some cases, these members contacted each other or the jig contacted them to damage the members. In particular, many of the spacers having a thin plate shape were damaged.

Embodiment 8

An embodiment of a residual hazardous metal amount inspection apparatus according to the present invention will be described below with reference to the accompanying drawings.

Figure 41:
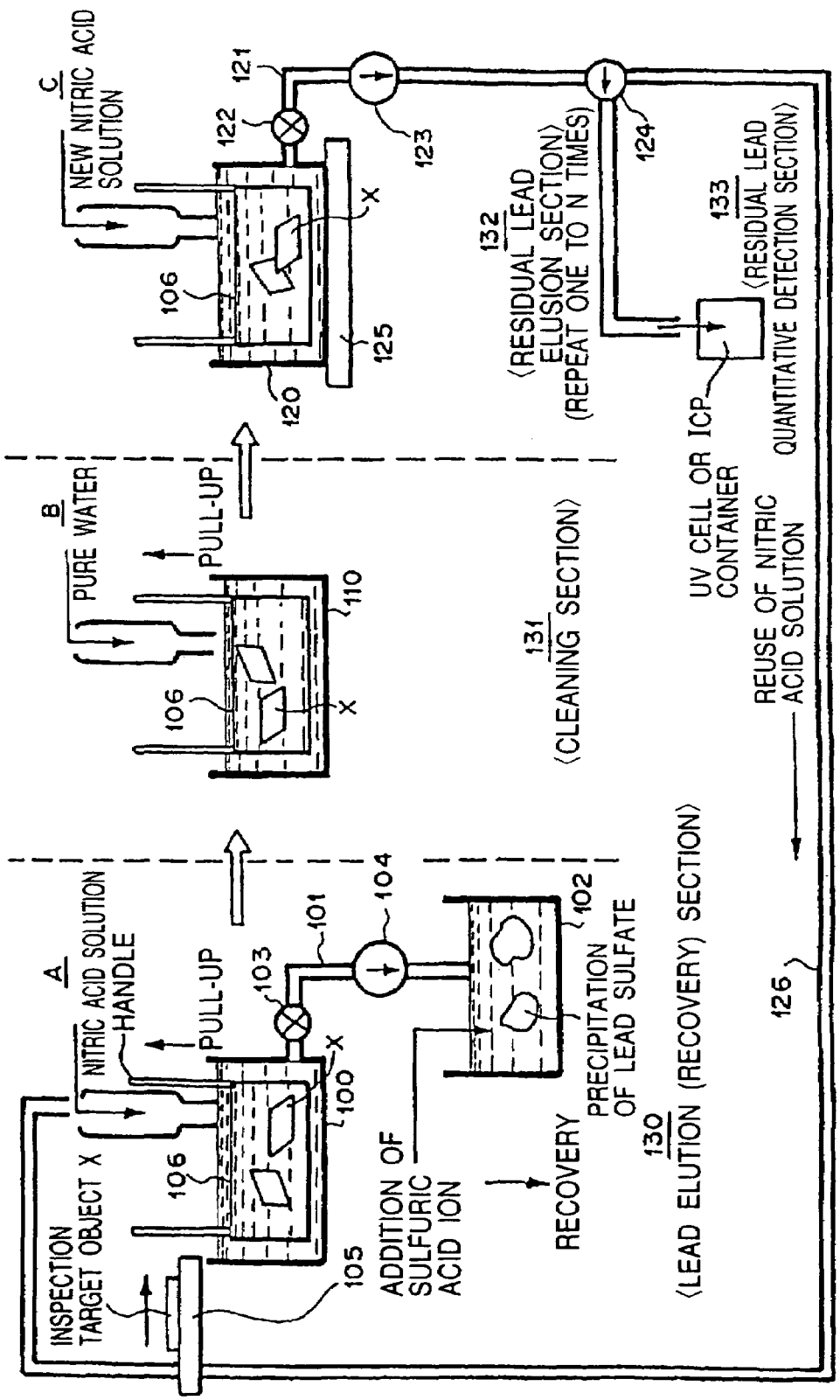
FIG. 41 is a view showing the arrangement of a residual hazardous metal amount inspection apparatus according to an embodiment of the present invention.

FIG. 41 is a view showing a residual hazardous metal amount inspection apparatus according to the embodiment of the present invention.

As shown in FIG. 41, this inspection apparatus inspects a hazardous metal amount of lead or the like contained in an inspection target object X such as a member, waste, or the like disassembled and fractionated for recycling. The inspection apparatus is mainly constituted by a lead elution/recovery section 130 for eluting and recovering lead, a cleaning section 131, a residual lead elusion section 132, and a residual lead quantity detection section 133.

Figure 43A:
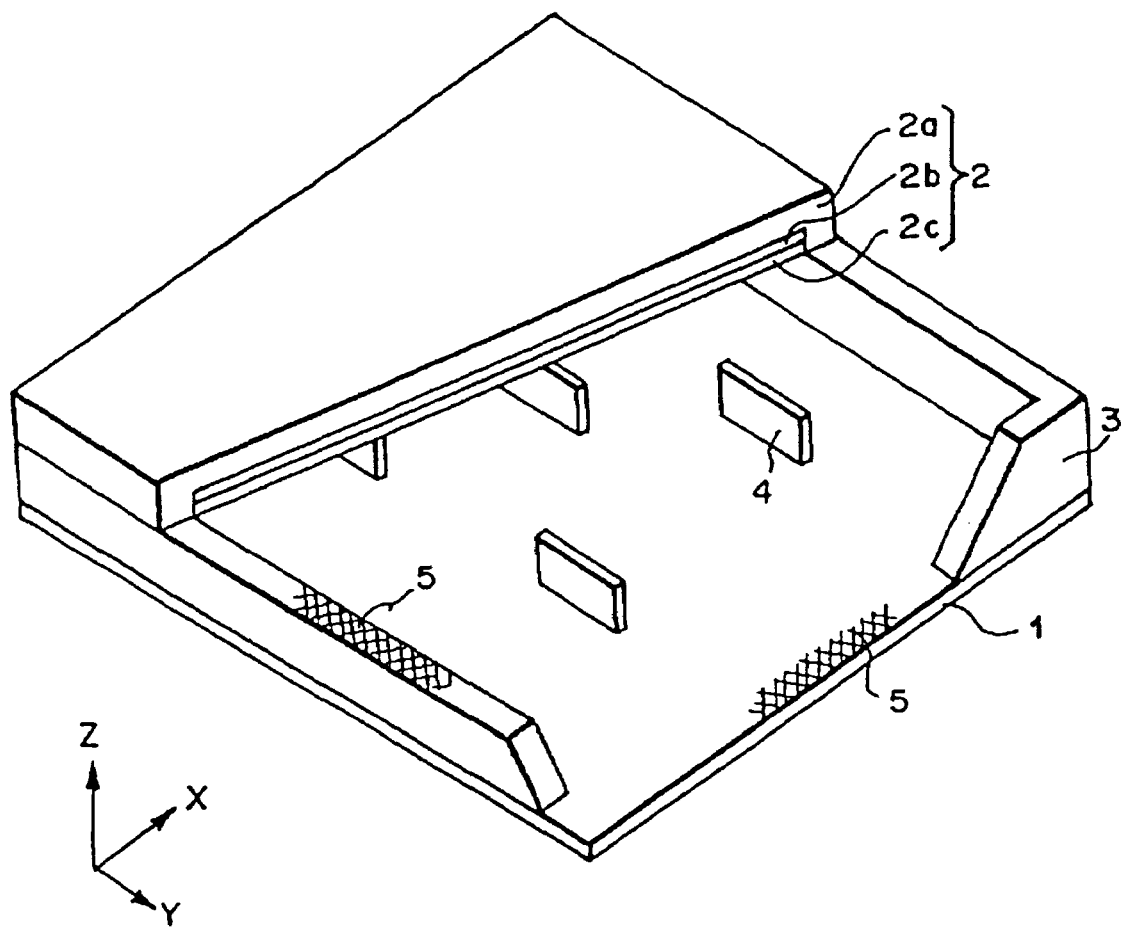
FIG. 43A is a partially cutaway perspective view showing a flat panel display.
Figure 43B:
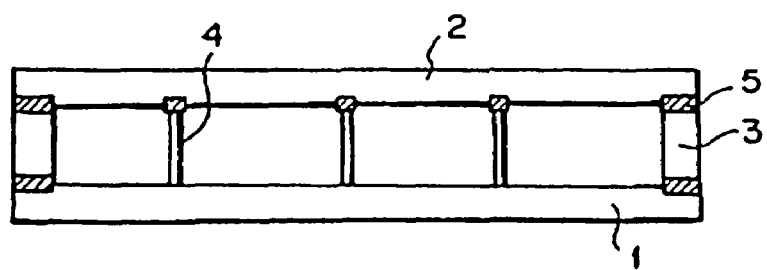
FIG. 43B is a sectional view showing the flat panel display in FIG. 43A.

As the inspection target object X includes members or wastes obtained after a device mainly containing a glass member, such as a flat panel display made up of a rear plate 1, face plate 2, frame 3, and spacers 4 shown in FIGS. 43A and 43B, or a cathode ray tube, is disassembled and fractionated. As will be described later, this inspection apparatus elutes lead with a nitric acid solution. Hence, the apparatus can inspect insolubles to the nitric acid solution, and the inspection target object X is not limited to a glass member.

In FIG. 41, the lead elution/recovery section 130 fills with an acid solution A a dipping bath 100 for dipping the inspection target object X, and elutes a hazardous metal (lead) contained in the inspection target object X. The dipping bath 100 is coupled to a recovery bath 102 via a pipe 101. A lead elution solution is supplied to the recovery bath 102 via an opening/closing valve 103 and solution convey pump 104 arranged midway along the pipe 101.

The convey outlet of a conveyer 105 is set at the upper edge of the dipping bath 100, and the inspection target object X such as a fractionated member is loaded from a disassembly processing section (not shown). A meshed cage 106 is set in the dipping bath 100. The inspection target object X falls from the conveyer 105 into the meshed cage 106, and extracted upon the lapse of a predetermined elution time by pulling up the handle of the meshed cage 106.

The cleaning section 131 fills with pure water B a cleaning bath 110 for dipping the inspection target object X, and cleans the inspection target object X after elution by the lead elution/recovery section 130. That is, the meshed cage 106 pulled up from the dipping bath 100 is set in the cleaning bath 110.

The residual lead elusion section 132 fills with an acid solution C a dipping bath 120 for dipping the inspection target object X, and elutes lead left on the inspection target object X cleaned by the cleaning section 131. The dipping bath 120 is connected to an opening/closing valve 122, solution convey pump 123, and switching valve 124 via a pipe 121. A residual lead elution solution is supplied to the residual lead quantity detection section 133. An ultrasonic vibrator 125 is arranged below the dipping bath 120, and applies ultrasonic vibrations to the acid solution C in the dipping bath 120 to prompt elution.

The other end of the switching valve 124 is connected to a pipe 126 extending to the dipping bath 100. The residue of the acid solution C filled in the dipping bath 120 is supplied to the dipping bath 100 where the residue is reused. The acid solution C and the acid solution A which reuses the acid solution C are, e.g., a nitric acid solution, and the concentration of the nitric acid solution preferably falls within the range of 0.1 N (Normal) to 1 N.

The residual lead quantity detection section 133 adopts an appropriate arrangement for quantity detection (to be described later), and quantitatively detects lead from a received elution solution.

Preferable examples of the material of the baths 100, 102, 110, and 120 are resins such as Teflon, and glass containing no lead, and must resist the acid solutions A and C which are stored and filled in these baths. Similarly, the material of the meshed cage 106 must resist the acid solutions A and C in which the meshed cage 106 is dipped, and preferable examples thereof are resins such as Teflon.

More specifically, in this inspection apparatus, the inspection target object X is dipped in the acid solution A (nitric acid solution) of the dipping bath 100 to elute a lead component contained in the inspection target object X. Then, the inspection target object X is cleaned with the pure water B of the cleaning bath 110, and dipped in the acid solution C (new nitric acid solution) of the dipping bath 120 to elute residual lead. The lead amount is subjected to quantity detection by the residual lead quantity detection section 133 to inspect the residual lead amount.

Figure 42:
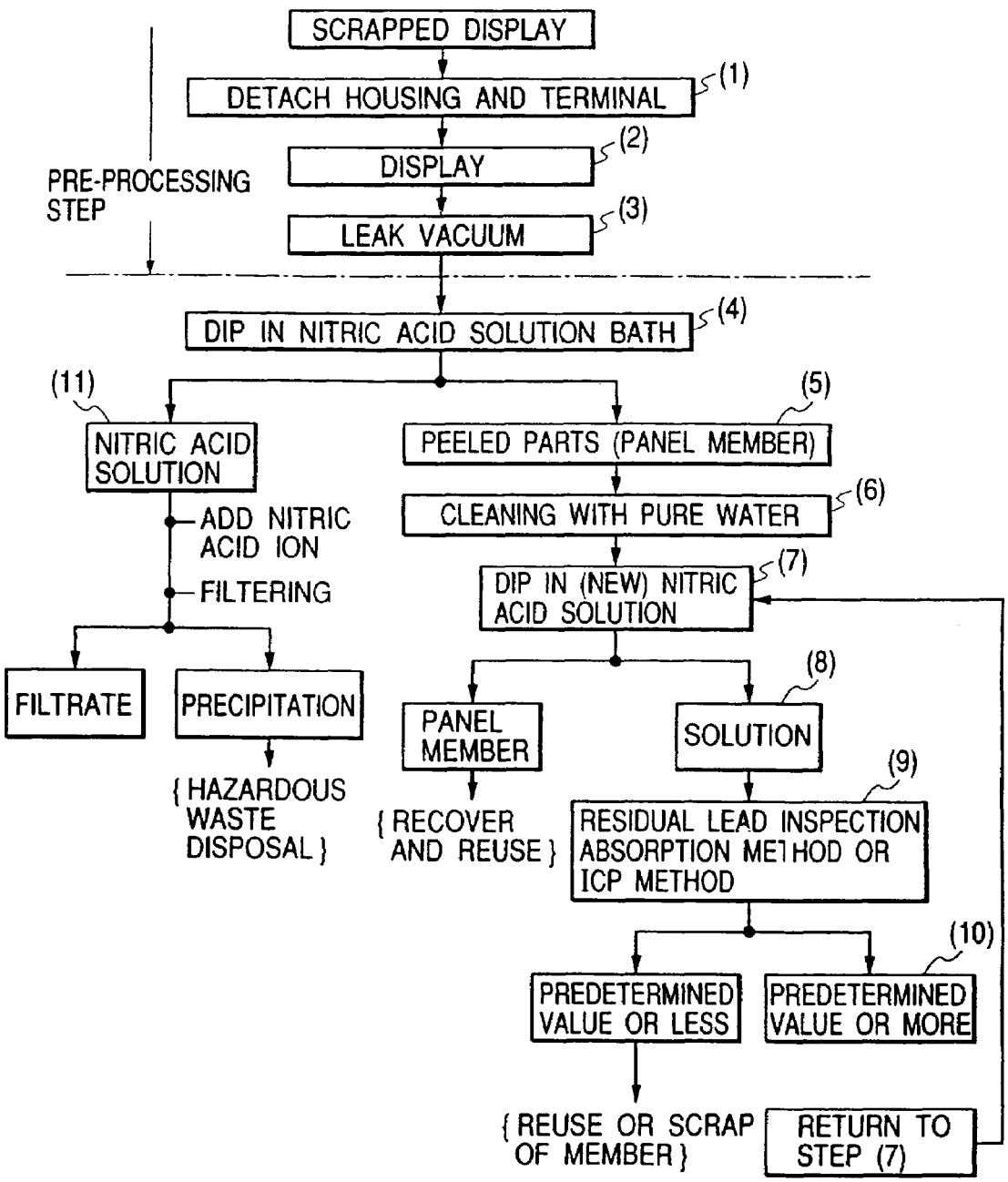
FIG. 42 is a flow chart for sequentially explaining inspection processing by the residual hazardous metal amount inspection apparatus shown in FIG. 41.

FIG. 42 is a flow chart for sequentially explaining inspection processing by the residual hazardous metal amount inspection apparatus shown in FIG. 41. A case wherein the flat panel display shown in FIG. 43 is disassembled will be described.

Pre-processing steps (1) to (3) of disassembly are performed. Connections such as terminals are detached from the housing of the flat panel display apparatus [step (1)], and only the display main body is extracted [step (2)]. The vacuum in the airtight container constituting the display main body is canceled and returned to the atmospheric pressure [step (3)].

The display main body is disassembled with a proper means and fractionated. The fractionated members and remaining wastes serve as inspection target objects X.

Such an inspection target object X is conveyed to the lead elution/recovery section 130 by the conveyer 105, and dipped in the acid solution A (nitric acid solution) of the dipping bath 100 [step (4)].

Upon the lapse of a predetermined time, the meshed cage 106 is pulled up to extract a member peeled from frit glass [step (5)].

The pulled meshed cage 106 is transferred to the cleaning section 131, and sunk in the cleaning bath 110 to clean with pure water the nitric acid solution attached to the inspection target object x [step (6)].

After cleaning, the meshed cage 106 is transferred to the residual lead elusion section 132, sunk in the dipping bath 120, and kept dipped in the acid solution C [step (7)]. At this time, the ultrasonic vibrator 125 is activated to apply vibrations to the dipping bath 120, thereby increasing the elution efficiency.

After that, the opening/closing valve 122 is operated to supply the elution solution in the dipping bath 120 to the residual lead quantity detection section 133 where the supplied elution solution is extracted [step (8)]. The extraction amount suffices to be several ten cc.

The residual lead quantity detection section 133 adds an iodide to the received elution solution to develop a color, and measures the absorbance [step (9)]. The measurement wavelength is preferably around 340 nm in order to attain a high analysis precision. The residual lead quantity detection section 133 obtains a lead ion concentration from the measured absorbance.

The lead ion concentration is obtained such that the relationship (calibration curve) between the lead ion concentration of a standard sample and the absorbance is obtained in advance, and the calibration curve is referred to for an absorbance to obtain a lead ion concentration. At this time, the quantitative value of lead in a nitric acid solution in use is used for a blank value.

Alternatively, the residual lead quantity detection section 133 may perform plasma emission spectroscopic analysis (ICP) for the received elution solution to detect a lead ion concentration. At this time, the measurement wavelength is preferably 220.4 nm in terms of the sensitivity.

The lower limit of the lead amount by the absorbance method is about 1 ppm, whereas the lower limit of the lead amount by the ICP method is about 0.05 ppm.

Note that, by operating the switching valve 124, the residual nitric acid solution of the elution solution extracted for inspection is supplied to the dipping bath 100 where the nitric acid solution is reused. This can preferably reduce wastes.

If the lead ion concentration value obtained in the above manner is equal to or smaller than a predetermined allowance (e.g., several ten ppm), the inspection target object X is regarded to be free from any residual lead. For a lead ion concentration higher than the allowance, the processing returns to step (7) to dip the inspection target object X in a new nitric acid solution again, and steps (8) to (10) are repeated [step (10)]. In this case, the dipping bath 120 may be filled with a new nitric acid solution after all the nitric acid solution in step (8) is discharged, or a plurality of dipping baths 120 may be prepared for use. Since the lead ion concentration is a relative amount which changes depending on an increase/decrease in solution amount, a new nitric acid solution prepared for the dipping bath 120 must keep the solution amount and concentration value constant.

On the other hand, after step (4), the nitric acid solution of the dipping bath 100 is supplied to the recovery bath 102 by operating the opening/closing valve 103 [step (11)]. Sulfuric acid ions are excessively added in the recovery bath 102 to cause lead in the nitric acid solution to react with the sulfuric acid ions, thereby precipitating lead as lead sulfate. The resultant solution is filtered, recovered, and subjected as a lead-containing hazardous substance to appropriate waste disposal.

With the above arrangement, in the residual hazardous metal amount inspection apparatus of Embodiment 8, when the inspection target object X is dipped in the dipping bath 100 of the lead elution/recovery section 130, lead (hazardous metal) contained in the inspection target object X is eluted with the nitric acid solution (acid solution) of the dipping bath 100. The inspection target object X is supplied to the cleaning section 131 where the inspection target object X is cleaned. Then, the inspection target object X is dipped in the dipping bath 120 of the residual lead elusion section 132 to elute lead (hazardous metal) left on the inspection target object X with the nitric acid solution (acid solution C) of the dipping bath 120. The elution solution is supplied to the residual lead quantity detection section 133 which quantitatively detects a lead ion concentration (hazardous metal amount) contained in the elution solution.

Hence, in disassembling and fractionating a flat panel display or the like, the amount of hazardous metal such as lead left on the inspection target object X such as a glass fractionated member or waste can be quantitatively detected. In this case, the inspection target object X is simply dipped in the dipping baths 100 and 120 filled with the acid solutions A and C, and thus the hazardous metal amount can be easily quantitatively detected without any cumbersome operation. As far as the inspection target object X does not dissolve in the acid solutions A and C, a hazardous metal such as lead can be eluted. The material, shape, and the like of the inspection target object X are not particularly limited, and various members can be inspected.

Embodiment 9

An embodiment of a flat display panel disassembly apparatus according to the present invention will be explained below with reference to the accompanying drawings.

Embodiment 9-1

Figure 44A:
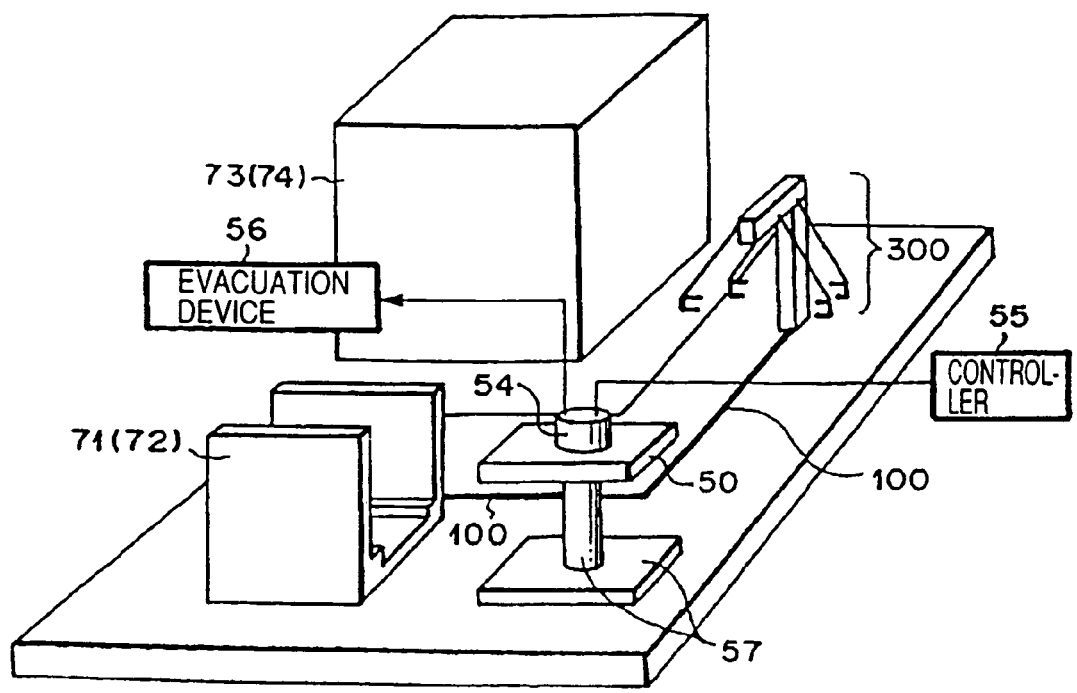
FIG. 44A is a perspective view showing the arrangement of a flat panel display disassembly apparatus according to the first embodiment of the present invention.
Figure 44B:
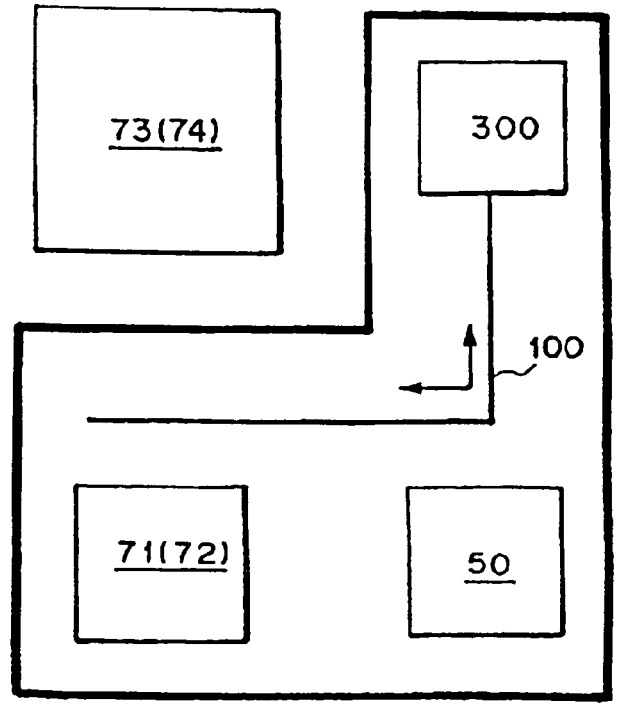
FIG. 44B is a plan view showing the disassembly apparatus in FIG. 44A.
Figure 45:
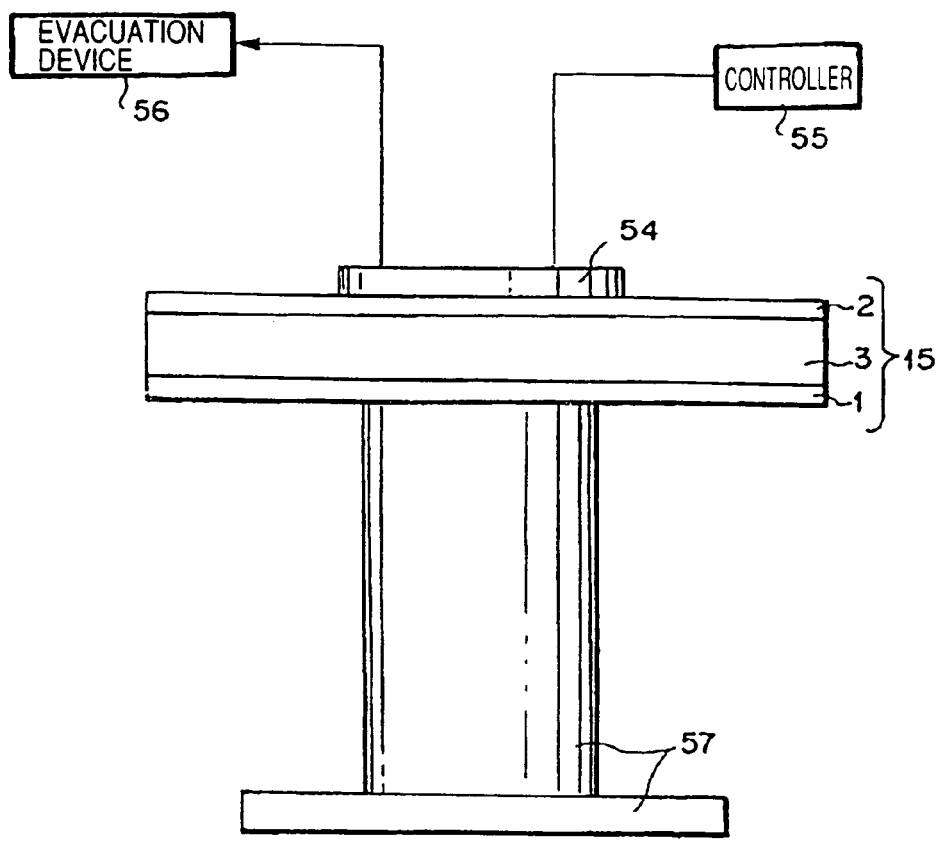
FIG. 45 is a side view showing a table and support means in FIGS. 44A and 44B.
Figure 49:
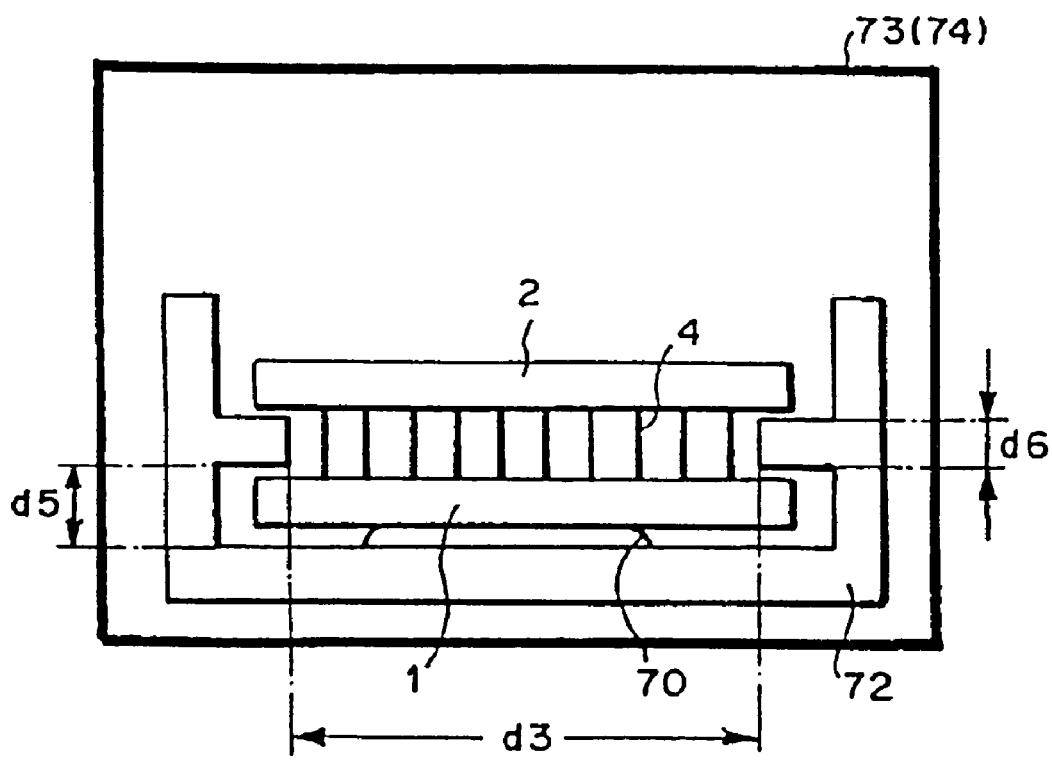
FIG. 49 is a side view showing another example of the spacer recovery jig in FIGS. 44A and 44B.

FIGS. 44A, and 44B to 49 show the first embodiment of the present invention. FIG. 44A is a perspective view showing the arrangement of the flat panel display disassembly apparatus, and FIG. 44B is a plan view thereof. FIG. 45 is a side view showing a table and support means in FIGS. 44A and 44B. FIG. 46A is a plan view showing a convey means in FIGS. 44A and 44B, and FIG. 46B is a side view showing the convey means. FIG. 47A is a plan view showing another example of the convey means in FIGS. 44A and 44B, and FIG. 47B is a side view showing this convey means. FIG. 48 is a side view showing a spacer recovery jig in FIGS. 44A and 44B. FIG. 49 is a side view showing another example of the spacer recovery jig in FIGS. 44A and 44B.

In FIGS. 44A and 44B, reference numeral 50 denotes a flat panel display; 57, a table for placing the flat panel display 50; 54, a support means for supporting the flat panel display 50 by applying a pull-up force to the upper surface of the flat panel display 50; 55, a controller for generating a pull-up force to the support means 54; 71 (72), a spacer recovery jig; and 300, a convey means.

The flat panel display 50 to be disassembled has the above-described structure shown in FIG. 43. The flat panel display 50 is placed on the table 57 with a plate member fixed to spacers 4 facing up. The support means 54 is brought into contact with the upper surface of the flat panel display 50, and a predetermined pull-up force is applied to the flat panel display 50 to fix it. FIG. 45 shows an example in which the spacers 4 are fixed to at least a face plate 2. The table 57 can be vertically elevated while placing the flat panel display 50 on it.

The support means 54 is connected to the controller 55. When the type of flat panel display 50 is input, the controller 55 causes the support means 54 to generate a predetermined pull-up force for supporting the weight of the upper surface.

An arrangement of generating a pull-up force by the support means 54 adopts an arrangement such as an evacuation means for supporting the flat panel display 50 by generating a pull-up force from the evacuation force of an evacuation device, or an arrangement such as a suction means for supporting the flat panel display 50 by generating a pull-up force from the suction force of a sucker. Embodiment 8 adopts the arrangement of the evacuation means, and the support means 54 is connected to an evacuation device 56. Note that the pull-up force of the support means 54 is set not to a value capable of supporting the total weight of the flat panel display 50 placed on the table 57, but to a value enough to support a weight of the flat panel display 50 from which a frame member 3 is separated, i.e., enough to support a plate member fixed to the spacers 4. The pull-up force is preferably set larger than this weight by 1 kg.

Figure 46A:
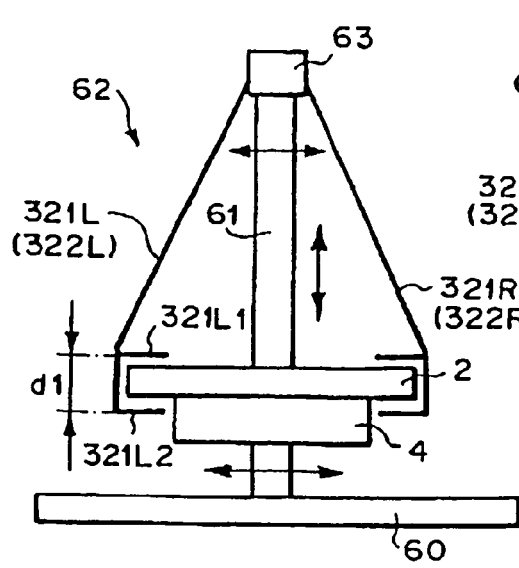
FIG. 46A is a front view showing a convey means in FIG. 44.
Figure 46B:
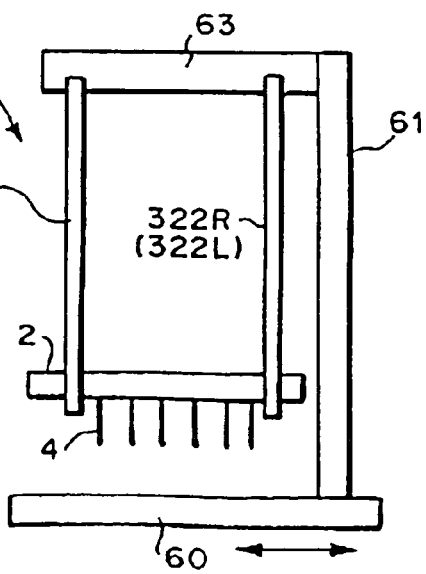
FIG. 46B is a side view showing the convey means in FIG. 44.

The convey means 300 conveys the plate member fixed to the spacers 4 to a spacer recovery unit 73 (74) after the frame member 3 is separated from the flat panel display 50. The convey means 300 moves along a guide rail 100 to convey the plate member. The arrangement shown in FIGS. 46A and 46B is for a display in which the spacers 4 are fixed to either one of two plates 1 and 2. The arrangement shown in FIGS. 47A and 47B is for a display in which the spacers 4 are fixed to the two plates 1 and 2.

A column 61 of the convey means 300 can move back and forth, and right and left on a stage 60. The column 61 is equipped with an arm 63, and the level of the arm 63 can be adjusted. The arm 63 is equipped with a press jig 62.

The press jig 62 holds the plate member fixed to the spacers 4 by clamping it from two sides. More specifically, pairs of right and left suspension bars 321R and 321L, and 322R and 322L are attached to the front and back of the arm 63. The suspension bars 321R 321L, 322R, and 322L have claws 321R1 and 321R2, 321L1 and 321L2, 322R1 and 322R2, and 322L1 and 322L2, each pair of which are apart at a vertical interval dl. The vertical interval dl is set large enough to mount the rear plate 1 or face plate 2. The horizontal opening angle and back/forth position of the press jig 62 attached to the arm 63 can be adjusted.

The spacer recovery jig 71 (72) receives and supports the edge of the plate fixed to the spacers 4. The spacer recovery jig 71 having the arrangement shown in FIG. 48 is for a display in which the spacers 4 are fixed to either one of the two plates 1 and 2. The spacer recovery jig 72 having the arrangement shown in FIG. 49 is for a display in which the spacers 4 are fixed to the two plates 1 and 2.

The spacer recovery jig 71 (72) which receives and supports a plate member is stored in the spacer recovery unit 73 (74) where the spacers 4 are separated and recovered.

As for the spacer recovery jig 71, a groove depth d2 is set equal to or larger than the height of each spacer 4, a groove width d3 is set to a distance equal to or larger than the area of the spacers 4, and a reception opening d4 is set equal to or larger than the width of a plate member received and supported by the spacer recovery jig 71. For the spacer recovery jig 72, a lower groove depth d5 is set equal to or larger than the thickness of the plate member, and a rack thickness d6 is set equal to or smaller than the interval between the rear plate 1 and the face plate 2, i.e., the thickness of the frame member 3 separated in the previous step. A load avoiding jig 70 is arranged at the bottom of the groove of the spacer recovery jig 72 to prevent any load from being applied to the spacers 4 on the received/supported plate member.

The spacer recovery unit 73 (74) stores the spacer recovery jig 71 (72) which receives and supports a plate member. In the spacer recovery unit 73 (74), the spacers 4 are separated and recovered.

To separate and recover the spacers 4, the spacers 4 are dipped in an acid solution such as a nitric acid solution, or heated. In other words, the spacer recovery unit is implemented by an acid solution dipping bath 73. The spacer recovery jig 71 (72) is dipped in the acid solution to separate the spacers 4 from the received/supported plate member, and the spacers 4 gathered at the bottom of the groove are recovered. Moreover, the spacer recovery unit is implemented by a heating furnace 74. The spacer recovery jig 71 (72) is heated to separate the spacers 4 from the received/supported plate member. The spacer recovery jig 71 (72) is extracted to recover the spacers 4 gathered at the bottom of the groove.

An example of the acid solution is a 0.2-N nitric acid solution. When the spacer recovery jig employs an arrangement of dipping spacers in an acid solution, the spacer recovery jig 71 (72) is made of an acid-resistant material such as a plastic. When the spacer recovery jig employs an arrangement of heating spacers, the spacer recovery jig 71 (72) is made of a heat-resistant material such as a metal.

Figure 50:
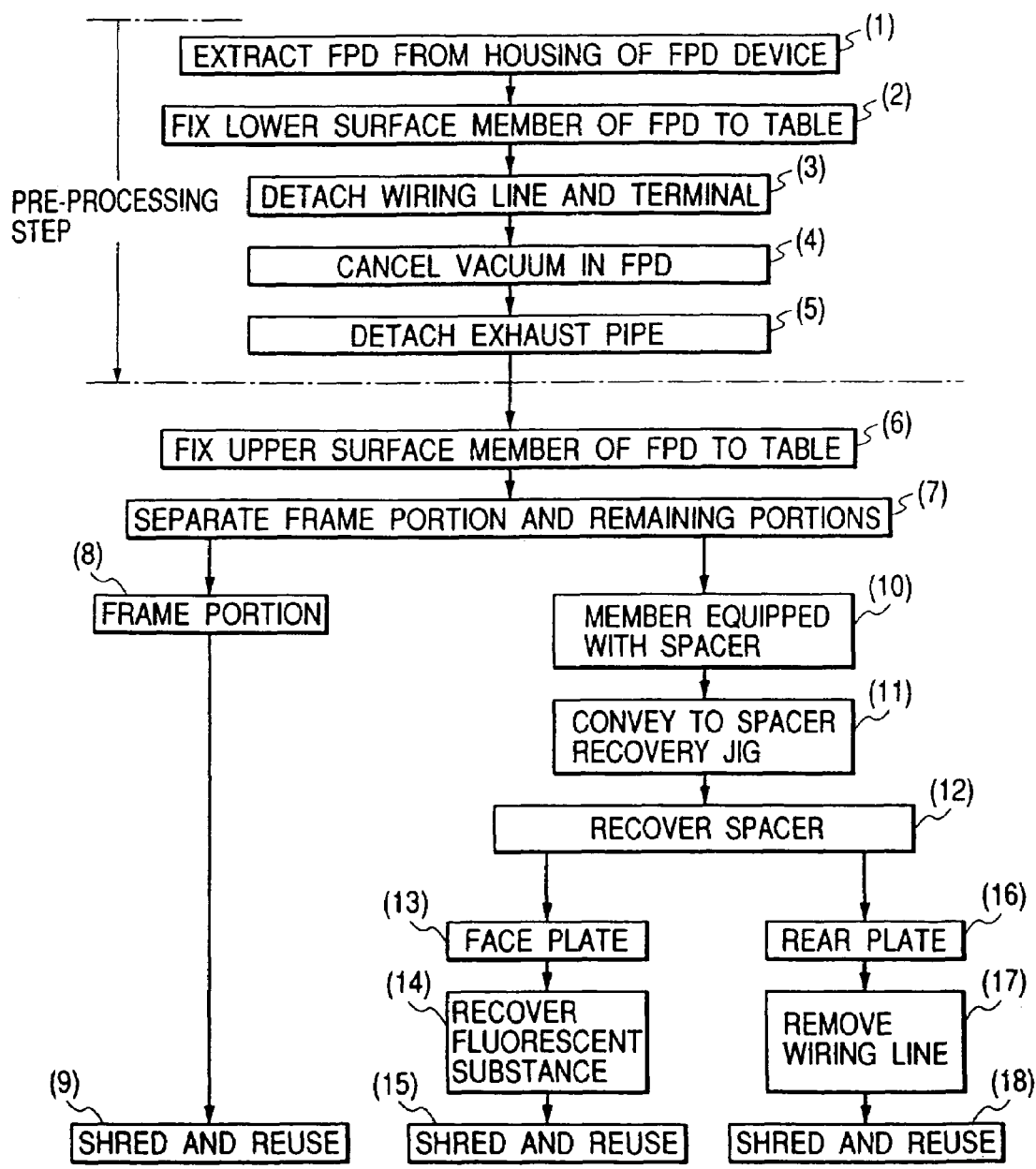
FIG. 50 is a flow chart for sequentially explaining the disassembly step by the flat panel display disassembly apparatus shown in FIGS. 44A and 44B.

FIG. 50 is a flow chart for sequentially explaining a disassembly process by the flat panel display disassembly apparatus shown in FIGS. 44A and 44B.

Pre-processing steps (1) to (5) of disassembly are performed. The flat panel display 50 is dismounted from the housing of the flat panel display apparatus [step (1)], and placed on the table 57 with a plate member fixed to the spacers 4 facing up [step (2)]. Accessory wiring lines and terminals are detached [step (3)]. Proper processing of, e.g., unsealing the attaching portion of an exhaust pipe is executed to cancel the vacuum in the vacuum container, thereby returning the interior of the vacuum container to the atmospheric pressure [step (4)]. Then, the exhaust pipe is detached [step (5)].

As shown in FIG. 45, the support means 54 is brought into contact with the upper surface of the flat panel display 50 on the table 57 to fix the flat panel display 50 by a predetermined pull-up force [step (6)].

Subsequently, the frame member 3 is separated from the flat panel display 50 [step (7)]. This separation adopts an appropriate method of simply cutting the flat panel display 50, press-inserting a wedged-edge tool into the joint portion between the frame member 3 and the two plates 1 and 2 to separate them, or spraying a nitric acid solution.

The frame member 3 separated in step (7) [step (8)] is shredded. At the same time, a lead component is removed, and the resultant material is reused as a recycled new glass material [step (9)].

The plate member fixed to the spacers 4 is held by the convey means 300 shown in FIGS. 46A and 46B [step (10)], moved along the guide rail 100, and transferred to the spacer recovery jig 71 (72) [step (11)]. More specifically, while the opening angles of the suspension bars 321L, 321R, 322L, and 322R are adjusted, the plate member is clamped, suspended, and supported by the claws 321L1, 321L2, 321R1, 321R2, 322L1, 322L2, 322R1, and 322R2. The stage 60 is moved along the guide rail 100, and the plate member is transferred to the spacer recovery jig 71 (72) by procedures opposite to suspension/support procedures.

Then, the spacers 4 are recovered [step (12)]. For this purpose, the spacer recovery jig 71 (72) which receives and supports the plate member fixed to the spacers 4 is stored in the spacer recovery unit 73 (74) where the spacers 4 are separated and recovered.

After the spacers 4 are recovered, when the plate member is the face plate 2 [step (13)], fluorescent substances are recovered from the face plate 2 [step (14)]. The face plate 2 is shredded, a lead component is removed, and the resultant material is reused as a recycled new glass material [step (15)].

When the plate member is the rear plate 1 [step (16)], wiring lines are removed from the rear plate 1 [step (17)]. The rear plate 1 is shredded, a lead component is removed, and the resultant material is reused as a recycled new glass material [step (18)].

With the above arrangement, in the flat panel display disassembly apparatus of Embodiment 9, a plate member fixed to the spacers 4 is supported by applying a pull-up force from the support means 54 in separating the frame member 3 from the display main body (vacuum container). The spacers 4 are suspended without receiving the weight of the fixed plate member, and the frame member 3 can be separated without applying any load to the spacers 4. This can prevent any damage to the spacers 4.

After the frame member 3 is separated, the spacer recovery jig 71 (72) receives and supports the edge of the plate fixed to the spacers 4. Also at this time, the spacers 4 are suspended without receiving the weight of the fixed plate member. The step of separating the spacers 4 from the plate member received and supported by the spacer recovery jig 71 (72) is performed while the spacer recovery unit 73 (74) keeps receiving and supporting the plate member. Also in the separating/recovery step for the spacers 4, the spacers 4 do not receive any extra weight, and can be prevented from being damaged.

In other words, disassembly processing can be executed by proper steps, and directly reusable constituent members such as the spacers 4 can be recovered without any damage. As a result, constituent members can be preferably recycled.

Embodiment 9-2

Figure 51A:
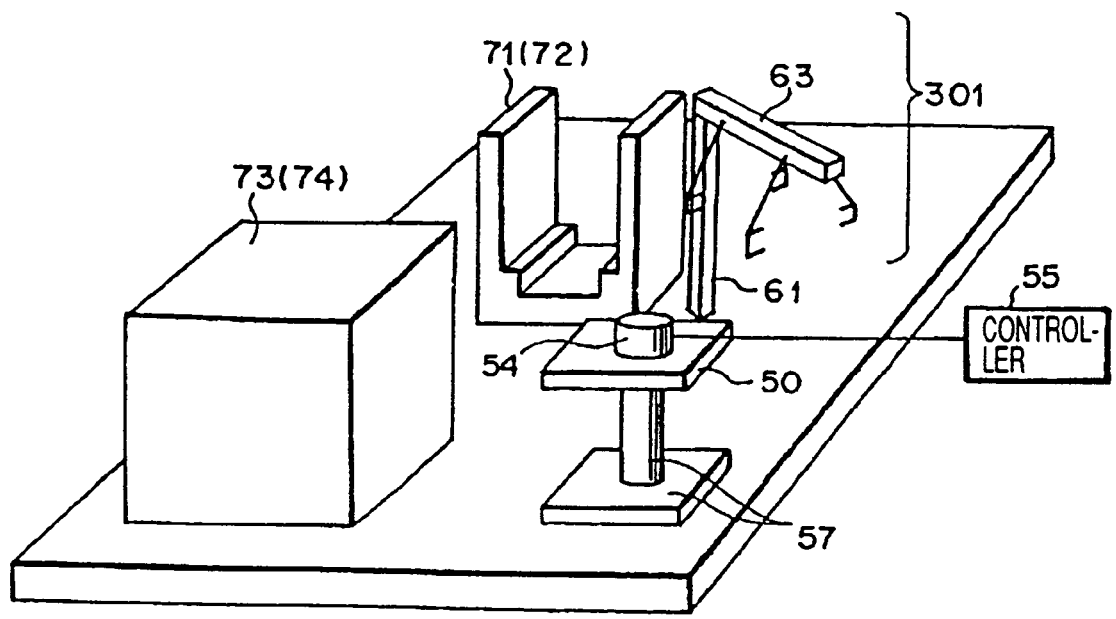
FIG. 51A is a perspective view showing the arrangement of a flat panel display disassembly apparatus according to the second embodiment of the present invention.
Figure 51B:
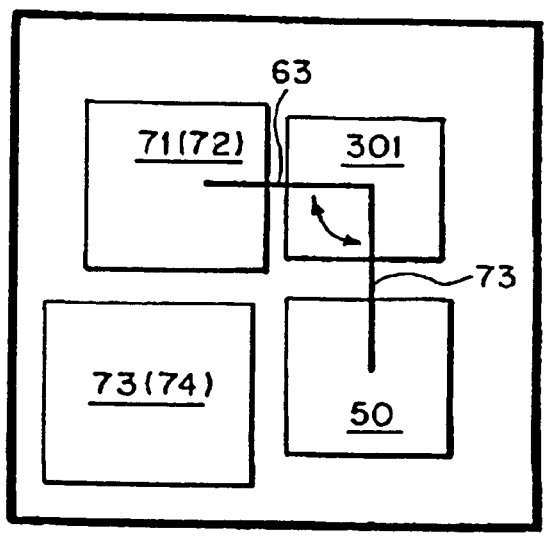
FIG. 51B is a plan view showing the disassembly apparatus in FIG. 51A.

FIGS. 51A and 51B show Embodiment 9-2 of the present invention. FIG. 51A shows a perspective view showing the arrangement of a flat panel display disassembly apparatus, and FIG. 51B is a plan view thereof.

In Embodiment 9-2, a support means for supporting a flat panel display 50 by applying a pull-up force to the upper surface of the flat panel display 50 is realized by a suction means 240 for supporting the flat panel display 50 by generating a pull-up force from the suction force of a sucker. A convey means 301 rotates an arm 63 attached to its upper portion about a column 61 as a rotating shaft. A table 57, spacer recovery unit 73 (74), and spacer recovery jig 71 (72) are arranged within the rotation range of the arm 63. Note that the same reference numerals as in Embodiment 9-1 denote the same parts, and a description thereof will be omitted.

The disassembly process in this case is the same as in Embodiment 9-1. In each step, spacers 4 can be suspended. The spacers 4 can be separated and recovered without applying any weight, and can be prevented from being damaged. Respective members can be disassembled and reused as recycled new glass materials. That is, disassembly processing can be executed by proper steps, and constituent members can be preferably recycled.

Embodiment 10

Embodiment 10 of the present invention will be described in detail below with reference to the accompanying drawings. Embodiment 10 will exemplify disassembly processing for an FPD which incorporates spacers and has a fluorescent screen on the inner surface of a face plate, as schematically shown in FIGS. 43A, 43B, and 32.

FIG. 43A is a partially cutaway perspective view showing the FPD, and FIG. 43B is a sectional view. In FIGS. 43A and 43B, reference numeral 1 denotes a rear plate; 2, a face plate; 3, a frame; and 4, spacers. Lead-containing frit glass 5 is used at each joint portion represented in black in FIGS. 43A and 43B.

Examples of the materials of the rear plate 1, face plate 2, and frame 3 are silica glass, glass containing a small amount of impurity such as Na, soda-lime glass, and glass prepared by stacking a silica layer on soda-lime glass.

On the face plate 2, a fluorescent film 2b is formed on the inner surface of a glass substrate 2a, and a metal back 2c containing Al is formed on the inner surface of the fluorescent film 2b.

The spacers 4 are bonded to either one of the face plate and rear plate or both of them. In this embodiment, the spacers 4 are bonded to only the face plate. The spacer 4 is basically made of glass, and the surface of the spacer 4 may be coated with an antistatic conductive film.

In addition, an exhaust pipe (not shown) for evacuating the FPD is generally attached to the FPD. In general, the exhaust pipe is formed from low-melting glass containing lead.

The FPD shown in FIG. 32 is an example of a surface-conduction type electron source display of matrix driving scheme. FIG. 32 is a partially cutaway view showing the FPD. In FIG. 32, surface-conduction type electron sources 11, and wiring lines 12 and 13 for driving the electron sources are formed on the rear plate 1. The wiring lines 12 and 13 are X-direction (Dox1, Dox2, . . . , Doxm) and Y-direction (Doy1, Doy2, . . . , Doyn) element wiring lines, and are made of Ag, Pd, or the like. The X-direction wiring lines 12 and Y-direction wiring lines 13 are insulated by an insulating layer (not shown) at least at their intersections. The insulating layer is made of glass containing a large amount of lead.

As described above, various portions of the FPD use lead-containing materials. The gist of the present invention is to efficiently execute processing of removing lead and processing glass and the like into a reusable state by a method suitable for the shape of a member to be processed.

Figure 53:
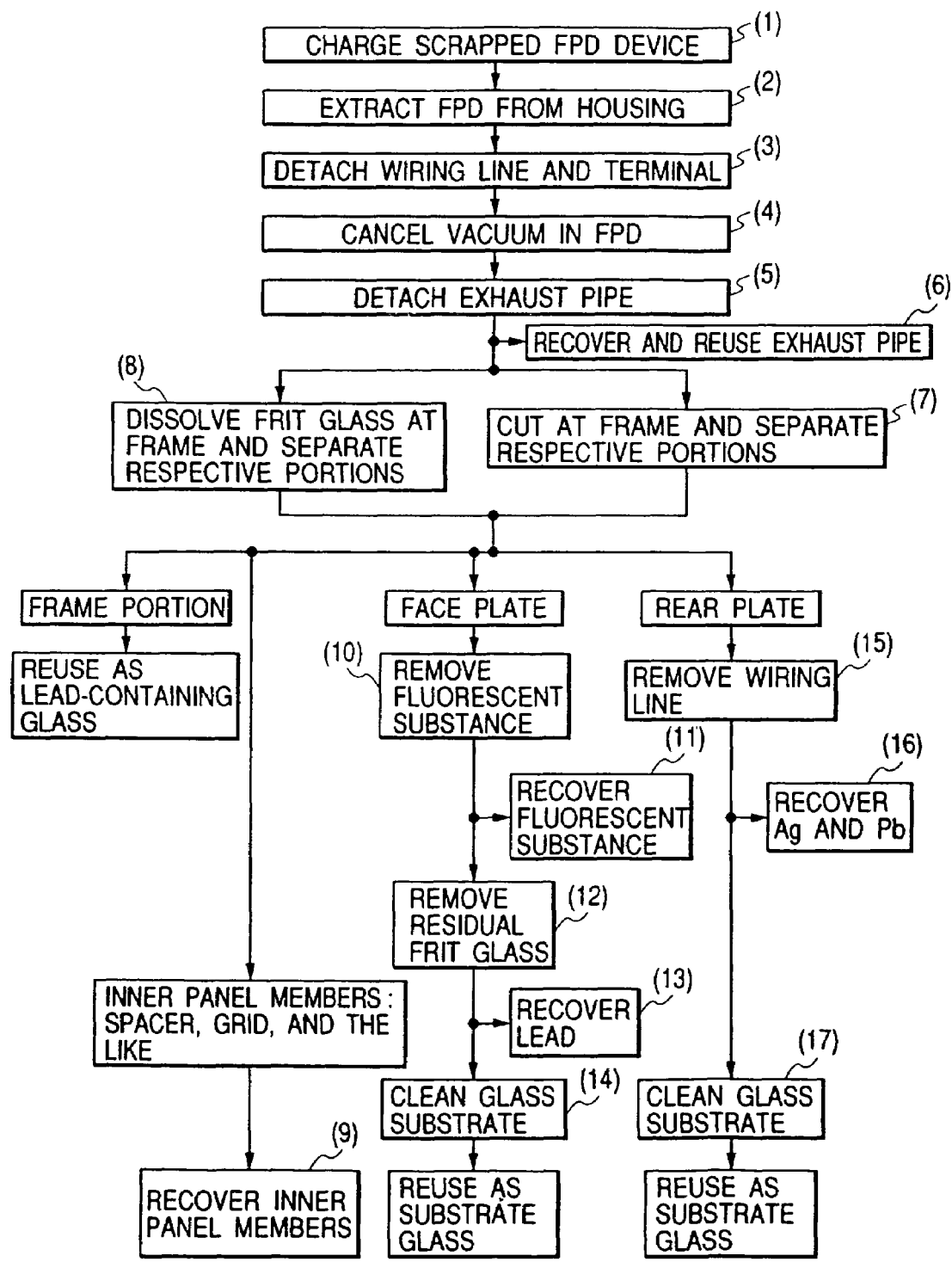
FIG. 53 is a flow chart for explaining an FPD disassembly processing method according to the present invention.

FIG. 53 is a flow chart showing the steps of an FPD device disassembly processing method for explaining the embodiment of the present invention. Steps (1) to (3) as the former half of this method are pre-processing steps, and include the step of extracting an FPD from the housing of an FPD device, and removing accessory wiring lines and terminals. In steps (4) to (6), the vacuum in the FPD is canceled by a proper method, and then the exhaust pipe is detached. Since the exhaust pipe contains lead, it is processed and reused as lead-containing glass.

In step (7), the panel is separated into respective members by cutting the frame. Alternatively, in step (8), frit glass at joint portions is melted to separate respective members. Through step (7) or (8), the scrapped FPD is separated into a frame, inner panel member, face plate, and rear plate. Processing methods for the respective members will be described.

The frame portion is shredded and reused as lead-containing glass.

If a spacer (made of glass), grid (made of a metal), and the like exist as inner panel members, they are recovered and reused (step (9)).

Figure 52:
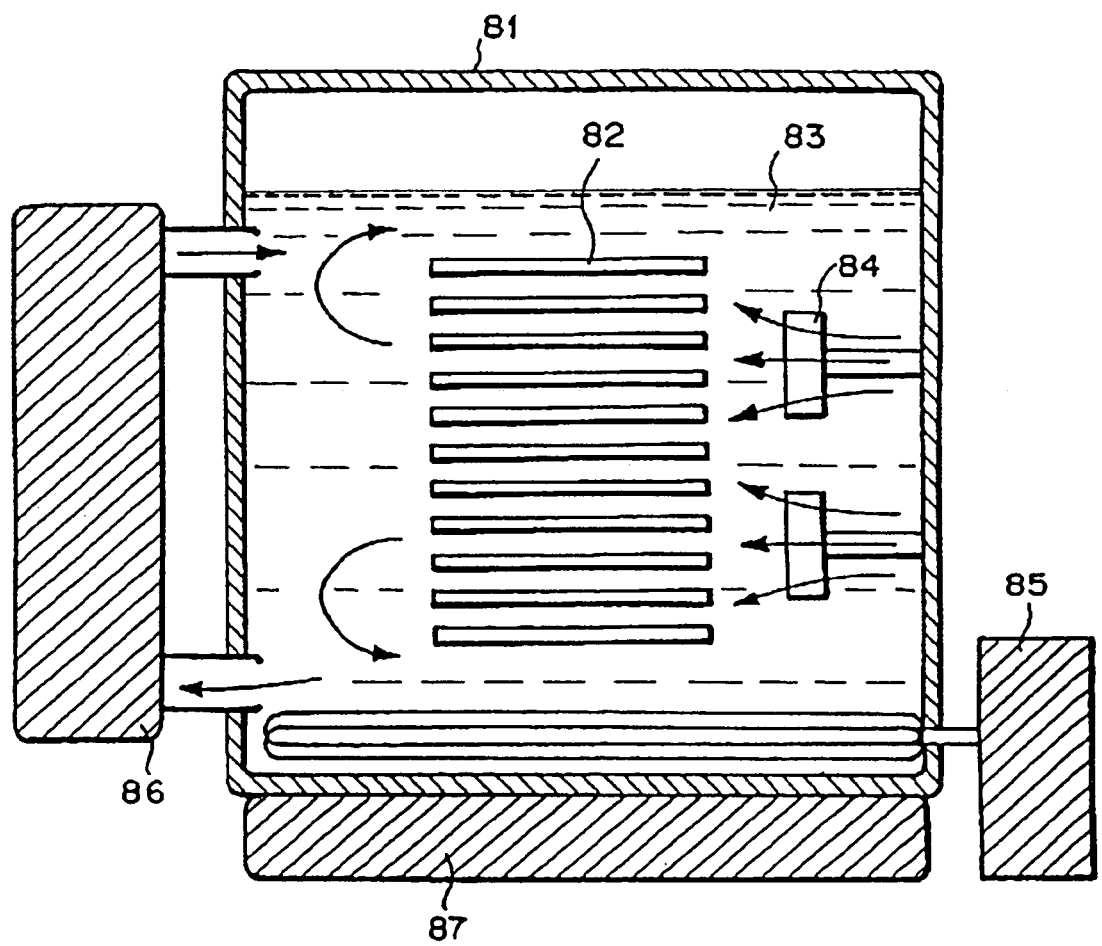
FIG. 52 is a schematic view showing an arrangement of a liquid processing bath in an FPD disassembly processing method according to the present invention.

As for the face plate, fluorescent substances are removed (step (10)), and recovered (step (11)). In step (12), the face plate is charged to a liquid processing bath in order to remove residual frit glass. FIG. 52 is a schematic view showing the arrangement of the processing bath used at this time. A processing bath 81 can simultaneously process a plurality of face plates 82. The face plates 82 are parallel-arranged at a predetermined interval in the processing bath 81 so as to prevent any contact of their surfaces by using a support frame (not shown). The face plates 82 are dipped in a liquid 83 (e.g., dilute nitric acid) which dissolves frit glass. Note that the processing bath 81 is made of a corrosion-resistant material such as stainless steel.

To accelerate dissolution of frit glass, a proper means is adopted: (1) the liquid is flowed; (2) vibrations or acoustic waves are propagated to the face plates; or (3) the temperature of the liquid is increased by a heating mechanism. The processing solution in which frit glass is eluted is extracted from the processing bath 81 to a processing solution recycling means 86 where lead and eluted substances are recovered (step (13)). As a result, the processing solution is recycled and returned to the processing bath 81. By using the processing solution recycling/circulating mechanism, the internal environment of the processing bath can be kept almost constant, and processing of removing residual frit glass from the face plates 82 can be continuously performed. Arrows shown in FIG. 52 schematically represent the flow of the processing solution.

Subsequently, the face plates are transferred from the processing bath to a cleaning bath where the face plates are cleaned (step (14)). In the cleaning step, a liquid (e.g., water) used for cleaning is used to remove the processing solution attached to the face plates. The structure and function of the cleaning bath are basically the same as those of the processing bath shown in FIG. 52. Glass having undergone the cleaning step can be reused as a face plate substrate through the shredding or re-fusing step.

As for the rear plate, the rear plate is charged to the liquid processing bath shown in FIG. 52 in order to remove wiring lines in step (15). Similar to face plates, rear plates are parallel-arranged at a predetermined interval in the processing bath 81 so as to prevent any contact of their surfaces by using a support frame (not shown). The rear plates are dipped in the liquid 83 (e.g., dilute nitric acid) which dissolves a wiring line material, and a plurality of rear plates are simultaneously processed. The structure and function of the rear plate processing bath are basically the same as those of the face plate processing bath. After wiring lines are removed in the processing bath, metals (Ag, Pb, and the like) contained in the wiring lines are recovered (step (16)).

Then, the rear plates are transferred from the processing bath to a cleaning bath where the rear plates are cleaned (step (17)). In the cleaning step, a liquid (e.g., water) used for cleaning is used to remove the processing solution attached to the rear plates. The structure and function of the cleaning bath are basically the same as those of the above-mentioned processing bath. Glass having undergone the cleaning step can be reused as a face plate substrate through the shredding or re-melting step.

EXAMPLE 10

The present invention will be explained in detail by way of Example 10 with reference to FIGS. 32, 43A, 43B, 52, and 53.

EXAMPLE 10-1

Method of Performing Bath Processing After Cutting and Separation

Ten surface-conduction type electron source displays (SED) of matrix driving scheme as shown in FIG. 32 were disassembled. Each SED has a panel structure including spacers as shown in FIGS. 43A and 43B.

In accordance with the flow chart of disassembly processing for an FPD device in FIG. 53, an SED was extracted from the housing of an SED device, and accessory wiring lines and terminals were removed. The vacuum in the SED was canceled, and the exhaust pipe was detached. The exhaust pipe was processed and reused as lead-containing glass.

Cutting lines were set inside a region of the SED panel where frit glass was applied, and the SED was cut along the cutting lines with a diamond cutting saw while a grinding solution was applied.

This operation was executed for the 10 SEDs. By cutting, each SED was divided into a frame, face plate, and rear plate. Some of spacers came off in cutting, and some of spacers were kept bonded to the face plate. All the spacers were manually recovered, and recyclable spacers were screened and reused.

The frame portion was shredded and reused as a lead-containing glass material. After metal backs and fluorescent substances were removed, the 10 face plates were charged to a liquid processing bath at once. FIG. 52 is a schematic view showing the arrangement of the processing bath used at this time. A processing bath 81 was filled with 0.2-N nitric acid as a processing solution 83. Respective face plates 82 were parallel-arranged and dipped in the processing solution 83. The processing bath 81 incorporated a support frame (not shown) so as to parallel-arrange the face plates 82 at a predetermined interval. The processing solution 83 was flowed along the surfaces of the face plates 82 by a liquid flowing means 84. At the same time, while the processing solution 83 was heated to 50° C. by a heater 85, the face plates 82 were processed for 1 h.

Meanwhile, the processing solution 83 was supplied to a processing solution recycling means 86 where the processing solution 83 was recycled and returned to the processing bath 81. The processing solution recycling means 86 removed a solid component with a filter, and a dissolved component was separated and recovered by the electrolytic method.

The 10 face plates 82 were transferred at once from the processing bath 81 to a cleaning bath where they were cleaned. The structure of the cleaning bath is basically the same as that of the processing bath. Water was used as a cleaning solution, and the face plates were cleaned for 30 min. Glass having undergone the cleaning step was shredded or re-melted, and reused as a face plate substrate.

Ten rear plates were charged to the liquid processing bath shown in FIG. 52 to remove residual frit glass and wiring lines. The processing solution was 0.2-N nitric acid. While the processing solution was heated to 50° C., and ultrasonic waves were applied by an ultrasonic wave application means 87, the rear plates were processed for 2 h.

The 10 rear plates were transferred at once from the processing bath to a cleaning bath where they were cleaned. The structure of the cleaning bath is basically the same as that of the processing bath. Water was used as a cleaning solution, and the rear plates were cleaned for 30 min. Glass having undergone the cleaning step was shredded or re-melted, and reused as a rear plate substrate.

EXAMPLE 10-2

Method of Performing Batch Processing After Dissolution and Separation

In accordance with the flow chart of disassembly processing for an FPD device in FIG. 53, an SED was extracted from the housing of an SED device, and accessory wiring lines and terminals were removed. The vacuum in the SED was canceled, and the exhaust pipe was detached. The exhaust pipe was processed and reused as lead-containing glass.

Each SED panel was dipped in a nitric acid solution to dissolve frit glass at the joint portions of the panel. As a result, each panel was divided into a frame, face plate, and rear plate.

This operation was done for 10 SEDs.

The processing is the same as in Example 10-1 up to the cleaning step for the face plate and rear plate. Glass having undergone the cleaning step was dried and reused as a face plate or rear plate substrate.

Since a glass substrate is not cut in Example 10-2, a recovered glass substrate can be directly reused as an SED member.

Embodiment 11

A preferred embodiment of a fluorescent substance recovery method and apparatus for a flat panel display according to the present invention will be described below with reference to the accompanying drawings.

In Embodiment 11, a display to be processed is a flat panel display which is made up of a face plate, rear plate, and frame, and in which fluorescent substances are applied to the inner surface of the face plate and emit light by irradiation of an electron beam.

The fluorescent substances recovery apparatus of the present invention uses a fixing device which has a fixing jig disposed to be retractable with respect to a flat panel display so as to surround the flat panel display placed on a base such as a work table or work belt, and which fixes the flat display panel by swinging the fixing jig and bringing it into contact with the flat panel display from the four directions of the flat panel display.

Figure 54:
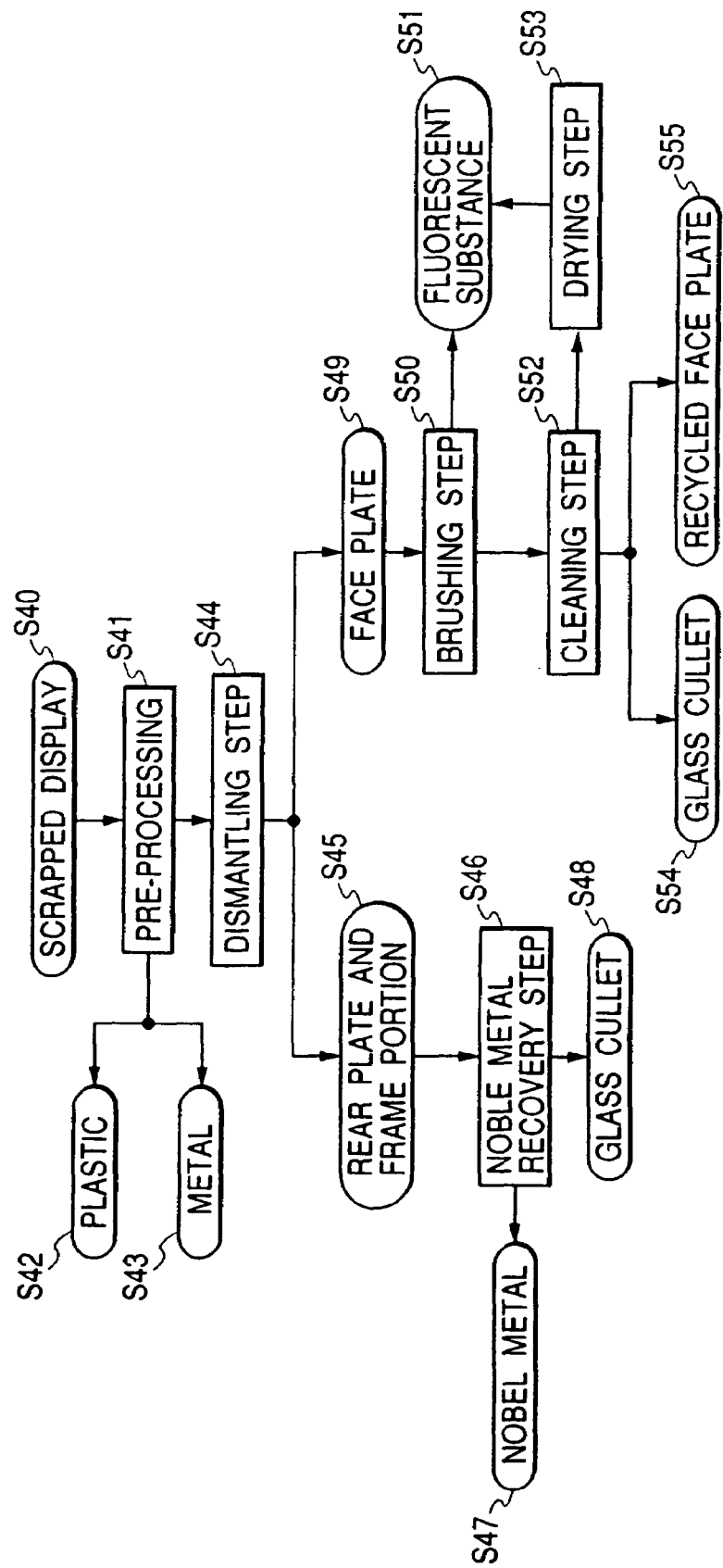
FIG. 54 is a flow chart showing the basic steps of fluorescent substance recovery processing according to the present invention.

FIG. 54 shows the basic steps of processing in the present invention.

In FIG. 54, a display (S40) to be processed/scrapped is separated from a cabinet. In this case, the display is placed on a work table with the face plate of the display facing down. The periphery of the display is temporarily fixed with a movable stop type fixing jig according to the present invention. Further, a chuck attached to the work table is operated to completely fix the flat panel display.

The position of the fixing jig in use is detected based on the moving distance, and size information of the flat panel display is detected from the positional information (S41). This information is sent to a control terminal (controller) which determines the moving range of a cutter (cutting means) used in cutting a frame (to be described later) or the work range of a subsequent fluorescent substance recovery brush (recovery means) (S41). A rubber or plastic seal is attached around the chucking port of the chuck in order to more tightly contact the face plate.

A sucker is moved down to suck the upper rear plate, and the frame is cut in accordance with the information from the control terminal (S44). By a method of, e.g., thermally melting frit glass at the frame, the face plate, rear plate, and frame are separated (S45 and S49). The rear plate and frame (S45) are removed from the face plate (S46). After noble metal elements (S47) such as gold, silver, and palladium are removed, the rear plate and frame are transferred to the cullet formation step (S48).

As for the face plate (S49), the fluorescent substance recovery brush with the chucking mechanism is moved down to the face plate a plurality of number of times, and reciprocated on the face plate a plurality of number of times (S50), thereby recovering fluorescent substances (S51). In this case, a fluorescent substance detection means for detecting the amount of fluorescent substances left on the face plate is used. The operation of the recovery brush serving as the recovery means is controlled based on fluorescent substance amount information obtained by the fluorescent substance detection means.

As a method of determining the end of fluorescent substance recovery work using the fluorescent substance detection means according to the present invention, e.g., a means for emitting visible light and detecting the transmittance can be attached to the work table to determine the end of work. Alternatively, a fluorescent spectrometer detection unit may be arranged behind the recovery brush, and when the fluorescent intensity of the fluorescent substances becomes 0.5% or less or preferably 0.2% or less the initial value, may determine the end of work.

Alternatively, the face plate may be reversed together with the jig after the rear plate and frame are separated, and the brush may be operated from below the face plate to drop and recover fluorescent substances. This method does not require any energy of brush chucking mechanism and layout of a recovery tube, and can realize more efficient work.

The face plate from which most of fluorescent substances are removed is subjected to the cleaning step using distilled water or an aqueous solution such as an aqueous oxalic acid solution capable of easily dissolving fluorescent substances. As a result, fluorescent substances are completely recovered and removed. Considering the cost of the subsequent oxalic acid recovery step, it is desirable to satisfactorily brush fluorescent substances in the brushing step so as to clean the face plate with only distilled water (S52).

The face plate having undergone the cleaning step is subjected to the drying step so as to reuse it as a face plate (S53), and sent to the face plate manufacturing step (S55). When the inner surface does not reach the face plate standard, the face plate is shredded into cullets, melted, and reused as general glass (S54), or reused as part of a face plate member.

The recovered fluorescent substances are separated and purified by a known method. This means is not particularly limited. For example, the recovered fluorescent substances are processed with an aqueous solution containing NaOH, NaClO, and $H_2O_2$, and processed with a weak acid (Japanese Laid-Open Patent Application No. 6-108047). Alternatively, the recovered fluorescent substances may be processed with a weak acid to leach rare-earth elements, oxalic acid may be added to convert the rare-earth elements into oxalate, and oxalate may be baked to obtain rear-earth oxides (Japanese Laid-Open Patent Application No. 8-333641).

In this case, the fixing device, cutter or brush, and the like included in the apparatus of the present invention are driven and controlled by the controller having a CPU in accordance with predetermined programs. That is, the controller controls processing work by issuing proper driving instructions to corresponding driving mechanisms for the moving amount and ON/OFF operation of a member such as the cutter or brush on the basis of positional information of the fixing jig and fluorescent substance amount information of the fluorescent substance detection means.

EXAMPLE 11

Detailed examples of the present invention will be explained.

EXAMPLE 11-1

Figure 58:
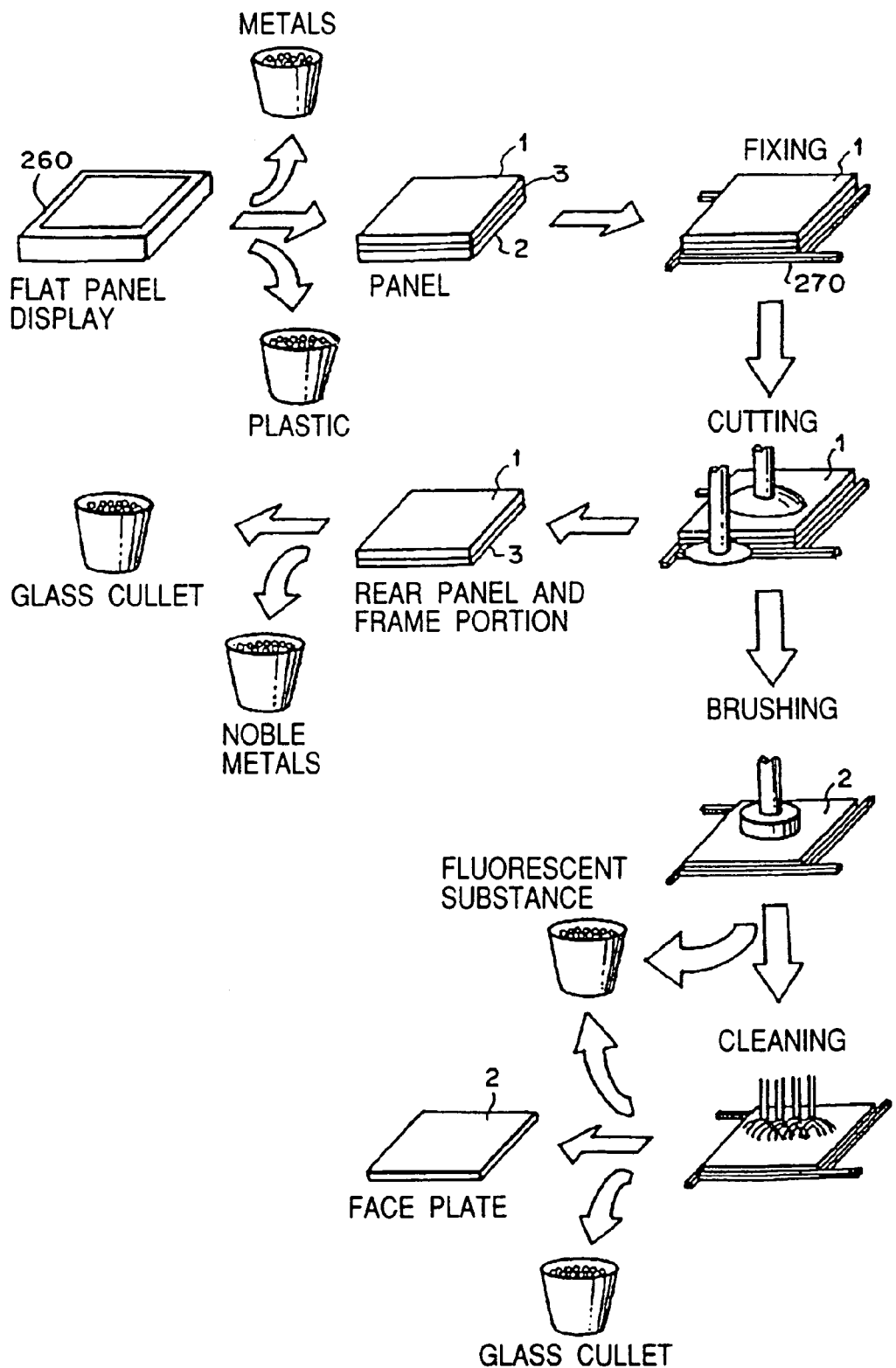
FIG. 58 is a view showing the steps of recovering fluorescent substances from a flat panel display according to the present invention.

FIG. 58 shows the steps in recovering fluorescent substances from a flat panel display according to Example 11-1.

Peripheral panel components are dismounted from a flat panel display 260. Fastening screws at the periphery of the display are unscrewed with a screwdriver or the like to dismount a display casing. A power supply cable, high-voltage power supply unit, tuner, and flexible cable are detached, metals and plastics are separately stored, and only a panel is left.

Figure 55A:
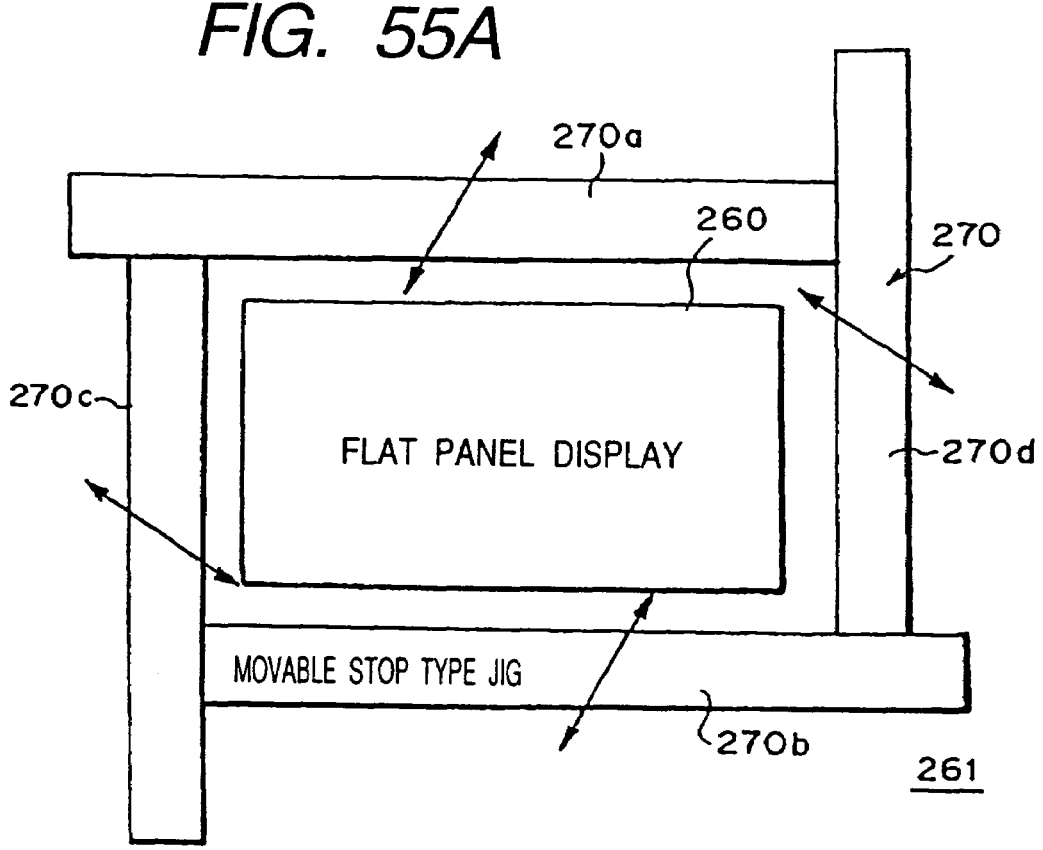
FIG. 55A is a plan view showing an arrangement of a movable stop type fixing jig according to the present invention.
Figure 55B:
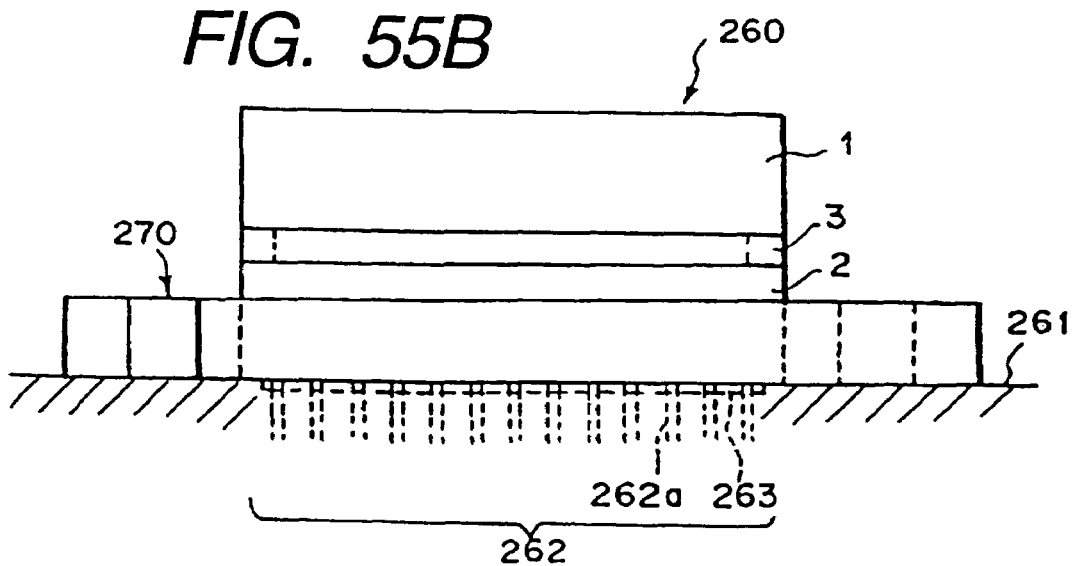
FIG. 55B is a side view showing the movable stop type jig in FIG. 55A.
Figure 56:
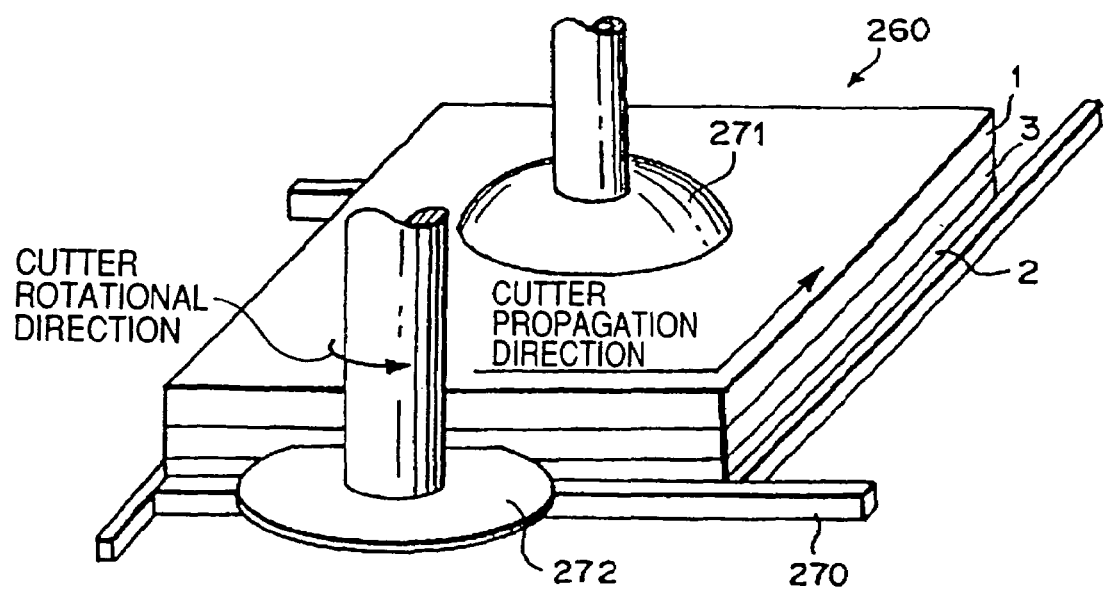
FIG. 56 is a perspective view showing the separation step for a face plate and rear plate according to the present invention.

As shown in FIGS. 55A, 55B, and 56, the extracted panel (flat panel display 260) is placed on a work table 261 having a vacuum chuck 271 while a face plate 2 faces down. The flat panel display 260 is fixed with a movable stop type jig 270 connected to a control terminal. As shown in FIG. 55A, jigs 270a and 270b for fixing the upper and lower ends of the panel gradually move in the vertical direction until they contact the panel. At the same time, jigs 270c and 270d for fixing the left and right ends of the panel gradually move in the lateral direction until they contact the panel. That is, the jig 270 moves until it detects the upper and lower ends of the panel and the left and right ends of the panel.

In practice, detection/movement of the upper and lower ends of the panel and detection/movement of the left and right ends of the panel are alternately performed. These operations are alternately done until any end is detected, and after an end is detected, detection/movement in a direction in which no end has been detected is continued. Movement of the jig 270 is observed such that the jig 270 fixes the panel while gradually decreasing the interval. Positional information of the jig 270 is sent to the control terminal which determines the moving range of a cutter (to be described later) and the work range of a brush with a chucking mechanism.

The panel is completely fixed to the work table 261 by a chuck 262 via a chucking hole 262a formed in the work table 261. In this case, the chucking port of the chuck 262 and its vicinity are completely sealed with a seal 263.

As shown in FIGS. 55A and 55B, a rear plate 1 is held by the jig 270 having four surrounding sections 270a, 270b, 270c, and 270d in a vacuum manner. As shown in FIG. 58, the panel is cut and separated between the face plate 2 and a frame 3 with a cutter 272 whose moving range is controlled by the control terminal. The rear plate 1 and frame 3 are moved away by the vacuum, and fed to the recovery step for noble metals used for wiring lines. The rear plate is mainly stored as glass cullets.

Figure 57:
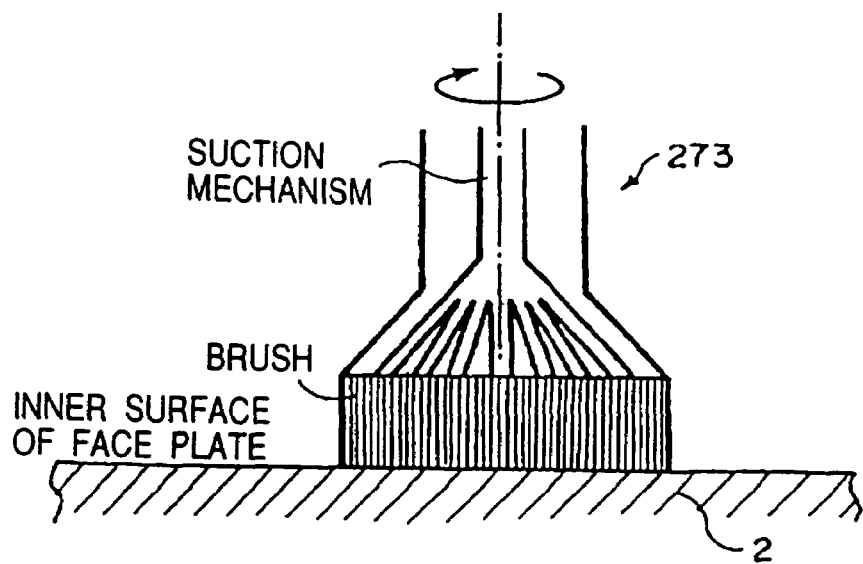
FIG. 57 is a view showing the structure and operation of a recovery brush according to the present invention.

As for the face plate 2, fluorescent substances are brushed with a brush 273 as shown in FIG. 57, chucked, and recovered. In this case, the residual amount of fluorescent substances is confirmed by a fluorescent spectrometer (not shown) from above the face plate 2, and the information is processed by the control terminal to determine the work time of the brush 273. At this stage, 99.5% of fluorescent substances used in the manufacture could be removed, and 99.2% thereof could be recovered.

The face plate 2 undergoes the cleaning step, and fluorescent substances left as power dust are recovered. At this stage, no detectable fluorescent substances existed on the face plate 2. In addition, 99.4% of fluorescent substances used in the manufacture could be recovered. Whether the face plate 2 can be used as a face plate is checked, and if the face plate 2 passes the test, it is reused. Otherwise, the face plate 2 is fed to the step of shredding it into glass cullets and reusing them as a glass resource.

EXAMPLE 11-2

Example 11-2 will be described.

In Example 11-2, fluorescent substances were recovered similarly to Example 11-1 except that a face plate 2 was reversed together with a jig after a rear plate 1 and frame 3 were separated.

Similar to Example 11-1, no detectable fluorescent substances existed on the face plate 2. The recovery ratio of fluorescent substances was 99.6%.

EXAMPLE 11-3

In Example 11-3, fluorescent substances were recovered similarly to Example 11-1 except that the transmittance of visible light was used as a fluorescent substance detection means. In this case, the brushing step was complete when the transmittance did not change.

After the processing step, the residual fluorescent substance amount was measured with a fluorescent spectrometer to confirm that about 1% of fluorescent substances remained. The recovery ratio of fluorescent substances was 99.2%.

Embodiment 12

A preferred embodiment of a substrate processing method and apparatus according to the present invention will be explained below with reference to the accompanying drawings.

Embodiment 12 will exemplify disassembly processing for an FPD which incorporates spacers and has a fluorescent screen on the inner surface of a face plate, as shown in FIGS. 43A, 43B, and 32.

In FIGS. 43A and 43B, reference numeral 1 denotes a rear plate; 2, a face plate; 3, a frame; and 4, spacers. Lead-containing frit glass 5 is used at each joint portion represented in black in FIGS. 43A and 43B.

The spacers 4 are bonded to one or both of the face plate 2 and rear plate 1. In this embodiment, the spacers 4 are bonded to only the face plate 2. Examples of the materials of the rear plate 1, face plate 2, and frame 3 are silica glass, glass containing a small amount of impurity such as Na, soda-lime glass, and glass prepared by stacking a silica layer on soda-lime glass. On the face plate 2, a fluorescent film 2b is formed on the inner surface of a glass substrate 2a, and a metal back 2c containing Al is formed on the inner surface of the fluorescent film 2b.

The spacer 4 is basically made of glass. In some cases, The surface of the spacer 4 may be coated with an antistatic conductive film. In addition to these constituent members, an exhaust pipe (not shown) for evacuating the FPD is generally attached to the FPD. In general, the exhaust pipe is formed from low-melting glass containing lead.

As shown in FIG. 32, an example of the FPD is a surface-conduction type electron source display (SED) of matrix driving scheme. In FIG. 32, surface-conduction type electron sources 11, and wiring lines 12 and 13 for driving the electron sources are formed on the rear plate 1. In FIG. 32, the wiring lines 12 and 13 are y-direction (Dox1, Dox2, . . . , Doxm) and y-direction (Dox1, Dox2, . . . , Doym) element wiring lines, and are made of Ag, Pd, or the like. The X-direction wiring lines and Y-direction wiring lines are insulated by an insulating layer at least at their intersections. The insulating layer are made of glass containing a large amount of lead.

As described above, various portions of the FPD use lead-containing materials. According to the present invention, efficient processing is executed by a method suitable for the shape of a member to be processed in order to remove lead and change glass and the like into a reusable state.

Figure 61:
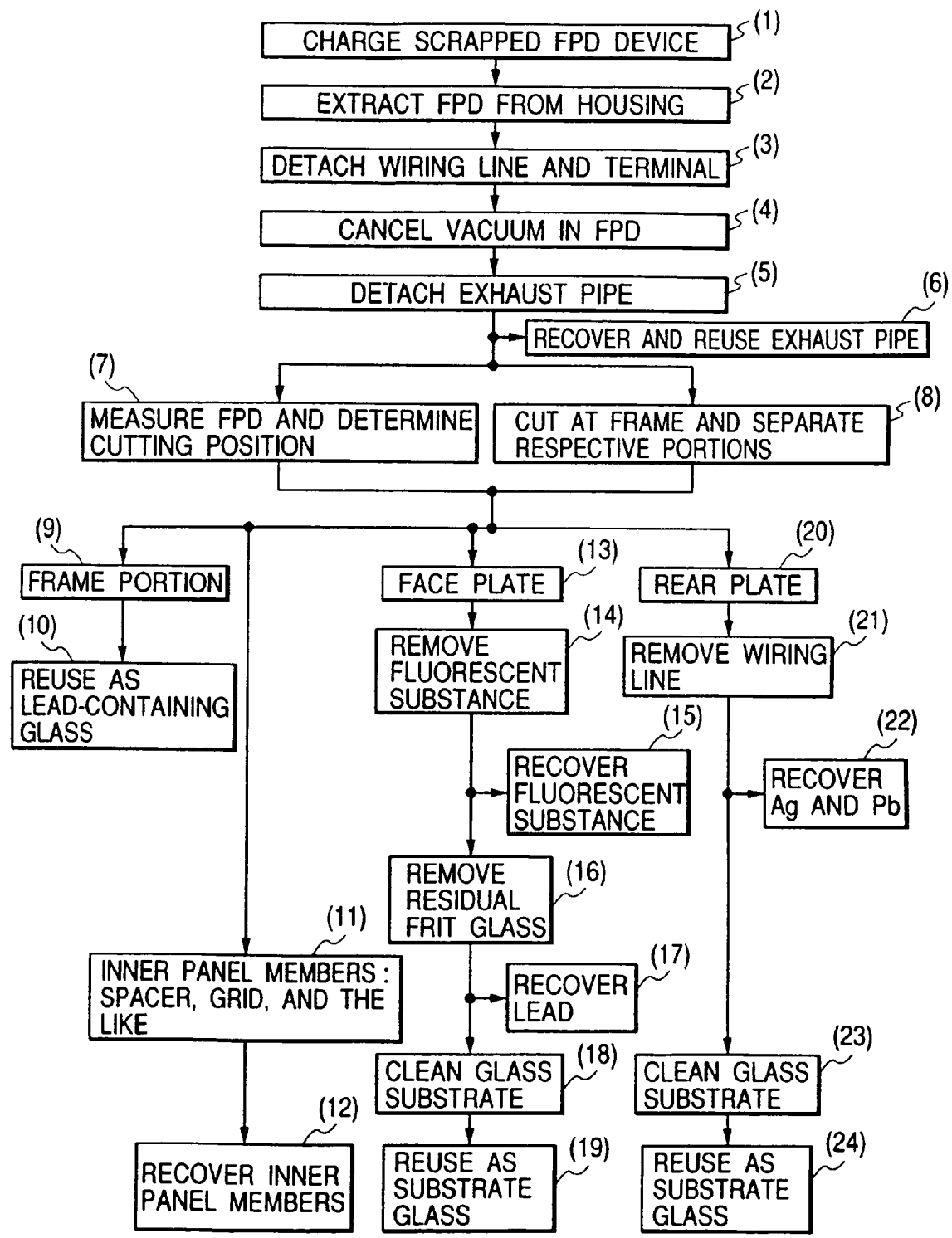
FIG. 61 is a flow chart showing an example of the steps of the FPD disassembly processing method of the present invention.

FIG. 61 is a flow chart showing the steps of an FPD device disassembly processing method for explaining the embodiment of the present invention.

Steps (1) to (3) as the former half of this method are pre-processing steps, and include the step of extracting an FPD from the housing of an FPD device, and removing accessory wiring lines and terminals. In steps (4) to (6), the vacuum in the FPD is canceled by a proper method, and then the exhaust pipe is detached. Since the exhaust pipe contains lead, it is processed and reused as lead-containing glass.

In step (7), the panel is separated into respective members by cutting the frame. Alternatively, the panel is separated into respective members by step (8) of dissolving frit glass at joint portions. Through step (7) or (8), the scrapped FPD is separated into a frame portion (9), an inner panel member (11), a face plate (13), and a rear plate (20). Processing methods for the respective members will be described.

The frame portion (9) is shredded and reused as lead-containing glass (step (10)). If a spacer (made of glass), grid (made of a metal), and the like exist as inner panel members (11), they are recovered and reused (step (12)).

As for the face plate, fluorescent substances are removed in step (14), and recovered in step (15). A glass plate as the face plate substrate is stored in a glass plate holding apparatus serving as a substrate processing apparatus of the present invention, and charged to a liquid processing bath in order to remove residual frit glass (step (16)).

Figure 59A:
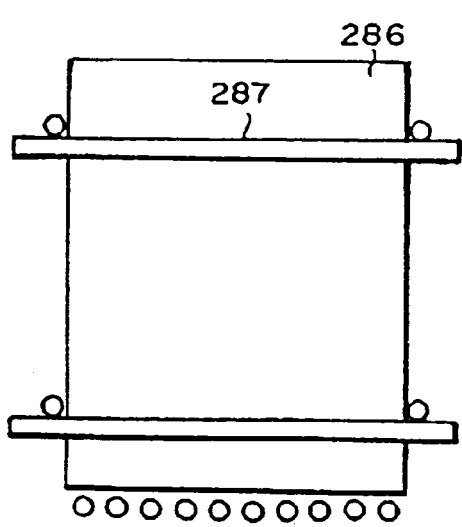
FIGS. 59A and 59B show views for explaining a glass plate holding mechanism according to an FPD disassembly processing method of the present invention.
Figure 59B:
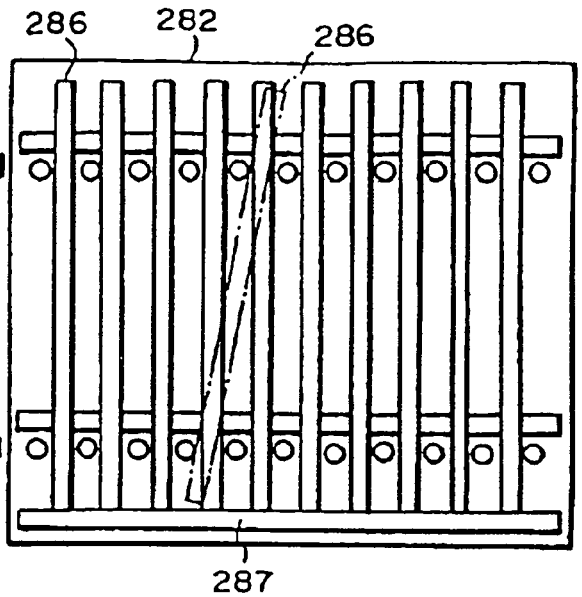

FIGS. 59A and 59B are views for explaining the arrangement of the glass plate holding apparatus used at this time. The arrangement and function of the glass plate holding apparatus will be explained in detail with reference to FIGS. 59A and 59B. A plurality of glass plates 286 stored in this apparatus are held in parallel with each other at a predetermined gap. This can sufficiently flow a processing solution along the glass surface in the liquid processing bath. To satisfactorily remove a solution and minimize carry-over of the processing solution from the processing bath, the glass plate 286 is preferably held such that the surface of the glass plate 286 stands almost vertically. As represented by the chain line, the glass plate 286 may be held with a proper inclination.

A support member 287 in contact with a corresponding glass plate 286 typically has a columnar shape. Since a portion of the support member 287 in contact with the substrate has a round or arcuated shape, the support member 287 comes into linear contact with the glass plate 286 to hold it. This structure can also reduce carry-over of the processing solution.

In this glass plate holding apparatus, removal of the processing solution is improved by the shape of the support member 287 or the like, and in addition, the processing solution may be removed from the glass plate 286 with an air blow or the like. The glass plate holding apparatus can be applied both when a plurality of glass plates equal in size are held and when a plurality of glass plates different in size are held.

The glass plate holding apparatus must rapidly move between liquid processing bathes while storing many glass plates 286. For this purpose, this apparatus must be strong as a whole. In addition, the apparatus must resist corrosion in order to cope with processing with acid and alkaline solutions. For example, the glass plate holding apparatus can be made of a material such as stainless steel, Teflon, or polypropylene.

Figure 60:
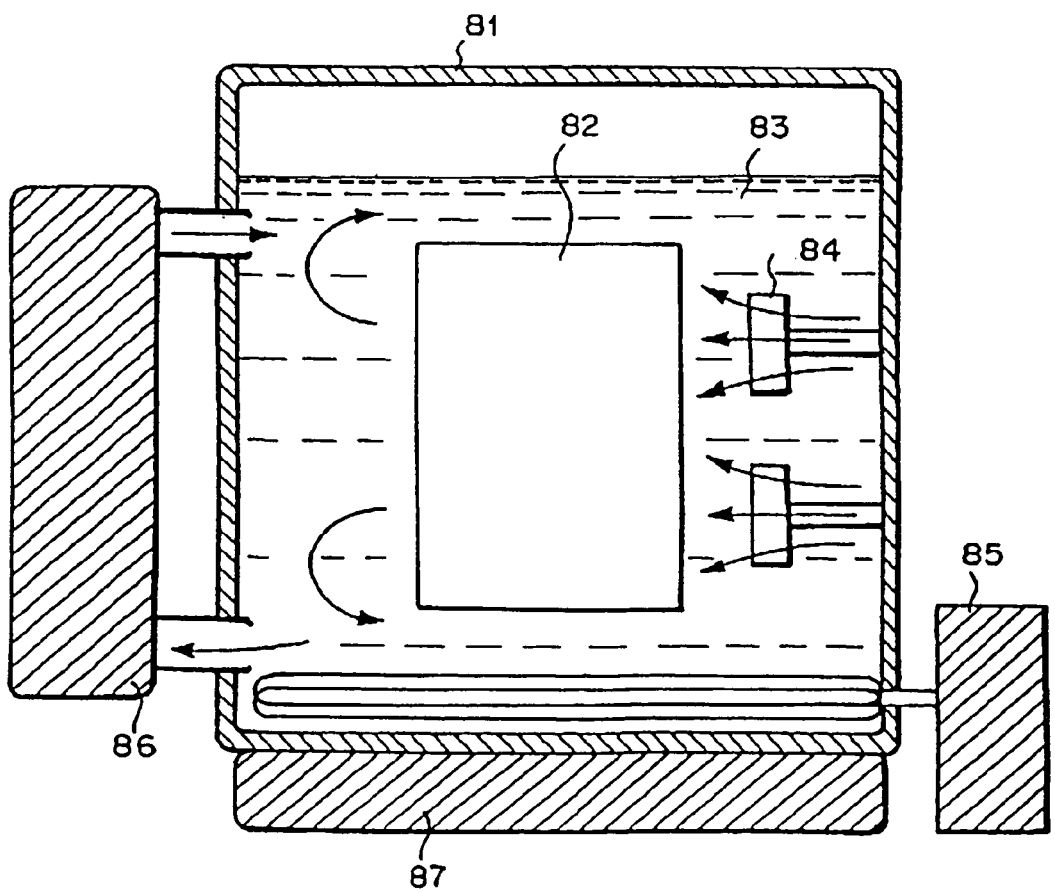
FIG. 60 is a schematic view showing the arrangement of a liquid processing bath according to the FPD disassembly processing method of the present invention.

FIG. 60 is a schematic view showing the arrangement of the processing bath used at this time. Glass plates are parallel-arranged by the holding apparatus at a predetermined interval in the processing bath 81 so as to prevent any contact of their surfaces. The glass plates are dipped in a liquid (e.g., dilute nitric acid) processing solution 83 which dissolves frit glass.

To accelerate dissolution of frit glass, a proper means is adopted: (1) the liquid of the processing solution 83 is flowed; (2) vibrations or acoustic waves are propagated to the glass plates; or (3) the temperature of the liquid is increased by a heating mechanism. The processing solution 83 in which frit glass is eluted is extracted from the processing bath 81, and lead and eluted substances are recovered in step (17) (see FIG. 61). As a result, the processing solution 83 is recycled and returned to the processing bath 81. By using the recycling/circulating mechanism for the processing solution 83, the internal environment of the processing bath 81 can be kept almost constant, and processing of removing residual frit glass from glass plates can be continuously performed. Arrows shown in FIG. 60 schematically represent the flow of the processing solution 83. Note that the processing bath 81 is made of a corrosion-resistant material such as stainless steel.

While the glass plates as the face plates 2 are kept stored in the glass plate holding apparatus, they are transferred from the processing bath 81 to a cleaning bath where the glass plates are cleaned (step (18)). In the cleaning step, a liquid (e.g., water) used for cleaning is used to remove the processing solution 83. The structure and function of the cleaning bath are basically the same as those of the processing bath 81. Glass having undergone the cleaning step can be reused as a face plate substrate through the shredding or re-melting step (step (19)).

In the rear plate 1 (20) in FIG. 61, a glass plate as the rear plate 1 is stored in a glass plate holding apparatus, and charged to a liquid processing bath in order to remove wiring lines (step (16)). The structure and function of the glass plate holding apparatus are basically the same as those of the apparatus used for the face plate.

Glass plates are parallel-arranged by the glass plate holding apparatus at a predetermined interval in the processing bath 81 so as to prevent any contact of their surfaces. The glass plates are dipped in a liquid (e.g., dilute nitric acid) which dissolves a wiring line material. The structure and function of the rear plate processing bath are basically the same as those of the face plate processing bath. After wiring lines are removed in the processing bath in step (21), metals (Ag, Pb, and the like) contained in the wiring lines are recovered.

While the glass plates as the rear plates 1 are kept stored in the glass plate holding apparatus, they are transferred from the processing bath to a cleaning bath where the glass plates are cleaned. In the cleaning step (23), a liquid (e.g., water) used for cleaning is used to remove the processing solution. The structure and function of the cleaning bath are basically the same as those of the above-mentioned processing bath. Glass having undergone the cleaning step can be reused as a face plate substrate through the shredding or re-fusing step (step (24)).

EXAMPLE 12

Detailed examples of the present invention will be explained with reference to FIGS. 43A, 43B, 32, 59A, and 59B to 61.

EXAMPLE 12-1

In Example 12-1 of the present invention, a plurality of glass plates 286 stored in the glass plate holding apparatus shown in FIGS. 59A and 59B are held in parallel with each other at a predetermined gap. Each glass plate is held such that the surface of the glass plate 286 stands almost vertically.

In Example 12-1, 10 glass plates 286 each having a thickness of 3 mm can be stored. A support member 287 in contact with a corresponding glass plate 286 has a columnar shape, and comes into linear contact with the glass plate 286 to hold it. The member in contact with the glass plate 286 is made of Teflon.

The glass plate holding apparatus of Example 12-1 is reinforced by many beams made of stainless steel so as to allow rapidly moving between liquid processing baths while storing 10 glass plates 286. These beams have a shape and layout which do not inhibit the flow of a processing solution in the liquid processing bath. The horizontal surface of each beam is suppressed small in order to minimize carry-over of the processing solution in pulling up the glass plate holding apparatus of Example 12-1 from the liquid processing bath.

EXAMPLE 12-2

Example 12-2 will exemplify disassembly processing of 10 surface-conduction type electron source displays (SED) of matrix driving scheme as shown in FIG. 32.

This SED has a panel structure including spacers as shown in FIGS. 43A and 43B. In accordance with the disassembly processing step for an FPD device in FIG. 61, an SED was extracted from the housing of an SED device, and accessory wiring lines and terminals were removed. The vacuum in the SED was canceled, and the exhaust pipe was detached. The exhaust pipe was processed and reused as lead-containing glass.

Cutting lines were set inside a region of the SED panel where frit glass was applied, and the SED was cut along the cutting lines with a diamond cutting saw while a grinding solution was applied. This operation was executed for the 10 SEDs.

By cutting, each SED was divided into a frame, face plate, and rear plate. Some of spacers came off in cutting, and some of spacers were kept bonded to the face plate. All the spacers were manually recovered, and recyclable spacers were screened and reused. The frame was shredded and reused as a lead-containing glass material. After metal backs and fluorescent substances were removed, the 10 face plates were stored in a glass plate holding apparatus 282 shown in FIGS. 59A and 59B.

To remove a residual lead component, the glass plate holding apparatus 282 was loaded to a liquid processing bath. FIG. 60 is a schematic view showing the arrangement of the processing bath used at this time. The processing bath was filled with 0.2-N nitric acid as a processing solution. The processing solution was flowed along the surfaces of the face plates by a liquid flowing means 84.

While the processing solution was heated to 50° C. by a heater 85, the face plates were processed for 1 h.

Meanwhile, the processing solution was supplied to a processing solution recycling mechanism where the processing solution was recycled and returned to the processing bath. The processing solution recycling mechanism removed a solid component with a filter, and a dissolved component was separated and recovered by the electrolytic method. Subsequently, the glass plate holding apparatus 282 of Example 12-2 was transferred from the processing bath to a cleaning bath where they were cleaned. The structure of the cleaning bath is basically the same as that of the processing bath. Water was used as a cleaning solution, and the face plates were cleaned for 30 min. Glass having undergone the cleaning step was extracted from the glass plate holding apparatus 282, shredded or re-melted, and reused as a face plate substrate.

Ten rear plates were stored in the glass plate holding apparatus 282 shown in FIGS. 59A and 59B. The glass plate holding apparatus 282 was charged to the liquid processing bath shown in FIG. 60 to remove residual frit glass and wiring lines. The processing solution was 0.2-N nitric acid. While the processing solution was heated to 50° C., and ultrasonic waves were applied by an ultrasonic wave application means 87, the rear plates were processed for 2 h.

The glass plate holding apparatus 282 which stored the 10 rear plate substrates was transferred from the processing bath to a cleaning bath where they were cleaned. The structure of the cleaning bath is basically the same as that of the processing bath. Water was used as a cleaning solution, and the rear plates were cleaned for 30 min. Glass having undergone the cleaning step was extracted from the glass plate holding apparatus 282, shredded or re-melted, and reused as a rear plate substrate.

A case wherein an electron source substrate having many surface-conduction type electron-emitting elements is formed on a glass substrate processed by the method of the present invention, and an image forming apparatus is manufactured using this electron source substrate will be described.

Pt electrodes were formed in a matrix on a recycled glass substrate by vacuum film formation and photolithography. In this case, the interval between element electrodes was 20 μm; the width of each element electrode, 500 μm; the thickness, 100 nm; and the layout pitch of the element, 1 mm. Then, Ag wiring lines were formed in a matrix by printing.

An aqueous palladium acetate monoethanolamine solution was applied between element electrodes by a spinner, and heated and baked at 270° C. for 10 min, thereby obtaining a thin film made of fine palladium oxide (PdO) particles. This film was processed into a 300-μm wide conductive thin film by photolithography and dry etching.

A voltage was applied between element electrodes in vacuum to perform forming processing, thereby forming a fissure-like electron-emitting portion in the conductive thin film.

The element having undergone electrification forming was subjected to activation processing. In this embodiment, ethylene gas was introduced into vacuum, and a pulse voltage having a peak value of 20 V was repetitively applied between element electrodes for 30 min. By this activation step, a compound mainly containing carbon was deposited to about 10 nm near the electron-emitting portion.

The electron source substrate having many surface-conduction type electron-emitting elements was used as a rear plate, and this rear plate constituted an envelope together with a face plate and support frame. The interior of the envelope was evacuated and sealed to obtain an image forming apparatus having a display panel and a driving circuit for realizing television display. This image forming apparatus formed a high-quality image free from any non-emission portion (pixel defect).

Embodiment 13

A preferred embodiment of the present invention will be described below with reference to the accompanying drawings. Embodiment 13 will exemplify disassembly processing for a flat panel display as shown in FIG. 29.

Figure 62:
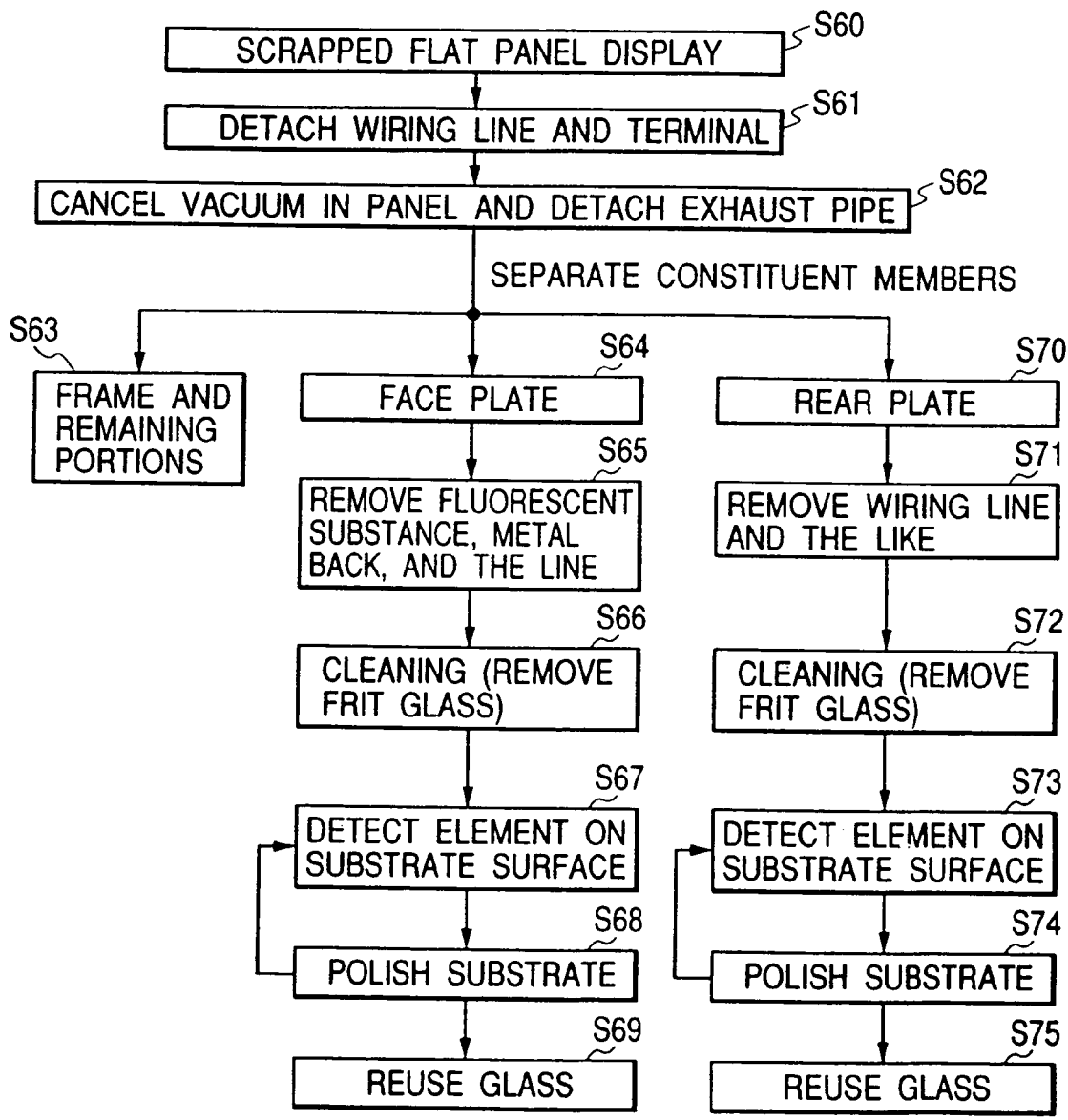
FIG. 62 is a flow chart showing the flat display disassembly processing step according to the present invention.

FIG. 62 is a flow chart showing the steps of a disassembly processing method according to Embodiment 13. After wiring lines, terminals, and like are detached from a flat panel display (S61) extracted from a housing (S60), the vacuum in the flat panel display is canceled, and an exhaust pipe is detached (S62). The flat panel display is separated into constituent members, i.e., a face plate (S64), rear plate (S70), and frame or the like (S63). In general, frit glass which joins these members is made of low-melting glass mainly containing lead oxide. As the separation method, frit glass may be melted by heating or dissolved with a proper solvent.

After fluorescent substances, black substances, and metal back are removed from the separated face plate (S64) by an appropriate method (S65), the face plate is cleaned with a solvent such as nitric acid and water in order to remove residual frit glass and clean the glass surface (S66). Also, the separated rear plate (S70) can be cleaned with a proper solvent and water (S71 and S72) to remove part or all of a constituent material formed on the substrate.

Elements present on the surface of the glass substrate having undergone the removal step are detected.

Figure 63:
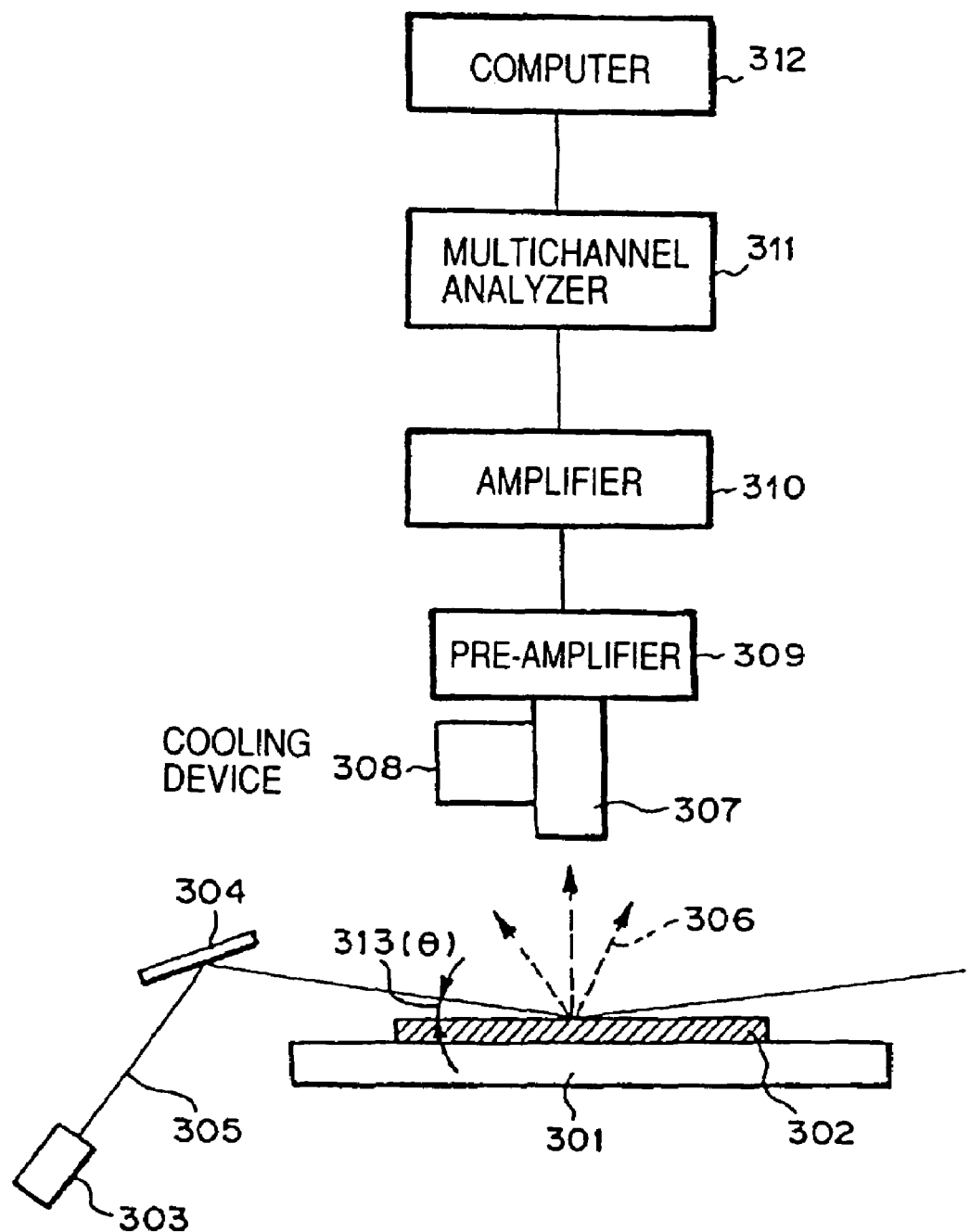
FIG. 63 is a schematic view showing a fluorescent X-ray analysis apparatus for detecting an element present on a glass substrate surface according to the present invention.

FIG. 63 is a schematic view showing a fluorescent X-ray analyzer according to the present invention for detecting elements present on the glass surface. In FIG. 63, reference numeral 301 denotes a table for a glass substrate 302; 302, the glass substrate serving as a sample; 303, an X-ray source; 304, a monochomater; 305, a primary X-ray; 306, a fluorescent X-ray; 307, a semiconductor detector; 308, a cooling device; 309, a pre-amplifier; 310, an amplifier; 311, a multichannel analyzer; and 312, a computer.

Elements are detected by the following procedures. The primary X-ray 305 emitted by the X-ray source 303 is monochromatized by the monochomater 304, and incident on the surface of the glass substrate 302 on the table 301 at an angle θ. The X-ray source has energy large enough to excite elements present on the glass substrate 302. For example, a W-Lα ray, Au-Lα ray, Mo-Kα ray, or the like is used. The surface of the glass substrate 302 irradiated with the primary X-ray 305 generates a fluorescent X-ray, which is detected by the semiconductor detector 307 arranged above the glass substrate 302. As the detector, an Si (Li) semiconductor detector is used. A detection signal from the semiconductor detector 307 is processed by the computer 312 via the pre-amplifier 309, amplifier 310, and multichannel analyzer 311. The computer 312 obtains a signal strength corresponding to the type and concentration of element on the surface of the glass substrate 302. Note that the semiconductor detector 307 and pre-amplifier 309 are cooled with liquid nitrogen.

If the incident angle θ of the primary X-ray 305 is set to an angle at which the X-ray is totally reflected, i.e., to a small angle equal to or smaller than the critical angle of total reflection, the X-ray enters the sample surface only by about several nm, and a fluorescent X-ray is efficiently generated. From this, sensitive element analysis can be executed at a lower detection limit of about $10^9$ atoms/cm$^2$ in a region from the sample surface by several nm or less. The critical angle of total reflection can be calculated by $\theta c \cong 1.64 \times 10^5 \times \rho^{1/2} \times \lambda$ ($\rho$: substrate density (g/cm$^3$), $\lambda$: wavelength of X-ray (cm)).

A large glass substrate 302 in this embodiment has a side length of several ten cm. The gist of the present invention is to efficiently perform element analysis for such a wide area at low cost. To measure elements at high sensitivity by this method, the detector generally preferably comes as close as possible to the sample surface. In this case, the analysis region substantially depends on the diameter of the detector, and this diameter is generally about several ten mmφ. However, in measuring a wide area while the sample and detector are very close to each other, the sample must be scanned to obtain data at many points, or many detectors must be arranged. This results in a long time and high installation cost.

To prevent this, the present invention adopts a method of changing the relative positions of the sample surface and detector in accordance with the size of the substrate in order to efficiently perform element analysis without decreasing the sensitivity. The method of changing the relative position in the present invention will be explained with reference to FIG. 64.

Figure 64A:
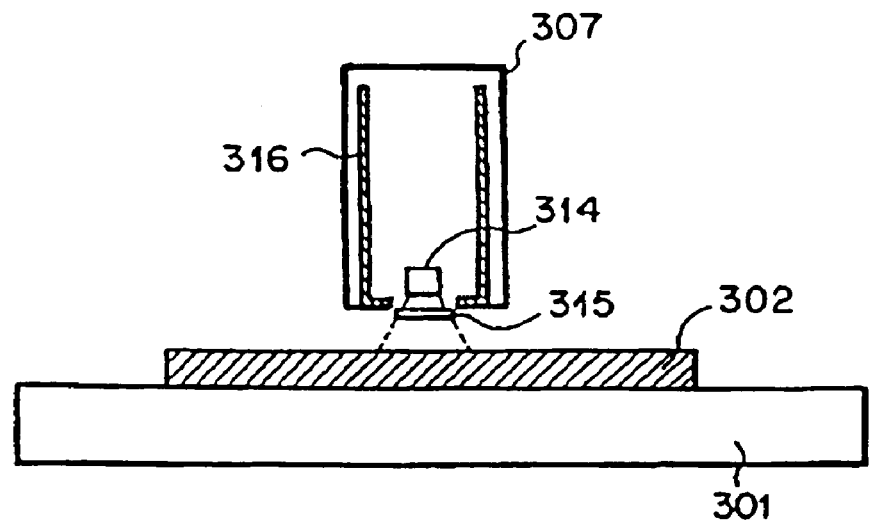
FIGS. 64A and 64B are schematic views showing a state in which the relative positions of a sample surface and detector are changed in a total reflection type fluorescent X-ray analysis apparatus according to the present invention.
Figure 64B:
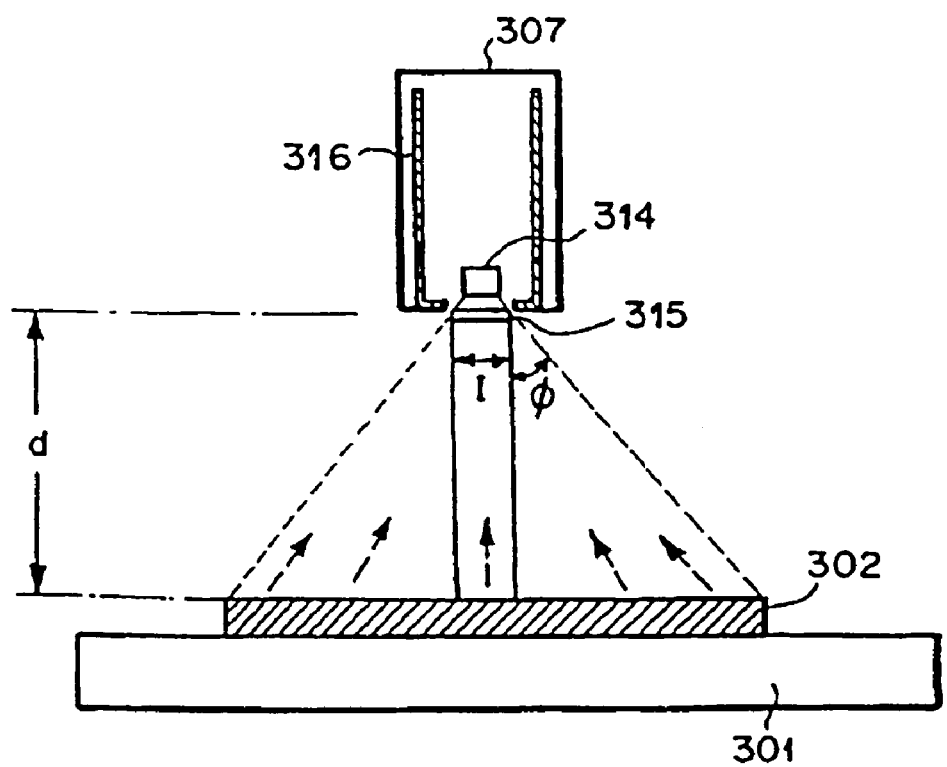

In FIGS. 64A and 64B, reference numeral 301 denotes the table for the glass substrate 302; 302, the glass substrate serving as a sample; 307, the semiconductor detector; 314, a semiconductor element; 315, an X-ray transmission window; and 316, a collimator. The semiconductor detector 307 has an arrangement as shown in FIGS. 64A and 64B. The semiconductor element 314 can receive X-rays from a region represented by dotted lines, i.e., a region having an angle φ determined by the size of the X-ray transmission window 315, the relative position to the semiconductor element 314, and the like, and an area depending on a size I of the semiconductor element 314 itself.

When the semiconductor detector 307 moves close to the sample surface, as shown in FIG. 64A, the analysis region becomes almost equal to the diameter of the X-ray transmission window 315. To the contrary, when the semiconductor detector 307 moves apart from the sample surface to a state shown in FIG. 64B, an X-ray intensity detectable from a unit area decreases, but the detectable region widens. Hence, when fluorescent X-rays are to be detected from the glass substrate 302 having a side length L, a distance d between the glass substrate 302 and the semiconductor detector 307 is set to obtain 2d·tan φL. While a primary X-ray irradiates the entire surface of the glass substrate 302, fluorescent X-rays are measured. As a result, X-rays can be received from the entire glass substrate 302 without decreasing the sensitivity.

Figure 65:
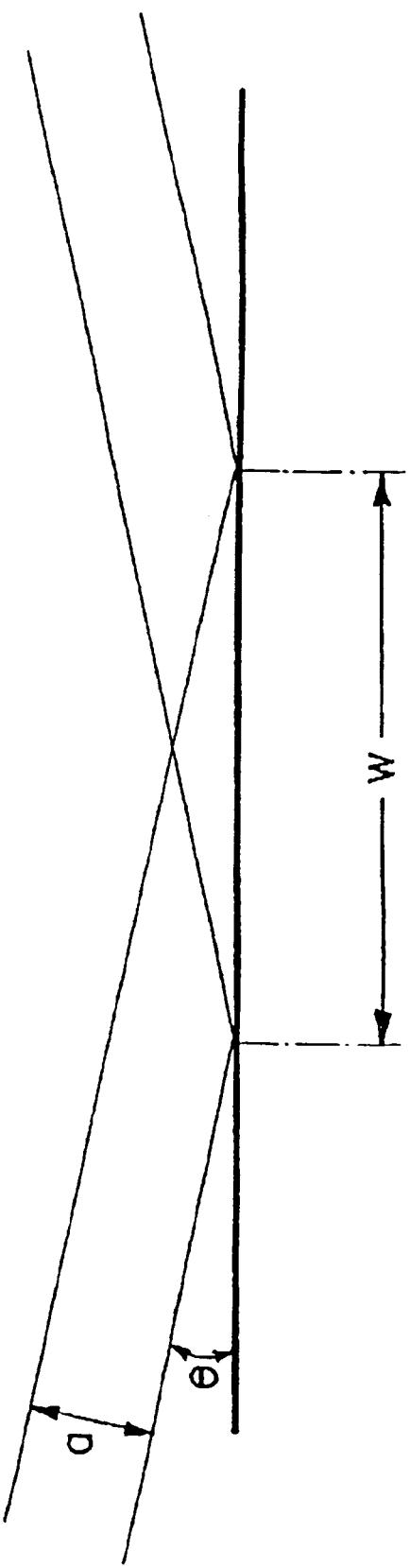
FIG. 65 is a schematic view showing the irradiation region of a primary X-ray in the total reflection type fluorescent X-ray analysis apparatus according to the present invention.

To irradiate a desired region with an X-ray, a beam diameter a of the primary X-ray is determined based on a W·sinθ from a region W to be irradiated and the incident angle θ of the primary X-ray, as shown in FIG. 65. Note that when the glass substrate 302 is too large, and a corresponding distance d is difficult to ensure in terms of mounting, the glass substrate 302 can be divided into a plurality of regions and repetitively measured.

Figure 66A:
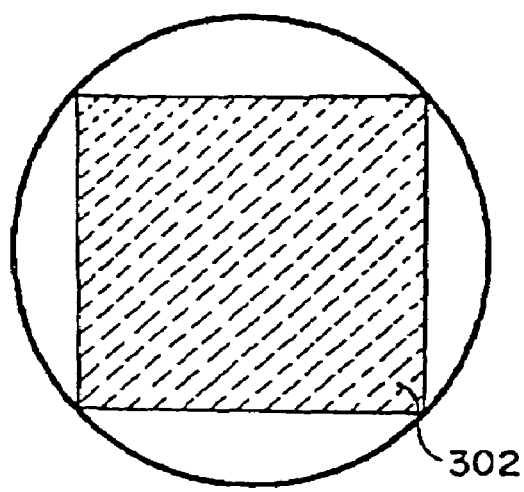
FIGS. 66A and 66B are schematic views each showing the detection region of a fluorescent X-ray in the total reflection type fluorescent X-ray analysis apparatus according to the present invention.
Figure 66B:
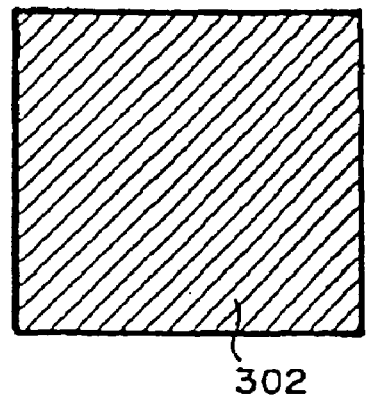

The X-ray transmission window 315 of the semiconductor detector 307 preferably has a rectangular shape similar to the shape of the glass substrate 302. For example, FIGS. 66A and 66B show the difference in the detection region of the fluorescent X-ray between a case wherein the X-ray transmission window 315 has a circular shape (FIG. 66A), and a case wherein the window 315 has a shape similar to the glass substrate 302 (FIG. 66B). In FIG. 66, reference numeral 302 denotes the glass substrate (plan view), and a dotted line or dotted portion represents an X-ray detection region. When the X-ray transmission window 315 is circular, its shape does not coincide with the glass substrate 302, and thus the detection efficiency is not always high. To the contrary, in FIG. 66B, an X-ray can be efficiently detected. Although the aspect ratio of the glass substrate 302 is not always constant, a proper transmission window shape is selected in accordance with the type of glass substrate and the number of glass substrates to be used, which can realize a more efficient detection step. By detecting fluorescent X-rays generated from the surface of the glass substrate 93 by this method, the presence/absence of residual elements on the substrate surface and elements diffused into the substrate and the presence/absence of a thin film formed on the substrate surface can be detected.

When elements other than a glass constituent element are detected in the above step, the step of removing the detected elements is executed. Although various methods can be employed as the removal method, surface polishing of the glass substrate 302 is especially preferable.

Figure 67:
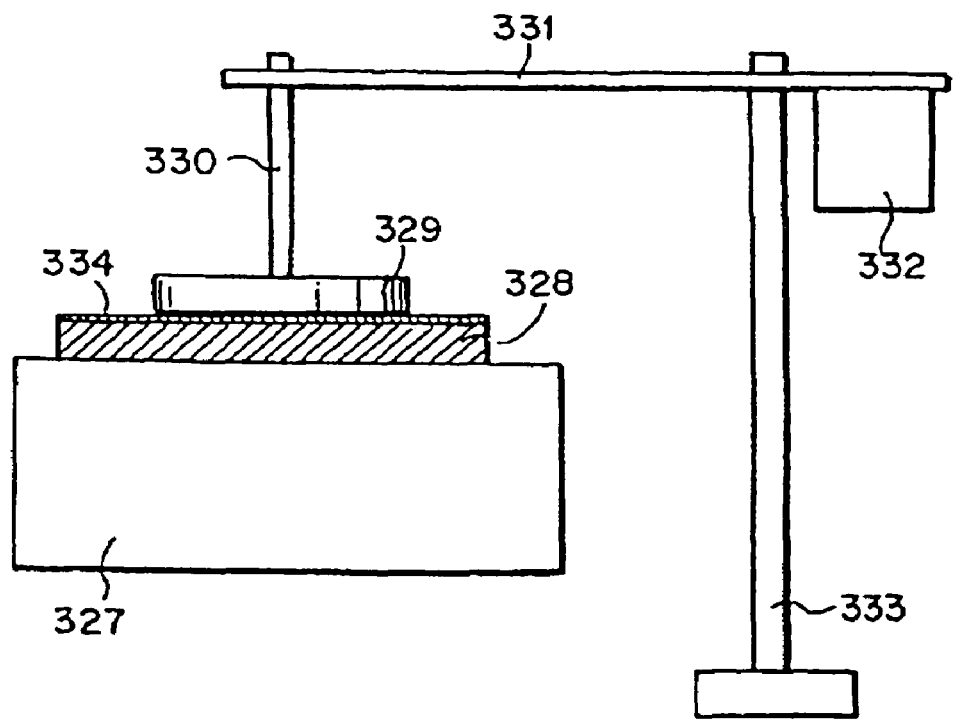
FIG. 67 is a schematic view showing a glass substrate surface polishing device according to the present invention.
Figure 68A:
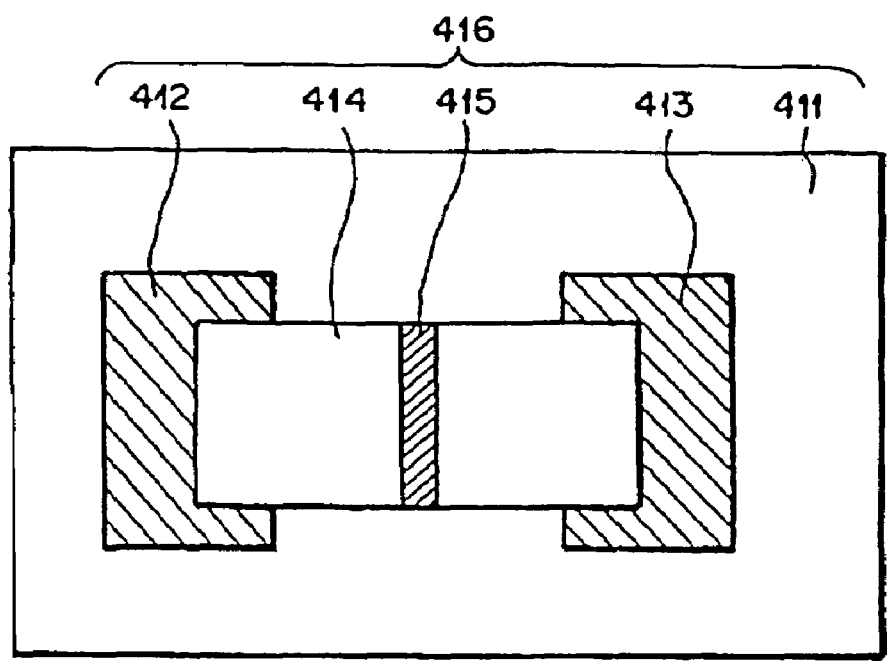
FIG. 68A is a plan view showing an electron-emitting element which can be used for the present invention.
Figure 68B:
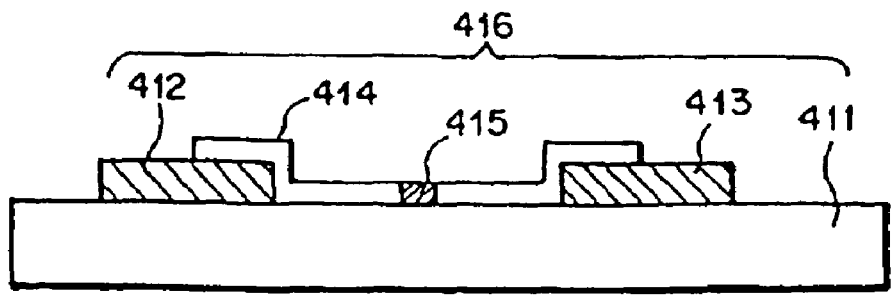
FIG. 68B is a sectional view showing the electron-emitting element in FIG. 68A.
Figure 69A:
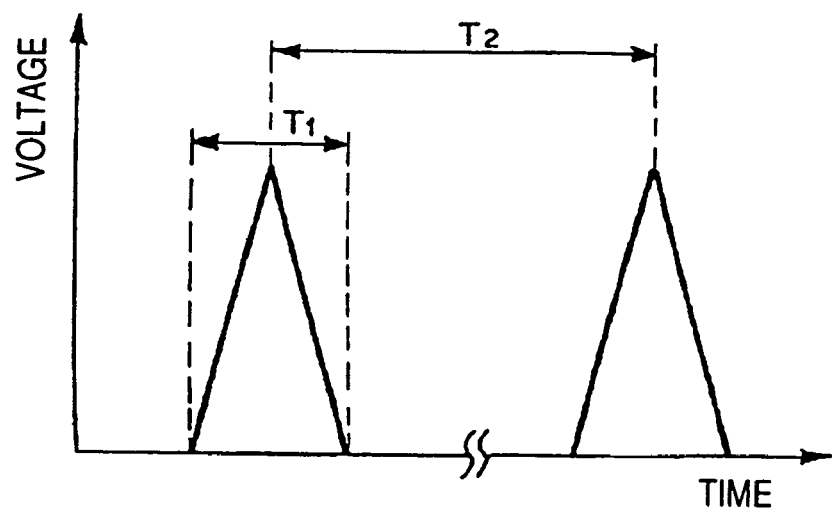
FIGS. 69A and 69B are waveform charts each showing the application voltage in forming the electron-emitting element used in the present invention.
Figure 69B:
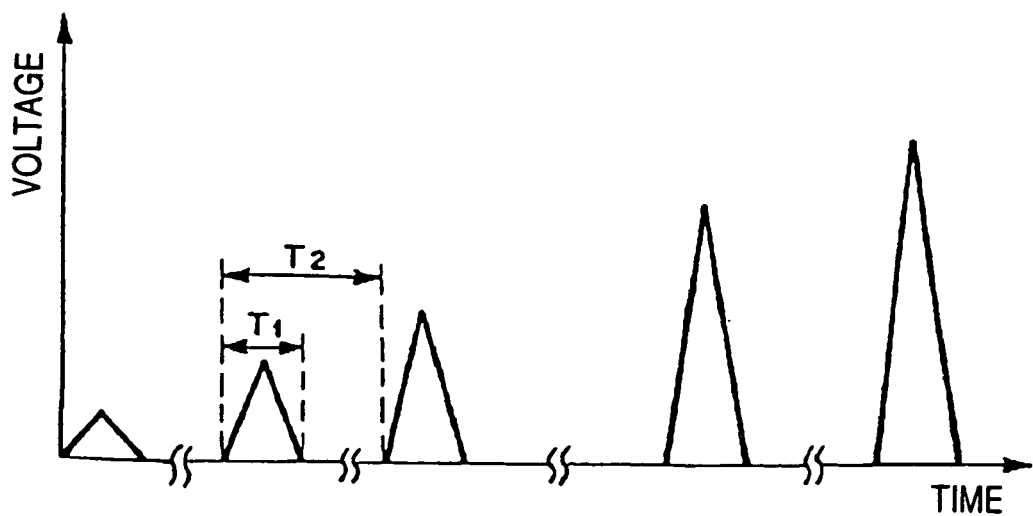

FIG. 67 is a schematic view showing an example of a polishing device in the present invention. In FIG. 67, reference numeral 327 denotes a table for a glass substrate 328; 328, the glass substrate; 329, a polishing tool; 330, a rotation support bar; 331, a support arm; 332, a motor; 333, a column; and 334, a polishing target surface. The glass substrate 328 to be polished is placed on the table 327 with the polishing target surface facing up. The polishing tool 329 is pressed against the polishing target surface. The motor 332 operates to rotate the rotation support bar 330 and polishing tool 329. At the same time, a slurry containing a polishing agent such as cerium oxide is supplied to the polishing target surface 334 to start polishing the glass surface 334.

The polished glass substrate 328 is cleaned and subjected to the above-described element analysis again. Until no element other than the glass constituent element of the glass substrate 328 is detected, element detection and polishing on the polishing target surface 334 are repeated. The glass substrate 328 having undergone this step is shredded into cullets, and can be reused as a flat display substrate or a material for another product through the re-melting step.

EXAMPLE 13

The present invention will be explained in more detail below by way of Example 13. Example 13 will describe disassembly processing of a surface-conduction type electron source display of matrix driving scheme as shown in FIG. 29.

EXAMPLE 13-1

In Example 13-1, a face plate 2 and rear plate substrate are formed from silica glass substrates each having a size of 800 mm×800 mm×2.8 mm. The rear plate is constituted by forming, on a substrate, cold cathode elements 11 mainly containing Pd, wiring lines 12 mainly containing Ag, Pt electrodes, and the like. The face plate 2 is constituted by forming fluorescent substances 2b, black substances, a metal back 2c, and the like on a substrate. A disassembly processing method for the display having this arrangement will be described with reference to FIGS. 63, 64A, 64B, 67, and 29.

(1) A housing was dismantled, and a unit made up of a rear plate 1, face plate 2, and frame 3 welded with frit glass was extracted.

(2) The unit of the rear plate 1, face plate 2, and frame 3 was dipped in a 0.2-N nitric acid solution to gradually dissolve the welded portions, thereby separating the respective members.

(3) After constituents formed on the rear plate 1 and face plate 2 were physically scrapped, the rear plate 1 and face plate 2 were dipped in a 0.2-N nitric acid solution again, and ultrasonic vibrations were applied to them. The rear plate 1 and face plate 2 were cleaned with pure water to remove frit glass left on the substrates and other dissolved substances.

(4) Elements present on each substrate surface were detected by a fluorescent X-ray analyzer as shown in FIG. 63. An Au-Lα ray ($\lambda$=0.12764 nm) was used as an X-ray source, and the incident angle θ of an X-ray on the substrate was set to the critical angle of total reflection or more. To irradiate the entire surface of the glass substrate with an X-ray, an X-ray having a beam width of 0.15 mm or more and a depth of 80 mm or more shown in FIG. 65 irradiated the substrate. The X-ray transmission window had a square shape, and the distance d between the glass substrate and the detector shown in FIGS. 64A and 64B was set to 40 mm.

With these settings, fluorescent X-rays generated from the entire surface of the glass substrate were received for 200 sec to measure elements. As a result, Pt and Ag were detected from the rear plate substrate in addition to Si as a substrate element, whereas no element except for Si was detected from the face plate substrate.

(5) The surface of the rear plate substrate from which Pt and Ag were detected was polished by the polishing device shown in FIG. 67. A polishing tool 329 was pressed against the polishing target surface of the substrate. While the polishing tool was rotated, and a cerium oxide slurry having an average diameter of 10 μm was supplied, the whole substrate was polished for 5 min.

(6) The polished rear plate substrate was cleaned with pure water, and subjected to element analysis again. As a result, it was confirmed that Pt and Ag were removed to the detection limit or less and all the residues on the substrate were removed.

(7) The rear plate substrate having undergone the above steps could be reused as a substrate together with the face plate substrate not requiring the polishing step, without shredding the rear plate substrate into cullets.

EXAMPLE 13-2

In Example 13-2, a face plate substrate is formed from a soda-lime glass substrate having a size of 80 mm×800 mm×2.8 mm, whereas a rear plate substrate is formed by stacking an $SiO_2$ thin film to 100 nm on a soda-lime glass substrate equal in size to the rear plate substrate. The rear plate is constituted by forming, on a substrate, cold cathode elements 11 mainly containing Pd, wiring lines 12 and 13 mainly containing Ag, Pt electrodes, and the like. The face plate is constituted by forming fluorescent substances, black substances, a metal back, and the like on a substrate. A disassembly processing method for this display will be described.

By the same method as steps (1) to (3) in Example 13-1, a rear plate, face plate, and frame were separated, and some of the constituent materials of elements formed on the substrates were removed.

(4) Then, elements present on each substrate surface were detected. In Example 13-2, an Au-Lα ray ($\lambda$=0.12764 nm) was used as an X-ray source, and the incident angle θ of an X-ray on the substrate was set to 0.1° equal to or smaller than the critical angle of total reflection. To irradiate the entire surface of the glass substrate with an X-ray, an X-ray having a beam width of 0.15 mm or more and a depth of 80 mm or more shown in FIG. 65 irradiated the substrate. The X-ray transmission window had a square shape, and the distance d between the glass substrate and the detector shown in FIGS. 64A and 64B was set to 40 mm.

With these settings, fluorescent X-rays generated from the entire surface of the glass substrate were received for 200 sec to perform element analysis. As a result, Pt, Ag, and Pb were detected from the rear plate substrate in addition to a substrate constituent element, and Pb was detected from the face plate substrate in addition to a substrate constituent element.

(5) The surfaces of the rear plate and face plate substrates were polished by the polishing device shown in FIG. 67. A polishing tool 329 was pressed against the polishing target surface of each substrate. While the polishing tool was rotated, and a cerium oxide slurry having an average diameter of 10 μm was supplied, the whole substrate was polished for 5 min.

(6) The polished rear plate substrate was cleaned with pure water, and subjected to element analysis again. As a result, Pt and Ag were removed to the detection limit or less, but Ag was still detected even with a low intensity, while no element other than a substrate constituent element was detected from the face plate substrate.

(7) The surface of the rear plate substrate was polished again by the polishing device shown in FIG. 67. By the same method as step (5), the whole substrate was polished for 15 min.

(8) The polished rear plate substrate was cleaned with pure water and subjected to element analysis again. As a result, it was confirmed that no element other than a substrate constituent element was detected and residues on the substrate and elements diffused into the substrate could be removed.

(9) The rear plate substrate and face plate substrate having undergone these steps were shredded into cullets, subjected to the melting step, and reused as a flat display substrate.

EXAMPLE 13-3

In Example 13-3, face plate and rear plate substrates are formed from silica glass substrates each having a size of 300 mm×250 mm×2.8 mm. A disassembly processing method for a flat display having the same arrangement as in Example 13-1 except for this will be described.

By the same method as steps (1) to (3) in Example 13-1, a rear plate, face plate, and frame were separated, and some of the constituent materials of elements formed on the substrates were removed in a nitric acid solution.

(4) Then, elements present on each substrate surface were detected by the total reflection type fluorescent X-ray analyzer as shown in FIG. 63. In Example 13-3, an Au-Lα ray ($\lambda$=0.12764 nm) was used as an X-ray source, and the incident angle θ of an X-ray on the substrate was set to 0.1°. To irradiate the entire surface of the glass substrate with an X-ray, an X-ray having a beam width of 0.6 mm or more and a depth of 300 mm or more shown in FIG. 65 irradiated the substrate. The X-ray transmission window had a square shape, and the distance d between the glass substrate and the detector shown in FIGS. 64A and 64B was set to 150 mm.

With these settings, fluorescent X-rays generated from the entire surface of the glass substrate were received for 200 sec to perform element analysis. As a result, Pt and Ag were detected from the rear plate substrate in addition to Si as a substrate element. From the face plate substrate, no element other than Si element was detected.

By the same method as steps (5) to (7) in Example 13-1, the glass surface was polished to remove all the residues on the substrate. The rear plate substrate having undergone the above steps could be reused as a substrate together with the face plate substrate not requiring the polishing step, without shredding the rear plate substrate into cullets.

EXAMPLE 13-4

In Example 13-4, a rear plate substrate is formed by stacking a P-doped $SiO_2$ thin film to 1 μm on a soda-lime glass substrate having a size of 300 mm×250 mm×2.8 mm. A disassembly processing method for a flat display having the same arrangement as in Example 13-1 except for this will be described.

By the same method as steps (1) to (3) in Example 13-1, a rear plate, face plate, and frame were separated, and some of the constituent materials of elements formed on the substrates were removed in a nitric acid solution.

(4) Then, elements present on each substrate surface were detected by the total reflection type fluorescent X-ray analyzer as shown in FIG. 63. In Example 13-4, an Mo-Kα ray ($\lambda$=0.07107 nm) was used as an X-ray source, and the incident angle θ of an X-ray on the substrate was set to 0.1°. To irradiate the entire surface of the glass substrate with an X-ray, an X-ray having a beam width of 0.6 mm or more and a depth of 300 mm or more shown in FIG. 65 irradiated the substrate. The X-ray transmission window had a square shape, and the distance d between the glass substrate and the detector shown in FIGS. 64A and 64B was set to 150 mm.

With these settings, fluorescent X-rays generated from the entire surface of the glass substrate were received for 200 sec to perform element analysis. As a result, Si, P, Pt, Ag, and Pb were detected from the rear plate substrate, and Pb was detected from the face plate substrate in addition to a substrate constituent element.

(5) The surfaces of the rear plate and face plate substrates were polished by the polishing device shown in FIG. 67. A polishing tool 329 was pressed against the polishing target surface of each substrate. While the polishing tool was rotated, and a cerium oxide slurry having an average diameter of 10 μm was supplied, the whole substrate was polished for 5 min.

(6) The polished rear plate substrate was cleaned with pure water, and subjected to element analysis again. As a result, Pt, Ag, and Pb were removed to the detection limit or less, and only Si and P were still detected, while no element other than a substrate constituent element was detected from the face plate substrate.

(7) The surface of the rear plate substrate was polished again by the polishing device shown in FIG. 67. By the same method as step (5), the whole substrate was polished for 10 min.

(8) The polished rear plate substrate was cleaned with pure water and subjected to element analysis again. As a result, P was removed to the detection limit or less, but K, Ca, and the like as glass constituent elements were detected. From this, it was confirmed that the P-doped $SiO_2$ layer was removed and all the residues on the substrate were removed.

(9) The rear plate substrate and face plate substrate having undergone these steps were shredded into cullets, subjected to the melting step, and reused as a flat display substrate.

A case wherein an electron source substrate having many surface-conduction type electron-emitting elements is formed on a glass substrate processed by the method of the present invention, and an image forming apparatus is manufactured using this electron source substrate will be described.

Pt electrodes were formed in a matrix on a recycled glass substrate by vacuum film formation and photolithography. In this case, the interval between element electrodes was 20 μm; the width of each element electrode, 500 μm; the thickness, 100 nm; and the layout pitch of the element, 1 mm. Then, Ag wiring lines were formed in a matrix by printing.

An aqueous palladium acetate monoethanolamine solution was applied between element electrodes by a spinner, and heated and baked at 270° C. for 10 min, thereby obtaining a thin film made of fine palladium oxide (PdO) particles. This film was processed into a 300-μm wide conductive thin film by photolithography and dry etching.

A voltage was applied between element electrodes in vacuum to perform forming processing, thereby forming a fissure-like electron-emitting portion in the conductive thin film.

The element having undergone electrification forming was subjected to activation processing. In this embodiment, ethylene gas was introduced into vacuum, and a pulse voltage having a peak value of 20 V was repetitively applied between element electrodes for 30 min. By this activation step, a compound mainly containing carbon was deposited to about 10 nm near the electron-emitting portion.

The electron source substrate having many surface-conduction type electron-emitting elements was used as a rear plate, and this rear plate constituted an envelope together with a face plate and support frame. The interior of the envelope was evacuated and sealed to obtain an image forming apparatus having a display panel and a driving circuit for realizing television display. This image forming apparatus formed a high-quality image free from any non-emission portion (pixel defect).

INDUSTRIAL APPLICABILITY

The effects of the present invention will be listed below along the numbers of the above-described embodiments and examples.

[Effect 1 of the Invention] According to the present invention, a scrapped FPD can be separated into glass not containing any lead and glass containing lead in disassembly processing, which can facilitate disassembly processing and reuse. Further, environmental pollution by lead can be prevented.

[Effect 2 of the Invention] The present invention can facilitate disassembly processing necessary for scrap and reuse of an FPD.

Since lead as a hazardous metal which causes a serious problem can be separated and recovered, environmental load in scrap can be reduced. Since rare elements in use such as noble metal elements and rare-earth elements can be recovered and reused, resources can be effectively ensured.

[Effect 3 of the Invention] According to the reuse method of the present invention, a rear plate as an important constituent component of a scrapped panel display can be reused to effectively use resources and reduce the cost.

[Effect 4 of the Invention] According to the present invention, since spacers can be recovered and reused with almost no damage in dismantling a flat display, resources can be effectively used, and the cost can be reduced. In addition, since the recovery step does not require any fine manual work, spacers can be safely recovered.

[Effect 5 of the Invention] The present invention can provide a method capable of efficiently recovering fluorescent substances from a CRT and flat display regardless of the type of device, and recovering a reusable face plate with almost no corrugations.

[Effect 6 of the Invention] An image display apparatus according to the present invention comprises a means connected to an airtight container kept at a pressure lower than the atmospheric pressure and an exhaust device, and a means for gradually returning the interior of the container to the atmospheric pressure as needed. In returning the airtight container to the atmospheric pressure, an atmospheric pressure-resistant structure member and image display means in the container are hardly destructed and damaged. Thus, members after dismantling can be easily reused. Moreover, defects generated during the manufacture can be easily repaired.

[Effect 7 of the Invention] In a flat display according to the present invention, members forming an envelope can be sequentially separated, so that the members can be safely recovered by a simple method without damaging the envelope and the internal members during the disassembly process. The members can, therefore, be recovered as reusable ones, resources can be effectively used, and the cost can be reduced.

[Effect 8 of the Invention] A residual hazardous metal amount inspection apparatus according to the present invention exhibits the following excellent effects.

In the residual hazardous metal amount inspection apparatus of the present invention, an inspection target object is dipped in the bath of a first elution means to elute a hazardous metal contained in the inspection target object with an acid solution in the bath. The inspection target object is transferred to a cleaning means where the object is cleaned. Then, the inspection target object is dipped in the bath of a second elusion means to elute a hazardous metal left on the inspection target object with an acid solution in the bath. This elution solution is supplied to a quantitative detection means, which quantitatively detects a hazardous metal amount contained in the elusion solution. Hence, in disassembling and fractionating a flat panel display or the like, the amount of hazardous metal such as lead left on an inspection target object such as a fractionated glass member or waste can be quantitatively detected.

In this case, the inspection target object is simply dipped in the dipping bath filled with the acid solution, and thus the amount can be easily quantitatively detected without any cumbersome operation. As far as the inspection target object does not dissolve in the acid solution, a hazardous metal such as lead contained in the inspection target object can be eluted. The material, shape, and the like of the inspection target object are not particularly limited, and various members can be inspected.

[Effect 9 of the Invention] A flat panel display disassembly apparatus according to the present invention exhibits the following excellent effects.

In the flat panel display disassembly apparatus of the present invention, a first support means supports a plate fixed to spacers by applying a pull-up force in the step of separating a frame member from a display main body (vacuum container). The spacers are suspended and are free from the weight of the fixed plate, and the frame member can be separated without applying any load to the spacers. This can prevent any damage to the spacers.

After the frame is separated, a second support means receives and supports the edge of the plate fixed to the spacers. At this time, the spacers are suspended and are free from the weight of the fixed plate. The step of separating the spacers from the plate received and supported by the second support means is executed by a spacer recovery means while the plate is kept received and supported. Also in the spacer separation/recovery step, the spacers are free from any extra weight, and can be prevented from being damaged.

That is, disassembly processing can be performed by proper steps, and directly reusable constituent members such as spacers can be recovered without any damage. As a result, constituent members can be preferably recycled.

[Effect 10 of the Invention] The present invention can process many glass substrates at once in the step of separating a component such as lead from a glass substrate by submergence processing in disassembling a scrapped FPD. Accordingly, (1) the necessary amount of processing solution is small, (2) energy required for processing is small, and (3) many glasses can be processed within a short time. Consequently, the cost of processing a scrapped FPD can be greatly reduced.

[Effect 11 of the Invention] The present invention improves a face plate fixing jig and fixing method in recovery work for fluorescent substances in recovering fluorescent substances from a flat panel display of this type. In addition, a brush used to recover fluorescent substances is driven based on positional information of the fixing jig. Fluorescent substances can be efficiently, reliably recovered.

[Effect 12 of the Invention] The present invention can easily process many glass substrates at once in a liquid processing bath in the step of separating a component such as lead from a glass substrate by submergence processing in disassembling a scrapped FPD. The present invention can safely, rapidly convey many glass substrates, and can easily automate the process. Consequently, the cost of processing a scrapped FPD can be greatly reduced.

[Effect 13 of the Invention] The present invention can detect, by a simple method, residues on a substrate surface and elements diffused into the substrate. At the same time, the present invention can remove all the elements other than a glass constituent element. Thus, glass can be efficiently reused without wastefully scraping it.

The invention claimed is:

1. A glass substrate processing method of detecting a surface state of a glass substrate and processing a substrate surface in accordance with a detection result, comprising:
    the detection step of irradiating the glass substrate surface with a primary X-ray, and detecting a generated fluorescent X-ray to detect an element present on the glass substrate surface; and
    the removal step of removing an element other than a glass constituent element from the glass substrate surface in accordance with a detection result of the detection step.

2. A glass substrate processing method according to claim 1, characterized in that the detection step of detecting an element present on the glass substrate surface comprises changing relative positions of the glass substrate and a fluorescent X-ray detector in accordance with a size of the glass substrate.

3. A glass substrate processing method according to claim 1, characterized in that a fluorescent X-ray detector irradiates with the primary X-ray a region wider than a region in which a fluorescent X-ray can be detected.

4. A glass substrate processing method according to claim 1, characterized in that an incident angle when the primary X-ray is incident on the glass substrate is not more than a critical angle of the primary X-ray.

5. A glass substrate processing method according to claim 1, characterized in that the removal step for the glass substrate surface is performed by polishing the glass substrate surface.

6. A glass substrate processing method according to any one of claims 1 to 5, characterized in that the detection step and the removal step for the glass substrate surface are repetitively performed.

7. A glass substrate recycling processing method in a flat display including a rear plate having a plurality of electron-emitting elements formed on a glass substrate, a face plate having an image display portion formed on a glass substrate, and a support frame which joins the plates so as to face each other, wherein
    the processing method defined in any one of claims 1 to 5 is applied to a substrate surface of the rear plate or the face plate after the rear plate and the face plate are separated and extracted.

8. A glass substrate recycling processing method in a flat display according to claim 7, characterized in that a wiring line mainly containing Ag is formed on the glass substrate of the rear plate.

9. A glass substrate recycling processing method in a flat display according to claim 7, characterized in that a thin film containing an element other than a glass constituent element is formed on the glass substrate surface constituting the rear plate.

10. A glass substrate recycling processing method according to claim 7, characterized in that fit glass for joining the rear plate, the face plate, and the frame is dissolved to separate the rear plate, the face plate, and the frame.

* * * * *

UNITED STATES PATENT AND TRADEMARK OFFICE
CERTIFICATE OF CORRECTION

PATENT NO. : 7,416,462 B2
APPLICATION NO. : 11/025991
DATED : August 26, 2008
INVENTOR(S) : Takashi Noma et al.

It is certified that error appears in the above-identified patent and that said Letters Patent is hereby corrected as shown below:

After Prior Publication Data please insert the following:

--[30] Foreign Application Priority Data

| | | |
|---|---|---|
| Sep. 9, 1998 | (JP) | ................ 10-255171 |
| Sep. 17, 1998 | (JP) | ................ 10-263033 |
| Sep. 17, 1998 | (JP) | ................ 10-263034 |
| Sep. 22, 1998 | (JP) | ................ 10-268151 |
| Jan. 11, 1999 | (JP) | ................ 11-004575 |
| Feb. 10, 1999 | (JP) | ................ 11-032142 |
| Feb. 10, 1999 | (JP) | ................ 11-032143 |
| Feb. 12, 1999 | (JP) | ................ 11-033855 |
| Feb. 23, 1999 | (JP) | ................ 11-045372 |
| Feb. 24, 1999 | (JP) | ................ 11-047086 |
| Feb. 24, 1999 | (JP) | ................ 11-047087 |
| Feb. 24, 1999 | (JP) | ................ 11-047088 |
| Feb. 24, 1999 | (JP) | ................ 11-047166 |
| Sep. 1, 1999 | (JP) | ................ 11-248061--. |

[62] Related U.S. Application Data

Line 4, after "6,623,113" insert --, which is a continuation of Application No. PCT/JP99/04866, filed on Sep. 8, 1999--.

[56] References Cited

FOREIGN PATENT DOCUMENTS, "JP   63-177047   7/1998" should read --JP 10-177047   7/1998--.

COLUMN 6:

Line 26, "stably" should read --stable--.

COLUMN 8:

Line 30, "solution.," should read --solution,--.

UNITED STATES PATENT AND TRADEMARK OFFICE
CERTIFICATE OF CORRECTION

PATENT NO.         : 7,416,462 B2
APPLICATION NO. : 11/025991
DATED                  : August 26, 2008
INVENTOR(S)        : Takashi Noma et al.

It is certified that error appears in the above-identified patent and that said Letters Patent is hereby corrected as shown below:

COLUMN 14:

Line 62, "fiat" should read --flat--.

COLUMN 20:

Line 21, "electron emitting" should read --electron-emitting--.

COLUMN 38:

Line 35, "rear-earth" should read --rare-earth--.

COLUMN 51:

Line 9, "came" should read --frame--.

COLUMN 65:

Line 26, "y-direction" should read --x-direction--.
    Line 30, "layer" should read --layers--.

Signed and Sealed this

Fifteenth Day of September, 2009

David J. Kappos
*Director of the United States Patent and Trademark Office*